United States Patent [19]

Duluk, Jr.

[11] Patent Number: 5,596,686
[45] Date of Patent: Jan. 21, 1997

[54] METHOD AND APPARATUS FOR SIMULTANEOUS PARALLEL QUERY GRAPHICS RENDERING Z-COORDINATE BUFFER

[75] Inventor: Jerome F. Duluk, Jr., Santa Clara County, Calif.

[73] Assignee: Silicon Engines, Inc., Palo Alto, Calif.

[21] Appl. No.: 231,251

[22] Filed: Apr. 21, 1994

[51] Int. Cl.$^6$ .................................................. G06T 15/40
[52] U.S. Cl. ......................... 395/122; 395/509; 395/515
[58] Field of Search ................................ 395/122, 157, 395/164, 165, 166

[56] References Cited

U.S. PATENT DOCUMENTS

| | | | |
|---|---|---|---|
| 5,146,592 | 9/1992 | Pfeiffer et al. | 395/157 |
| 5,245,700 | 9/1993 | Fossum | 395/122 |
| 5,363,475 | 11/1994 | Baker et al. | 395/122 |

OTHER PUBLICATIONS

Goris et al., "A Configurable Pixel Cache for Fast Image Generation", IEEE Computer Graphics & Applications, Mar. 1987.
Rossignac et al., "Depth–Buffering Display Techinues for Constructive Solid Geometry", IEEE Computer Graphics & Applications, Sep. 1986, pp. 29–39.
Akeley, K., "RealityEngine Graphics", Computer Graphics, Annual Conference, SIGGRAPH 1993 Conference Proceedings, Aug. 1–6, 1993, p. 109–116.
Carpenter, L., "The A–buffer, An Antialaised Hidden Surface Method", SIGGRAPH 1984 Conference Proceedings, pp. 103–108.
Clark, J. and Hannah, "Distributed Proc in High Performance Smart Image Memory", LAMDA 4th Quarter, Oct. 1990, pp. 40–45.
Clark, J., "Hierarchical geometric Models for Visible Surface Algorithms", Communications of the ACM, vol. 19, No. 10, Oct. 1976.
Cook, R., "The Reyes Image Rendering Architecture", SIGGRAPH 1987 Conference Proceedings, pp. 95–102.
Deering, M. and Nelson, S. "Leo: A System for Cost Effective 3D Shaded . . . " Computer Graphics, Annual Conference Series, SIGGRAPH 1993 Conference Aug. 1–6.
Demetrescu, S. "High Speed Image Rasterization Using . . . " Stanford Tech Report 83–244, Jun. 1983.
Demetrescu, S. "High Speed Image Rasterization Using . . . " 1985 Chapel Hill Conference on VLSI, pp. 221–243.
Foley, van Dam, Feiner and Hughes, "Computer Graphics: Principles and Practice", 2nd Edition, ISBNO–201–12110–7, Addison–Wesley, 1990, cor. '92, Ch. 15, pp. 649–720.
Fuchs, H., et al. "Pixel–Planes 5: A Heterogeneous Multiprocessor . . . " SIGGRAPH 1989 Conference Proceedings, pp. 79–88.

(List continued on next page.)

Primary Examiner—Mark K. Zimmerman
Attorney, Agent, or Firm—Flehr, Hohbach, Test, Albritton & Herbert

[57] ABSTRACT

Apparatus and method for a Parallel Query Z-coordinate Buffer are described. The apparatus and method perform a keep/discard decision on screen coordinate geometry before the geometry is converted or rendered into individual display screen pixels by implementing a parallel searching technique within a novel z-coordinate buffer based on a novel magnitude comparison content addressable memory (MCCAM) structure. The MCCAM provides means for performing simultaneous arithmetic magnitude comparisons on numerical quantities. These arithmetic magnitude comparisons include arithmetic less-than, greater-than, less-than-or-equal-to, and greater-than-or-equal-to operations between coordinate values of a selected graphical object and the coordinate values of other objects in the image scene which may or may not occult the selected graphical object. Embodiments of the method and apparatus utilizing variations of bounding box occulting tests, vertex bounding box occulting tests, span occulting tests, and raster-write occulting tests, as well as combinations of these tests are described.

30 Claims, 59 Drawing Sheets

OTHER PUBLICATIONS

Gharachorloo, N., et al. "A characterization of Ten Rasterization . . . ", SIGGRAPH 1989 Conference Proceedings, pp. 355–368.

Gharachorloo, No., et al. "Super Buffer: A systolic VLSI Graphics . . . " 1985 Chapel Hill Conf., ISBN 0–88175–103–0, Com. Science Press, pp. 285–305.

Garachorloo, et al. "Subnanosecond Pixel Renderer . . . " SIGGRAPH 1988 Conference Proceedings, Aug. 1988, pp. 41–49.

Greene, N., Kass, M., and Miller, G., "Hierarchial Z–Buffer Visibility . . . " SIGGRAPH 1993 Conference Proceedings, Aug. 1–6, 1993, pp. 231–238.

Gupta, S., "A VLSI Architecture for Updating . . . ", Computer Graphics, vol. 15, No. 3, Aug. 1981, pp. 71–78.

Gupta, S., "PS: Polygon Streams, A Distributed . . . ", Advances in Com. Graphics Hardware IV, ISBN 0–387–53473–3, Springer–Verlag, pp. 91–111.

Hu, Mei–Cheng, and Foley, J., "Parallel Processing Approaches . . . ", Computer and Graphics, vol. 9, No. 3, pp. 303–317, 1985.

Jackel, D. "The Graphics PARCUM System . . . ", Computer Graphics Forum, vol. 4, pp. 21–32, 1985.

Kaplan, M. and Greenberg, D., "Parallel Processing Techniques for Hidden . . . " SIGGRAPH 1979 Conference Proceedings, p. 300.

Kaufman, A., "A Two–Dimensional Frame Buffer Processor", Advances in Com. Graphics Hardware II, ISBN 0–387–50109–6, Springer–Verlag, pp. 67–83.

Nishizawa, T., et al., "A Hidden Surface Processor for 3 . . . " IEEE, ISSCC 1988, pp. 166–167, 351.

Ohhashi, M., et al., "A 32b 3–D Graphics Processor Chip with 10M . . . ", IEEE, ISSCC 1988, pp. 166–167, 351.

Oldfield, J. Williams, R., Wiseman, N., Brule, M., "Content Addressable . . . " Electronics Letters, vol. 23, No. 6, Mar. 1987, pp. 262–263.

Parke, F., "Simulation and Expected Performance of Multiple Processor . . . ", SIGGRAPH 1980 Conference Proceedings, pp. 48–56.

Pineda, J., "A Parallel Algorithm for Polygon Rasterization", SIGGRAPH 1988 Conference Proceedings, Aug. 1988.

Potmesil, M. and Hoffert, E., "The Pixel Machine: A Highly Parallel Image . . . ", SIGGRAPH 1989 Conference Proceedings, pp. 69–78.

Poulton, J., Fuchs, H., et al. "Pixel–Planes: Building a VLSI–Based . . . ", 1985 Chapel Hill Conference, ISBN 0–88175–103–0, Computer Science Press, pp. 35–60.

Schneider, B., "Towards A Taxonomy for Display Processors", Advances in Computer Graphics Hardware IV, ISBN 0–387–53473–3, Springer–Verlag, pp. 91–111.

Schneider, B., Clausen, U., "Proof: An Architecture for . . . " Advances in Comp. Graphics Hardware III, ISBN 0–387–53488–1, Springer–Verlag, pp. 67–83.

Soderberg, B., and Miller, D., "Image Generation Design for Ground–Based Network Training . . . ", Inter. Training Equipment Conf. May 4–6, 1993, London.

Sutherland, I. and Sproull, R., "A Characterization of ten Hidden–. . . " Computing Surveys, vol. 6, No. 1, Mar. 1974, pp. 1–55.

Torborg, G., "A Parallel Processor Architecture . . . " SIGGRAPPH 1987 Conference Proceedings, Jul. 27–31, 1987, pp. 197–204.

Weiler, K. and Atherton, P., "Hidden Surface Removal Using Polygon . . . ", Computer Graphics, vol. 11, No. 2, Jul. 1977, pp. 214–222.

Whelan, D., "A Rectangular Area Filling Display System . . . ", SIGGRAPH 1982 Conference Proceedings, Jul. 1982, pp. 147–153.

Franklin, W., "A Linear Time Exact Hidden Surface Algorithm", SIGGRAPH 1980 Conference Proceedings, pp. 117–123.

Franklin, W., "Parallel Object–Space Hidden Surface Removal", SIGGRAPH 1990 Conference Proceedings, pp. 87–94.

Values for this specific example:
XMAX = 119 (120 pixels per display screen)
YMAX = 79 (80 pixels per display screen)

| | X-fields 11004 | Y-fields 11006 | Z-fields 11008 | Infinity Flags 11010 | additional logic 11012 |
|---|---|---|---|---|---|
| word 9599 | x = 119 | y = 79 | z[119][79] | Inf. Flag | logic |
| word 9598 | x = 118 | y = 79 | z[118][79] | Inf. Flag | logic |
| word 9597 | x = 117 | y = 79 | z[117][79] | Inf. Flag | logic |
| ... | ... | ... | ... | ... | ... |
| word 9481 | x = 1 | y = 79 | z[1][79] | Inf. Flag | logic |
| word 9480 | x = 0 | y = 79 | z[0][79] | Inf. Flag | logic |
| word 9479 | x = 119 | y = 78 | z[119][78] | Inf. Flag | logic |
| ... | ... | ... | ... | ... | ... |
| word 241 | x = 1 | y = 2 | z[1][2] | Inf. Flag | logic |
| word 240 | x = 0 | y = 2 | z[0][2] | Inf. Flag | logic |
| word 239 | x = 119 | y = 1 | z[119][1] | Inf. Flag | logic |
| ... | ... | ... | ... | ... | ... |
| word 121 | x = 1 | y = 1 | z[1][1] | Inf. Flag | logic |
| word 120 | x = 0 | y = 1 | z[0][1] | Inf. Flag | logic |
| word 119 | x = 119 | y = 0 | z[119][0] | Inf. Flag | logic |
| ... | ... | ... | ... | ... | ... |
| word 3 | x = 3 | y = 0 | z[3][0] | Inf. Flag | logic |
| word 2 | x = 2 | y = 0 | z[2][0] | Inf. Flag | logic |
| word 1 | x = 1 | y = 0 | z[1][0] | Inf. Flag | logic |
| word 0 | x = 0 | y = 0 | z[0][0] | Inf. Flag | logic |

Raster Set 11014

MCCAM Word 12000 or 13000

12000

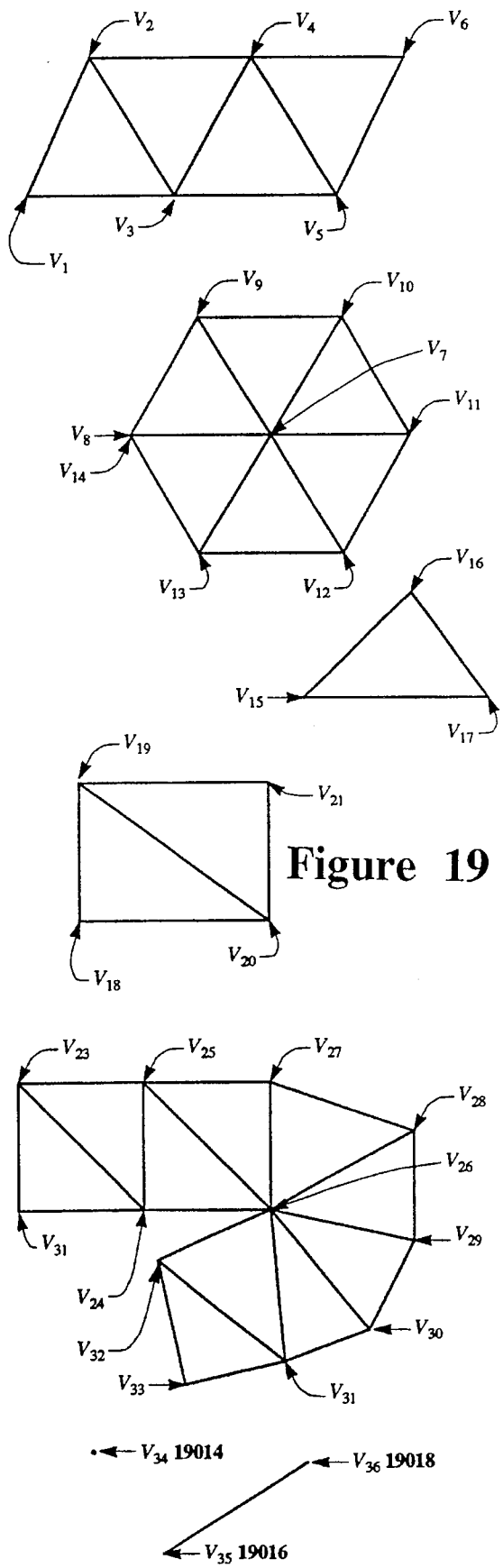

Figure 19

| New Vertex 19002 | Vertex Action 19004 | $R_0$ 19006 | $R_1$ 19008 | $R_2$ 19010 | Polygon Done 19012 |
|---|---|---|---|---|---|
| $V_1$ | Restart | $V_1$ | X | X | No |
| $V_2$ | Replace Oldest | $V_1$ | $V_2$ | X | No |
| $V_3$ | Replace Oldest | $V_1$ | $V_2$ | $V_3$ | Yes |
| $V_4$ | Replace Oldest | $V_4$ | $V_2$ | $V_3$ | Yes |
| $V_5$ | Replace Oldest | $V_4$ | $V_5$ | $V_3$ | Yes |
| $V_6$ | Replace Oldest | $V_4$ | $V_5$ | $V_6$ | Yes |
| $V_7$ | Restart | $V_7$ | X | X | No |
| $V_8$ | Replace Oldest | $V_7$ | $V_8$ | X | No |
| $V_9$ | Replace Oldest | $V_7$ | $V_8$ | $V_9$ | Yes |
| $V_{10}$ | Replace Middle | $V_7$ | $V_{10}$ | $V_9$ | Yes |
| $V_{11}$ | Replace Middle | $V_7$ | $V_{10}$ | $V_{11}$ | Yes |
| $V_{12}$ | Replace Middle | $V_7$ | $V_{12}$ | $V_{11}$ | Yes |
| $V_{13}$ | Replace Middle | $V_7$ | $V_{12}$ | $V_{13}$ | Yes |
| $V_{14}$ | Replace Middle | $V_7$ | $V_{14}$ | $V_{13}$ | Yes |
| $V_{15}$ | Restart | $V_{15}$ | X | X | No |
| $V_{16}$ | Replace Oldest | $V_{15}$ | $V_{16}$ | X | No |
| $V_{17}$ | Replace Oldest | $V_{15}$ | $V_{16}$ | $V_{17}$ | Yes |
| $V_{18}$ | Restart | $V_{18}$ | X | X | No |
| $V_{19}$ | Replace Oldest | $V_{18}$ | $V_{19}$ | X | No |
| $V_{20}$ | Replace Oldest | $V_{18}$ | $V_{19}$ | $V_{20}$ | Yes |
| $V_{21}$ | Replace Oldest | $V_{21}$ | $V_{19}$ | $V_{20}$ | Yes |
| $V_{22}$ | Restart | $V_{22}$ | X | X | No |
| $V_{23}$ | Replace Oldest | $V_{22}$ | $V_{23}$ | X | No |
| $V_{24}$ | Replace Oldest | $V_{22}$ | $V_{23}$ | $V_{24}$ | Yes |
| $V_{25}$ | Replace Oldest | $V_{25}$ | $V_{23}$ | $V_{24}$ | Yes |
| $V_{26}$ | Replace Oldest | $V_{25}$ | $V_{26}$ | $V_{24}$ | Yes |
| $V_{27}$ | Replace Oldest | $V_{25}$ | $V_{26}$ | $V_{27}$ | Yes |
| $V_{28}$ | Replace Oldest | $V_{28}$ | $V_{26}$ | $V_{27}$ | Yes |
| $V_{29}$ | Replace Middle | $V_{28}$ | $V_{26}$ | $V_{29}$ | Yes |
| $V_{30}$ | Replace Middle | $V_{30}$ | $V_{26}$ | $V_{29}$ | Yes |
| $V_{31}$ | Replace Middle | $V_{30}$ | $V_{26}$ | $V_{31}$ | Yes |
| $V_{32}$ | Replace Middle | $V_{32}$ | $V_{26}$ | $V_{31}$ | Yes |
| $V_{33}$ | Replace Oldest | $V_{32}$ | $V_{33}$ | $V_{31}$ | Yes |
| $V_{34}$ | Restart | $V_{34}$ | X | X | Yes |
| $V_{35}$ | Restart | $V_{35}$ | X | X | No |
| $V_{36}$ | Replace Oldest | $V_{35}$ | $V_{36}$ | X | Yes |

37000

| | X-fields 11004 | Y-fields 11006 | Z-fields 11008 | Infinity Flags 11010 | additional logic 11012 | Tag-fields 39010 | |
|---|---|---|---|---|---|---|---|
| word 9599 | x = 119 | y = 79 | z[119][79] | Inf. Flag | logic | Tag-field | |
| word 9598 | x = 118 | y = 79 | z[118][79] | Inf. Flag | logic | Tag-field | |
| word 9597 | x = 117 | y = 79 | z[117][79] | Inf. Flag | logic | Tag-field | |
| ... | ... | ... | ... | ... | ... | ... | |
| word 9481 | x = 1 | y = 79 | z[1][79] | Inf. Flag | logic | Tag-field | |
| word 9480 | x = 0 | y = 79 | z[0][79] | Inf. Flag | logic | Tag-field | |
| word 9479 | x = 119 | y = 78 | z[119][78] | Inf. Flag | logic | Tag-field | |
| ... | ... | ... | ... | ... | ... | ... | |
| word 241 | x = 1 | y = 2 | z[1][2] | Inf. Flag | logic | Tag-field | |
| word 240 | x = 0 | y = 2 | z[0][2] | Inf. Flag | logic | Tag-field | |
| word 239 | x = 119 | y = 1 | z[119][1] | Inf. Flag | logic | Tag-field | |
| ... | ... | ... | ... | ... | ... | ... | |
| word 121 | x = 1 | y = 1 | z[1][1] | Inf. Flag | logic | Tag-field | |
| word 120 | x = 0 | y = 1 | z[0][1] | Inf. Flag | logic | Tag-field | |
| word 119 | x = 119 | y = 0 | z[119][0] | Inf. Flag | logic | Tag-field | |
| ... | ... | ... | ... | ... | ... | ... | |
| word 3 | x = 3 | y = 0 | z[3][0] | Inf. Flag | logic | Tag-field | |
| word 2 | x = 2 | y = 0 | z[2][0] | Inf. Flag | logic | Tag-field | |
| word 1 | x = 1 | y = 0 | z[1][0] | Inf. Flag | logic | Tag-field | one Tag MCCAM Word 41000 |
| word 0 | x = 0 | y = 0 | z[0][0] | Inf. Flag | logic | Tag-field | |
| | | | | Comparison Register 23010 | | | Comp. Regs. 23010 |
| | | | | Comparison Register 23010 | | | |
| | | | | Comparison Register 23010 | | | |
| | | | | Hit Flag Register 23020 | | | Hit Flag Registers 23020 |
| | | | | Hit Flag Register 23020 | | | |
| | | | | Hit Flag Register 23020 | | | |
| | | | | Priority Resolver & Encoder 23040 | | | |

Values for this specific example:
XBLKMAX = 4 {5 blocks per display screen}
YBLKMAX = 7 {8 blocks per display screen}
XMAX = 1 {2 cells per block}
YMAX = 4 {5 cells per block}
XBLKMAX = 11 {12 pixels per cell}
YBLKMAX = 1 {2 pixels per cell}

47000 prior art

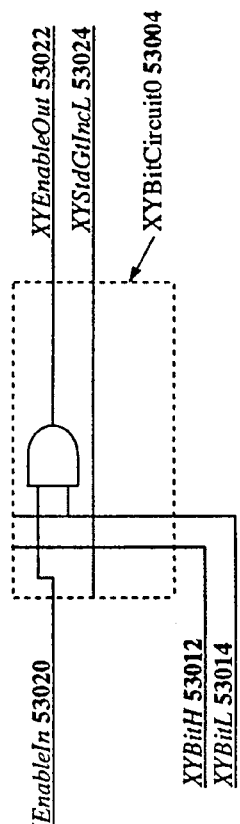
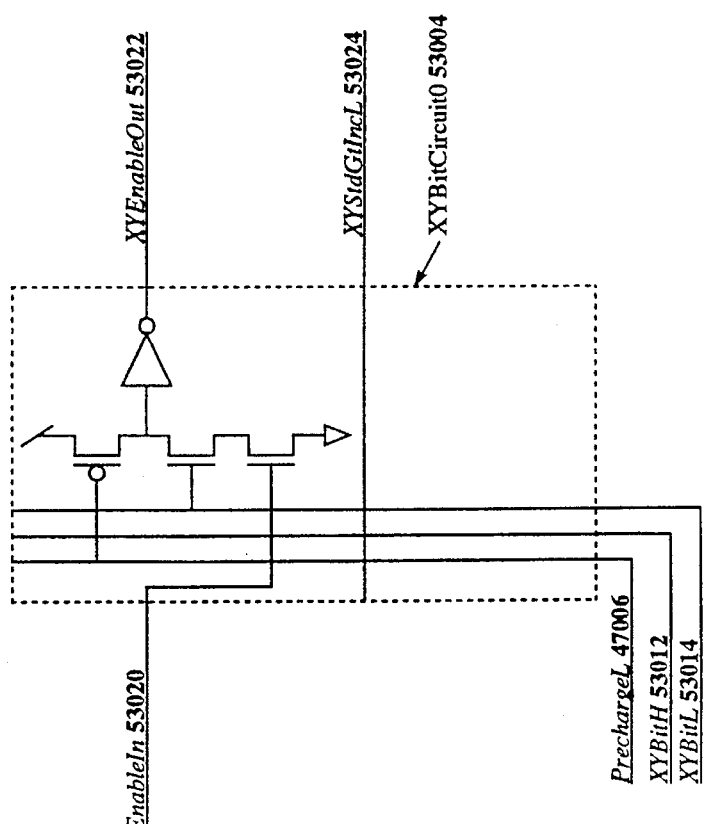
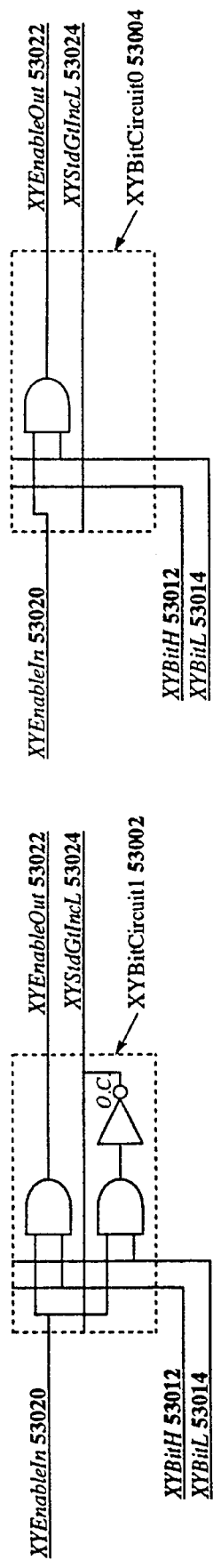
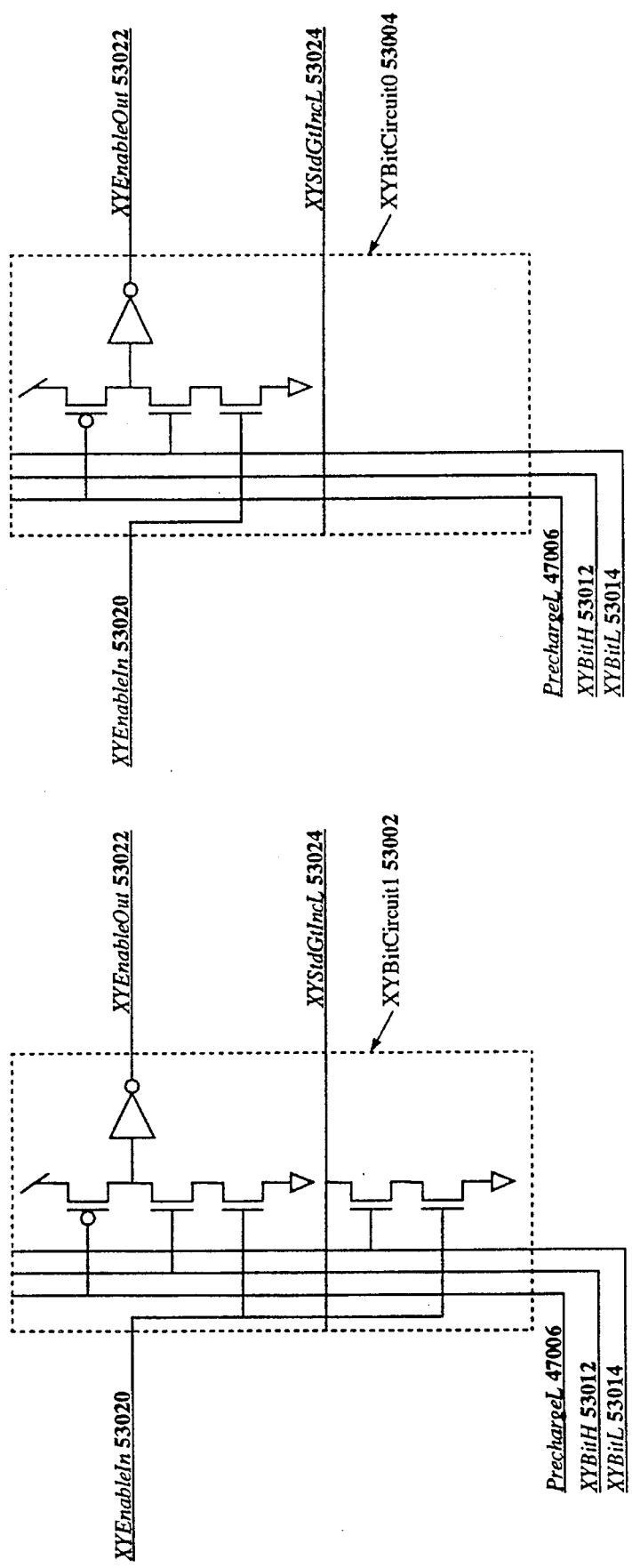
Figure 53

56000 prior art

METHOD AND APPARATUS FOR SIMULTANEOUS PARALLEL QUERY GRAPHICS RENDERING Z-COORDINATE BUFFER

FIELD OF THE INVENTION

The field of this invention is twofold: 1) three-dimensional computer graphics, and more specifically, hidden surface removal in three-dimensional rendering; and 2) computer memories, and more specifically, Content Addressable Memories (CAM).

BACKGROUND OF THE INVENTION

Three-dimensional Computer Graphics

Computer graphics is the art and science of generating pictures with a computer. Generation of pictures is commonly called rendering. Generally, in three-dimensional computer graphics, geometry that represents surfaces (or volumes) of objects in a scene is translated into pixels stored in a frame buffer, and then displayed on a display device, such as a CRT.

Pixels may have a direct one-to-one correspondence with physical display device hardware, but this is not always the case. Some three-dimensional graphics systems reduce aliasing with a frame buffer that has multiple pixels per physical display picture element. Other 3D graphics systems, in order to reduce the rendering task, have multiple physical display picture elements per pixel. In this document, "pixel" refers to the smallest individually controllable element in the frame buffer, independent of the physical display device. The display screen 100 is defined as the two-dimensional array of pixels which makes a picture. Display screens 100 can be almost any size. This document uses, as a numerical example for various pixel organizations, a very small display screen 100 of 120×80 pixels.

When a piece of 3D geometry is projected onto a display screen 100, it affects a set of pixels in the Frame Buffer 1012. In the context of a particular piece of geometry, the term "pixel" is used to describe one small portion of the projected piece of geometry which has a one-to-one correspondence with a pixel in the display screen 100.

A summary of the rendering process can be found in: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0 (hereinafter referred to as the Watt Reference).

An example of a hardware renderer is incorporated herein by reference: "Leo: A System for Cost Effective 3D Shaded Graphics", by Deering and Nelson, pages 101 to 108 of SIGGRAPH 93 Proceedings, 1–6 Aug. 1993, Computer Graphics Proceedings, Annual Conference Series, published by ACM SIGGRAPH, New York, 1993, Softcover ISBN 0-201-58889-7 and CD-ROM ISBN 0-201-56997-3 (hereinafter referred to as the Deering Reference). The Deering Reference describes a generic 3D graphics pipeline (i.e., a renderer, or a rendering system) as "truly generic, as at the top level nearly every commercial 3D graphics accelerator fits this abstraction", and this pipeline diagram is reproduced here as FIG. 1. Such pipeline diagrams convey the process of rendering, but do not describe any particular hardware. The Generic 3D Graphics Pipeline 1000 has two sections highlighted, the floating-point intensive functions 1020 and the drawing intensive functions performed by a Pixel Drawing Pipeline 4000. In this document, the term "pixel drawing pipeline" refers to a subset of a 3D graphics pipeline, and it includes everything after the screen space conversion 1003 step up to and including the Z-buffered blend 1010 step. The Pixel Drawing Pipeline 4000 method is shown in a flow diagram in FIG. 4.

The Pixel Drawing Pipeline 4000 in FIG. 1 is implemented in hardware by a Pixel Drawing Subsystem 2002, and a simple block diagram is shown in FIG. 2. The Pixel Drawing Subsystem 2002 includes a conventional, prior art, Z-buffer 2008 and a Prior Art Rasterize Processor 2010. As defined here, the Prior Art Rasterize Processor 2010 performs: 1) set up for incremental render 1004; 2) edge walking 1006; 3) span interpolation 1008; and 4) Z-buffered blend 1010. Some manufacturers do not include the set up for incremental render 1004 as part of the Prior Art Rasterize Processor 2010. But, it 1004 is included here because the present invention adds a new step before the set up for incremental render 1004 step, and both steps are included in the novel pixel drawing pipelines presented here. The Prior Art Rasterize Processor 2010 performs the Z-buffered blend 1010 by accessing the Z-buffer 2008 over a bus, labelled ZValues 2006 in FIG. 2. As the Prior Art Rasterize Processor 2010 generates new pixel color values, they are written into the frame buffer 1012 by utilizing the busses PixelColor 2012 and PixelAddr 2016.

In computer graphics, each renderable object generally has its own local object coordinate system, and therefore needs to be translated from object coordinates to pixel display coordinates. Conceptually, this is a 4-step process: 1) translation (including scaling for size enlargement or shrink) from object coordinates to world coordinates, which is the coordinate system for the entire scene; 2) translation from world coordinates to eye coordinates, based on the viewing point of the scene; 3) translation from eye coordinates to perspective translated eye coordinates, where perspective scaling (farther objects appear smaller) has been performed; and 4) translation from perspective translated eye coordinates to pixel coordinates, also called screen coordinates. These translation steps can be compressed into one or two steps by precomputing appropriate translation matrices before any translation occurs.

FIG. 3 shows a three-dimensional object, a tetrahedron, with its own coordinate axes ($x_{obj}$, $y_{obj}$, $z_{obj}$). The three-dimensional object 3010 is translated, scaled, and placed in the viewing point's 3030 coordinate system based on ($x_{eye}$, $y_{eye}$, $z_{eye}$). The object 3020 is projected onto the viewing plane, thereby correcting for perspective. At this point, the object appears to have become two-dimensional; however, the object's z-coordinates are preserved so they can be used later for hidden surface removal techniques. The object is finally translated to screen coordinates, based on ($x_{screen}$, $y_{screen}$, $z_{screen}$), where $z_{screen}$ is going perpendicularly into the page. Points on the object now have their x and y coordinates described by pixel location within the display screen and their z coordinates in a scaled version of distance from the viewing point.

Once the geometry is in screen coordinates, it is rasterized, which is the process of generating actual pixel color values. Many techniques are used for generating pixel color values, including Gouraud shading, Phong shading, and texture mapping. In some systems, the Frame Buffer 1012 is augmented with an A-buffer which is used to reduce aliasing. The A-buffer reduces aliasing by keeping track of the percentage coverage of a pixel by a rendered object, which is relevant for edges of projected objects. Hereinafter, the A-buffer will not be explicitly discussed, but is assumed to be optionally included in any rendering system described herein.

Because many different portions of geometry can affect the same pixel, the geometry representing the surfaces closest to the scene viewing point must be determined. Thus, for each pixel, the closest surface to the viewing point determines the pixel color value, and the other more distant surfaces which could affect the pixel are hidden and are prevented from affecting the pixel. An exception to this rule occurs when non-opaque surfaces are rendered, in which case all non-opaque surfaces closer to the viewing point than the closest opaque surface affect the pixel color value, while all other non-opaque surfaces are discarded. In this document, the term "occulted" is used to describe geometry which is 100% hidden by other non-opaque geometry.

As a rendering process proceeds, the renderer must often recompute the color value of a given screen pixel multiple times, because there may be many surfaces that intersect the volume subtended by the pixel. The average number of times a pixel needs to be rendered, for a particular scene, is called the depth complexity of the scene. Simple scenes have a depth complexity near unity, while complex scenes can have a depth complexity of ten or twenty. As scene models become more and more complicated, renderers will be required to process scenes of ever increasing depth complexity.

Many techniques have been developed to perform visible surface determination, and a survey of these techniques are incorporated herein by reference to: "Computer Graphics: Principles and Practice", by Foley, van Dam, Feiner, and Hughes, Chapter 15: Visible-Surface Determination, pages 649 to 720, 2nd edition published by Addison-Wesley Publishing Company, Reading, Mass., 1990, reprinted with corrections 1991, ISBN 0-201-12110-7 (hereinafter referred to as the Foley Reference).

When a point on a surface (frequently a polygon vertex) is translated to screen coordinates, the point has three coordinates: 1) the x-coordinate of the affected pixel; 2) the y-coordinate of the affected pixel; and 3) the z-coordinate of the point in either eye coordinates, distance from the virtual screen, or some other coordinate system which preserves the relative distance of surfaces from the viewing point. In this document, positive z-coordinate values are used for the "look direction" from the viewing point, and smaller values indicate a position closer to the viewing point.

For example, if a surface is approximated by a set of planar polygons, the vertices of each polygon are translated to screen coordinates. For points in or on the polygon (other than the vertices), the screen coordinates are interpolated from the coordinates of vertices, typically by the processes of edge walking and span interpolation, as discussed in the Deering Reference. Thus, a z-coordinate value is included in each pixel value (along with the color value) as geometry is rendered.

The most common method for visible surface determination, or conversely, for hidden surface removal, is the Z-buffer. Another common hidden surface removal technique is called backface culling (see Foley Reference, page 663), which eliminates polygons from rendering before they are converted into pixels. Backface culling is generally included in the face determination 1003 step of the graphics pipeline 1000, and therefore occurs before (and is, therefore, complementary to) subsequent hidden surface removal steps.

Z-buffers

Stated simply, the Z-buffer stores, for every pixel, the z-coordinate of the pixel within the closest geometry (to the viewing point) that affects the pixel. Hence, as new pixel values are generated, each new pixel's z-coordinate is compared to the corresponding location in the Z-buffer. If the new pixel's z-coordinate is smaller (i.e., closer to the viewing point), this value is stored into the Z-buffer and the new pixel's color value is written into the frame buffer. If the new pixel's z-coordinate is larger (i.e., farther from the viewing point), the frame buffer and Z-buffer values are unchanged and the new pixel is discarded. Method pseudocode for the Z-buffer method is shown in Appendix 1, which is a slightly modified version of FIG. 15.21 in the Foley Reference. The pixel loop A1006–A1013 is performed for every pixel in each polygon.

A flow diagram of the prior art Z-buffer method is shown in FIG. 4. This figure highlights the portion of the method, called the Pixel Drawing Pipeline method 4000, which rasterizes the polygon. In this document, rasterization refers to the process of converting a piece of renderable geometry into individual pixels.

One drawback to the Z-buffer hidden surface removal method is the requirement for geometry to be converted to pixel values before hidden surface removal can be done. This is because the keep/discard decision is made on a pixel-by-pixel basis, rather than at a higher level, such as at the level of the geometry in screen coordinates, which is accomplished by the present invention.

Prior art Z-buffers are based on conventional Random Access Memory (RAM) or Video RAM (VRAM). High performance prior art Z-buffers employ many different techniques, such as page-mode addressing and bank interleaving, to interrogate as many Z-buffer memory locations per second as possible. The interrogation process is needed to perform the keep/discard decision on a pixel-by-pixel basis as geometry is rasterized. One major drawback to the prior art Z-buffer is its inherently pixel-sequential nature. For scenes with high depth complexity, access to the Z-buffer is a bottleneck which limits performance in renderers.

Temporal Correlation

Many applications of 3D computer graphics generate a sequence of scenes in a frame-by-frame manner. If the frame rate of the sequence is sufficiently high (this is generally the case), then the present scene looks very much like the previous scene, and the only differences are due to movement of objects or light sources within the scene or movement of the viewing point. Thus, consecutive scenes are similar to each other due to their temporal correlation.

Identifying the non-occulted geometry from the previous scene can help with the rendering of the present scene because such non-occulted geometry can be rendered first. Then, when geometry which was occulted in the previous scene undergoes hidden surface removal, most of it can be discarded before pixel color computations need to be done.

Prior art rendering systems do not gain much from taking advantage of temporal correlation because they will only save computations at the very end of the graphics pipeline 1000. Namely, they will save the pixel color computation within the span interpolation step 1008 of the pipeline 1000. This savings is minor because the pixel-by-pixel nature of the Z-buffer hidden surface removal technique requires geometry to be converted to separate pixels before the keep/discard decision can be made. Also, the minor savings is mostly eliminated if the pixel color computation is performed in parallel (by different hardware) with Z-buffer hidden surface removal computation.

On top of this, taking advantage of temporal correlation is difficult in prior art rendering systems because, the "backward link" from the final values in the Z-buffer and frame buffer back to the geometry database is difficult to construct. In other words, prior art rendering systems smash geometry into separate and independent pixels, and taking advantage of temporal correlation requires knowing which pieces of geometry generated the pixels which survived the keep/discard decisions when an entire scene has completed the rendering process.

Geometry Databases

The geometry needed to generate a renderable scene is stored in a database. This geometry database can be a simple display list of graphics primitives or a hierarchically organized data structure. In the hierarchically organized geometry database, the root of the hierarchy is entire database, and the first layer of subnodes in the data structure is generally all the objects in the "world" which can be seen from the viewpoint. Each object, in turn, contains subobjects, which, in turn, contain subsubobjects; thus resulting in a hierarchical "tree" of objects. Hereinafter, the term "object" shall refer to any node in the hierarchial tree of objects. Thus, each subobject is an object. The term "root object" shall refer to a node in the first layer of subnodes in the data structure. Hence, the hierarchical database for a scene starts with the scene root node, and the first layer of objects are root objects.

Hierarchical databases of this type are used by the Programmer's Hierarchical Interactive System (PHIGS) and PHIGS PLUS standards An explanation of these standards can be found in the book, "A Practical Introduction to PHIGS and PHIGS PLUS", by T. L. J. Howard, et. al., published by Addison-Wesley Publishing Company, 1991, ISBN 0-201-41641-7 (incorporated herein by reference and hereinafter called the Howard Reference). The Howard Reference describes the hierarchical nature of 3D models and their data structure on pages 5 through 8.

Content Addressable Memories

Most Content Addressable Memories (CAM) perform a bit-for-bit equality test between an input vector and each of the data words stored in the CAM. This type of CAM frequently provides masking of bit positions in order to eliminate the corresponding bit in all words from affecting the equality test. It is inefficient to perform magnitude comparisons in a equality-testing CAM because a large number of clock cycles is required to do the task.

CAMs are presently used in translation look-aside buffers within a virtual memory systems in some computers. CAMs are also used to match addresses in high speed computer networks. CAMs are not used in any practical prior art renders.

Magnitude Comparison CAM (MCCAM) is defined here as any CAM where the stored data are treated as numbers, and arithmetic magnitude comparisons (i.e. less-than, greater-than, less-than-or-equal-to, etc.) are performed in parallel. This is in contrast to ordinary CAM which treats stored data strictly as bit vectors, not as numbers. An MCCAM patent, included herein by reference, is U.S. Pat. No. 4,996,666, by Jerome F. Duluk Jr., entitled "Content-Addressable Memory System Capable of Fully Parallel Magnitude Comparisons", granted Feb. 26, 1991 (hereinafter referred to as the Duluk Patent). Structures within the Duluk Patent specifically referenced shall include the prefix "Duluk Patent", e.g. "Duluk Patent MCCAM Bit Circuit". MCCAMs are not used in any prior art renderer.

The basic internal structure of an MCCAM is a set of memory bits organized into words, where each word can perform one or more arithmetic magnitude comparisons between the stored data and input data.

SUMMARY OF THE INVENTION

The method and apparatus of this document enhance the performance of the prior art Pixel Drawing Pipeline 4000 portion of a 3D Graphics Pipeline 1000 (commonly called a renderer), resulting in novel Pixel Drawing Pipelines 8000, 20000, 29000, or 32000 portions of a 3D Graphics Pipelines 5000, 6000, or 31000.

The method and apparatus presented here perform the keep/discard decision on screen coordinate geometry before it is converted into individual pixels. This is done by utilizing parallel searching within a new type of Z-buffer based on a new type of Magnitude Comparison Content Addressable Memory (MCCAM), hereinafter called a MCCAM Z-buffer 11000, 23000, or 39000.

The MCCAM Z-buffer 11000, 23000, or 39000 performs a keep/discard decision on all pixels (or, as described later, on groups of pixels called Cells) at once. The MCCAM Z-buffer 11000, 23000 or 39000 achieves this parallelism by including a set of arithmetic comparators in every memory word that stores a pixel's z-value. The operation of performing a keep/discard decision on all pixels at once is called a "parallel query" of the MCCAM Z-buffer 11000, 23000 or 39000. Parallel query operations enhance performance of Pixel Drawing Pipelines 8000, 20000, 29000, or 32000 by providing Occulting Tests 9000, 22000, 27000, or 30000 that can quickly determine if an entire object or graphics primitive is occulted before it undergoes rasterization.

The basic internal structure of an MCCAM Z-buffer 11000, 23000, or 39000 is a set of memory bits organized into MCCAM Words 12000, 13000, 18000, 24000, or 41000. Each MCCAM Word 12000, 13000, 18000, 24000, or 41000 corresponds to one pixel (or Cell) in the display screen 100 and is organized into at least three Fields 11004, 11006, or 11008. Each of the three Fields 11004, 11006, or 11008 performs an arithmetic magnitude comparison between the stored pixel data and input geometry data. Each MCCAM Word 12000, 13000, 18000, 24000, or 41000 has at least three Fields 11004, 11006, or 11008 representing the position of geometry in screen coordinates: an x-dimension and y-dimension for the plane of the display screen 100; and the z-dimension for the distance from the viewing point. Efficient circuits for the MCCAM Z-buffer 11000, 23000, or 39000 are included in a later section of this document.

This document includes new methods for the keep/discard decision. The new methods, called Occulting Tests 9000, 22000, 27000, or 30000, are performed on any type of geometry in screen coordinates: 1) entire 3D objects; 2) subobjects; 3) renderable graphics primitives; and/or 4) individual polygons. Culling out hidden geometry before it is converted into individual pixels eliminates a major bottleneck in the rendering pipeline, thereby increasing total rendering performance.

Occulting Tests 9000, 22000, 27000, or 30000 utilize an axially aligned right parallelepiped, hereinafter called a bounding box, as an approximation of the boundary of 3D geometry. Occulting Tests 9000, 22000, 27000, or 30000 use the comparison apparatus of the MCCAM Z-buffer 11000, 23000, or 39000 to determine if the bounding box is occulted by previously rasterized geometry. If the bounding box is occulted, then the 3D geometry is occulted and can be discarded because it cannot affect pixel colors in the Frame Buffer 1012. Occulting Tests 9000, 22000, 27000, or 30000 can also test individual spans within renderable graphics primitives to determine if they are occulted.

The methods disclosed here include four types of Occulting Tests 9000, 22000, 27000, or 30000: 1)the Bounding Box Occulting Test 9000 (hereinafter sometimes abbreviated BBOT 9000); 2) the Vertex Bounding Box Test 22000 (hereinafter sometimes abbreviated VBBOT 22000); 3) the Span Occulting Test 27000 (hereinafter sometimes abbreviated SOT 27000); and 4) the SOT 27000 is included, called the Raster Write Span Occulting Test 30000 (hereinafter sometimes abbreviated RWSOT 30000). A piece of geometry that "passes" an Occulting Test 9000, 22000, 27000, or 30000 is declared occulted and can be discarded. A piece of geometry that "fails" an Occulting Test 9000, 22000, 27000, or 30000 may or may not be occulted, and therefore, requires further processing.

The Bounding Box Occulting Test 9000 takes a piece of geometry, generates a bounding box around it, and then determines if the bounding box is occulted by previously rasterized geometry.

The Vertex Bounding Box Test 22000 takes vertices (and how they describe geometry) and automatically generates bounding boxes. For hierarchically defined objects, the input vertices could be the opposite corners of the bounding box of the object.

The Span Occulting Test 27000 operates on spans generated by edge walking 1006 and determines if they are occulted.

The Raster Write Span Occulting Test 30000 operates on spans generated by edge walking 1006 and determines if they are occulted. It also simultaneously writes into the MCCAM Z-buffer 11000, 23000 or 39000 a conservative approximation for the z-value for each pixel within the span.

Also described herein is the Dual Occulting Test Pixel Drawing Pipeline 32000, which combines either the BBOT 9000 or the VBBOT 22000 with either the SOT 27000 or the RWSOT 30000.

The invention takes advantage of temporal correlation in a sequence of scenes through the use of Tags. Tags are "backward links" (i.e., pointers) to the source geometry, and the main problems with such "backward links" are overcome by storing them into a CAM within the Tag MCCAM Z-buffer 39000.

One Tag for every pixel (or Cell) in the display screen 100 is stored in a fourth Field, the Tag-field 39010, within each Tag MCCAM Word 41000. Each Tag-field 39010 can perform bit-for-bit equality tests. When a scene is completely rendered, a Visible Objects List is generated by reading Tags from the Tag MCCAM Z-buffer 39000. When a new Tag is read, it is then used as a search key to find, and declare invalid, all redundant Tags within the Tag MCCAM Z-buffer 39000. Elimination of redundant Tags greatly reduces the number of clock cycles needed to construct the Visible Objects List.

Tags, implemented in an equality-testing CAM circuit, can be added to renderers that use only the prior art Z-buffer for hidden surface removal. However, Tags are substantially more useful when used with an MCCAM Z-buffer 11000, 23000 or 39000 because Occulting Tests 9000, 22000, 27000, or 30000 operate on geometry rather than pixels. This means geometry can be culled out earlier in the pipeline, thereby reducing computation and increasing performance. This document includes the method for generating a sequence of scenes using Tags.

Three specific types of MCCAM Z-buffers 11000, 23000 or 39000 are disclosed: 1) the Basic MCCAM Z-buffer 11000; 2) the Vertex MCCAM Z-buffer 23000; and 3) the Tag MCCAM Z-buffer 39000.

The Basic MCCAM Z-buffer 11000 processes separate bounding boxes, where each bounding box is separately input and encloses a piece of geometry. This, however, is very inconvenient for most geometry databases where geometry is stored as sets of polygons.

The Vertex MCCAM Z-buffer 23000 processes vertices one at a time, and internally generates a bounding box around each polygon (which is a multiplicity of vertices) or other piece of geometry specified by a set of 3D points. This is done by temporarily saving comparison results from recently input vertices. When polygon meshes are input to the Vertex MCCAM Z-buffer 23000, each polygon within the mesh generates a bounding box, even though vertices are shared between polygons.

The Tag MCCAM Z-buffer 39000 includes the processing of Tags. This is necessary for taking advantage of temporal correlation between scenes in a sequence.

Five specific types of words within MCCAM Z-buffers 11000, 23000, or 39000 are disclosed: 1) the Basic MCCAM Word 12000; 2) the Raster Write MCCAM Word 13000; 3) the Vertex MCCAM Word 18000; 4) the Hit Flag MCCAM Word 24000; and 5) the Tag MCCAM Word 41000.

The Basic MCCAM Word 12000 requires bounding boxes to be generated outside the MCCAM Z-buffer 11000, 23000 or 39000. It also requires pixel data to be written into the MCCAM Z-buffer 11000, 23000 or 39000 one pixel at a time.

The Raster Write MCCAM Word 13000 provides for writing multiple words 13000 simultaneously. This feature is used to write the z-value for multiple pixels within the same raster line of the display screen 100. Simultaneously writing pixels reduces the fraction of time used for writing data into the MCCAM Z-buffer 11000, 23000 or 39000. That decrease leads to an increase in the fraction of time devoted to Occulting Tests 9000, 22000, or 27000, thereby increasing throughput and performance. Because the same z-value is used for multiple pixels, a conservative approximation must be used. The exact z-values must be stored elsewhere, generally in a conventional Z-buffer 2008.

The Vertex MCCAM Word 18000 can perform a comparison on one vertex at a time, but it can reconstruct bounding boxes around geometry described by the vertices. This is important because geometry is usually input in polygon form.

The Hit Flag MCCAM Word 24000 has the capability to mark, as a Hit, any pixel, segment, and/or raster line which has caused a piece of geometry to fail (not declared occulted) an Occulting Test 9000, 22000, or 27000. Hits are read from the MCCAM Z-buffer 11000, 23000 or 39000 and rasterized into pixels.

The Tag MCCAM Word 4100 includes a fourth Field for storing and comparing Tag-values.

Each of these different MCCAM Words 12000, 13000, 18000, 24000, or 41000 illustrate a specific features. These features can be combined to create new word types.

The MCCAM Word 12000, 13000, 18000, 24000, or 41000 can include a special bit, called an Infinity Flag 11010, that causes the z-value to be treated as though it is equal to positive infinity. When the MCCAM Z-buffer 11000, 23000, or 39000 is initialized before rendering of a scene is begun, all stored z-values must be set to a value that is always greater than any finite z-value generated by rasterized geometry. At initialization, all Infinity Flags 11010 are asserted in parallel, thus requiring only one clock cycle. This saves the large number of clock cycles needed in prior art rendering systems to initialize every word in the Z-buffer to its largest possible value.

As an Occulting Test 9000, 22000, 27000, or 30000 processes a piece of geometry, the MCCAM Z-buffer 11000, 23000, or 39000 looks for pixels within the projected bounding box of the piece of geometry that may not be occulted. Such pixels are called Pixel Hits. If Pixel Hits are found, then the piece of geometry may not be occulted, and further processing is required. As an optional feature, Pixel Hits can be read from the MCCAM Z-buffer 11000, 23000, or 39000 as an aid to further processing. Alternatively, Segment Hits or Raster Hits can be read instead, thereby reducing the number of clock cycles utilized for reading Hit information. A Segment Hit is a horizontal set of Pixel Hits. A Raster Hit is one row of pixels across the entire width of the projected bounding box where one or more of the pixels is a Pixel Hit.

Also included in this document are descriptions of Pixel Drawing Pipelines 8000, 20000, 29000, or 32000 which include one or more MCCAM Z-buffers 11000, 23000 or 39000. A pixel drawing pipeline writes data into the Frame Buffer 1012 and is responsible for processing geometry after it is output from the screen space conversion 1003 step of the graphics pipeline.

Hardware that implements a Pixel Drawing Pipeline 8000, 20000, 29000, or 32000 is called a Pixel Drawing Subsystem 2002, 6002, 14002, 33002, 34002, 37002, or 38002, and several are described here. A Pixel Drawing Subsystem 2002, 6002, 14002, 33002, 34002, 37002, or 38002 is a subset of the full rendering system, and begins after screen space conversion 1003 step of the graphics pipeline.

In prior art renderers, the span interpolation 1008 process is the main bottleneck. In this invention, however, span interpolation 1008 processing is reduced by Occulting Tests 9000, 22000, 27000, or 30000 that remove geometry in the middle of the Graphics Pipeline. Because of the geometry removal, the generation of spans is not evenly spread over the scene rendering time. When rendering a scene, most of the first objects will not be occulted by prior objects, and these will generate many spans that need to be rasterized. However, near the end of the rendering of a scene, most objects will be occulted by prior objects (assuming a reasonably high depth complexity), generating few spans that need to be rasterized.

Some of the Pixel Drawing Subsystems 33002, 34002, or 38002 described here include a Span FIFO 33003. The Span FIFO 33003 provides the ability to balance the span interpolation 1008 processing load over the time it takes to render a scene. The Span FIFO 33003 temporarily stores span information in order to allow the span interpolation 1008 process to spread its computational load over the entire scene rendering time.

Novel VLSI circuits 48000, 49000, 49000, 51000, 52000, 53000, 54000, 55000, 57000, 58000, and 59000 for efficiently implementing the MCCAM Z-buffer 11000, 23000 or 39000 are included in the invention.

A BRIEF DESCRIPTION OF THE DRAWINGS

FIG. 1: Generic rendering pipeline from the Deering Reference (prior art).

FIG. 2: Prior art rendering subsystem including the Pixel Drawing Subsystem 2002 which includes a conventional Z-buffer 2008

FIG. 3: An object in three-dimensional space, its projection onto the viewing plane, and its image one a display screen.

FIG. 4: Method flow diagram for the standard Z-buffer method (prior art).

FIG. 5: The BBOT 3D Graphics Pipeline 5000, which includes the Bounding Box Occulting Test 9000 or the Vertex Bounding Box Occulting Test 22000.

FIG. 6: Rendering subsystem including the MCCAM Pixel Drawing Subsystem 6002.

FIG. 7: Piece of renderable geometry 7002 on a display screen 100, showing the projected bounding box 7004 of the geometry.

FIG. 8: Method flow diagram for hidden surface removal utilizing the Bounding Box Occulting Test 9000.

FIG. 9: Method flow diagram for the Bounding Box Occulting Test 9000.

FIG. 10: Example display screen 100 where each pixel is shown. This example has 120 pixels in the x dimension and 80 pixels in the y dimension. The square white spaces between tick marks are pixel locations.

FIG. 11: Diagram of the data storage within a Basic MCCAM Z-buffer 11000.

FIG. 12: Basic MCCAM Word 12000 used in the Basic MCCAM Z-buffer 11000.

FIG. 13: Raster Write MCCAM Word 13000 used when one z-value is used as an approximate z-value by multiple pixels, which is done by writing the one z-value into multiple words 13000.

FIG. 14: Rendering subsystem including the Approximation Based Pixel Drawing Subsystem 14002, which utilizes both a MCCAM Z-buffer 11000, 23000, or 39000 and a conventional Z-buffer 2008.

FIG. 15: Method flow diagram 15000 for rendering a scene with multiple objects and subobjects. The Bounding Box Occulting Test 9000 is performed on entire objects and subobjects in addition to renderable graphics primitives.

FIG. 16: Polygon 16002 on a display screen 100, showing the projected bounding box 16012 of the polygon.

FIG. 17: A triangle strip of four triangles where the projected bounding box of each triangle is shown.

FIG. 18: Vertex MCCAM Word 18000 used to process polygon vertices.

FIG. 19: A generalized triangle strip, a modified version of FIG. 3 from the Deering Reference (prior art). The table shows how a sequence of vertices specifies a set of triangles.

FIG. 20: Method flow diagram 21000 for hidden surface removal of polygons utilizing the Vertex Bounding Box Occulting Test 22000 on vertex comparison results.

FIG. 21: Method flow diagram for Vertex Comparisons 21000 which performs comparisons between a vertex's coordinate values (vx, vy, and vz) and the values stored in the Vertex MCCAM Z-buffer 23000 or 39000. The results of the comparison operations are stored in one of the Comparison Registers 23010.

FIG. 22: Method flow diagram for the Vertex Bounding Box Occulting Test 22000.

FIG. 23: Diagram of the data storage within a Vertex MCCAM Z-buffer 23000.

FIG. 24: Hit Flag MCCAM Word 24000 used to process vertices and provide for reading Hits.

FIG. 25: Example Segment Hits and Raster Hits.

FIG. 26: Display screen 100 showing a polygon and its composite pixels as it is rasterized by edge walking 1006 and span interpolation 1008.

FIG. 27: Method flow diagram for the Span Occulting Test 27000.

FIG. 28; The SOT 3D Graphics Pipeline 28000, which includes the Span Occulting Test 27000 or the Raster Write Span Occulting Test 30000.

FIG. 29: Method flow diagram for the Span Pixel Drawing Pipeline method 30000.

FIG. 30: Method flow diagram for the Raster Write Span Occulting Test 30000.

FIG. 31: The DOT 3D Graphics Pipeline 31000, which includes both the Vertex Bounding Box Occulting Test 22000 and the Span Occulting Test 27000 or 30000.

FIG. 32: Method flow diagram for hidden surface removal of polygons utilizing the Vertex Bounding Box Occulting Test 22000 and the Raster Write Span Occulting Test 30000.

FIG. 33: Rendering subsystem including the Span FIFO 33003.

FIG. 34: Rendering subsystem including multiple Span FIFOs 33003 and multiple Span Interpolate Processors 33006.

FIG. 35: Example display screen 100 where Blocks of pixels are shown. This example has 10 Blocks in the x dimension and 8 Blocks in the y dimension, where each Block has 12 pixels in the x dimension and 10 pixels in the y dimension.

FIG. 36: Example display screen 100 where one Interleaved Block is shaded. The example has 2 Blocks in the x dimension and 8 Blocks in the y dimension, where each Block has 60 pixels in the x dimension and 10 pixels in the y dimension.

FIG. 37: Rendering subsystem including multiple Block Pixel Drawing Subsystems 37002, each including a MCCAM Z-buffer 11000, 23000, or 39000 and responsible for a Block within the display screen 100.

FIG. 38: Rendering subsystem including multiple Block Span FIFO Pixel Drawing Subsystems 38002, each including a MCCAM Z-buffer 11000, 23000, or 39000 and a conventional Z-buffer 2008.

FIG. 39: Diagram of the data storage within a Tag MCCAM Z-buffer 39000.

FIG. 40: Method flow diagram 40000 for generating the Visible Objects List.

FIG. 41: Tag MCCAM Word 41000 used to process vertices with Tags.

FIG. 42: Method flow diagram 42000 for rendering a sequence of scenes by taking advantage of temporal coherency through the use of Tags.

FIG. 43: Example display screen 100 where Blocks of Cells of pixels are shown. This example has 5 Blocks in the x dimension and 20 Blocks in the y dimension, where each Block has 2 Cells in the x dimension and 2 Cells in the y dimension, and where each Cell has 12 pixels in the x dimension and 2 pixels in the y dimension.

FIG. 44: Example display screen 100 where Blocks of Raster Cells of pixels are shown. A Raster Cell only has one pixel in its y dimension. This example has 5 Blocks in the x dimension and 10 Blocks in the y dimension, where each Block has 2 Cells in the x dimension and 8 Cell in the y dimension, and where each Cell has 12 pixels in the x dimension and 1 pixel in the y dimension.

FIG. 45: Example display screen 100 where one Interleaved Block of Raster Cells of pixels is shown. A Raster Cell only has one pixel in its y dimension. This example has 2 Blocks in the x dimension and 8 Blocks in the y dimension, where each Block has 5 Cells in the x dimension and 10 Cells in the y dimension, and where each Cell has 12 pixels in the x dimension and 1 pixel in the y dimension.

FIG. 46: An example of pseudorandom pixels within a Cell used to generate representative Tag.

FIG. 47: Prior art Duluk Patent MCCAM Bit Circuit 47000.

FIG. 48: MCCAM Bit Circuit A 48000, which supports multiple word write operations. This cell 48000 does not support a read operation.

FIG. 49: MCCAM Bit Circuit B 49000, which supports multiple word write operations. This cell 49000 does not support a read operation.

FIG. 50: MCCAM Bit Circuit C 49000, which supports multiple word write operations and a read operation.

FIG. 51: Infinity Flag Bit Circuit 51000, which stores the Infinity Flag 11010 within the MCCAM Word 12000, 13000, 18000, 24000, or 41000.

FIG. 52: A circuit for the Z-field 11008 which utilizes a multiplicity of MCCAM Bit Circuit A 48000 and one Infinity Flag Bit Circuit 51000.

FIG. 53: Circuits used in the X-field 11004 and Y-field 11006. FIG. 53A is a gate-level circuit for XBitCircuit1 53002, which stores a logical "one" for comparison purposes. FIG. 53B is a gate-level circuit for XBitCircuit0 53004, which stores a logical "zero" for comparison purposes. FIG. 53C is a CMOS transistor circuit for XBitCircuit1 53002, which stores a logical "one" for comparison purposes. FIG. 53D is a CMOS transistor circuit for XBitCircuit0 53004, which stores a logical "zero" for comparison purposes.

FIG. 54: A circuit for a six-bit X-field 11004 (or a Y-field 11006) which stores and compares to the value "101110", which is binary for 46.

FIG. 55: A circuit for a set of sixteen X-fields 11004, which correspond to sixteen MCCAM Words 12000, 13000, 18000, 24000, or 41000. The circuitry for higher order bits is shared amongst multiple X-fields 11004.

FIG. 56: Prior an CAM Bit Circuit 56000 which can perform bit-for-bit equality comparisons. This cell 56000 can be used to store one bit within a Tag, providing Raster Write operations are not allowed.

FIG. 57: Tag Bit Circuit 57000, which supports multiple word write operations and a read operation.

FIG. 58: Tag Invalid Bit Circuit 58000 stores the value TagInvalid 58006, which indicates the Tag stored in the Tag-field 39010 is invalid.

FIG. 59: A circuit for the Tag-field 39010.

DETAILED DESCRIPTION OF THE INVENTION

The methods presented in this document are described using both flow diagrams and pseudocode. Method flow diagrams are used for most aspects of the method, and method pseudocode is attached as a set of appendices and is used to describe the details of the method. Pseudocode is used in this document to describe a process performed by some type of apparatus, and all pseudocode contained herein is consistent in style to that of the Foley Reference. Variables and named constants are shown in italics; language reserved words (e.g. if, than, and, or, do, etc.) are shown in bold; and comments are shown in curly brackets.

Each method pseudocode in the appendices has its lines numbered, where the numbering in each appendix's first line starts with one thousand times the appendix number along with the prefix "A". The method pseudocode appendices include, for readability, vertical lines to show how both begin-end and repeat-until statements are paired together.

Hierarchical method names (e.g. "WritePixel" at A1037), a "routine" in pseudocode terms, within the method pseudocode are treated as global, and each name is unique. Routines which are used in an appendix, but are defined elsewhere, have a cross reference line number included as a comment. Appendix 2 defines global constants, types, and variables.

Reference numbers are four or five digit numbers, and the first one or two digits are the figure number where the reference item is best illustrated.

Modified Rendering Pipeline

FIG. 1 shows the Generic 3D Graphics Pipeline 1000 (sometimes called the rendering pipeline), which includes the prior art Z-buffer method 1010. FIG. 5 shows a modified version of the generic pipeline 1000, called the BBOT 3D Graphics Pipeline 5000 which adds the Bounding Box Occulting Test 9000 (or, alternatively, the Vertex Bounding Box Occulting Test 22000). The Bounding Box Occulting Test 9000 determines whether geometry can be discarded before the Set Up for Incremental Rendering 1004, thus reducing the total amount of computation required for rendering an image. The input to the Bounding Box Occulting Test 9000 is from the screen space conversion 1003 step, which produces geometry (or bounding boxes) in screen coordinates. In the BBOT 3D Graphics Pipeline 5000, the input data may not be strictly renderable geometry. Input may also include object bounding information which is appropriately translated to screen coordinates in order for the Bounding Box Occulting Test 9000 to be used to determine if an entire object is occulted.

The BBOT 3D Graphics Pipeline 5000 has two sections highlighted, the floating-point intensive functions 5008 and the Occulting Test Pixel Drawing Pipeline 8000, 20000, which includes the Bounding Box Test 9000 or the Vertex Bounding Box Occulting Test 22000. The Bounding Box Occulting Test 9000 is included as a floating point intensive function because it may be done utilizing floating-point arithmetic, although integer arithmetic may also be used.

Hardware for implementing the Occulting Test Pixel Drawing Pipeline 8000, 20000 is shown in FIG. 6 as the MCCAM Pixel Drawing Subsystem 6002. When compared to the Pixel Drawing Subsystem 2002, the MCCAM Pixel Drawing Subsystem 6002 replaces the Z-buffer 2008 with the MCCAM Z-buffer 11000, 23000, or 39000.

To implement the various versions of pixel drawing pipelines, six hardware pixel drawing subsystem architectures will be presented: 1) MCCAM Pixel Drawing Subsystem 6002; 2) Approximation Based Pixel Drawing Subsystem 14002; 3) Span FIFO Pixel Drawing Subsystem 33002; 4) Multiple Span FIFO Pixel Drawing Subsystem 34002; 5) Block Pixel Drawing Subsystem 37002; and 6) Block Span FIFO Pixel Drawing Subsystem 38002.

Bounding Box Occulting Test 9000

In simplified terms, the Bounding Box Occulting Test 9000 method presented here performs the following repeated steps on a set of geometry: 1) take a new piece of geometry in screen coordinates; 2) generate an axially aligned three-dimensional bounding box around the piece of geometry; 3) determine if the minimum z-coordinate of the new piece of geometry (i.e., $z_{min}$ of its bounding box) is less than (i.e. in front of) any of the z-coordinates of previously generated pixel values which lie within the projected bounding box of the new piece of geometry; and 4) if any such pixel values are found, these pixels are candidates for replacement in both the Frame Buffer 1012 and the z-coordinate storage.

The axially aligned three-dimensional bounding box is an approximation for the three-dimensional surface of a piece of geometry. This approximation, for occulting purposes, introduces an error in the keep/discard decision at the Occulting Test 9000, 22000, 27000, or 30000 step in the rendering pipeline. However, the Occulting Test 9000, 22000, 27000, or 30000 needs to act as a filter which filters out much of the occulted geometry from further processing while keeping any geometry that is not occulted. Thus the Occulting Test 9000, 22000, or 27000 must err on the side of being conservative.

FIG. 7 shows a piece of geometry 7002 in screen coordinates and its projected bounding box 7004 on a display screen 100. The geometry's bounding box is described by the ordered set of numbers:

$$(x_{min}, x_{max}, y_{min}, y_{max}, z_{min}, z_{max}) \quad (EQ\ 1)$$

The geometry's projected bounding box 7004 (as distinguished from its bounding box) is simply its bounding box without the z-coordinate values, namely:

$$(x_{min}, x_{max}, y_{min}, y_{max}) \quad (EQ\ 2)$$

Thus, a projected bounding box is a minimum sized rectangle in the plane of the display screen 100 which covers the entire projected area of a piece of geometry.

Conceptually, both the Frame Buffer 1012 and the MCCAM Z-buffer 11000, 23000, or 39000 are arrays of data, with one array position per (x, y) pixel location. During rendering of a scene, previously processed geometry has generated pixels, each pixel located at some value of (x, y, z) in screen coordinates. When a new piece of geometry is processed, the Bounding Box Occulting Test 9000 is performed by applying the following magnitude comparison tests to all pixels previously stored in the MCCAM Z-buffer 11000, 23000, or 39000:

$$\text{PixelHit} \Leftarrow (x \geq x_{min}) \wedge (x \leq x_{max}) \wedge (y \geq y_{min}) \wedge (y \leq y_{max}) \wedge (z \geq z_{min})$$

$$(EQ\ 3)$$

The boolean value, PixelHit, is generated for each pixel. Pixels with PixelHit true are called "Hits", and this condition indicates the new geometry may not be occulted at such pixels.

In equations and method flow diagrams, the symbol "$\Leftarrow$" is used to indicate assigning a variable's value (needed to distinguish it from "=" which is used here as an arithmetic test for equality). In all method flow diagrams, rhombuses are used for conditionals only, and do not assign values as do rectangles.

The five values $x_{min}, x_{max}, y_{min}, y_{max}$, and $z_{min}$ are referred to as the parameters of the bounding box. The first four inequalities in Equation 3 test the previously generated pixels to see if they are within the projected bounding box of the new piece of geometry. If, for a specific pixel with its own values of (x, y), all four of these inequalities are true, then the pixel is within the projected bounding box, and can, therefore, be affected by the new geometry. For pixels within the projected bounding box, the fifth inequality of Equation 3 comes into play. The fifth inequality tests to see if the new geometry could be in front of the previously rendered geometry by comparing previous z-coordinate values to $z_{min}$ of the new geometry's bounding box. Thus, if a pixel is within the projected bounding box and $z_{min}$ is less than the present MCCAM Z-buffer 11000, 23000, or 39000 value, then the pixel may be changed by the new geometry. Hits may be tagged for a downstream processor to use, and they may be grouped together into segments along a display raster line If PixelHit is true for any pixel (i.e. all five inequalities are true), then the piece of geometry has failed the Bounding Box Occulting Test 9000, and those pixels may or may not occulted. Pixels with PixelHit true must then be subsequently processed by two steps: 1) test to see if the pixel is within the true projection of the geometry; and 2) if within the projection, the new pixel's z-coordinate value is compared to that stored in the MCCAM Z-buffer 11000, 23000, or 39000. Hence, if Equation 3 is true for any pixel in a piece of geometry, then at least some rasterization or further processing of the geometry must be done.

If PixelHit is not true for any pixels (PixelHit is false for all pixels), then the new piece of geometry passes the Bounding Box Occulting Test 9000 and is occulted, which means no further processing is required for this piece of geometry.

Thus, the Bounding Box Occulting Test 9000 is sufficient to determine if a piece of geometry is occulted, but it is not necessary for a piece of geometry to be occulted. In other words, geometry can fail the Bounding Box Occulting Test 9000 and still actually be occulted. However, for scenes with high depth complexity, the Bounding Box Occulting Test 9000 can cull out a large fraction of the geometry before the rasterization process.

The logical inverse of Equation 3 is:

$$\text{PixelMiss} \Leftarrow (x<x_{min}) \lor (x>x_{max}) \lor (y<y_{min}) \lor (y>y_{max}) \lor (z<z_{min})$$

(EQ 4)

which, if PixelMiss 12001 is true for all pixels, indicates the piece of geometry has passed the Bounding Box Occulting Test 9000, and is therefore occulted. If PixelMiss 12001 is false for any pixel, then further processing of the piece of geometry is required. Hence, pixels for which PixelMiss 12001 is false are Hits. Either Equation 3 or Equation 4 can be implemented in hardware. However, Equation 4 is generally preferable to Equation 3 because large logical "or" structures are easier to build than logical "and" structures. This is because the former can be built with "wired-or" logic or precharged circuits with conditional discharge. The five bits which result from the five inequality comparisons of Equation 4 are collectively called Comparison Results 12003.

FIG. 8 is a rendering method flow diagram which includes the BBOT Pixel Drawing Pipeline method 8000 for use with the MCCAM Z-buffer 11000, 23000, or 39000. Here, each piece of geometry is: 1) retrieved from a geometry database 8002; 2) has a bounding box constructed around it 8004; 3) has the Bounding Box Occulting Test 9000 performed on it; 4) if it fails the Bounding Box Occulting Test 9000, it is then rasterized by the Pixel Drawing Pipeline method 4000, else it is occulted and thus simply discarded.

FIG. 9 is a method flow diagram for the Bounding Box Occulting Test 9000 which operates on a piece of geometry's bounding box parameters. The desired result of this method 9000 is to find the logical value of the variable occulted 6006, which is initialized to true 9002. Two other variables, x and y, are pixel indices, and they start at (0,0) 9004, 9006 and are incremented 9008, 9010, 9012, 9014 in such a way as to cover all the pixels in the display screen 100, where the last pixel is at (XMAX,YMAX). At each pixel, the current z-value is found 9016, and if the pixel is within the projected bounding box 9018, 9020, then the z-value is compared 9022 to $z_{min}$. If $z_{min}$ is not greater than the z-value of the pixel, then occulted 6006 is set to false 9024, meaning the piece of geometry may not be occulted, thus requiring additional processing. The Bounding Box Occulting Test method 9000 is shown here as sequentially testing the z-value of every pixel, even those outside the projected bounding box of the piece of geometry. The method 9000 is described this way because the parallel apparatus of this document tests every pixel in parallel, thus finding the value of occulted 6006 in an amount of time (generally one clock cycle) independent of both the number of pixels or the size of the projected bounding box. A software implementation of the Bounding Box Occulting Test 9000 would save time by: 1) terminating at any time when occulted 6006 is set to false 9024; and 2) testing only pixels within the projected bounding box, thus, x would go from $x_{min}$ to $x_{max}$ (rather than from 0 to XMAX) and y would go from $y_{min}$ to $y_{max}$.

FIG. 10 shows an example display screen 100 which is 120 pixels in the x dimension 10002 and 80 pixels in the y dimension 10004. Practical physical display devices 6020 are generally much larger; for example, a physical display device 6020 on a typical computer workstation is 1152×870 pixels. In the example of FIG. 10, the pixels are organized as a simple two dimensional array. The example is included in order to contrast it to alternate pixel organizations described in later sections of this document. For this specific example of display screen 100, FIG. 10 also shows specific values for constants used in the method pseudocode included in the appendices.

Parallel Computation Apparatus

Rather than perform either Equation 3 or Equation 4 sequentially pixel-by-pixel, it is desirable to perform the computation for all pixels in the display screen 100 in parallel. Such a parallel searching apparatus must perform, for every bounding box, the five arithmetic comparisons of either Equation 3 or Equation 4 (hereinafter only Equation 4 will be referenced) for every pixel in the display screen 100. Thus, for the first example display screen 100 in FIG. 10, a parallel searching apparatus must perform, for every piece of geometry, 5×120×80=48,000 arithmetic comparisons.

Parallel searching of z-values provides a major advantage over prior art Z-buffer techniques by drastically reducing the time it takes to determine if a piece of geometry is occulted. Entire complex objects can be tested to see if they are occulted before they undergo the computationally expensive process of conversion into separate pixels. If it is determined that an entire object is occulted, then all the computations normally required to convert the object into pixels can be completely avoided.

FIG. 11 shows the data organization of the Basic MCCAM Z-buffer 11000, appropriate for performing the Bounding Box Occulting Test 9000. The example of FIG. 10 is continued here, which means 9600 Basic MCCAM Words 12000 are needed. Each Basic MCCAM Word 12000 includes: an X-field 11004 for storing and comparing the pixel x-value; a Y-field 11006 for storing and comparing the pixel y-value; a Z-field 11008 for storing and comparing the pixel z-value; an infinity flag 11010; and additional logic 11012 for generating signals, such as PixelMiss 12001. Each rectangle in FIG. 11 corresponds to hardware which stores data and/or performs operations. For example, the pixel Z-field 11008 of a particular word 12000 both stores the z-value of the pixel corresponding to this word 12000, but also performs a comparison such as $z<z_{min}$.

The prior art MCCAM in the Duluk Patent would not be appropriate for use as an MCCAM Z-buffer 11000, 23000, or 39000 because all the fields in each of its words need to be written at once. In contrast, the MCCAM Z-buffer 11000, 23000, or 39000 needs its X-fields 11004 and Y-fields 11006 to remain fixed during normal operation, especially while corresponding Z-fields 11008 are being written.

As shown in FIG. 11, Pixels are stored in row-by-row order in the MCCAM Z-buffer 11000, 23000, or 39000, and appropriate sets of consecutive words 11014 compose one raster line of the display screen 100, and are called a Raster Set 11014. The list could also be column-by-column, but it is preferable to list pixels along raster lines to align Segment Hits and Raster Hits (both described later) with the span interpolation 1008 used in incremental rendering.

When a prior art Z-buffer is initialized before a scene starts to be rendered, all Z-buffer values must be set to the maximum in order to designate each pixel "blank" This means geometry at any distance will overwrite the Frame Buffer 1012 and Z-buffer for any such "blank" pixels. Assuming temporarily the Z-buffer uses unsigned integers, initialization of this type generally requires all the bits in the Z-buffer to be set to "1", which is a massive writing operation.

As an optional feature of the MCCAM Z-buffer 11000, 23000, or 39000, initialization can be done by turning on a special hardware flag, called an Infinity Flag 11010 (abbreviated Inf. Flag 11010 in FIG. 11) in each MCCAM Word 12000, 13000, 18000, 24000, or 41000. In any particular MCCAM Word 12000, 13000, 18000, 24000, or 41000, an asserted Infinity Flag 11010 means the z-value for that pixel is infinity, thus causing this pixel to be farther away from the viewing point than any geometry could be located. In the hardware, all infinity bits can be set in parallel, thereby using very little time for initialization. This also avoids a massive write operation to the z-values of every MCCAM Word 12000, 13000, 18000, 24000, or 41000. When a new z-value is written, the corresponding Infinity Flag 11010 is turned off. The addition of the Infinity Flag 11010 (the signal is called InfinityFlg 12018) changes the logic of Equation 4 to Equation 5.

$$\text{PixelMiss} \Leftarrow (x<x_{min}) \lor (x>x_{max}) \lor (y<y_{min}) \lor (y>y_{max}) \lor [(z<z_{min}) \land \overline{\text{InfinityFlg}}] \quad \text{(EQ 5)}$$

FIG. 12 shows a hardware implementation of a Basic MCCAM Word 12000 where the five parameters of a bounding box needed for the Bounding Box Occulting Test 9000 are all compared in parallel and input to the hardware over five buses: BusXMax 12002; BusXMin 12004; BusYMax 12006; BusYMin 12008; and BusZMin 12010. Pipelining could be used for a throughput of one bounding box per clock cycle. This requires both the X-field 11004 and Y-field 11006 within each word 12000 to perform two comparison operations, which are done in the comparators, Gt test 12013 and Lt test 12014 (greater-than and less-than, respectively). The five comparators 12013, 12014 generate the Comparison Results 12003, which are then "or-ed" together 12016 (with the inversion of the signal InfinityFlg 12018 "and-ed" with the z-value Comparison Result, $z<z_{min}$) to generate PixelMiss 12001. PixelMiss 12001 from every Basic MCCAM Word 12000 is then "or-ed" together (shown as a "wired-or" using an open collector buffer 12020) to form NotOcculted 12012. NotOcculted 12012 is inverted to form the signal, occulted 6006, which indicates whether a piece of geometry is occulted. Initialization of the MCCAM Z-buffer 11000, 23000, or 39000, done before a scene is rendered, is accomplished by asserting the signal, SetInfinity 12040, which turns all Infinity Bits 11010 in the MCCAM Z-buffer 11000, 23000, or 39000.

In the X-field 11004 and Y-field 11006 respectively, the x-value and y-value do not need to be altered for a fixed display screen 100 size. Hence, read-only memory, called Fixed X-value 12030 and Fixed Y-value 12032, can be used to store these values. An optional feature of an MCCAM Z-buffer 11000, 23000, or 39000 would be the ability to change the values in X-Field 11004 and Y-Field 11006 with a memory write access. This would allow the hardware to be programmed for different display screen 100 sizes. This would, however, be a considerable additional cost due to the additional circuitry required for read/write memory.

Because, for a fixed display screen 100 size, the values stored in the X-field 11004 and Y-field 11006 portions of MCCAM Words 12000, 13000, 18000, 24000, or 41000 do not change, these two fields 11004, 11006 can be hardwired for the desired display screen 100 configuration. This, in turn, allows these two portions 11004, 11006 to be built using a decoder technique rather than data storage and compare circuitry of the Duluk Patent.

When a new z-value needs to be written into the Basic MCCAM Z-buffer 11000, the Write Control 12041 circuitry is used. The x-value of the affected pixel is input on both BusXMax 12002 and BusXMin 12004, while its y-value is input on both BusYMax 12006 and BusYMin 12008. When this is done, only one Basic MCCAM Word 12000 will have its four Comparison Results 12003 involving x and y all set to false. The signal, WrEn 12042, is then asserted, causing WordWrEn 12044 to be asserted in one Basic MCCAM Word 12000, thereby writing the data on into the Z-value Storage 12048. When WordWrEn 12044 is asserted, ClrInfinity 12046 is also asserted, which resets the Infinity Flag 11010 in the word being written.

The Basic MCCAM Word 12000 shown in FIG. 12 appears to be "write-only". That is, there is no mechanism for reading the z-value stored in any of the Z-fields 11008. For the methods described so far, reading is not necessary because only the value of occulted 6006 is needed by circuitry outside of the Basic MCCAM Z-buffer 11000.

In a later section, information conveying which pixels were Hits is used as an aid in the rasterization process. For systems with this optional capability, this information is read from the MCCAM Z-buffer 11000, 23000, or 39000 and output over the optionally included bus, HitInformation 6008.

As an alternate approach to supplying the five parameters at once, the parameters can be supplied as two triplets:

$$(x_{min}, y_{min}, z_{min}), (x_{max}, y_{max}, z_{max}) \quad \text{(EQ 6)}$$

Hence, each triplet of Equation 6 can be supplied and evaluated in a single clock cycle, thus requiring two clock cycles per bounding box. For the simple bounding box approach, this is inefficient since $z_{max}$ is not used. However, for a vertex-based approach 20000, as described later, this vertex-by-vertex input is preferable because the rendering pipeline is fed polygon vertices one at a time. Sequentially inputting points or vertices requires temporary storage of Comparison Results 12003.

FIG. 6 is a block diagram of a portion of a hardware rendering subsystem 6000 which includes a MCCAM Z-buffer 11000, 23000, or 39000. In this figure, the MCCAM Pixel Drawing Subsystem 6002 is outlined, and it performs the operation of the BBOT Pixel Drawing Pipeline 8000, 20000, the Span Occulting Test Pipeline 29000, or the Dual Occulting Test Pipeline 32000. Information about the scene to be rendered is input over the data bus TranslatedGeometry 2004 which describes geometry in screen coordinates and comes from the screen space conversion 1003 portion of the rendering pipeline 5000. The MCCAM Z-buffer 11000, 23000, or 39000 performs Occulting Tests 9000, 22000, or 27000, and supplies the signals occulted

6006 and (optionally) HitInformation 6008 to the Rasterize Processor 6010; the signals describe, respectively, if the present piece of geometry is occulted and which pixels are Hits.

If the geometry is not occulted, the Rasterize Processor 6010 generates new pixel color values on the bus PixelColor 2012 which are written to the Frame Buffer 1012 at the address specified by PixelAddr 2016. The Rasterize Processor 6010 also generates new pixel z-values (with pixel coordinates) on the bus NewZValues 6012, which are written into the MCCAM Z-buffer 11000, 23000, or 39000. The scene can be displayed as it is rendered or after completion. The display device 6020 can be a CRT of a computer or a storage device such as a disk or photographic film.

Raster Write Capability

In the rendering subsystem of FIG. 6, the MCCAM Z-buffer 11000, 23000, or 39000 stores all the z-coordinate information for every pixel. However, storing many new z-values can consume a major fraction of the memory access bandwidth of the MCCAM Z-buffer 11000, 23000, or 39000. As an alternative, to avoid this bottleneck, $z_{max}$ can be stored into the non-occulted pixels in the projection of a piece of geometry rather than each pixel's true z-coordinate. This saves MCCAM memory access bandwidth because the MCCAM Z-buffer 11000, 23000, or 39000 can be designed with Raster Write MCCAM Words 13000 which allow writing many words 13000 simultaneously with the same value. This, in turn, requires adding another buffer to store the true z-coordinate values, which would generally be a conventional Z-buffer 2008 coupled to the Rasterize Processor 6010.

The projection of a piece of geometry is generally not a rectangle. Therefore, when simultaneously writing a z-value to multiple words, a degenerate rectangle with a height of one pixel is used. This degenerate rectangle is one raster of pixels within the projection of the piece of geometry. Hence the name "Raster Write" is used. The degenerate rectangle is a span of the projected geometry, and is generated by edge walking 1006.

In Raster Write MCCAM Words 13000, Write Control 12041 is replaced with Raster Write Control 13002, which needs an additional control signal, WriteMult 13004. WriteMult 13004 indicates the writing of multiple Raster Write MCCAM Words 13000. The new equation for WordWrEn 12044 is:

$$\text{WordWrEn} \Leftarrow \text{WriteEn} \wedge [(x < x_{min}) \vee (x > x_{max})]$$
$$\wedge [(y < y_{min}) \vee (y > y_{max})] \wedge [\overline{\text{WriteMult}} \vee ((z < z_{min}) \wedge \overline{\text{InfinityFlg}})]$$

(EQ 7)

When multiple simultaneous writes are desired, the following inputs are used: 1) $x_{min}$ is set to $x_{start}$, input over BusXMin 12004; 2) $x_{max}$ is set to $x_{end}$, input over BusXMax 12002; 3) both $y_{min}$ and $y_{max}$ are set to $y_{span}$, input over BusYMin 12008 and BusYMax 12008; 4) $z_{max}$ is input over BusZMin 12010; 5) WrEn 12042 is asserted; and 5) WriteMult 13004, which chooses between a single word write and a multiple word write, is asserted. In essence, for a Raster Write operation, Equation 7 looks for pixels with all of the following conditions: 1) x-value such that $x_{start} \leq x \leq x_{end}$; 2) y-value such that $y = y_{span}$; and 3) z-value such that $z \geq z_{max}$ or has the Infinity Flag 11010 true.

The Raster Write Control 13002 can actually perform a Bounding Box Write by using all five parameters with independent values. The signal, WriteMult 13004, decides whether the z-values are taken into consideration. The use of a Bounding Box Write is limited because 3D geometry generally does not have a projection which is a rectangle. However, the Bounding Box Write could be used to set all z-values to the same value.

Raster Write capability is prefered over word-by-word writing because it increases performance. Hence, additional novel word types (explained in later sections) assume a Raster Write capability although they could be built with word-by-word writing.

A rendering subsystem 14000 with both a MCCAM Z-buffer 11000, 23000, or 39000 and a standard (i.e., prior art) Z-buffer 2008 is shown in FIG. 14, with the Approximation Based Pixel Drawing Subsystem 14002 outlined. This subsystem is identical to that of FIG. 6 except for: 1) approximate z-values are written back to the MCCAM Z-buffer 11000, 23000, or 39000 over the ApproxZValues 14004 bus; 2) the true z-values are written over the bus NewZValues 14006 into the conventional Z-buffer 2008; and 3) the Rasterize Processor 6010 must generate data for both the MCCAM Z-buffer 11000, 23000, or 39000 and the conventional Z-buffer 2008. The z-values on ApproxZValues 14004 must be the worst case values for the concerned pixel or pixels. In other words, the z-values stored into the MCCAM Z-buffer 11000, 23000, or 39000 must be greater than or equal to (i.e. it is not closer to the viewing point) the pixels' true z-coordinate values so as to always err on the side of allowing new geometry to be rasterized when it is actually occulted, and never declare geometry as occulted when, in fact, it is not occulted. The bus, ApproxZValues 14004, is also used to transfer data to perform the Span Occulting Test 27000 or the Raster Write Span Occulting Test 30000 (both described in a later section).

Another reason for having both a MCCAM Z-buffer 11000, 23000, or 39000 and a standard Z-buffer 14004, as shown in FIG. 14, is having a many-to-one mapping of the pixels in the standard Z-buffer 14004 to each of the MCCAM Words 12000, 13000, 18000, 24000, or 41000. In this case, each MCCAM Word 12000, 13000, 18000, 24000, or 41000 corresponds to a Cell (described in detail in a later section), which is a group of pixels. The value for a particular Cell in the MCCAM Z-buffer 11000, 23000, or 39000 is the maximum z-value of all the pixels within the Cell. This is, once again, the worst case value which approximates the true z-coordinate values.

Prior art rendering systems do not have the capability to simultaneously write the same value into multiple Z-buffer memory locations. This is because prior art systems do not include a separate memory to store approximate z-values. The apparatus described here stores approximate z-values into a memory, the MCCAM Z-buffer 11000, 23000, or 39000, which can both write multiple words and/or query multiple words within one clock cycle. The parallel writing and querying of multiple words substantially enhances renderer throughput by reducing the number of clock cycles needed to process geometry.

The circuits in the prior art MCCAM in the Duluk Patent are not good for writing to multiple words, thus are not able to perform the Raster Write operation.

Scene Rendering and Hierarchical Object Occulting

As described above, geometry databases are frequently hierarchically organized into a tree of objects. A major performance advantage arises from applying Occulting Tests 9000, 22000, or 27000 to hierarchical objects rather than to only renderable pieces of geometry. A method flow diagram for this application of the MCCAM Z-buffer 11000, 23000, or 39000 is shown in FIG. 15. This method is called the MCCAM Scene Rendering method 15000.

In order to aid in generating a bounding box for an object, the database should include some bounding information.

However, since the database generally contains geometry which is not yet translated to screen coordinates, or even world coordinates, any bounding information must pass through the spatial transformation process, which is from data input to screen space conversion 1003. Such bounding information could describe a bounding sphere, a bounding parallelepiped, other bounding volume shapes, or a union of various shapes. In any case, the most efficient input to an Occulting Test 9000, 22000, or 27000 would be two vertices which are the opposite corners of an axially aligned bounding box.

As shown in FIG. 15, a scene is rendered by first initializing 15002 the Frame Buffer 1012 and MCCAM Z-buffer 11000, 23000, or 39000, then sequentially getting 15004 each root object from the geometry database. The "getting" of an object or its geometry is done by feeding the appropriate data from the database, into the 3D Graphics Pipeline 5000, 28000, or 31000, and having it flow through to the pipeline 5000, 28000, or 31000 to the output of the screen space conversion 1003 step.

For each root object, a bounding box is made 8004, or 20002, 20004, and 21000 and then a bounding box based Occulting Test 9000, or 22000 is performed. If this object is occulted 15010, all subobjects of this object are also occulted, and this branch of the hierarchical database tree needs no further processing. If this object is not occulted 15010, then subobjects within this object must be processed. At the first subobject level (or subsequent subobject levels), if there are renderable graphics primitives 15012, then these undergo testing and rasterization 8000, 20000, or 30000. If them are subobjects 15016, then they are processed the same way their parent object was processed. First, a subobject is obtained 15018 by reading it from the database, feeding into the 3D Graphics Pipeline 5000, 28000, or 31000, and translating it to screen coordinates. Next, a bounding box is made 8004, or 20002, 20004, and 21000 and an Occulting Test 9000, 22000, or 27000 is performed. If a subobject is not occulted 15024, then its subobjects and renderable primitives are tested and rasterized 8000, 20000, or 30000.

The method of FIG. 15 is naturally recursive due to the treelike nature of the database. However, recursion does not illustrate well with a flow diagram, so description of a recursive version is presented using method pseudocode in the appendices.

Prior art systems cannot process entire objects to see if they are occulted. Prior art renderers must break objects into separate pixels, then test each pixel to see if it is occulted. The invention described here processes an entire object by performing operations on all pixels at once. The elimination of entire occulted objects saves a large fraction of the total computation, thereby allowing more complicated scenes to be rendered because more objects can be processed.

Processing Vertex-based Geometry and Polygon Meshes

FIG. 16 shows a polygon 16002 on a display screen 100. The polygon 16002, in this case a triangle, is described by its vertices $V_1$ 16006, $V_2$ 16008, and $V_3$ 16010, which are in screen coordinates. The position of each vertex is described by a triplet such as ($V_{1,x}$, $V_{1,y}$, $V_{1,z}$). Thus, the bounding box (and projected bounding box 16012) for the polygon can be generated strictly from the vertices by:

$$x_{min} \Leftarrow \text{MinOf}(V_{1,x}, V_{2,x}, V_{3,x}) \quad x_{max} \Leftarrow \text{MaxOf}(V_{1,x}, V_{2,x}, V_{3,x})$$
$$y_{min} \Leftarrow \text{MinOf}(V_{1,y}, V_{2,y}, V_{3,y}) \quad y_{max} \Leftarrow \text{MaxOf}(V_{1,y}, V_{2,y}, V_{3,y})$$
$$z_{min} \Leftarrow \text{MinOf}(V_{1,z}, V_{2,z}, V_{3,z}) \quad z_{max} \Leftarrow \text{MaxOf}(V_{1,z}, V_{2,z}, V_{3,z})$$
(EQ 8)

A common technique for generation of a polygonally approximated surface is the use of polygon meshes, as described in the Deering Reference, the Watt Reference, and the Howard Reference. FIG. 17 shows a triangle mesh which uses six vertices to describe four triangles. The four projected bounding boxes 17002, 17004, 17006, 17008 can overlap, and each bounding box is used by the Bounding Box Occulting Test 9000 to determine if the corresponding triangle is occulted. FIG. 18 is a Vertex MCCAM Word 18000, which processes polygons and meshes vertex-by-vertex and automatically generates the equivalent of a bounding box by using the Vertex Bounding Box Occulting Test 22000.

An alternative to independently supplying the parameters of the bounding boxes (four in the case of FIG. 17) is to operate directly on vertex coordinates, and the method to do so is hereinafter called the Vertex Bounding Box Occulting Test 22000. Rather than performing a "MinOf" or "MaxOf" operation on vertex coordinates (as Equation 8 implies), which requires corresponding coordinates of vertices to be compared to each other, the list of inequalities of Equation 4 is expanded to operate on vertex coordinates, and Vertex-PixelMiss 18001 is generated by Equation 9.

$$\begin{aligned}
\text{VertexPixelMiss} \Leftarrow\ & [(x < V_{n,x}) \land (x < V_{n-1,x}) \land (x < V_{n-2,x})] \lor \\
& [(x > V_{n,x}) \land (x > V_{n-1,x}) \land (x > V_{n-2,x})] \lor \\
& [(y < V_{n,y}) \land (y < V_{n-1,y}) \land (y < V_{n-2,y})] \lor \\
& [(y > V_{n,y}) \land (y > V_{n-1,y}) \land (y > V_{n-2,y})] \lor \\
& [(z < V_{n,z}) \land (z < V_{n-1,z}) \land (z < V_{n-2,z})]
\end{aligned}$$
(EQ 9)

Equation 9 operates on three vertices within a triangle mesh: $V_n$, $V_{n-1}$, and $V_{n-2}$, where $V_n$ is the most recently input vertex, and $V_{n-1}$ and $V_{n-2}$ are the two immediately previous vertices (n is essentially a time index). Each of the inequalities of Equation 4 has been expanded in Equation 9 to a conjunction of three inequalities. To illustrate, the first inequality of Equation 4, $(x<x_{min})$, has been expanded to $$(x<V_{n,x}) \land (x<V_{n-1,x}) \land (x<V_{n-2,x})$$
(EQ 10)

which has the same logical value. This expansion can be done because if $x<x_{min}$ is true, then the conjunction of the corresponding inequalities in Equation 10 must also be true since $V_{n,x}$, $V_{n-1,x}$, and $V_{n-2,x}$ must all be greater than or equal to $x_{min}$ by Equation 8.

The simplest version of the Vertex MCCAM Z-buffer 23000 processes one vertex per clock cycle. Each Vertex MCCAM Word 18000, one corresponding to each particular (x,y) region (either a pixel or a Cell) on the display screen 100, performs the following five independent arithmetic tests on the nth vertex, $V_n$, in a mesh:

$$\begin{aligned}
L_x &\Leftarrow (x<V_{n,x}) \\
G_x &\Leftarrow (x>V_{n,x}) \\
L_y &\Leftarrow (y<V_{n,y}) \\
G_y &\Leftarrow (y>V_{n,y}) \\
L_z &\Leftarrow (z<V_{n,z}) \land \overline{\text{InfinityFlg}}
\end{aligned}$$
(EQ 11)

The five one-bit results, $L_x$, $G_x$, $L_y$, $G_y$, and $L_z$, in each Vertex MCCAM Word 18000 are collectively called the Vertex Comparison Results 18008. As a mesh is processed, vertices undergo the operations in Equation 11, and the Vertex Comparison Results 18008 from all Vertex MCCAM Words 18000 are temporarily stored in a Comparison Register 23010. Only Vertex Comparison Results 18008 from vertices included in polygons which have not completed the Vertex Bounding Box Occulting Test 22000 need to saved. Once all the polygons which include a particular vertex have completed the Vertex Bounding Box Occulting Test 22000, the Vertex Comparison Results 18008 from that vertex can be discarded, and the Comparison Register 23010 can be reused to store the results 18008 from another vertex. Since a multiplicity of vertices are included in polygons which are partially processed, a multiplicity of Comparison Registers 23010 are needed. In one Vertex MCCAM Word 18000, the set of all bits within all Comparison Registers 23010 is called the Comparison Register Bits 18012. The output from the Comparison Register Bits 18012 is shown as Comparison Register Output Bits 18014 in FIG. 18.

The rth Comparison Register 23010 is called $R_r$, and each Comparison Register 23010 has five bits per Vertex MCCAM Word 18000, which, for $R_r$, are called $L_{r,x}, G_{r,x}, L_{r,y}, G_{r,y},$ and $L_{r,z}$. A polygon is completed when its last vertex is input. Then, the appropriate Comparison Register Output Bits 18014 bits are gated together in each Vertex MCCAM Word 1800 using Equation 9 to generate Vertex-PixelMiss 18001. Alternatively, for polygons with more than three vertices, a similar logic equation with more terms in each conjunction can be used. For example, if a quadrilateral has the Vertex Comparison Results 18008 from its four vertices stored in Comparison Registers 23010 $R_0, R_1, R_4,$ and $R_5$, then the appropriate version of Equation 9 is Equation 12.

$$VertexPixelMiss \Leftarrow [L_{0,x} \wedge L_{1,x} \wedge L_{4,x} \wedge L_{5,x}] \vee \quad (EQ\ 12)$$
$$[G_{0,x} \wedge G_{1,x} \wedge G_{4,x} \wedge G_{5,x}] \vee$$
$$[L_{0,y} \wedge L_{1,y} \wedge L_{4,y} \wedge L_{5,y}] \vee$$
$$[G_{0,y} \wedge G_{1,y} \wedge G_{4,y} \wedge G_{5,y}] \vee$$
$$[L_{0,z} \wedge L_{1,z} \wedge L_{4,z} \wedge L_{5,z}]$$

Continuing with this example, another vertex could be input to form a triangle with the vertices whose Vertex Comparison Results 18008 were stored in $R_4$ and $R_5$, thus reusing those Vertex Comparison Results 18008. The Vertex Comparison Results 18008 for this new vertex could be stored in $R_0$, overwriting previously stored Vertex Comparison Results 18008. This assumes the old results in $R_0$ won't be needed again. This newly formed triangle then requires yet another equation different from Equation 12.

For hardware to generate many different logic functions (such as Equation 12), some mechanism is needed for selecting which of the Comparison Registers 23010 are used to compute the value of VertexPixelMiss 18001. This mechanism uses enable signals, where a logic "1" on an enable signal selects the corresponding Comparison Register 23010 to be included in the computation of VertexPixelMiss 18001. Hence, assuming there are only three Comparison Registers 23010, three enable signals, $E_0$ 18040, $E_1$ 18042, $E_2$ 18044, are needed, and the logic needed in the Miss Computation 18011 hardware is:

$$VertexPixelMiss \Leftarrow [(L_{0,x} \vee \overline{E_0}) \wedge (L_{1,x} \vee \overline{E_1}) \wedge (L_{2,x} \vee \overline{E_2})] \vee \quad (EQ\ 13)$$
$$[(G_{0,x} \vee \overline{E_0}) \wedge (G_{1,x} \vee \overline{E_1}) \wedge (G_{2,x} \vee \overline{E_2})] \vee$$
$$[(L_{0,y} \vee \overline{E_0}) \wedge (L_{1,y} \vee \overline{E_1}) \wedge (L_{2,y} \vee \overline{E_2})] \vee$$
$$[(G_{0,y} \vee \overline{E_0}) \wedge (G_{1,y} \vee \overline{E_1}) \wedge (G_{2,y} \vee \overline{E_2})] \vee$$
$$[(L_{0,z} \vee \overline{E_0}) \wedge (L_{1,z} \vee \overline{E_1}) \wedge (L_{2,z} \vee \overline{E_2})]$$

For the Vertex Bounding Box Occulting Test 22000, a polygon is occulted if VertexPixelMiss 18001 is true in all Vertex MCCAM Words 18000. When a hierarchical object's bounding box is input as a "non-renderable polygon" in order to find out if the object is occulted, the bounding box is described by a multiplicity of vertices. The minimum number of vertices required for this "non-renderable polygon" is two, namely two opposite corners of the bounding box. The objective is to provide the best Occulting Test 9000, 22000, 27000, or 30000 results by generating a "non-renderable polygon" whose bounding box is the same size (or larger, but not smaller) than the true bounding box of the hierarchical object.

Vertex Comparison Results 18001 are represented by two bits per coordinate: 1) greater-then; and 2) less-than. One alternate representation uses: 1) greater-than; and 2)equal-to. Another alternate representation uses: 1) less-than; and 2) equal-to. Any of these three representations can be converted to one of the others.

If high order polygons (ones with more vertices) are allowed, where the number of vertices exceeds the number of Comparison Registers 23010, a running conjunction of Vertex Comparison Results 18008 can be maintained in a particular Comparison Register 23010 (shown here as $R_0$) by adding the capability for it 23010 to do a running conjunction, as shown in Equation 14.

$$L_{0,x} \Leftarrow (L_{0,x} \vee NoRunConj) \wedge (x < V_{n,x})$$
$$G_{0,x} \Leftarrow (G_{0,x} \vee NoRunConj) \wedge (x > V_{n,x})$$
$$L_{0,y} \Leftarrow (L_{0,y} \vee NoRunConj) \wedge (y < V_{n,y}) \quad (EQ\ 14)$$
$$G_{0,y} \Leftarrow (G_{0,y} \vee NoRunConj) \wedge (y > V_{n,y})$$
$$L_{0,z} \Leftarrow (L_{0,z} \vee NoRunConj) \wedge (z < V_{n,z})$$

New values in Comparison Register 23010 $R_0$ are a function of the present values in $R_0$ and the new Vertex Comparison Results 18008. In Equation 14, the signal NoRunConj 18046 controls the restarting of the running conjunction, and is asserted for the start of a new polygon or when a running conjunction is not desired. When a high order polygon is completed, only $E_0$ 18040 enables its corresponding Comparison Register to effect VertexPixelMiss 18001.

If the running conjunction capability of Equation 14 is included, then the minimum number of Comparison Registers 23010 needed is equal to the maximum number of vertices per polygon in a polygon mesh. Hence, if triangle meshes are allowed and quad meshes or higher are not allowed, then the minimum number of Comparison Registers 23010 is three. If quad meshes are allowed (and they are not really triangle meshes with twice the number of polygons), then four Comparison Registers 23010 are needed. Since meshes of polygons with more vertices than triangles or quadrilaterals are of little use, the best number of Comparison Registers 23010 for use with the Vertex Bounding Box Occulting Test 22000 is either three or four.

A sequence of vertices composing multiple triangle meshes is illustrated in FIG. 19 (this figure is an adapted version of FIG. 3 of the Deering Reference). The first column of the table within FIG. 19 is the list of vertices 19002 being consecutively processed. The second column is the "Vertex Action" 19004 which describes how the vertex fits into the current mesh: "Restart" means a new mesh or polygon is starting, and the Vertex Comparison Results 18008 from $V_n$ are stored in the Comparison Register 23010 $R_0$; "Replace Oldest" means the Vertex Comparison Results 18008 from $V_n$ replace the Vertex Comparison Results 18008 from the oldest vertex whose Vertex Comparison Results 18008 are stored in the Comparison Registers 23010; and "Replace Middle" means the Vertex Comparison Results 18008 from $V_n$ replace the Vertex Comparison Results 18008 from the second oldest vertex whose Vertex Comparison Results 18008 are stored in the Comparison Registers 23010. The third 19006, fourth 19008, and fifth 19010 columns list which vertices have their Vertex Comparison Results 18008 stored in $R_0$, $R_1$, and $R_2$. The fifth column lists which vertices result in a completed polygon 19012, thus requiring Equation 13 to be invoked. This generates VertexPixelMiss 18001 for every Vertex MCCAM Word 18000, thereby performing the Vertex Bounding Box Occulting Test 22000 and determining if the completed polygon is occulted. Only three Comparison Registers 23010 are shown in FIG. 19, but more can be included in the apparatus. FIG. 19 also shows how a single point 19014 and a line 19016, 19018 can be processed simply by treating them as, respectively, a one vertex polygon and a two vertex polygon.

The Vertex MCCAM Word 18000 performs a Block Write by the following steps:

Step 1: Getting as input, on the first clock cycle of the Raster Write operation, $x_{start}$ and $y_{start}$ on BusX 18002 and BusY 18006 (the BusZ 18010 data does not matter), and storing the Comparison Results 18008 in Comparison Register 23010 $R_0$.

Step 2: Getting as input, on the second clock cycle of the Raster Write operation, $x_{end}$, $y_{end}$, and $z_{max}$ on BusX 18002, BusY 18006, and BusZ 18010.

Step 3: On the second clock cycle of the Raster Write operation, asserting both WrEn 12042 and WriteMult 13004.

For a Raster Write operation, the inputs are the same except $y_{span}$ is substituted for both $y_{start}$ and $y_{end}$. The logic in Raster Write Control 13002 performs:

$$\text{WordWrEn} \Leftarrow \text{WrEn} \wedge \overline{[L_{0,x} \vee G_x]} \wedge \overline{[L_{0,y} \vee G_y]} \wedge [\overline{\text{WriteMult}} \vee \overline{(L_z \wedge \overline{\text{InfinityFlg}})}] \quad \text{(EQ 15)}$$

The VBBOT Pixel Drawing Pipeline method 20000 is shown in FIG. 20, which implements the pixel drawing part of the BBOT 3D Graphics Pipeline 5000. This method 20000 processes polygon meshes (which could also be a single point or a line), and performs the function of the "Test & Rasterize the primitives" steps in FIG. 15. First, a vertex in screen coordinates is obtained 20002 from the screen space conversion 1003 part of the BBOT 3D Graphics Pipeline 5000. Next, r is assigned 20004 a value to select a Comparison Register 23010, $R_r$, to store the Vertex Comparison Results 18008. Then, the coordinates of the vertex are compared to the values in the Vertex MCCAM Z-buffer 23000 in a set of operations called Vertex Comparisons 21000 (detailed in FIG. 21), which is the operation of Equation 11 performed in every Vertex MCCAM Word 18000 in parallel. If a polygon is completed 20008, the Vertex Bounding Box Occulting Test 22000 is done (detailed in FIG. 22) utilizing Equation 13 and the data in the Comparison Registers 23010. If the polygon is not occulted 20012, it is rasterized using the Pixel Drawing Pipeline 4000 method of FIG. 4.

FIG. 21 is the method flow diagram for the Vertex Comparisons 21000 operation, which takes, as input, the vertex screen coordinates vx, vy, and vz, as well as r, which selects the Comparison Register 23010 to be written. The operation generates boolean values for each of the five bits in the Comparison Register 23010 $R_r$ for each Vertex MCCAM Word 18000. In the flow method 21000, comparisons are performed in every Vertex MCCAM Word 18000 through the use of two nested loops, where x and y are both initialized to zero 21004, 21006, and incremented 21008, 21010 up to XMAX 21012 and YMAX 21014 so as to traverse along rows in the x dimension while covering all possible (x,y) positions. The five comparisons 21016, 21018, 21020, 21022, 21024 are between the vertex coordinates and the MCCAM values. For vz, an additional test 21026 is done which checks the Infinity Flag 12002 of the Vertex MCCAM Word 18000. The set of Comparison Registers 23010 is a four-dimensional array, and an example use 21016 is R[r][Gx][x][y], where: the first index designates which Comparison Register 23010 is used; the second index designates which of the five Comparison Result 18008 bits is used; and the third and fourth indices together designate both a particular (x,y) position and a particular Vertex MCCAM Word 18000. The flow method 21000 is shown as sequentially performing comparisons, but the Vertex MCCAM Z-buffer 23000 performs the entire flow method 21000 in parallel, usually in a single clock cycle.

FIG. 22 is the method flow diagram for the Vertex Bounding Box Occulting Test 22000, which is invoked each time a polygon is completed 20008. It 22000 utilizes the Comparison Results 18008 stored in the Comparison Registers 23010 to determine the value of the signal, occulted 6006. The signal, occulted 6006, is initialized to true 22002, and is changed to false 22004 if any pixel has VertexPixelMiss 18001 false 22006 because it is both within the projected bounding box of the polygon and is behind any portion of the polygon's bounding box. In the flow method 22000, VertexPixelMiss 18001 is computed in every Vertex MCCAM Word 18000 through the use of two nested loops, where x and y are both initialized to zero 22008, 22010, and incremented 22012, 22014 up to XMAX 22016 and YMAX 22018 so as to traverse along rows in the x dimension while covering all possible (x,y) positions. The computation of VertexPixelMiss 18001 is done utilizing Equation 13, and the flow method 22000 performs Equation 13 by using an inner loop through the Comparison Registers 23010 while inside of the two nested (x,y) loops. This inner loop initializes the temporary variables 22020 and conditionally 22022 utilizes 22024 the Comparison Results in $R_r$, a Comparison Register 23010. The condition 22022 for utilization 22024 depends on wether the rth Comparison Register 23010 contains Comparisons Results 18008 from a vertex which is part of the newly completed polygon. If this is true, the temporary variables are each updated 22024 by the appropriate bit in $R_r$. When all the Comparison Registers 23010 have been done 22026, the value of VertexPixelMiss 18001 is computed 22028 for the pixel. Once again, the flow method 22000 is shown as sequentially processing (x,y) positions, but the Vertex MCCAM Z-buffer 23000 performs the entire flow method 22000 in parallel, usually in a single clock cycle. The Vertex MCCAM Z-buffer 23000, through the use of pipelining, can perform both the Vertex Comparisons 21000 operation and the Vertex Bounding Box Occulting Test 22000 in the same clock cycle.

Prior art renderers generally process geometry databases composed of polygon meshes. It is very important for this invention to be compatible with existing geometry databases, so processing of polygon meshes must be included. In prior art renderers, as a polygon mesh is processed, every new vertex can cause an entire polygon to be generated (this is true for triangle meshes), thereby requiring lots of pixel values to be generated. This very-many-to-one mapping of pixels to polygons puts the bottleneck of prior art renderers in the pixel generating portion of the system. In this invention, as a vertex generates a new polygon, the polygon is immediately tested in a single clock cycle to see if it is occulted, thereby eliminating a large fraction of the pixels within these polygons. This invention reduces the very-many-to-one mapping, which reduces (or eliminates) the bottleneck, and increases performance.

The prior art MCCAM in the Duluk Patent cannot perform the Vertex Bounding Box Occulting Test 22000 because it does not have the provision to independently process or store anything like the Comparison Results 18008 within each of its words. Rather, the Duluk Patent MCCAM generates, in each of its words, a single Flag Result that is derived from the single-bit Query Result. The inability to perform the VBBOT 22000 prevents the Duluk Patent MCCAM from processing polygon meshes.

Methods for Reading Hits

The method disclosed up to this point performs an Occulting Test 9000, 22000, or 27000, which determines the outcome of the rendering keep/discard decision on a polygons, other pieces of geometry, or hierarchical objects. Each MCCAM Word 12000, 13000, 18000, 24000, or 41000 generates its own PixelMiss 12001 or VertexPixelMiss 18001 signal, which indicates if the pixel (or Cell) the word 12000, 13000, 18000, 24000, or 41000 represents is a Hit. If a piece of renderable geometry (polygon, etc.) fails the Occulting Test 9000, 22000, or 27000, and hence needs to be rasterized, the method disclosed up to this point requires the Rasterize Processor 6010 to rasterize the entire piece of geometry without help from the Hit information located in the MCCAM Z-buffer 11000, 23000, or 39000.

As an optional feature, Hit information can be read from the MCCAM Z-buffer 11000, 23000, or 39000. This section describes three ways the Hit information can be transferred to the Rasterize Processor 6010: 1) Pixel Hits; 2) Segment Hits; and 3) Raster Hits. This information would be passed over the HitInformation 6010 bus described earlier. Also, reading Hit information requires additional hardware features, and such features are included in the Hit Flag MCCAM Word 24000, shown in FIG. 24.

For discussion purposes, only VertexPixelMiss 18001 will be explicitly discussed, but PixelMiss 12001 may be substituted if the corresponding apparatus is used. The term "Hit" corresponds to a single MCCAM Word 12000, 13000, 18000, 24000, or 41000, and, for discussion purposes, refers to pixels, but Cells may be used instead.

Individual Pixel Hits

When a piece of renderable geometry is processed by the MCCAM Z-buffer 11000, 23000, or 39000 and fails the Occulting Test 9000, 22000, or 27000, one or more MCCAM Words 12000, 13000, 18000, 24000, or 41000 must have VertexPixelMiss 18001 equal to false. Where this occurs, the pixels are considered Hits. In order to store the information about which pixels are Hits, the Hit Flag MCCAM Word 24000 inverts all the VertexPixelMiss 18001 values and stores them into one of the Hit Flag Registers 23020 for later input into the Priority Resolver and Encoder 23040. Bits in a Hit Flag Register 23020 are used to designate each word's membership or non-membership in a set of Pixel Hits. Specifically, a bit equal to true designates set membership, and false designates set non-membership.

If the Rasterize Processor 6010 determines a piece of geometry causes the signal, occulted 6006, to be false, it 6010 reads out of the MCCAM Z-buffer 11000, 23000, or 39000 all of the pixels which are Hits. For each such read operation, the following steps are done:

Step 1: The stored Hit Flags, labeled FlgValue 24044 in each Hit Flag MCCAM Word 24000, are read out of the Hit Flag Register 23020 and into the Priority Resolver and Encoder 23040. In any particular Hit Flag MCCAM Word 24000, this means reading out of the Hit Flag Register Bits 24010 and into the Priority Resolver and Encoder Section 24012.

Step 2: The Priority Resolver and Encoder 23040 is commanded via the PriResCntrl 24042 signals to find the first (highest priority) Hit Flag MCCAM Word 24000 with its corresponding FlgValue 24044 equal to true.

Step 3: In this highest priority Hit Flag MCCAM Word 24000, the signal, ClrFlg 24046, is set to true (remaining false elsewhere), thereby clearing the corresponding Hit Flag in the Hit Flag Register 23020.

Step 4: Also in the same Hit Flag MCCAM Word 24000, the signal, ReadField 24050, is set to true (remaining false elsewhere), thereby enabling the reading of the coordinate fields, X-field 11004, Y-field 11006, and Z-field 11008, onto the corresponding busses, BusX 18002, BusY 18006, and BusZ 18010, thereby providing the (x,y,z) location of the Pixel Hit.

Step 5: If a lower priority Hit Flag MCCAM Word 24000 has its

FlgValue 24044 equal to true, then the Priority Resolver and Encoder Section 23040 in this lower priority Hit Flag MCCAM Word 24000 asserts the signal, MoreHitsLeft 24048, which indicates further reads are necessary to process the remaining Pixel Hits.

In step 3, clearing one Hit Flag in the Hit Flag Register 23020 eliminates one pixel from the set of Pixel Hits. Thus, for subsequent reads, other Pixel Hits are read. The value in the Z-field 11008 is read out onto BusZ 18010 only if the MCCAM Z-buffer 11000, 23000, or 39000 is storing actual z-values (not approximate values as described above). If approximate z-values are being stored, then the Z-field 11008 does not need to be read because the actual z-values (needed for the keep/discard decision 4002 in the rasterization process 4000) are stored in a conventional Z-buffer 2008. If this is the case, the Z-field 11008 should not have a read capability.

If the Z-field 11008 does not have read capability, then the Priority Resolver and Encoder 23040 can simply perform a priority encode function (similar to the standard TTL part 74148), which outputs the word number within the MCCAM Z-buffer 11000, 23000, or 39000 on the RasterOutBus 24042. The word number can be translated to the pixel (x,y) location (since there is a one-to-one mapping), or the Priority Resolver and Encoder 23040 can be designed to encode the priority directly into the coordinates, (x,y), rather than the simple word number.

FIG. 24 shows a Hit Flag MCCAM Word 24000. The portion of the set of Hit Flag Registers 23020 within the Hit Flag MCCAM Word 24000 are called the Hit Hag Register Bits 23010. The portion of the Priority Resolver and Encoder 23040 within one Hit Flag MCCAM Word 24000 is called a Priority Resolver and Encoder Section 23012. The Hit Flag MCCAM Word 24000 is a superset of either the Basic MCCAM Word 12000 or the Vertex MCCAM Word 18000 because it 24000 adds Hit reading capability.

Multiple Hit Hag Registers 23020 are generally needed to allow new pieces of geometry to undergo Occulting Tests 9000, 22000, or 27000 before the Pixel Hits for prior pieces of geometry are completely read out of the MCCAM Z-buffer 11000, 23000, or 39000. Hence, the signals, HitRegWrSel 24030 and HitRegRdSel 24034, are needed to select a Hit Flag Register 23020 for writing and reading, respectively. Writing to a Hit Flag Register 23020 is enabled by the signal, HitRegWrEn 24032.

Segment Hits

The main drawback to reading every Pixel Hit out of the MCCAM Z-buffer 11000, 23000, or 39000 is similar to the above described drawback to the one-by-one writing of new z-values into the MCCAM Z-buffer 11000, 23000, or 39000. Reading (or writing) all the Pixel Hits can consume a major fraction of the memory access bandwidth of the MCCAM Z-buffer 11000, 23000, or 39000. To solve this, either Segment Hits or Raster Hits are used.

In FIG. 25, a display screen 100 is shown with four pieces of geometry: 1) the polygon 25002 currently being processed; 2 & 3) two prior "front" polygons 25004, 25005 which are in front of the current polygon, where their 25004, 25005 z-values are all less than the current polygon's 25002 $z_{min}$; and 4) a prior "behind" polygon 25006 which is behind the current polygon, where its 25006 z-values are all greater than the current polygon's 25002 $z_{min}$. A Segment Hit is a horizontal set of Pixel Hits, hence Segments Hits must lie completely within a projected bounding box 25014 of the piece of geometry 25002, but may lie outside the projection of the piece of geometry.

The first example Segment Hit 25010 has six pixels and does not include the next pixel to the left because that pixel's current z-value is from the prior "front" polygon 25005, hence that pixel is not a Hit. The Segment Hit 25010 extents to the right all the way to the edge of the projected bounding box 25014 because those pixels have not been previously affected and either have the maximum z-value or have their Infinity Flag 12002 set to true. The Segment Hit 25010 includes pixels previously affected by the prior "behind" polygon because all of those pixels are Hits.

The second example Segment Hit 25020 has five pixels and does not include the next pixel to the right because that pixel's current z-value is from the prior "front" polygon 25005, hence that pixel is not a Hit. The Segment Hit 25010 extents to the left, outside of the polygon's projected bounding box, until the next pixel which is included in the other "front" polygon 25004.

The Raster Write capability described above is a mechanism for simultaneously changing a multiplicity of z-values stored in the MCCAM Z-buffer 11000, 23000, or 39000, and the Segment Hit Read capability disclosed here is, in essence, provides for simultaneously reading a multiplicity of Pixel Hits. That is, rather than read out the Pixel Hits one-by-one, only the minimum information necessary to describe the Segment Hit needs to be read from the MCCAM Z-buffer 11000, 23000, or 39000. This minimum information is the Segment Hit Parameters:

$$(x_{start}, x_{end}, y_{segment}) \quad \text{(EQ 16)}$$

where $x_{start}$ and $x_{end}$ are, respectively, the x-coordinates of leftmost and rightmost pixels in the Segment Hit, and where $y_{segment}$ is the y-coordinate of the Segment Hit. Thus, three numbers describe a Segment Hit regardless of how many Pixel Hits are included.

In the Hit Flag MCCAM Word 24000, when the reading of Segment Hits is desired, the Priority Resolver and Encoder 23040 must be used to find both the leftmost Pixel Hit and the rightmost Pixel Hit, hereinafter called, respectively, the Start Pixel Hit and the End Pixel Hit, within a Segment Hit.

If the Start Pixel Hit and the End Pixel Hit are sequentially read, then the steps to read the Start Pixel Hit are:

Step 1: The stored Hit Flags, labeled FlgValue 24044 in each Hit Flag MCCAM Word 24000, are read out of the Hit Flag Register 23020 and into the Priority Resolver and Encoder 23040.

Step 2: The Priority Resolver and Encoder 23040 is commanded via the PriResCntrl 24042 signals to find the first (highest priority) Hit Flag MCCAM Word 24000 with its corresponding FlgValue 24044 equal to true.

Step 3: In this highest priority Hit Flag MCCAM Word 24000, the signal, ReadField 24050, is set to true (remaining false elsewhere), thereby enabling the reading of the coordinate fields, X-field 11004, Y-field 11006, and Z-field 11008, onto the corresponding busses, BusX 18002, BusY 18006, and BusZ 18010, thereby providing the (x,y) location of the Start Pixel Hit.

If the Start Pixel Hit and the End Pixel Hit are sequentially read, then the steps to read the End Pixel Hit are:

Step 1: The stored Hit Flags, labeled FlgValue 24044 in each Hit Flag MCCAM Word 24000, are read out of the Hit Flag Register 23020 and into the Priority Resolver and Encoder 23040.

Step 2: The Priority Resolver and Encoder 23040 is commanded via the PriResCntrl 24042 signals to find the first (highest priority) Hit Flag MCCAM Word 24000 with its corresponding FlgValue 24044 equal to true and the very next Hit Flag MCCAM Word 24000 has either its FlgValue 24044 equal to false or has a different y-value.

Step 3: In all the Hit Flag MCCAM Words 24000 within the Segment Hit, the signal, ClrFlg 24046, is set to true (remaining false elsewhere), thereby clearing the corresponding Hit Flags in the Hit Flag Register 23020 for all Pixel Hits in this Segment Hit.

Step 4: Also in the same highest priority Hit Flag MCCAM Word 24000 (found in step 2), the signal, ReadField 24050, is set to true (remaining false elsewhere), thereby enabling the reading of the coordinate fields, X-field 11004, Y-field 11006, and Z-field 11008, onto the corresponding busses, BusX 18002, BusY 18006, and BusZ 18010, thereby providing the (x,y) location of the End Pixel Hit.

Step 5: If a lower priority Hit Flag MCCAM Word 24000 has its FlgValue 24044 equal to true, then the Priority Resolver and Encoder Section 23040 in this lower priority Hit Flag MCCAM Word 24000 asserts the signal, MoreHitsLeft 24048, which indicates further reads are necessary to process the remaining Segment Hits.

Segment Hit Read capability would generally be used in conjunction with Raster Write capability; therefore, the Z-field 11008 would not need read capability. If the Z-field 11008 does not have read capability, then the Priority Resolver and Encoder 23040 can perform a priority encode function for generating all three Segment Hit Parameters, which are output on the RasterOutBus 24042. This would save a read access cycle because only one read cycle would be needed per Segment Hit. An alternate approach for saving a read cycle would be to have both Hit Flag MCCAM Words 24000 with the Start Pixel Hit and End Pixel Hit read at the same time, which would, in turn, require two coordinate values to be output on the BusX 18002. Only one coordinate value would be output on the BusY 18006 because the y-values of the start Pixel Hit and the End Pixel Hit are always the same.

An alternative definition of Segment Hit is to allow only one Segment Hit per display screen 100 raster line. With this alternate definition, the Priority Resolver and Encoder 23040 must be able to find the leftmost Pixel Hit and the rightmost Pixel Hit across an entire raster line, thus allowing pixels which are not Pixel Hits to be included in a Segment Hit, except at the Start Pixel Hit and End Pixel Hit. This reduce the number of clock cycles needed to read Segment Hits.

Raster Hits

In FIG. 25, a display screen 100 is shown with four pieces of geometry: 1) the polygon 25002 currently being processed; 2 & 3) two prior "front" polygons 25004, 25005 which are in front of the current polygon, where their 25004, 25005 z-values are all less than the current polygon's 25002 $z_{min}$; and 4) a prior "behind" polygon 25006 which is behind the current polygon, where its 25006 z-values are all greater than the current polygon's 25002 $z_{min}$. A Raster Hit is a colinear set of pixels which horizontally span the width of a projected bounding box, where at least one pixel in the set is a Pixel Hit.

The example Raster Hit 25006 includes Pixel Hits along a horizontal swath of the projected bounding box 25014. Pixels within this swath which are not Pixel Hits, such as those included in the prior "front" polygons 25004, 25005, are included because a Raster Hit always spans the entire width of the projected bounding box 25014.

Raster Hits have a major advantage over Segment Hits and Pixel Hits in that a Raster Hit has only one parameter which needs to be output from the MCCAM Z-buffer 11000, 23000, or 39000: the y-coordinate of the Raster Hit. Since the Rasterize Processor 6010 has all of the parameters which describe the pieces of geometry (and can therefore construct its own copy of the bounding boxes), it 6010 only needs to know which pixels within a projected bounding box could be affected by the non-occulted portions of a new piece of geometry. Hence, the only new information a Raster Hit can supply is its y-coordinate. Spanning the entire width of a projected bounding box 25014 is not a disadvantage because both Segment Hits and Pixel Hits include pixels which fall outside of the projection of a piece of geometry; therefore, the Rasterize Processor 6010 must determine which pixels are actually within the projection of a piece of geometry no matter which type of Hit information is supplied.

Another advantage stemming from having the y-coordinate as the only parameter is simplification of the Priority Resolver and Encoder 23040. The Priority Resolver and Encoder 23040 can do a simple encode on the y-coordinate of Raster Sets 23050, rather then an encode on the set of all Hit Flag MCCAM Words 24000. The Priority Resolver and Encoder 23040 generates one RasterFlgValue signal per Raster Set 23050 by performing an "or" operation on the FlgValue 24000 signals in every Hit Flag MCCAM Word 24000 within a Raster Set 23050. The set of RasterFlgValue signals are input into a priority encoder, which then puts the y-coordinate of the highest priority Raster Set 23050 which has a Pixel Hit.

The steps for reading a Raster Hit are:

Step 1: The stored Hit Flags, labeled FlgValue 24044 in each Hit Flag MCCAM Word 24000, are read out of the Hit Flag Register 23020 and into the Priority Resolver and Encoder 23040.

Step 2: The Priority Resolver and Encoder 23040 is commanded via the PriResCntrl 24042 signals to perform, for each Raster Set 23050, an "or" operation on the FlgValue 24000 signals in every Hit Flag MCCAM Word 24000 within the Raster Set 23050 to generate RasterFlgValue.

Step 3: The Priority Resolver and Encoder 23040 finds the first (highest priority) Raster Set 23050 with its corresponding RasterFlgValue equal to true.

Step 4: In this highest priority Raster Set 23050, the signal, ClrFlg 24046, is set to true in every Hit Flag MCCAM Word 24000 within the Raster Set 23050 (remaining false elsewhere), thereby clearing the Hit Flag in the Hit Hag Register 23020 in all these Hit Flag MCCAM Words 24000.

Step 5: The Priority Resolver and Encoder 23040 encodes the y-coordinate of the highest priority Raster Set 23050 and outputs it on the RasterOutBus 24042.

Step 6: If a lower priority Raster Set 23050 has its RasterFlgValue equal to true, then the Priority Resolver and Encoder Section 23040 in this lower priority Raster Set 23050 asserts the signal, MoreHitsLeft 24048, which indicates further reads are necessary to process the remaining Raster Hits.

Reading Raster Hits this way does not require any of the coordinate fields, X-field 11004, Y-field 11006, and Z-field 11008, to have read capability. In a pipelined Hit Flag MCCAM Word 24000, reading Raster Hits can be done in parallel with Occulting Tests 9000, 22000, 27000, or 30000 because each uses different portions of the hardware.

FIG. 24 is a Hit Flag MCCAM Word 24000 which is the union of all the Hit reading features. Thus, for systems which use only one specific type of Hit, some features shown in the figure are unnecessary, or, at least, optional. The above descriptions show which features are necessary for each type of Hit reading capability. The features included in a specific implementation depend on: 1) the type of Hit being read; 2) whether actual z-values are stored in the MCCAM Z-buffer 11000, 23000, or 39000; and 3) whether the Priority Resolver and Encoder Section 23040 is designed to encode the word location, pixel location, Segment Hit location, or Raster Hit location.

The prior art MCCAM in the Duluk Patent includes a priority resolver for finding the first hit. However, it is not capable of identifying sets of hits, and therefore cannot find Segment Hits or Raster Hits.

The Span Occulting Test 27000

For a piece of geometry to be discarded before it is rasterized, both the Bounding Box Occulting Test 9000 and the Vertex Bounding Box Occulting Test 22000 require the piece of geometry's entire bounding box to be occulted by previously rasterized geometry. This causes an inefficiency is due to: 1) the projected bounding box having a larger area than the projection of the piece of geometry, requiring otherwise uninvolved pixels to occult the piece of geometry; and 2) pixels of previously rasterized geometry must have their z-coordinate values less than $z_{min}$ of the bounding box (or the equivalent for the VBBOT 22000), rather than the actual z-values of the pixels in the piece of geometry. This is a very conservative approach to the keep/discard decision in that it will never discard geometry which is not occulted; however, it will sometimes keep geometry which is occulted. The inefficiencies are acceptable because the MCCAM Z-buffer 11000, 23000, or 39000 can be used to perform all the necessary operations in parallel, resulting in a very high throughput of geometry for these Occulting Tests 9000 or 22000.

An alternative to the use of a bounding box is the use of spans, as described here for the Span Occulting Test 27000. A span is simply one row of pixels across a polygon (or piece of geometry), and spans are generated by the standard rasterization process of edge walking 1006. FIG. 26 shows a polygon 26002 on a display screen 100, and points out one of the spans 26004 of the polygon 26002, where a span's 26004 position is always described by a pair of pixels: the Span Start Pixel 26006 and the Span End Pixel 26008. For the Span Occulting Test 27000, the Span Start Pixel 26006 and the Span End Pixel 26008 are input as the span parameters:

$$(x_{start}, x_{end}, y_{span}, z_{min}) \qquad \text{(EQ 17)}$$

Only one y-parameter is needed for a span because the two pixels 26006, 26008 have the same y-coordinate. The parameter, $z_{min}$, can be either: 1) the minimum z-coordinate of the polygon's bounding box; or 2) the minimum z-coordinate of the span, which would be the minimum z-coordinate of the Span Start Pixel 26006 and the Span End Pixel 26008.

The Span Occulting Test 27000 computes, for each pixel, PixelHit by:

$$\text{PixelHit} \Leftarrow (x \geq x_{start}) \wedge (x \leq x_{end}) \wedge (y = y_{span}) \wedge (z \geq z_{min}) \quad \text{(EQ 18)}$$

or, the inverse, PixelMiss 9001, by:

$$\text{PixelMiss} \Leftarrow (x < x_{start}) \vee (x > x_{end}) \vee (y \neq y_{span}) \vee (z < z_{min}) \quad \text{(EQ 19)}$$

If PixelMiss 9001 is false (or PixelHit is true) for any pixels (i.e. all four comparisons of Equation 19 are false in every MCCAM Word 12000, 13000, 18000, 24000, or 41000), then the span has failed the Span Occulting Test 27000, and those pixels maybe (or maybe not) occulted. Pixels with PixelMiss 9001 false must then be subsequently processed by Rasterize Processor 6010 which compares the pixel's z-coordinate value to that stored in the conventional Z-buffer 2008 (or that stored in the MCCAM Z-buffer 11000, 23000, or 39000 if that is where the actual z-values are stored). There is no need to check if the pixel is within the projection of the polygon, as in the Bounding Box Occulting Test 9000 or the Vertex Bounding Box Occulting Test 22000, because the entire span is within the projection of the polygon. Hence, if PixelMiss 9001 is false for any pixel in a piece of geometry, or PixelHit is true for any pixel, then at least some rasterization or further processing of the geometry must be done.

If PixelMiss 12001 is true for all pixels (or, PixelHit is false for all pixels), then the new span passes the Span Occulting Test 27000 and is occulted, which means no further processing is required for this span. Passing the Span Occulting Test 27000 is sufficient to determine if a span of a polygon is occulted, but it is not necessary for a piece of geometry to be occulted. In other words, spans can fail the Span Occulting Test 9000 and still actually be occulted. However, for scenes with high depth complexity, most spans will be occulted.

FIG. 27 is a method flow diagram for the Span Occulting Test 27000 which is very similar to FIG. 9, which is the Bounding Box Occulting Test 9000. The only difference is in the conditionals 27002, 27004, 27006 which compare the span parameters to the MCCAM Z-buffer 11000, 23000, or 39000 values. The flow method 27000 processes one span, performs comparisons for every pixel, and computes a Boolean value for occulted 6006. Once again, a method is described as sequential, but the MCCAM Z-buffer 11000, 23000, or 39000 apparatus performs all the comparisons in parallel.

The method of FIG. 27 utilizes either the Basic MCCAM Word 12000 or the Raster Write MCCAM Word 13000. However, since only one particular y-value is used at a time, it is possible to build a type of MCCAM where many words share the same arithmetic comparators because they correspond to pixels with different y-values, and only the ones with their y-value equal to $y_{span}$ are selected for input to the comparators.

When the Span Occulting Test 27000 is included in a graphics pipeline, the SOT 3D Graphics Pipeline 28000 results, as shown in FIG. 28. The Span Occulting Test 27000 is inserted after the edge walking step 1006 because edge walking 1006 generates the spans which are tested by the Span Occulting Test 27000, and if they fail the test 27000 (are not declared occulted), they are rasterized into pixels by the span interpolation step 1008.

When used as the only occulting test, the Span Occulting Test 27000 is probably not the best mode of use of the present invention because it is a small improvement over the prior art Z-buffer. This is because only the span interpolation step in a rendering pipeline is avoided by spans which pass the Span Occulting Test 27000. However, when the Span Occulting Test 27000 is added to the Bounding Box Occulting Test 9000 or the Vertex Bounding Box Occulting Test 22000, the DOT 3D Graphics Pipeline 31000 reduces the amount of pixel coloring to a minimum (disclosed in a later section).

A version of the Span Occulting Test 27000 can be made where the term "span" is changed to mean a set of pixels in a multiplicity of rows, rather than a single row. This would reduce the number of MCCAM operations, but would introduce, for most cases, the stone inefficiencies as the methods based on bounding boxes.

The Raster Write Span Occulting Test

The SOT Pixel Drawing Pipeline method 29000 is shown in FIG. 29, which implements the SOT Pixel Drawing Pipeline 29000 part of the SOT 3D Graphics Pipeline 28000. This method 29000 processes a polygon one span at a time, and starts with the Set Up for Incremental Render 1004. Next, it 29000 gets a span 29014 within the polygon by edge walking 1004. The span is then processed by treating it as a two-vertex polygon where one vertex is located at the Span Start Pixel and the other at the Span End Pixel, which entails assigning 29015, 29016 two Comparison Registers 25010 and performing Vertex Comparisons 21000 twice. Then, the Vertex MCCAM Z-buffer 23000 performs the Raster Write Span Occulting Test 30000 to both determine if the span is occulted and to write $z_{max}$ into Pixel Hits which have their z-value greater than $z_{max}$. If the span is not occulted, span interpolation 1008 and Z-buffered blend 1010 are performed to generate and store new pixel color values and new pixel z-values. The SOT Pixel Drawing Pipeline method 29000 continues to process spans this way until all spans in the polygon have been done.

When the Span Occulting Test 27000 discovers a non-occulted span, the span must be rasterized, including the generation of new z-values which must be written into the MCCAM Z-buffer 11000, 23000, or 39000. To do this writing, a Raster Write capability can be used to write zmax into Vertex MCCAM Word 18000 corresponding to pixels within the span. However, the input data for a span, when it is tested by the Span Occulting Test 27000, is essentially redundant with the input data for a Raster Write; namely, the locations of the Span Start Pixel and the Span End Pixel. Hence, these two operations can be condensed into one operation, the Raster Write Span Occulting Test 30000, which both determines whether the span is occulted and writes $z_{max}$ into Pixel Hits which have their z-value greater than $z_{max}$.

FIG. 30 is the method flow diagram for the Raster Write Span Occulting Test 30000 which is invoked for each span, and utilizes the Comparison Results 18008 stored in the Comparison Registers 23010 to determine the value of the signal, occulted 6006. The signal, occulted 6006, is initialized to true 30002, and is changed to false 30004 if any pixel has VertexPixelMiss 18001 false 30006 because it is both within the span and is behind any portion of the span. In the flow method 30000, VertexPixelMiss 18001 is computed in every Vertex MCCAM Word 18000 through the use of two nested loops, where x and y are both initialized to zero 30008, 30010, and incremented 30012, 30014 up to XMAX 30016 and YMAX 30018 so as to traverse along rows in the x dimension while covering all possible (x,y) positions. The SOT Pixel Drawing Pipeline method 29000 utilizes two Comparison Registers 25010, $R_s$ and $R_e$, and these are used to compute 30024, 30028 VertexPixelMiss 18001. Pixel Hits, which are pixels where VertexPixelMiss 18001 is false, are also tested 30030 to see if their z-value is less than the span's $z_{max}$. This testing 30030 is done utilizing either $L_z$ or R[e][Lz][x][y], and if false, then the Vertex MCCAM Word's 18000 z-value is overwritten 30032 with $z_{max}$. The comparison 30030 must be done to keep z-values stored in the MCCAM Z-buffer 11000, 23000, or 39000 from getting larger as geometry is rendered. As the rendering of a scene proceeds, stored z-values should only get smaller. Once again, the flow method 30000 is shown as sequentially processing (x,y) positions, but the Vertex MCCAM Z-buffer23000 performs the entire flow method 30000 in parallel, generally in two clock cycles. For the method 30000 to be done in a single clock cycle, the BusZ 18010 must transmit both $z_{max}$ and $z_{max}$, and the Z-field 11008 value must be compared to both.

The MCCAM Z-buffer 11000, 23000, or 39000 performs a Raster Write Span Occulting Test 30000 by having every Vertex MCCAM Word 18000 execute the following steps:

Step 1: The input on the first clock cycle of a Raster Write Span Occulting Test 30000 operation is $x_{start}$ on BusX 18002, $y_{span}$ on BusY 18006, and $z_{min}$ on the BusZ 18010, and storing the Comparison Results 18008 in Comparison Register 23010 $R_0$.

Step 2: The input on the second clock cycle of a Raster Write Span Occulting Test 30000 operation is $x_{end}$ on BusX 18002, $y_{span}$ on BusY 18006, and $z_{max}$ on the BusZ 18010, and storing the Comparison Results 18008 in Comparison Register 23010 $R_1$.

Step 3: Since the span has used two Comparison Registers 23010, $R_0$ and $R_1$, the two corresponding enable signals, $E_0$ 18040 and $E_1$ 18042, are asserted. This enables the occulting test of the span by causing the computation of NotOcculted 12012, which is driven by VertexPixelMiss 18001.

Step 4: During the second clock cycle, the signals WrEn 12042 and WriteMult 13004 are asserted, causing a Raster Write operation. Since $z_{max}$ is on BusZ 18010 at this time, $z_{max}$ is written into the Z-field 11008 in all Vertex MCCAM Words 18000 where WordWrEn 12044 is asserted.

The logic in Raster Write Control 13002 performs Equation 14, as described earlier.

If only spans are tested to see if they are occulted (and not polygons or meshes), the minimum number of Comparisons Registers 23010 is only two.

The Dual Occulting Test

The main drawback with the Span Occulting Test 27000 and the Raster Write Span Occulting Test 30000 is the reduced throughput caused by the requirement for processing many spans per polygon, rather than processing an entire polygon in a single step as done by both the Bounding Box Occulting Test 9000 and the Vertex Bounding Box Occulting Test 22000. An alternate method is the Dual Occulting Test (hereinafter sometimes abbreviated DOT) which combines the Vertex Bounding Box Occulting Test 22000 (or the Bounding Box Occulting Test 9000, and hereinafter, only the VBBOT 22000 will be described explicitly described as part of the DOT) with the Raster Write Span Occulting Test 30000 (which can be substituted by the Span Occulting Test 27000 with appropriate writing of z-values to their proper location). The combination is shown in FIG. 31 as components in the DOT 3D Graphics Pipeline 31000. Here, the Dual Occulting Test Pixel Drawing Pipeline method 32000 includes the Vertex Bounding Box Occulting Test 22000 for processing entire polygons, objects, or subobjects, and also includes the Raster Write Span Occulting Test 30000 for processing spans within polygons which fail the Vertex Bounding Box Occulting Test 22000.

FIG. 32 shows the flow method for the Dual Occulting Test Pixel Drawing Pipeline method 32000, including both the Vertex Bounding Box Occulting Test 22000 and either the Span Occulting Test 27000 or the Raster Write Span Occulting Test 30000. This method 32000 processes polygon meshes (which could also be a single polygon, point, or line), and performs the function of the "Test & Rasterize the primitives" steps 15014, 15026 in FIG. 15. First, a vertex in screen coordinates is obtained 32002. Next, r is assigned 32004 a value to select a Comparison Register 23010, $R_r$, to store the Vertex Comparison Results 18008. Then, the coordinates of the vertex are compared to the values in the Vertex MCCAM Z-buffer 23000 in the Vertex Comparisons 21000 operations. If a polygon is completed 32008, the Vertex Bounding Box Occulting Test 22000 is done. If the polygon is not occulted 32012, it is passed to the SOT Pixel Drawing Pipeline method 29000 portion of the method 32000.

The above step which gets a span 32014, rather than performing an edge walk 1004, can read Raster Hits from the MCCAM Z-buffer 11000, 23000, or 39000. The locations of the Span Start Pixel and the Span End Pixel are then computed from the Raster Hit's y-coordinate and the vertices of the polygon. Since Raster Hits are read out in increasing y-coordinate order, a variation of edge walking 1004 can be used. Choosing between simple edge walking 1004 and processing Raster Hits depends on the expected average fraction of Raster Hits within a projected bounding box. Hence, if most of the raster lines within a projected bounding box are expected to be Raster Hits, then reading Raster Hits provides little additional information and uses up MCCAM Z-buffer 11000, 23000, or 39000 memory access bandwidth. Conversely, if most of the raster lines within a projected bounding box are expected to not be Raster Hits, then reading Raster Hits saves on performing the SOT Pixel Drawing Pipeline method 29000.

The minimum number of Comparisons Registers 23010 must now be at least equal to the largest order of polygon in a mesh plus two. The additional two are for $R_s$ and $R_e$ used for the Raster Write Span Occulting Test 30000. The DOT Pixel Drawing Pipeline method 32000 processes vertices, and if triangle meshes are input, three Comparisons Registers 23010 are required by the Vertex Bounding Box Occulting Test 22000. When a polygon fails the Vertex Bounding Box Occulting Test 22000, processing of vertices is temporarily suspended, and spans within the polygon are then processed using the Raster Write Span Occulting Test 30000, requiting two additional Comparisons Registers 23010. The three Comparisons Registers 23010 used for the Vertex Bounding Box Occulting Test 22000 can not be reused for the Raster Write Span Occulting Test 30000 because the Vertex Bounding Box Occulting Test 22000 maybe in the middle of processing a mesh, and to resume processing the mesh, the contents of the three Comparisons Registers 23010 must be preserved.

Prior art renderers perform pixel-by-pixel keep/discard decisions, requiring geometry to be decomposed all the way down to individual pixels before determining if they can be thrown away. This invention introduces three additional earlier levels where the keep/discard decisions are performed. The first is on the object (or, subobject) level, the second is at the polygon (or other renderable geometry)

level, and the third is at the span level. This hierarchy of tests provides successively stricter and stricter filtration on geometry in the scene in order to avoid generation of individual pixels whenever possible. At each level in the hierarchy of tests, fewer and fewer pieces of geometry are left, while the ones which remain cost more and more to process. Thus, this invention makes efficient use of available computational ability at each level, while reducing computations otherwise wasted on items which are thrown away later.

The Span FIFO 33003

The DOT Pixel Drawing Pipeline method 32000 is very efficient at performing Occulting Tests 9000, 22000, or 27000 and storing new z-values in the MCCAM Z-buffer 11000, 23000, or 39000. However, if the span interpolation 1008 process accepts spans more slowly than they are generated, then either: 1) the pipeline must wait for the span interpolation 1008 process; or 2) there must be a First-In-First-Out (FIFO) memory between the Raster Write Span Occulting Test 30000 and the span interpolation 1008 process. The second choice, which uses the Span FIFO 33003 memory, is preferable because it does not degrade performance.

The Span FIFO 33003 provides the ability to balance the span interpolation 1008 processing load over the time it takes to render a scene. When rendering a scene, most of the first objects will not be occulted by prior objects, and these will generate many spans which need to be rasterized. However, near the end of the rendering of a scene, most objects will be occulted by prior objects (assuming a reasonably high depth complexity), and these will generate few spans which need to be rasterized. The FIFO takes this front loaded span interpolation 1008 process and balances it over the time it takes to render the entire scene.

The use of the Span FIFO 33003 is possible because the Raster Write Span Occulting Test 30000 updates the z-values in the MCCAM Z-buffer 11000, 23000, or 39000 with approximate values (it uses each span's $z_{max}$), and does not need the z-values generated by span interpolation 1008. Hence, the Raster Write Span Occulting Test 30000 can proceed without waiting for the span interpolation 1008. Non-occulted spans are temporarily stored in the Span FIFO 33003 until they can be span interpolated 1008.

In prior art rendering systems, all polygon spans generated by edge walking 1006 must go through Z-buffer Blend 1010 on a pixel-by-pixel basis. Hence, the Z-buffer Blend 1010 is the bottleneck, and processing ahead on edge walking 1006 cannot increase total throughput. In contrast, the Raster Write Span Occulting Test 30000 reduces the total work of the Z-buffer Blend 1010, while also providing the necessary z-values so that Occulting Tests 9000, 22000, 27000, or 30000 can proceed. This makes it advantageous to process ahead on the part of the graphics pipeline up to and including edge walking 1006. Hence, the methods and apparatus presented in this document remove the main rendering bottleneck and substantially increase renderer performance.

FIG. 33 shows a portion of a 3D rendering system, including the Span FIFO Pixel Drawing Subsystem 33002, which is a modification of the Approximation Based Pixel Drawing Subsystem 14002 of FIG. 14. With the addition of the Span FIFO 33003, the Rasterize Processor 6010 is divided into the Edge Walk Processor 33004 and the Span Interpolate Processor 33006. The Edge Walk Processor 33004 is responsible for managing both the Vertex Bounding Box Occulting Test 27000 and the Raster Write Span Occulting Test 30000, as well as the edge walking process 1006. Data and control for these Occulting Tests 27000, 30000 are communicated to the MCCAM Z-buffer 11000, 23000, or 39000 and Span FIFO 33003 via the GeoParameters 33010 bus. While operations pertaining to the Vertex Bounding Box Occulting Test 27000 (within the DOT 3D Graphics Pipeline 31000) are performed, the Edge Walk Processor 33004 communicates with the MCCAM Z-buffer 11000, 23000, or 39000 and does not write into the Span FIFO 33003. However, during the Raster Write Span Occulting Test 30000 (within the DOT 3D Graphics Pipeline 31000) the Edge Walk Processor 33004 performs the tests 30000 utilizing the MCCAM Z-buffer 11000, 23000, or 39000 and, if a span is not declared occulted, the span is written into the Span FIFO 33003 along with the necessary parameters, including color or texture mapping information. In parallel with these operations on meshes and spans, the Span Interpolate Processor 33006 reads spans out of the Span FIFO 33003 (assuming it 33002 is not empty, otherwise the processor 33006 waits), performs span interpolation 1008 on the spans, and writes new pixel colors into the Frame Buffer 1012. As new pixel colors are generated, the Span Interpolate Processor 33006 also performs the Z-buffer blend 1010 utilizing the z-values stored in the conventional Z-buffer 2008.

Separation of the Edge Walk Processor 33004 from the Span Interpolate Processor 33006 with a FIFO in between allows further parallelizing to be done by incorporating multiple Span Interpolate Processors 33006 as shown in FIG. 34. Since spans do not intersect if they have different y-values, multiple spans can generally be processed in parallel within the Multiple Span FIFO Pixel Drawing Subsystem 34002. Multiple Span Interpolate Processors 33006 requires either: 1) assigned a portion of the pixels within the Frame Buffer 1012 to each Span Interpolate Processor 33006 (see definition of Block in next section), generally with multiple Span FIFOs 33003; 2) a Frame Buffer 1012 with multiple write ports; or 3) Span Interpolate Processors 33006 to time-share a single write port on the Frame Buffer 1012 (as shown in FIG. 34). For multiple Edge Walk Processors 33004 to be used, the MCCAM Z-buffer 11000, 23000, or 39000 must be either time shared, or multiple MCCAM Z-buffers 11000, 23000, or 39000 must be employed.

Organizing Pixels into Blocks

The Pixel Drawing Subsystems 6000, 14000, 33000 described above have a single MCCAM Z-buffer 11000, 23000, or 39000 which is generally built from a multiplicity of VLSI circuits. The performance of such subsystems 6000, 14000, 33000 is limited by the input/output capability of the single MCCAM. The throughput can be increased by putting a multiplicity of Pixel Drawing Subsystems 6000, 14000, 33000 in parallel. Each Pixel Drawing Subsystem 6000, 14000, 33000 is then responsible for a subset of the pixels within the display screen 100. Such a subset is called a Block. Thus, the rendering problem addressed by the Pixel Drawing Pipeline 5000, 28000, 31000 is split into a multiplicity of smaller independent problems by splitting the display screen 100 into Blocks.

FIG. 35 shows a display screen 100 which has been split into multiple Blocks of pixels, with one such Block 35000 pointed out. Since each Block is considered a separate rendering process and has its own Pixel Drawing Subsystem 37002, 38002, a vertex (or any pixel within a renderable piece of geometry) must be translated from screen coordinates to coordinates relative to each Block by a Block Convert 37004 function. For a simple organization of Blocks as shown in FIG. 35, a vertex at screen coordinates ($V_x$, $V_y$) are translated to coordinates ($V_{block,x}$, $V_{block,y}$) relative to a particular Block at ($B_x$, $B_y$) by the equations:

$$V_{block,x} \Leftarrow V_x - B_x S_x$$
$$V_{block,y} \Leftarrow V_y - B_y S_y \quad \text{(EQ 20)}$$

where $S_x$ and $S_y$ are the size of a Block, in pixels, in the x-dimension and the y-dimension. For a particular Block at $(B_x, B_y)$, Equation 20 shifts the origin (i.e., the lower left corner) of the entire a display screen 100 to the origin of the particular Block, and $B_x S_x$ and $B_y S_y$ are the coordinates of the origin of the particular Block in the overall display screen 100.

A vertex has a location relative to every Block, and is located outside every Block except for one. To be outside of a Block, either of the coordinates relative to the Block must be either negative or greater than or equal to the number of pixels in the Block along the corresponding dimension.

The Frame Buffer 1012 is split into corresponding Blocks, where a pixel is now identified by $(B_x, B_y, V_{block,x}, V_{block,y})$, where $B_x$ and $B_y$ identify the Block, and $V_{bloc,x}$ and $V_{block,y}$ identify the pixel's location within the Block.

The simple Block partitioning shown in FIG. 35 is inefficient because a polygon will have a tendency to fall primarily within a small set of Blocks, and therefore, not evenly spread its rendering load over the set of Pixel Drawing Subsystems 37002, 38002. An alternative is to have every Nth raster line within the display screen 100 to belong to the Nth Block, or a similar type of interleaving of Blocks.

FIG. 36 shows an example of an Interleaved Block, where each Interleaved Block includes a portion of every 8th raster line. The translation of a vertex at screen coordinates $(V_x, V_y)$ to coordinates $(V_{block,x}, V_{block,y})$ relative to a particular Block at $(B_x, B_y)$ is done by the Block Convert 37004 function with the equations:

$$V_{block,x} \Leftarrow V_x \bmod S_x$$
$$V_{block,y} \Leftarrow V_y - B_y S_y \quad \text{(EQ 21)}$$

where $S_x$ and $S_y$ are the size of a Interleaved Block, in pixels, in the x-dimension and the y-dimension. For the x-dimension, a modulus operation (expressed as V % S in the C programming language) is performed to account for the gaps between the raster lines within a Interleaved Block.

FIG. 37 shows a multiplicity of Block Pixel Drawing Subsystems 37002, where each 37002 is responsible for a Block (or Interleaved Block) of pixels within the display screen 100. The Block Pixel Drawing Subsystem 37002 is the MCCAM Pixel Drawing Subsystem 6002 plus the Block Convert 37004 function. This function 37004 translates input data on the TranslatedGeometry 2004 bus from screen coordinates to coordinates relative to the corresponding Block, and outputs this data on the BlockTranslatedGeometry 37006 bus. The assigning of one Block within the display screen 100 to each Block Pixel Drawing Subsystem 37002 requires the Frame Buffer 1012 to be divided. Hence, each Block Pixel Drawing Subsystem 37002 has a corresponding Frame Buffer Block 37008. The multiplicity of Frame Buffer Blocks 37008 must act as a single Frame Buffer 1012 when the scene is read and output to the display screen 100. To achieve this, a Display Screen Multiplexor 37010 is included to select the output from the appropriate Frame Buffer Block 37008 when the display screen 100 needs pixels from that Block.

FIG. 38 shows a multiplicity of Block Span FIFO Pixel Drawing Subsystems 38002, where each 38002 is responsible for a Block (or Interleaved Block) of pixels within the display screen 100. The Block Span FIFO Pixel Drawing Subsystem 38002 is the Span FIFO Pixel Drawing Subsystem 33002 plus the Block Convert 37004 function. A multiplicity of Multiple Span FIFO Pixel Drawing Subsystems 34002 could also be used. In the rendering subsystem of FIG. 37, the set of MCCAM Z-buffers 11000, 23000, or 39000 store all the z-coordinate information for every pixel in a Block, whereas in the rendering subsystem of FIG. 38, the set of MCCAM Z-buffers 11000, 23000, or 39000 store approximations for pixel z-values and the set of conventional Z-buffers 2008 store all the true z-coordinate information for every pixel in a Block.

For the partial rendering systems of FIG. 37 and FIG. 38, the herein previously described Pixel Drawing Pipeline methods apply to individual Pixel Drawing Subsystems. Hence, when a set of Pixel Drawing Subsystems are taken as a whole, the set of Comparison Registers 23010 is a six-dimensional array such as BlockR[r][Gx][bx][by][x][y], where: the first index designates which Comparison Register 23010 is used; the second index designates which of the five Comparison Result 18008 bits in a particular Comparison Register 23010 within a Vertex MCCAM Word 18000 is used; the third and fourth indices together designate both a particular Block within the display screen 100 and a particular Pixel Drawing Subsystem; and the fifth and sixth indices together designate both a particular (x,y) position within the particular Block and a particular Vertex MCCAM Word 18000.

Temporal Correlation and the use of Tags

Most applications of 3D computer graphics generate a sequence of scenes in a frame-by-frame manner. Applications can generate either an animation (done in non-real time) or a simulation (done in real time). If the frame rate of the sequence is sufficiently high (this is generally the case), then the present scene looks very much like the previous scene, and the only differences are due to movement of objects or light sources within the scene or movement of the viewing point. Thus, consecutive scenes are similar to each other due to their temporal correlation.

For the hidden surface removal problem, identifying the non-occulted geometry from the previous frame can help with the rendering of the present scene because such non-occulted geometry can be rendered first. Then, when geometry which was occulted in the previous scene undergoes the Occulting Tests 9000, 22000, 27000, or 30000 most of it is discarded because, if it was occulted in the previous scene, it is probably occulted in the scene.

Taking advantage of temporal correlation is difficult in prior art rendering systems because the "backward link" from the final values in the Z-buffer (and frame buffer) back to the geometry database is difficult to construct. In other words, prior art rendering systems smash geometry into separate and independent pixels, and taking advantage of temporal correlation requires knowing which pieces of geometry generated the pixels which survived the keep/discard decisions when an entire scene has completed the rendering process.

A simple solution to generating this "backward link" is to save, for every pixel in the display screen 100, a "Tag" which is a pointer to (or label for) the source geometry. Tags could be a simple address to a particular renderable primitive, or a Tag could be a hierarchical list of pointers for traversing the hierarchical geometry database. The Tag could locate one polygon, a renderable primitive, a subobject, or an entire object. The exact nature of how the Tag is used depends on how the geometry database is designed and the desired level of detail in the Tag pointer.

When Span Interpolation 1008 is performed, and a new pixel's z-value causes overwriting the old values in the Z-buffer and Frame Buffer 1012, the Tag is also updated with a pointer back to the geometry which generated the new pixel. For incorporation into methods previously disclosed herein, the Z-buffer Blend 1010 not only writes color data into the Frame Buffer 1012 and true z-coordinate information into either the MCCAM Z-buffers 11000, 23000, or 39000 or the conventional Z-buffers 2008, but also writes Tag information into the MCCAM Z-buffers 11000, 23000, or 39000 or into a separate Tag CAM memory.

When a scene is completely rendered, the Tags are read, thereby identifying the geometry which was not occulted. Then, this geometry is rendered first in the next frame. However, for a display screen 100 with a million or more pixels (this is typical), too many Tags will need to be read to be practical. In addition to reading all the Tags, there must also be a mechanism for determining if the most recently read Tag is redundant with a previously read Tag. Since a single non-occulted polygon typically affects tens or hundreds of pixels, most Tags will be redundant.

The Tag reading and redundancy problems are solved by the Tag MCCAM Z-buffer 39000, which can perform a parallel search method 40000, 42000 which culls out redundant Tags and thereby reduces the number of Tag reads. Each Tag MCCAM Word 41000 includes a Tag-field 39010 which can perform bit-for-bit equivalency tests. A Tag-field 39010 is a word of content addressable memory which, when a comparison operation is performed, produces a true value on the signal TagHit 41020 when all the stored bits match all the bits (which are not masked) on the BusTag 41010 data bus.

Just before rendering of a scene is started, all the Tags stored in the Tag MCCAM Z-buffer 39000 are labelled invalid. This is done at the same time the z-values are set to infinity by the assertion of SetInfinity 12040. In addition to setting all the InfinityFlg 12018 bits, SetInfinity 12040 also sets the TagInvalid 58006 bit in every Tag-field 39010.

As rendering proceeds, Tags are written into Tag-fields 39010 and corresponding TagInvalid 58006 bits are cleared. Writing of Tags can occur during either: 1) Span Interpolation 1008, as new z-values are generated and the keep/discard decision is made on a pixel-by-pixel basis; or 2) Raster Write operations, as they are performed during an Occulting Test 9000, 22000, 27000, or 30000.

When the rendering of a scene is complete, and Tags of the visible geometry are stored in the set of Tag-fields 39010, the Visible Objects List is generated 40000. The Visible Objects List is a non-redundant list of Tags for visible geometry. The set of Tag MCCAM Words 41000 generate 40000 the list with the following steps:

Step 1: A Hit Flag Register 23020 is chosen and used for marking which Tags have not been read. In Tag MCCAM Words 41000 where TagInvalid 58006 is false, the bit in the chosen Hit Flag Register 23020 is turned on 40010, elsewhere, it is turned off. This is done by performing a search on all Tag-fields 39010 where all the Tag bits are masked (and so do not affect the comparison) and where a zero is desired for the value of TagInvalid 58006.

Step 2: The Hit Flag Register 23020 is selected for reading with HitRegRdSel 24030. The Hit Hag in each Tag MCCAM Word 41000 is fed into the Priority Resolver and Encoder 24012 via FlgValue 24044. The Priority Resolver and. Encoder 24012 finds the highest priority Tag MCCAM Word 41000 which has its FlgValue 24044 equal to true and asserts this word's 41000 ReadField 24050 signal. This causes the contents of the Tag-fields 39010 to be read 40020 by outputting it on the BusTag 41010 data bus. The Tag is output to the main system processor (or the one which controls reading the geometry database) via the FeedbackData 33020 bus.

Step 3: The main system processor (or the one which controls reading the geometry database) adds 40030 the Tag to the Visible Objects List.

Step 4: In this highest priority Tag MCCAM Word 41000, the signal, ClrFlg 24046, is set to true, thereby clearing the Hit Flag in the Hit Flag Register 23020 in this one word 41000.

Step 5: The Tag being read is on the BusTag 41010 data bus, where it is input to the Tag-field 39010 of every Tag MCCAM Word 41000 for comparison. If, in any Tag MCCAM Word 41000, this comparison discovers the Tag on the BusTag 41010 data bus is equal to the Tag stored in the Tag-field 39010, the signal TagHit 41020 is asserted, which clears 40040 the Hit Flag in such words. Clearing 40040 the Hit Flag in words 41000 where an identical Tag is stored eliminates duplicate Tags from being read.

Step 6: If, after matching Tags cause their Hit Flags to be cleared, a lower priority Tag MCCAM Word 41000 has its FlgValue 24044 equal to true, then the Priority Resolver and Encoder Section 23040 in this lower priority Tag MCCAM Word 41000 asserts the signal, MoreHitsLeft 24048, which indicates further reads are necessary to obtain additional Tags.

Step 7: If 40050 MoreHitsLeft 24048 is true, than additional Tags are read by looping back to Step 2.

FIG. 42 shows a method flow diagram for rendering a sequence of scenes. Here 42000, a loop 42002 is performed until all the scenes in the sequence are done. Before a new scene is generated, there maybe some information which indicates the scene is radically different from the previous one. This is the case 42004 for the very first scene (which requires the generation 42006 of an entirely new scene), and is also the case 42008 when the viewing point radically changes or when an object changes enough to create a substantially different scene.

If the scene has a significant chance of having high temporal correlation with the previous scene, then: 1) the Visible Object List is created 40000; 2) the Frame Buffer 1012 and Z-buffer (any type of Z-buffer) are initialized 42010; 3) objects are rendered 42013 (done by a pixel drawing pipeline method 4000, 8000, 20000, 29000, or 32000 with the addition of Tags) by reading 42012 from the Visible Object List until the list is emptied 42014; and 4) objects are obtained 42018 from the geometry database and rendered 42013 (done by a pixel drawing pipeline method 4000, 8000, 20000, 29000, or 32000 with the addition of Tags), if 42020 not already rendered, until 42022 none are left.

If the scene does not have a significant chance of having high temporal correlation with the previous scene, the Visible Object List is not created processing proceeds as: 1)the Frame Buffer 1012 and Z-buffer are initialized 42016; and 2) objects are obtained 42018 from the geometry database and rendered 42013 (done by a pixel drawing pipeline method 4000, 8000, 20000, 29000, or 32000 with the addition of Tags) until 42022 none are left.

An alternate method of generating a new Visible Object List starts with the previous Visible Object List. An item from the previous Visible Object List is used as a search key for all Tag-fields 39010. If a match is found, this item is added to the new Visible Object List, and all Tag-fields

39010 matching this item have their bit in the Hit Flag Register 23020 turned off. This continues until all the items in the previous Visible Object List have been processed. Then, if any bits in the Hit Flag Register 23020 are still on, the above method for reading and eliminating redundancies is used to add more items to the new Visible Object List. The advantage to this strategy is it preserves the order of items in the previous Visible Object List, which is important if it is costly to sort the Visible Object List so as to make the traversal of the geometry database efficient.

The above discussion assumes Tags are used in conjunction with an MCCAM Z-buffer 11000, 23000, or 39000. However, Tags can be used without an MCCAM Z-buffer 11000, 23000, or 39000 using the methods of FIG. 40 and FIG. 42. Tags would be stored in a conventional CAM which tests for bit-for-bit equivalency. At a minimum, such a CAM needs one word per pixel, where each word has: 1) a Tag-field 39010 for storing the Tag; 2) a Hit Flag Register 23020 for marking which Tags have not been read; and 3) a mechanism for determining if a stored Tag is valid or not.

In addition to helping with hidden surface removal, Tags can also be used to postpone computationally expensive lighting calculations until after all hidden surface removal is done. Once the entire geometry database has been traversed, and each pixel has a Tag which identifies the piece of geometry responsible for the pixel's final color, the lighting calculations can be done.

For a sequence of scenes with high temporal correlation, Tags will accurately predict which geometry should be rendered first. Subsequent geometry will be mostly occulted, and therefore, will be filtered out before pixels need to be generated. As depth complexity of scenes increase, the total number of pixels needed to be generated will not increase dramatically. In fact, ideally, the amount of pixel generation is proportional to the number of pixels in the frame buffer and independent of the depth complexity of the scene or size of the geometry database. While this ideal situation may not actually be reached, the invention disclosed here is a dramatic improvement over prior art rendering systems. In prior art rendering systems, the amount of pixel generation is proportional to the depth complexity of the scene and size of the geometry database. Hence, prior art rendering systems require substantially more computation per scene than the system presented here.

Organizing Pixels into Cells, or Blocks of Cells

As described previously herein, one or more MCCAM Z-buffers 11000, 23000, or 39000 within a rendering system store either the exact or approximate z-value for every pixel in the display screen 100. For rendering systems with millions of pixels, this requires millions of MCCAM Words 12000, 13000, 18000, 24000, or 41000, which maybe very expensive. As an alternative, an additional approximation can be made: to have a many-to-one mapping from pixels to MCCAM Words 12000, 13000, 18000, 24000, or 41000. When this type of approximation is introduced, the group of pixels which correspond to a single MCCAM Word 12000, 13000, 18000, 24000, or 41000 is called a Cell, and the approximate z-value stored in the MCCAM Word 12000, 13000, 18000, 24000, or 41000 is called a Cell z-value.

FIG. 43 shows an example display screen 100 which has been split into 40 Blocks, where each Block is further divided into 10 Cells, each Cell composed of 24 pixels. For this example, the introduction of the Cell-based approximation results in reducing the number of MCCAM Words 12000, 13000, 18000, 24000, or 41000 from 9600 to 400, thereby saving a factor of 24.

Raster Cells are Cells which have pixels within only one raster line. FIG. 44 shows an example display screen 100 which has been split into 50 Blocks, where each Block is further divided into 16 Raster Cells, each Raster Cell composed of 12 pixels. In FIG. 44, one Raster Cell is pointed out 44002. Raster Cells have the advantage of being aligned with raster-based operations such as Raster Writes and Span Interpolation 1008.

FIG. 45 shows one Interleaved Block of Raster Cells, where the example display screen 100 has been split into 16 Interleaved Blocks, where each Interleaved Block is further divided into 50 Raster Cells, each Raster Cell composed of 12 pixels. In FIG. 45, one Raster Cell is pointed out 45002.

Using Cells reduces the number of required MCCAM Words 12000, 13000, 18000, 24000, or 41000, but requires one Cell z-value to represent the z-coordinates of all the pixels within the same Cell. Hence, an approximation is required. The approximation must be conservative, which means the Cell z-value must be not less than the largest true z-coordinate of any of the pixels within the corresponding Cell. In Pixel Drawing Subsystems 14002, 33002, 34002, or 38002 appropriate for use with Cells, the Cell z-values are stored into the MCCAM Z-buffer 11000, 23000, or 39000, and the exact z-coordinates for every pixel are stored in the conventional Z-buffer 2008.

When a piece of geometry is undergoing an Occulting Test 9000, 22000, 27000, or 30000, Cell coordinates are used for x-values and y-values, rather than pixel screen coordinates. In this "Cell domain", all the Occulting Tests 9000, 22000, 27000, or 30000 function correctly, as if the display screen 100 has pixels the size of Cells.

When a piece of geometry fails the Occulting Test 9000, 22000, 27000, or 30000 (and therefore cannot be discarded), values in the conventional Z-buffer 2008 are updated, and new Cell z-values are generated for Cells which were affected. New Cell z-values must take into consideration the old value in the conventional Z-buffer 2008 because the largest z-value within the Cell may come from either the new piece of geometry or previously rasterized geometry.

When a Span FIFO 33003 is included, spans are written into the MCCAM Z-buffer 11000, 23000, or 39000 in Cell coordinates, while spans are written into the Span FIFO 33003 in pixel (or screen) coordinates. This is necessary because the exact pixel location of the end points of a Span are lost when Cell coordinates are used.

In general, the use of Cells requires a decimation of the two-dimensional display screen 100 data. That is, Cells introduce an undersampling (a coarser sampling) of the two-dimensional display screen 100 data. For z-values, this means a conservative error must be introduced into the data stored in the MCCAM Z-buffer 11000, 23000, or 39000.

Using Tags and Cells

When Cells are used, only one MCCAM Word 12000, 13000, 18000, 24000, or 41000 is used per Cell. If Tags are stored within Tag MCCAM Words 41000, then only one Tag can be used to represent all the pixels in the Cell. Since pixels within the same Cell could have been from different pieces of geometry (each with its own Tag), some Tag information could be lost. This is not a big problem since the vast majority of pieces of geometry generate pixels in multiple Cells, thus providing many opportunities for their Tags to keep from being lost.

As a Cell z-value is written into an MCCAM Word 12000, 13000, 18000, 24000, or 41000, a decision must be made on which Tag to write. Many such decision mechanisms are possible: 1) choose the same pixel location within every Cell and use that pixel's Tag as the Cell's Tag; 2) choose a pseudorandom pixel location within each Cell, this pattern may repeat by Block, as seen in FIG. 46; 3) keep a Tag for every pixel in conventional RAM (addressed along with the conventional Z-buffer 2008), and when a Cell z-value is written, randomly choose one Tag from the Tags for all the pixels within the Cell; 4) keep a Tag for every pixel in conventional RAM, and when a z-value is written, keep the Tag which is attached to the most (or, alternatively, the least) pixels within the Cell; and 5) keep a Tag for every pixel in conventional RAM, and when a Cell z-value is written, randomly choose one Tag from all the Tags for pixels within the Cell, where the probability is inversely proportional to the number of times the Tag appears in the Cell.

Rather than storing Tags in the MCCAM Z-buffer 11000, 23000, or 39000, Tags could be stored in a separate CAM written in parallel with the conventional Z-buffer 2008. This means there could be one Tag per pixel even though Cells are used.

The Preferred Embodiment

Many choices for the method and apparatus have been described in this document. While it is not possible to describe the best choices for all systems, the preferred embodiment described in this section is selected to be reasonably compatible with portions of existing high performance state-of-the-art real time rendering systems.

Most rendering systems take polygons as their primary input. This makes the Vertex Bounding Box Occulting Test 22000 superior to the Bounding Box Occulting Test 9000. The VBBOT 22000 is preferable also because individual bounding boxes need not be independently generated for every polygon; they are automatically generated within the Vertex MCCAM Z-buffer 23000.

The Raster Write Span Occulting Test 30000 is included in the preferred embodiment because it includes parallel hardware for writing a z-value into multiple MCCAM Words 12000, 13000, 18000, 24000, or 41000. Thus, the RWSOT 30000 requires an X-field 11004 which allows multiple MCCAM Words 12000, 13000, 18000, 24000, or 41000 to be written simultaneously. Because both the VBBOT 22000 and the RWSOT 30000 are included in the preferred embodiment, the Dual Occulting Pipeline 31000 and the Dual Occulting Test Pixel Drawing Pipeline method 32000 are included in the preferred embodiment.

Blocks are included in the preferred embodiment because they provide a divide-and-conquer approach to the problem by splitting it up. Interleaved Blocks are best because they provide a mechanism for computation associated with a piece of geometry to be evenly spread over Block Span FIFO Pixel Drawing Subsystems 38002.

Reading Hits are not included in the preferred embodiment because they (in general) reduce the throughput of the MCCAM Z-buffer 11000, 23000, or 39000 by using a significant fraction of the total clock cycles. If any type of Hit reading is done, the best type would be Raster Hit reading because it can be done in parallel with Occulting Tests 9000, 22000, 27000, or 30000. However, this is only valuable if, on the average, a very significant fraction of spans within polygons which fail the VBBOT 22000 are occulted. If no Hit reading is done, then Hit Flag Registers 23020 are not needed (unless Tags are stored in the MCCAM Z-buffer 11000, 23000, or 39000).

The Span FIFO 33003 is included in the preferred embodiment because it helps balance the span interpolation 1008 load over the time it takes to render a scene. Depending on complexity and cost, multiple Span Interpolation Processors 33006 would probably be included. Since Blocks are included in the preferred embodiment, the Block Span FIFO Pixel Drawing Subsystem 38002 is the preferred pixel drawing subsystem.

Cells are not included in the preferred embodiment because they require data to be read from a conventional Z-buffer 2008 in order to generate an approximation the Cell z-value. However, if Cells are used, then Raster Cells would be the best choice. Because all the pixels in a Cell must be processed as a unit, a block-transfer memory system would perform best. The block-transfer memory would be read to obtain all the information concerning a Cell (i.e., colors, z-values, Tags, etc.), the information would be updated, and then written back to the block-transfer memory. Such block-transfer memory is commercially available through Rambus Inc., located in Mountain View, Calif.

Tags alter the way the hierarchical data structure is traversed, so Tags do not easily fit into existing rendering systems. Hence, when the method and apparatus of this document are incorporated into an existing rendering system, the preferred embodiment does not include the use of Tags, and therefore uses the Vertex MCCAM Z-buffer 23000. However, for new rendering systems, Tags (and therefore the Tag MCCAM Z-buffer 39000) are included in the preferred embodiment because they increase performance by reducing the number of polygons which need to be rasterized.

In summary, the preferred embodiment consists of: 1) the Dual Occulting Test 3D Graphics Pipeline 31000, as shown in FIG. 31; 2) a multiplicity of Block Span HFO Pixel Drawing Subsystems 38002, as shown in FIG. 38, each probably including multiple Span FIFOs 33003 and Span Interpolate Processors 33006 (as shown in FIG. 34); 3) Interleaved Blocks, as shown in FIG. 36; 4) the DOT Pixel Drawing Pipeline method 32000, as shown in FIG. 32, including the VBBOT 22000 and RWSOT 30000, as shown in FIG. 22 and FIG. 30; 5) the Vertex MCCAM Z-buffer 23000, as shown in FIG. 22, except with the deletion of the Hit Flag Registers 23020 and the Priority Resolver and Encoder 23040; and 6) the Vertex MCCAM Word 18000, as shown in FIG. 18.

If Tags are included, then items 5 and 6 in the preceding paragraph are replaced by the following: 5) the Tag MCCAM Z-buffer 39000, as shown in FIG. 39, except only one of the Hit Flag Registers 23020 is needed (used for reading non-redundant Tags); and 6) the Tag MCCAM Word 41000, as shown in FIG. 41, except only one bit is needed within the Hit Flag Register Bits 24010. Also, the inclusion of Tags implies use of the method of FIG. 22 for rendering a sequence of scenes.

Another good choice for an embodiment would be to eliminate any approximations for the values stored in the MCCAM Z-buffer 11000, 23000, or 39000. This eliminates the conventional Z-buffer 2008, which is included in the above described preferred embodiment. Such a rendering system could include either or both the VBBOT 22000 and SOT 27000. However, it could not include Raster Write operations because this introduces approximations in z-values. This means individual z-values must be written into the MCCAM Z-buffer 11000, 23000, or 39000, thus reducing rendering throughput. Such an implementation would include: 1) the Dual Occulting Test 3D Graphics Pipeline 31000, as shown in FIG. 31; 2) a multiplicity of Block Pixel Drawing Subsystems 37002, as shown in FIG. 37, each probably including multiple Rasterize Processors 6010; 3) Interleaved Blocks, as shown in FIG. 36; 4) the DOT Pixel Drawing Pipeline method 32000, as shown in FIG. 32, including the VBBOT 22000 and replacing the RWSOT 30000 with the SOT 27000; 5) the Vertex MCCAM Z-buffer 23000, as shown in FIG. 22; and 6) the Vertex MCCAM Word 18000, as shown in FIG. 18.

Hardware Implementation

The MCCAM Z-buffer 11000, 23000, or 39000 is very well suited to implementation in Very Large Scale Integration (VLSI) circuits, with CMOS being the current best choice. For layout of a VLSI circuit, the transistor circuits within MCCAM Words 12000, 13000, 18000, 24000, or 41000 must physically tile together to form a compact, regular pattern; much like that of typical RAM VLSI circuits. The memory circuits presented here make use of prior art support circuits such as differential sense amps and six transistor static RAM Circuits.

The Duluk Patent includes the Duluk Patent MCCAM Bit Circuit 47000 (FIG. 4 in the Duluk Patent), reproduced here as FIG. 47. The Duluk Patent MCCAM Bit Circuit 47000 includes a typical Six Transistor RAM Subcircuit 47020, which stores one bit of information. The signal, CamWord 47010, selects one word of memory for writing or reading, and data is input or output on the differential signals ZBitH 47002 and ZBitL 47004. The signal, PrechargeL 47006, precharges the domino logic chain which performs the magnitude comparison. The domino logic chain propagates within each word from bit circuit 47000 to bit circuit 47000 via the EnableIn 47014 and EnableOut 47016 signals, successively enabling bit positions until a bit circuit 47000 with an asserted NotEqual 47016 is encountered. The signal, QueryTrue 47012, is precharged high, and is pulled down if the word fails the query operation. The signal, ComparisonOp 47008, is driven high or low as a function of the input bit value and type of query operation, as described in the Duluk Patent.

The Duluk Patent MCCAM Bit Circuit 47000 could possibly be utilized in the Basic MCCAM Word 12000, but probably would not be appropriate in any MCCAM Word 13000, 18000, 24000, or 41000 which performs a Raster Write operation. This is because asserting a large number of CamWord 47010 signals would result in a very slow (or possibly nonfunctional) write operation. The Duluk Patent MCCAM Bit Circuit 47000 can perform many different query operations, but only "less-than" is needed in the MCCAM Z-buffer 11000, 23000, or 39000. Thus, some simplification can be utilized here.

FIG. 48 shows MCCAM Bit Circuit A 48000, which can perform Raster Write operations, but cannot perform a read operation. Thus, this circuit 48000 is appropriate for the Vertex MCCAM Word 18000. It can also be used in the Tag MCCAM Word 41000 if the Hit Flag Register Bits 24010 and Priority Resolver and Encoder Section 24012 are not included for selecting Hits for reading. In order to accomplish a write operation to multiple words, this circuit 48000 uses an Eight Transistor Storage Subcircuit 48002. When WordWrEn 12004 is asserted, one of the two storage nodes 48004, 48006 is pulled down, and the other is pulled up. This requires the pullup in both inverters 48008, 48010 to be weaker than the series pulldown transistors.

MCCAM Bit Circuit A 48000 includes a Compare Enable Subcircuit 48020 which does not require a precharge signal, thereby reducing the circuit 48000 size. The circuit 48000 also includes a Three Transistor Query Resolution Subcircuit 48030 which pulls down the signal, ZStdGtIncL 48032, if EnableIn 47014 is asserted, the bit circuit 48000 is storing a "one", and the incoming bit for comparison is a "zero".

FIG. 49 shows MCCAM Bit Circuit B 49000, which, like MCCAM Bit Circuit A 48000, can perform Raster Write operations, but cannot perform a read operation. This bit circuit 49000 performs the same operations as MCCAM Bit Circuit A 48000, but has fewer transistors. One transistor is eliminated by using the Seven Transistor Storage Subcircuit 49000, but this may actually result in a larger bit circuit due to the addition of diffusion contacts and/or wiring. Another transistor is eliminated by using the Two Transistor Query Resolution Subcircuit 49030, but this change maybe undesirable due to substantially more loading on the ZBitL 47004 signal. To illustrate an alternative to the Compare Enable Subcircuit 48020, this bit circuit 49000 includes the Precharged Compare Enable Subcircuit 49000, which was also used in the Duluk Patent MCCAM Bit Circuit 47000.

Figure 1:
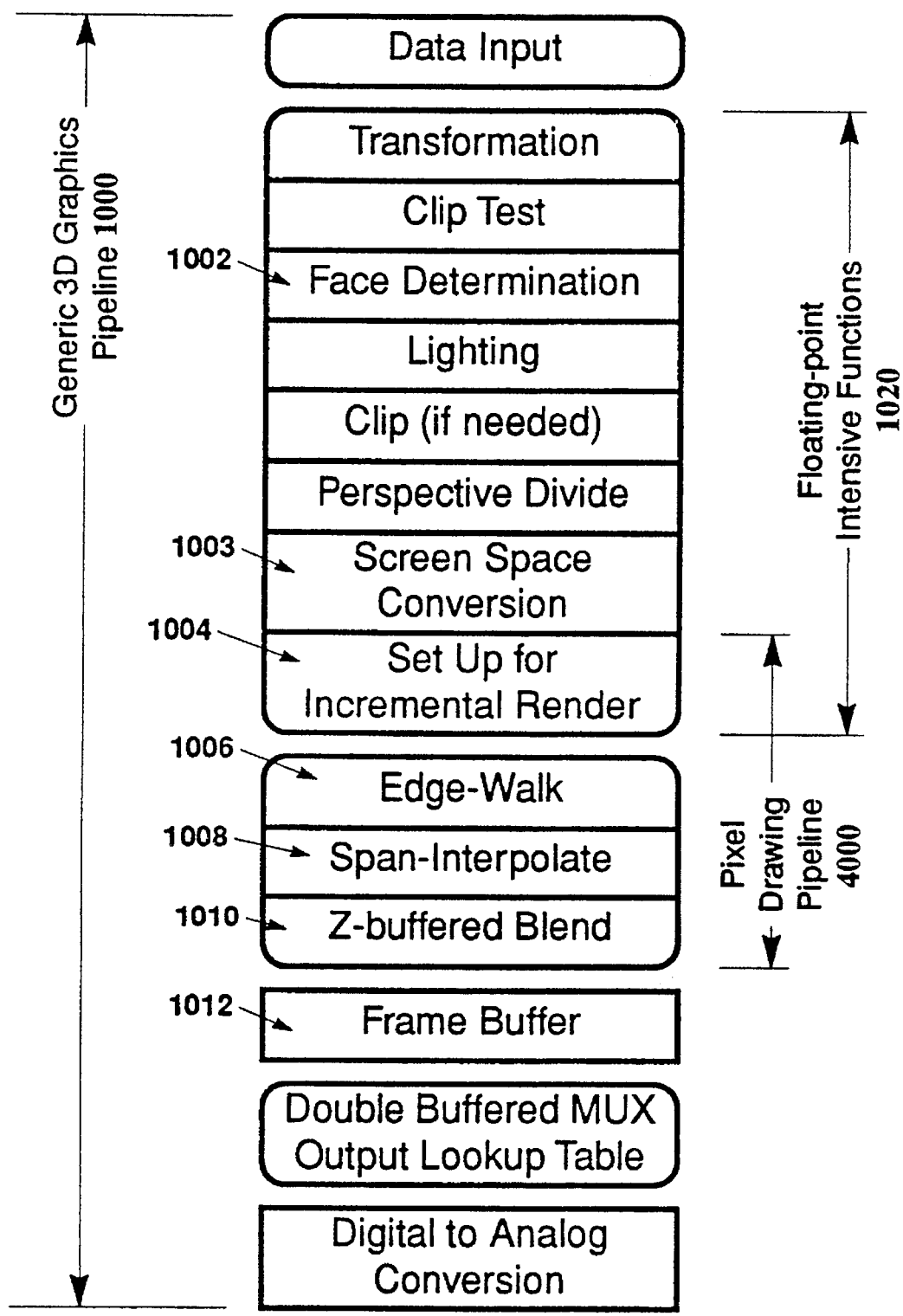
Figure 2:
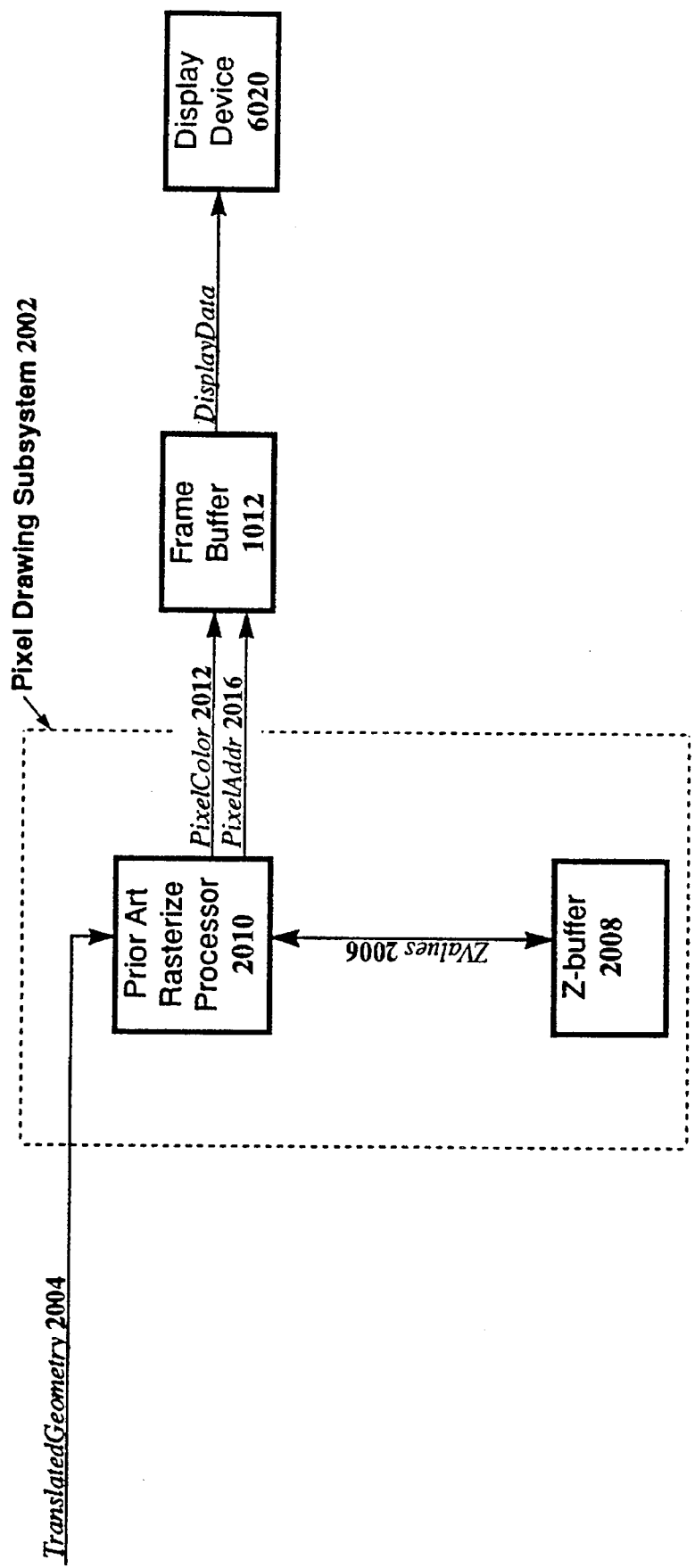
Figure 3:
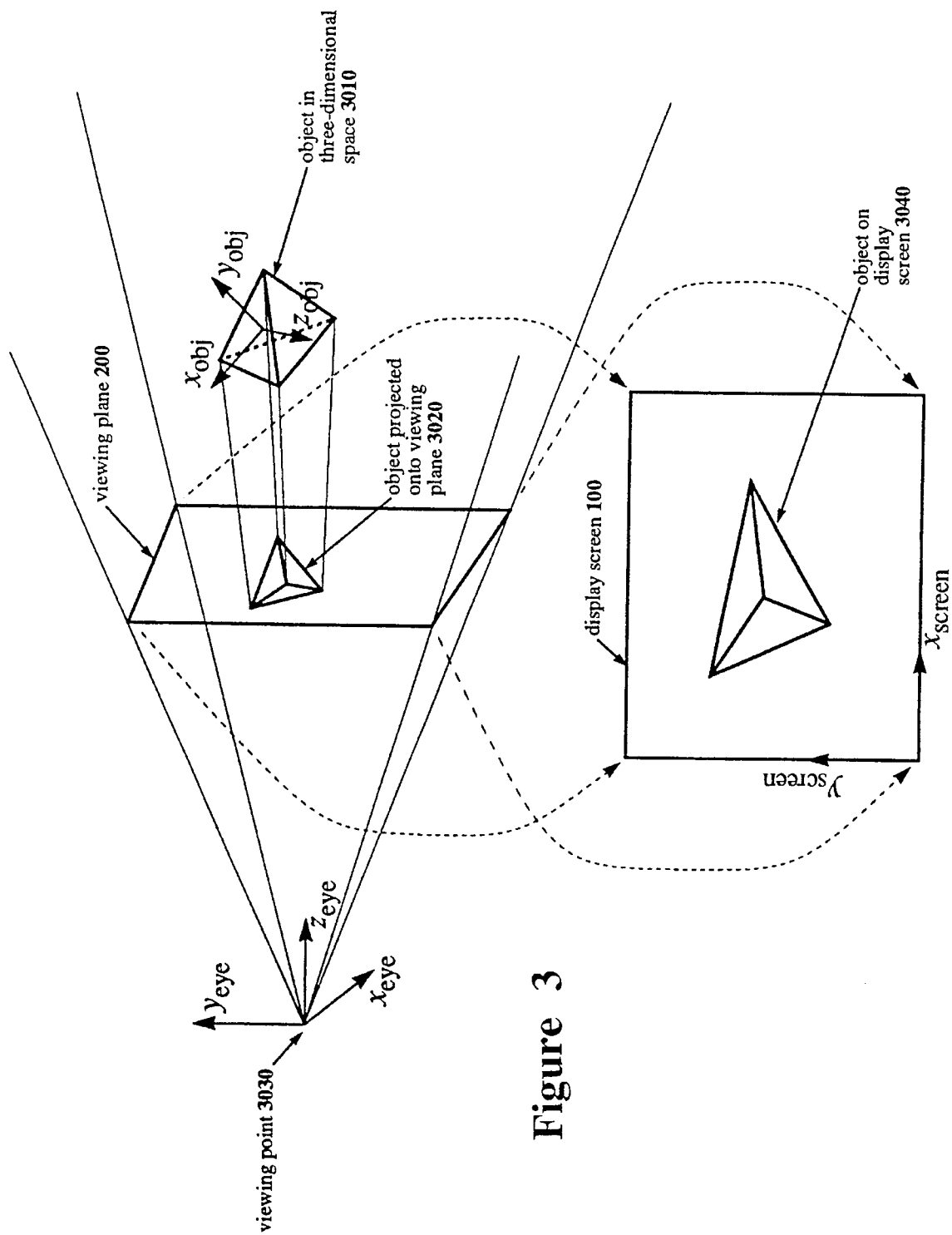
Figure 4:
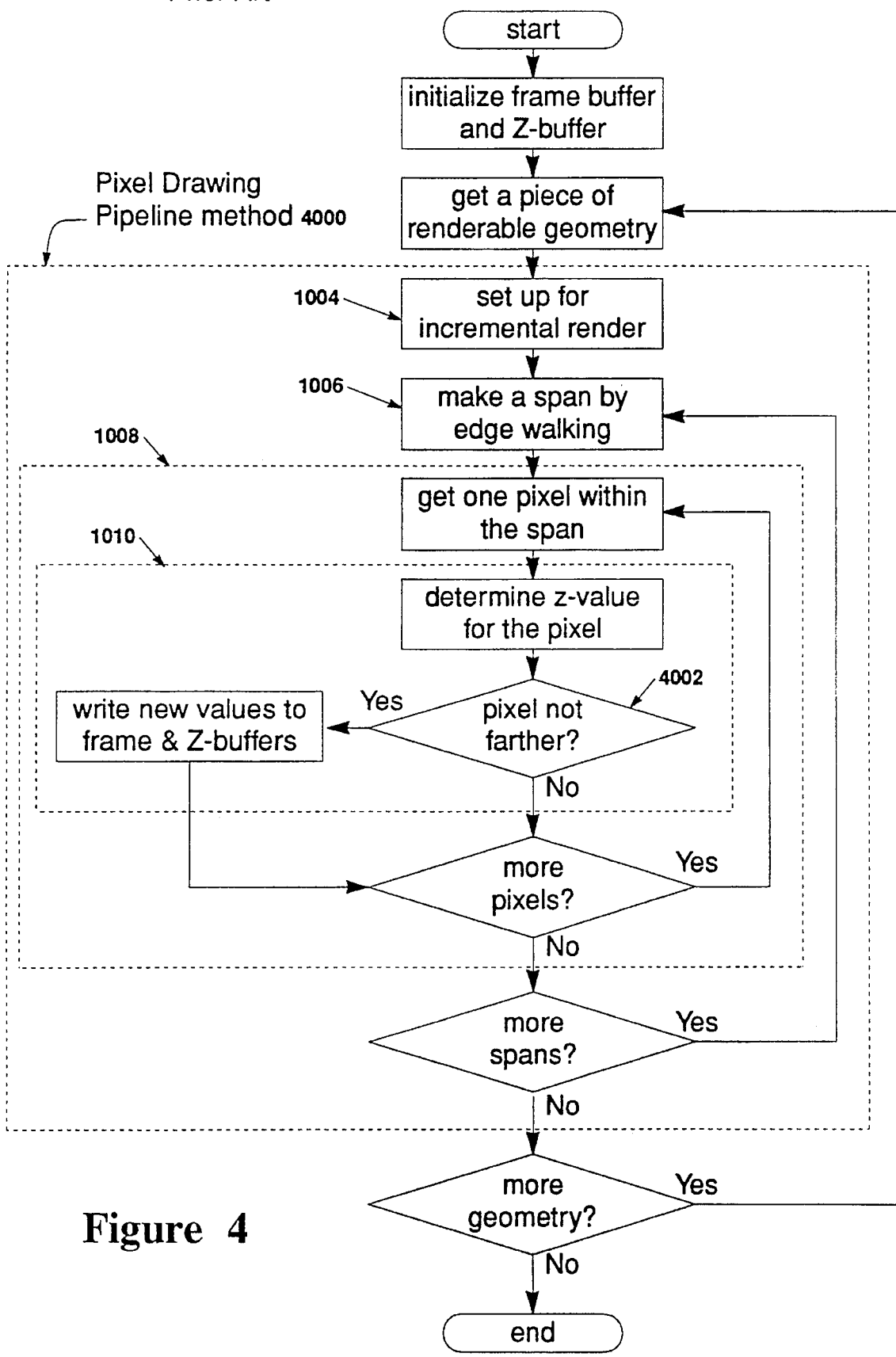
Figure 5:
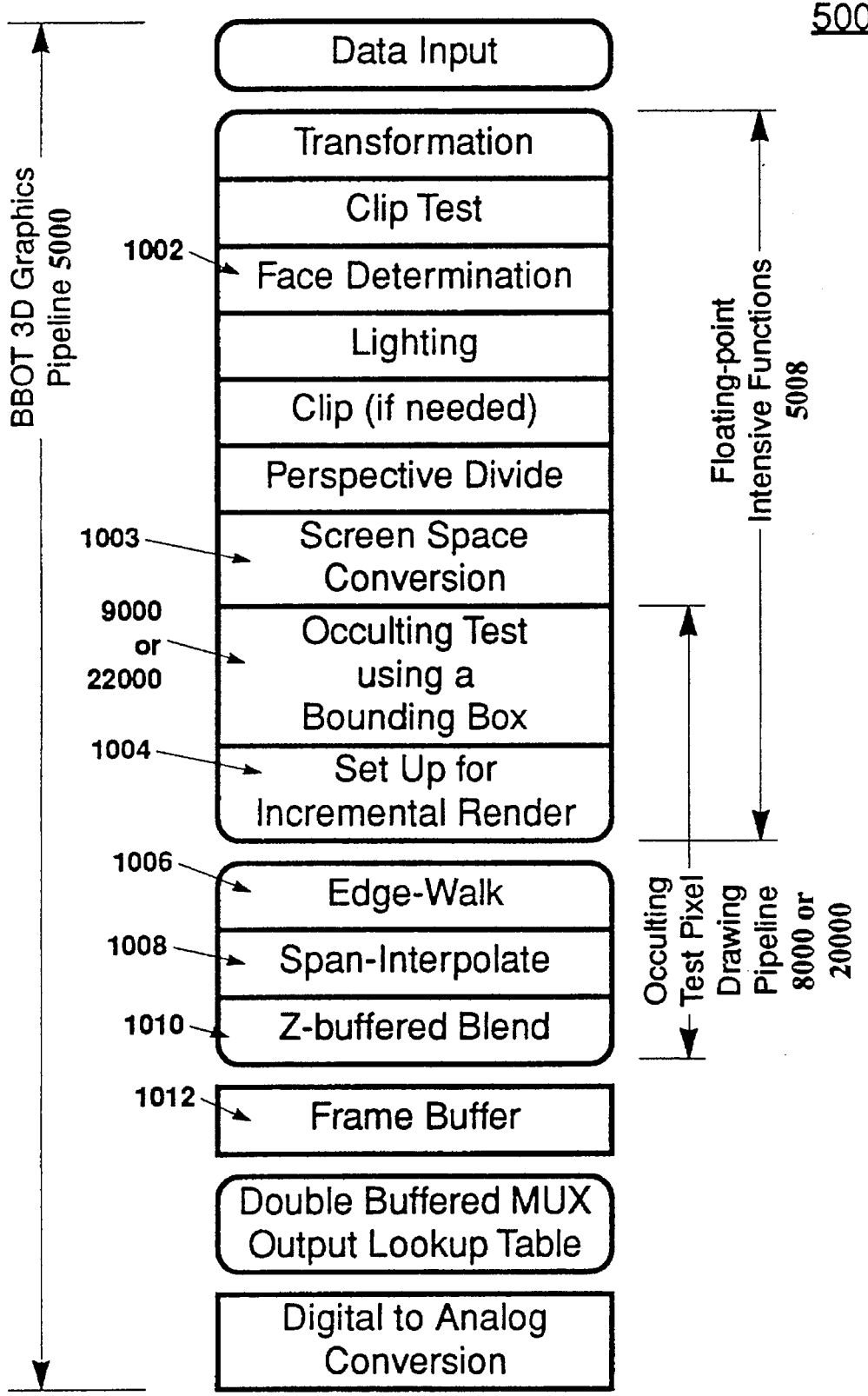
Figure 6:
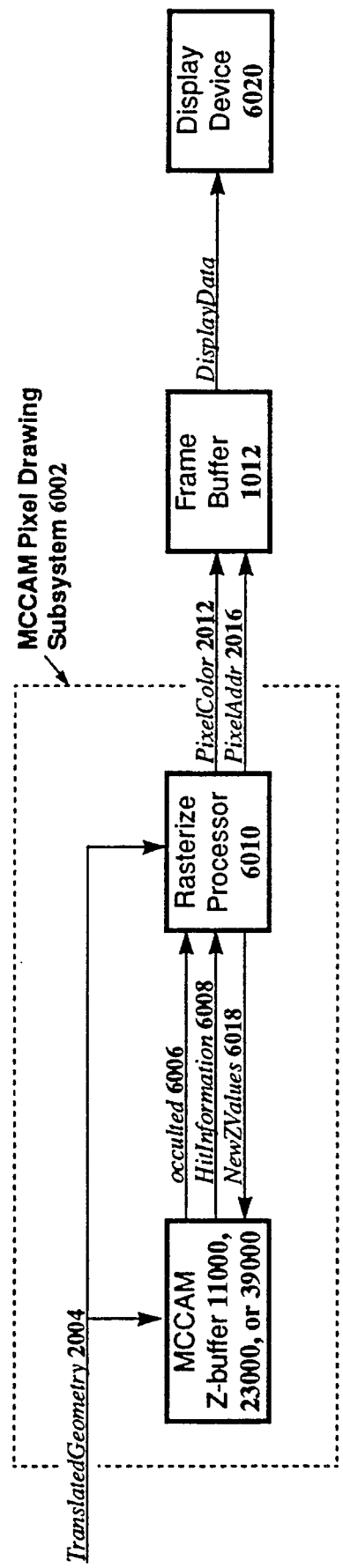
Figure 7:
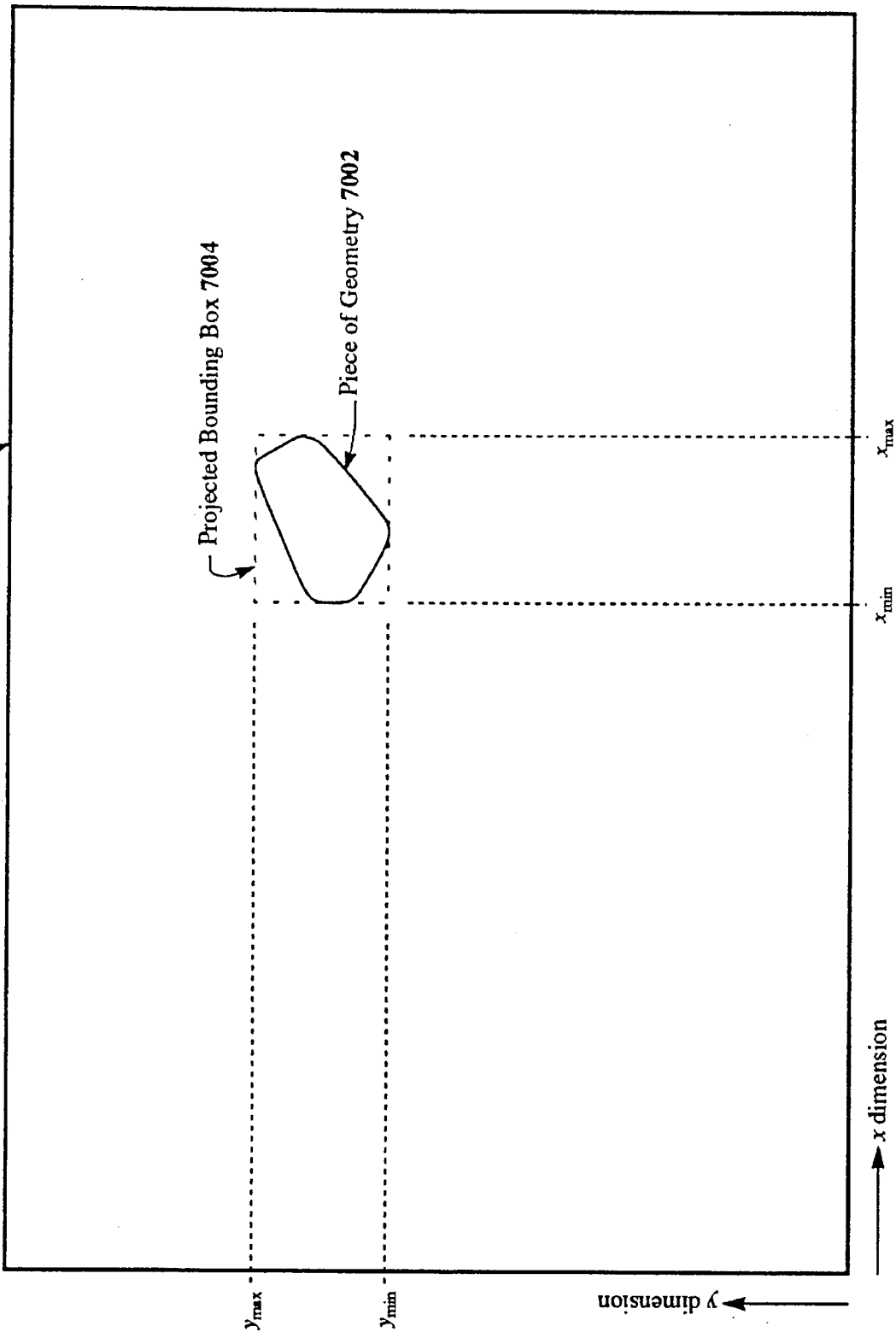
Figure 8:
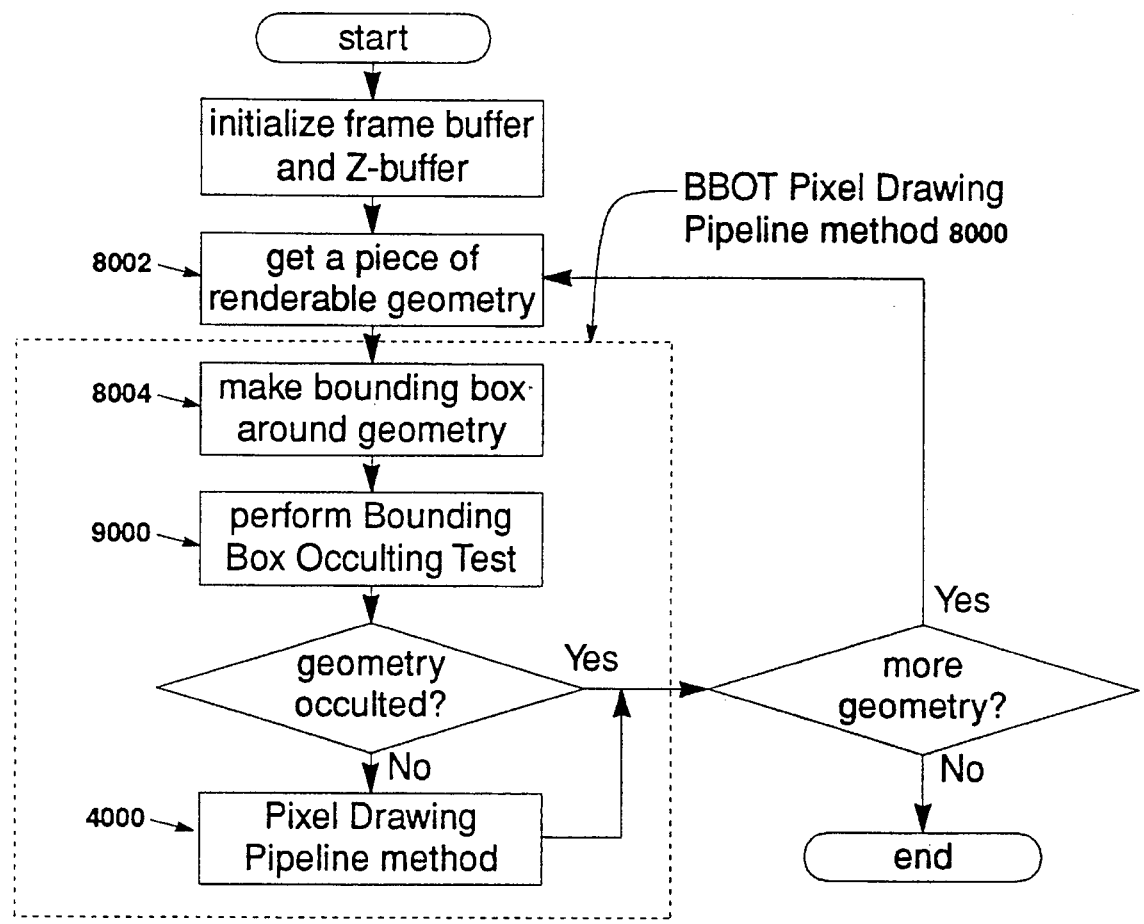
Figure 9:
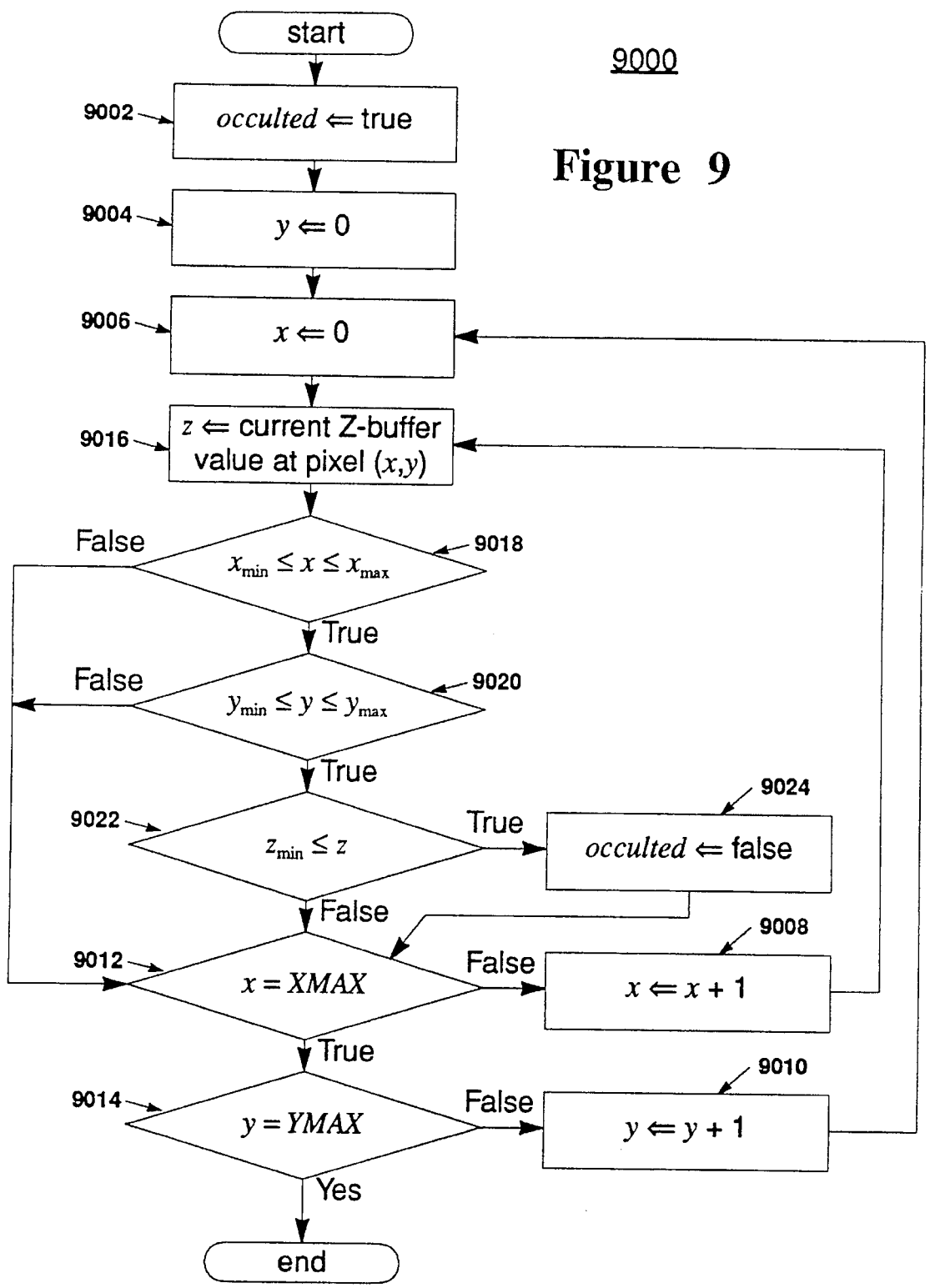
Figure 10:
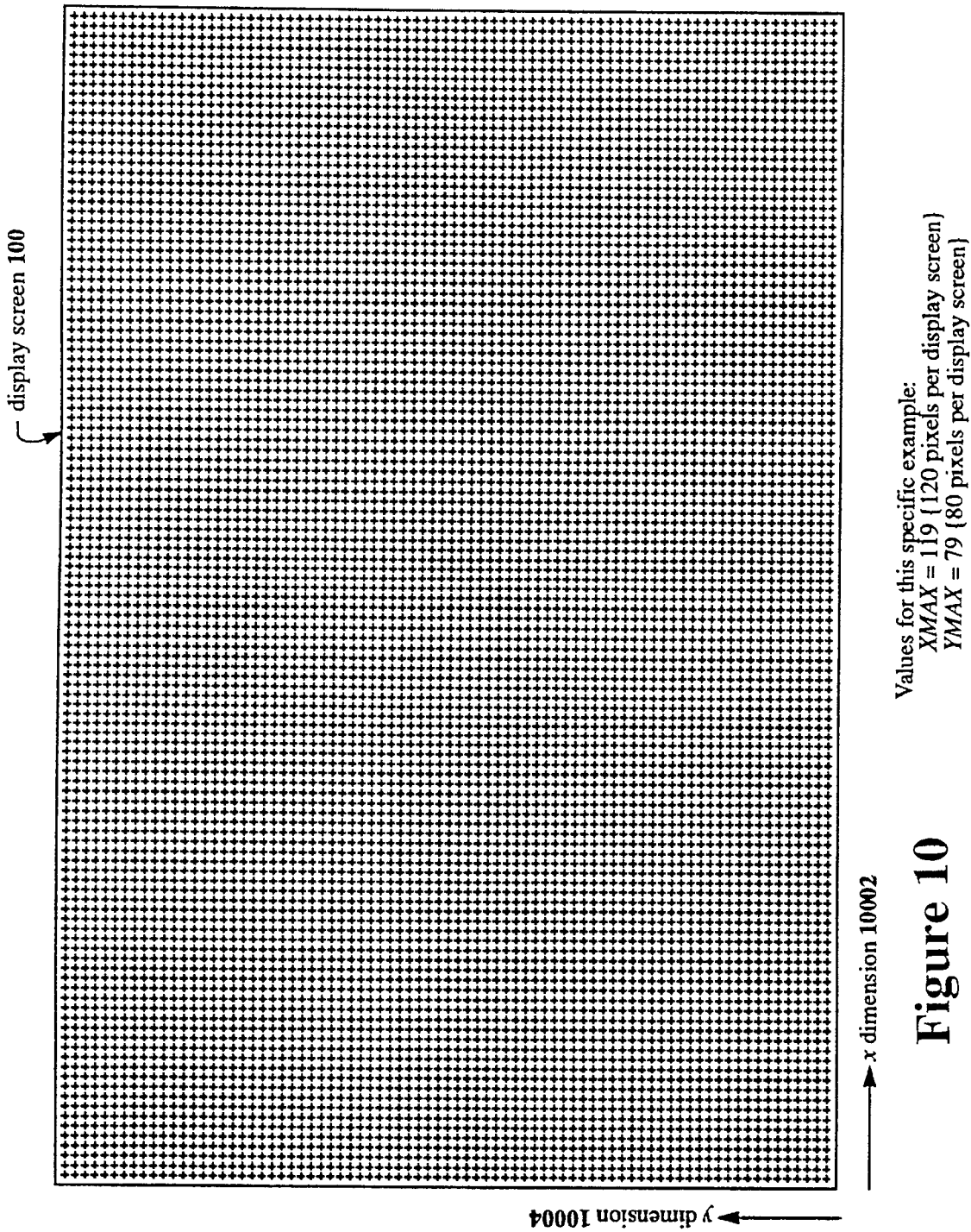
Figure 12:
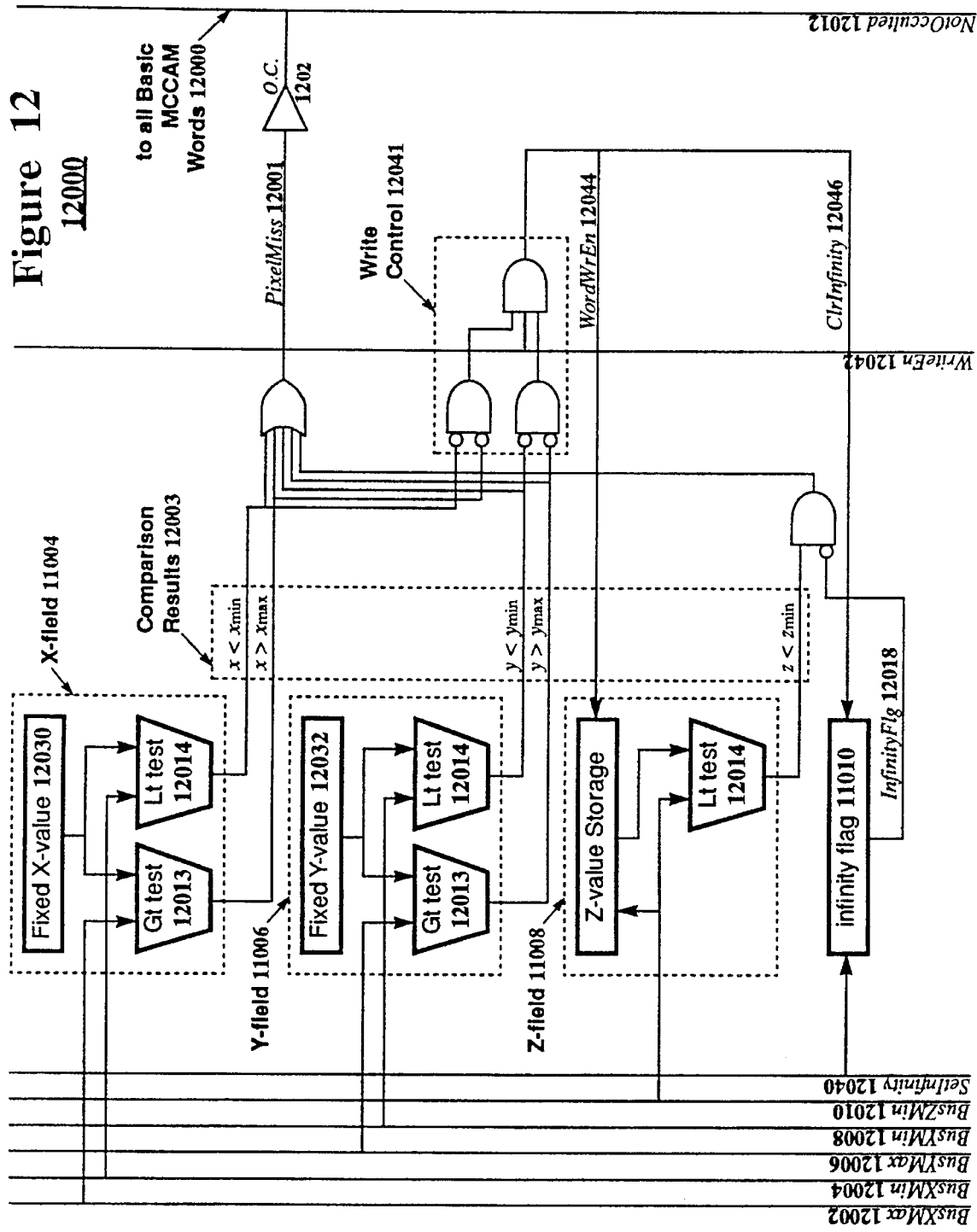
Figure 13:
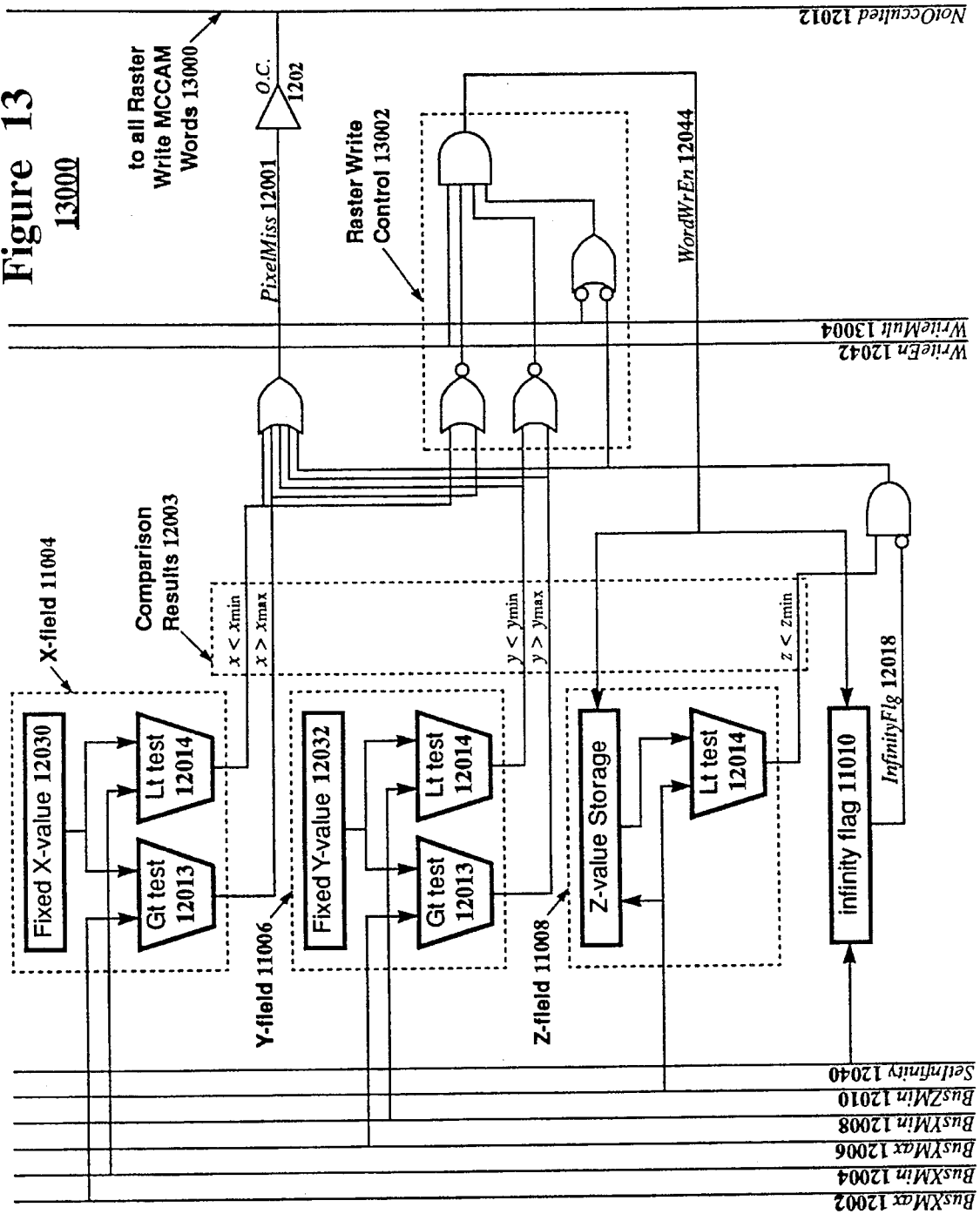
Figure 14:
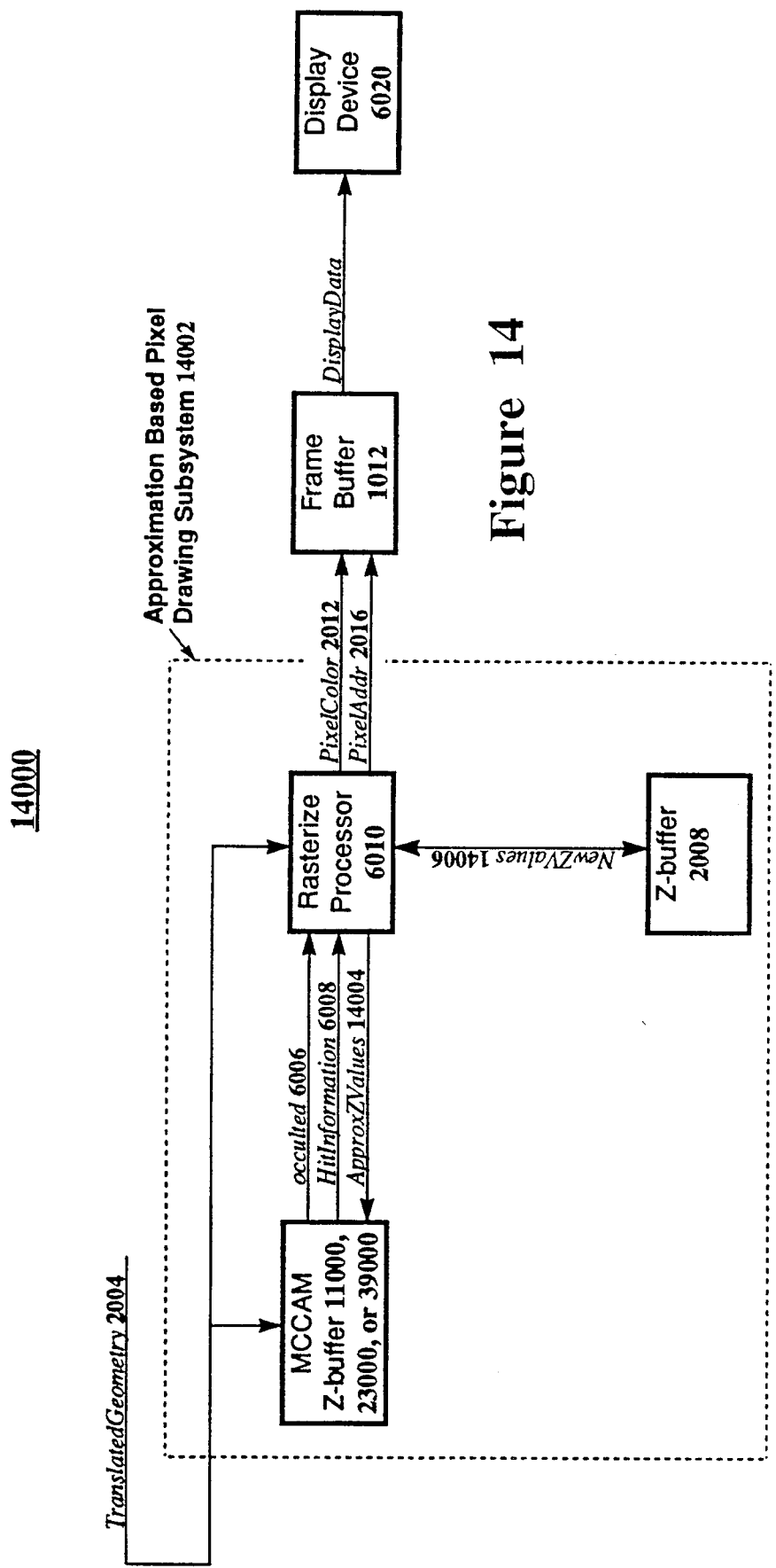
Figure 15:
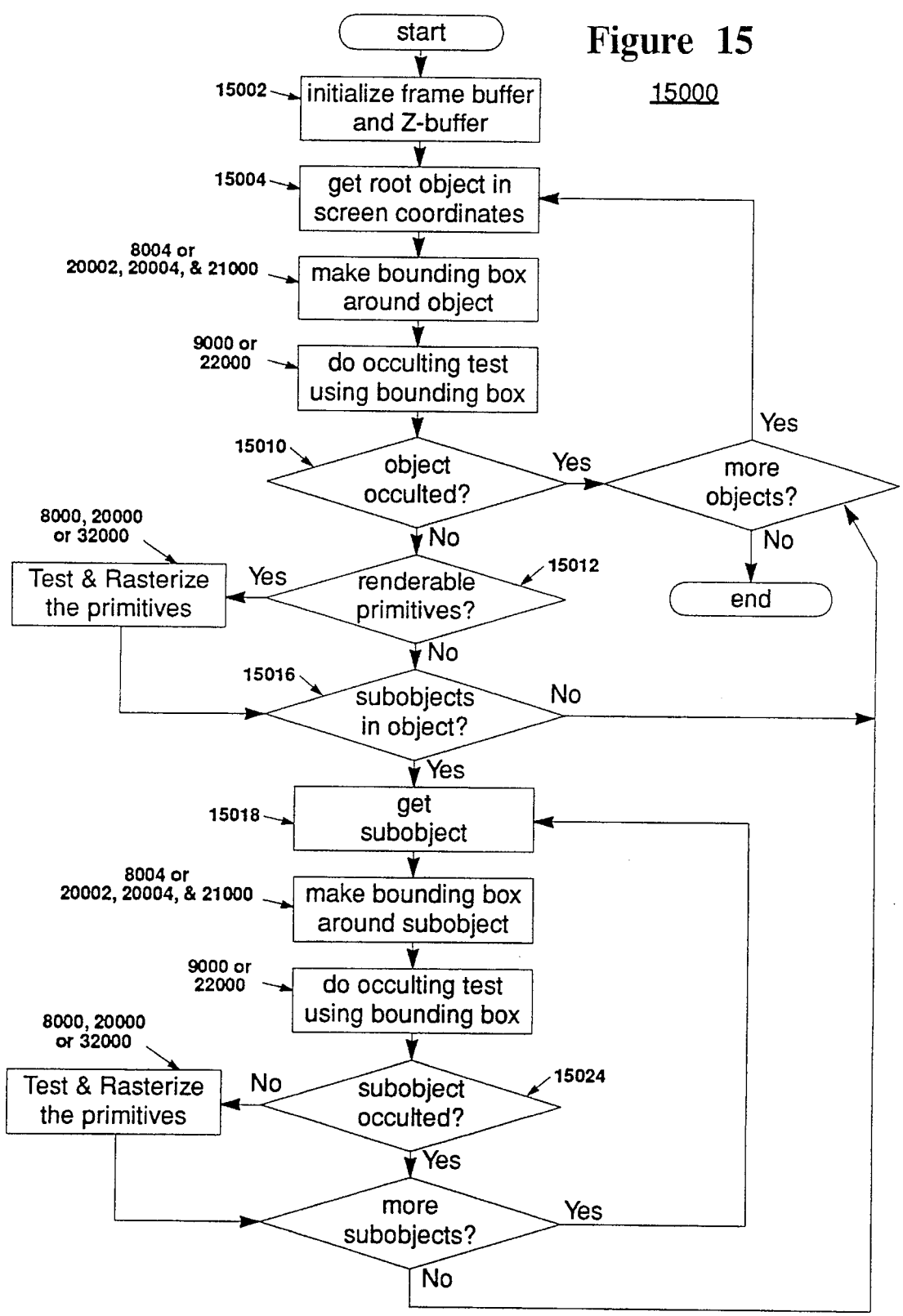
Figure 16:
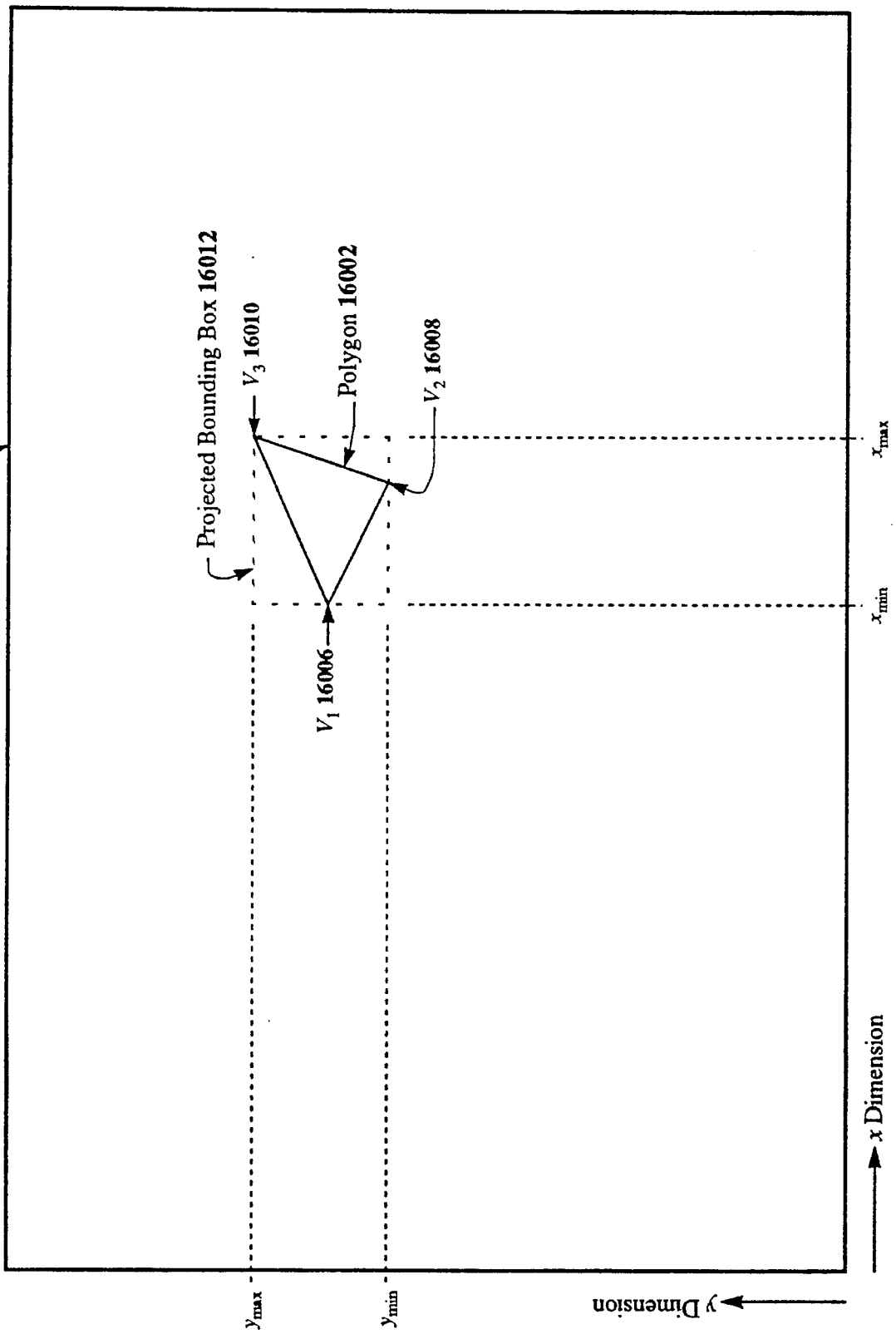
Figure 17:
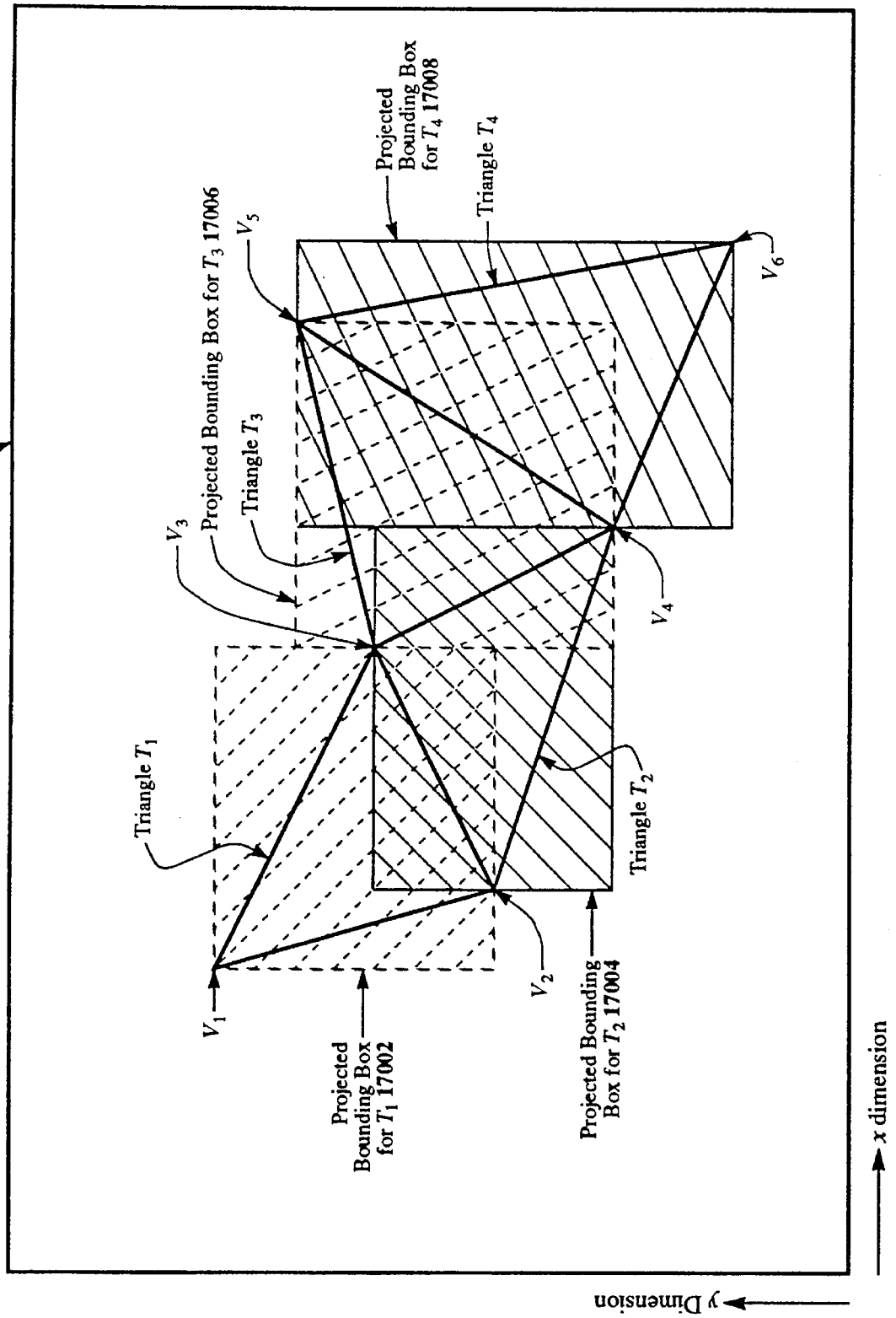
Figure 18:
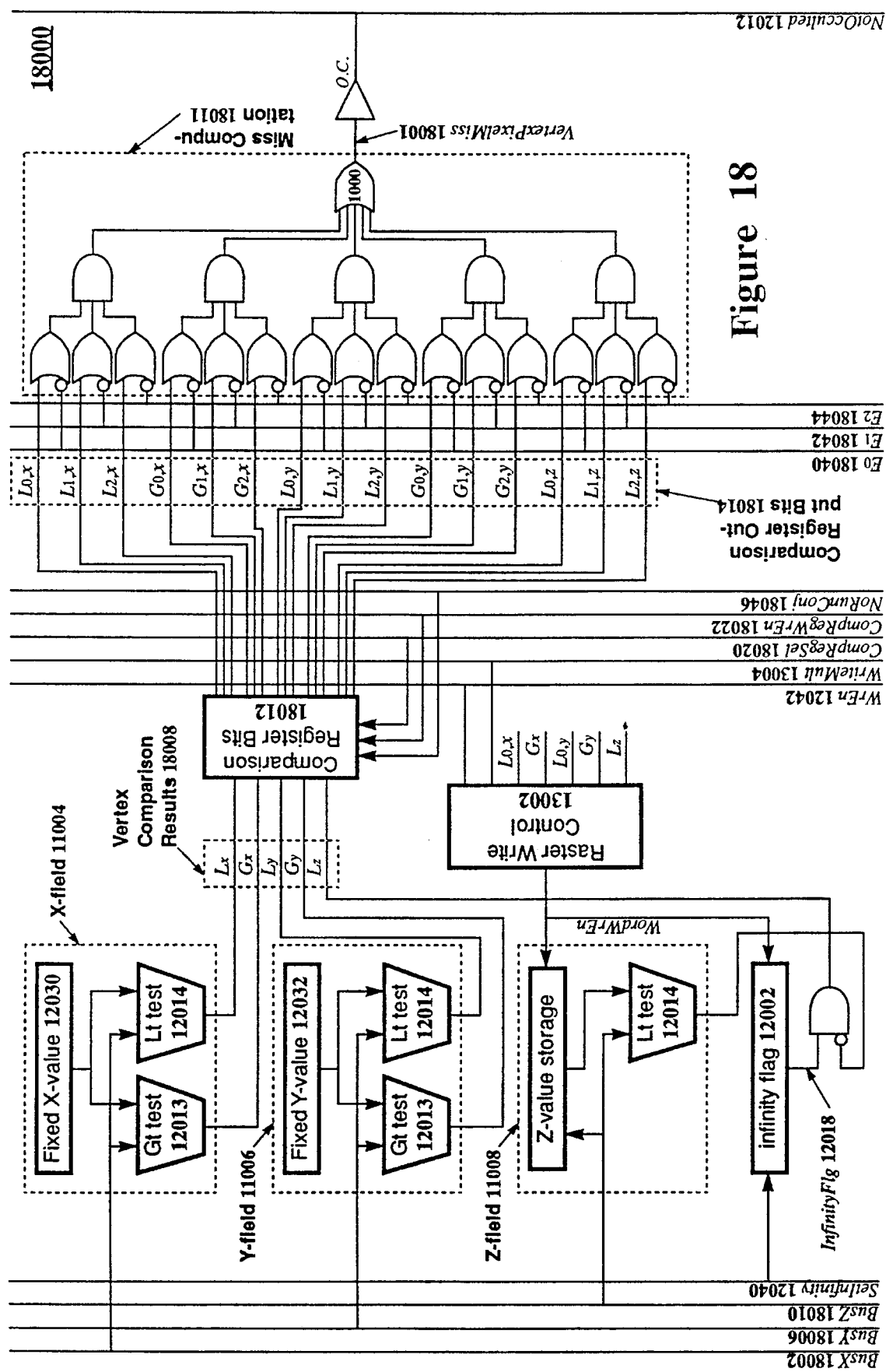
Figure 20:
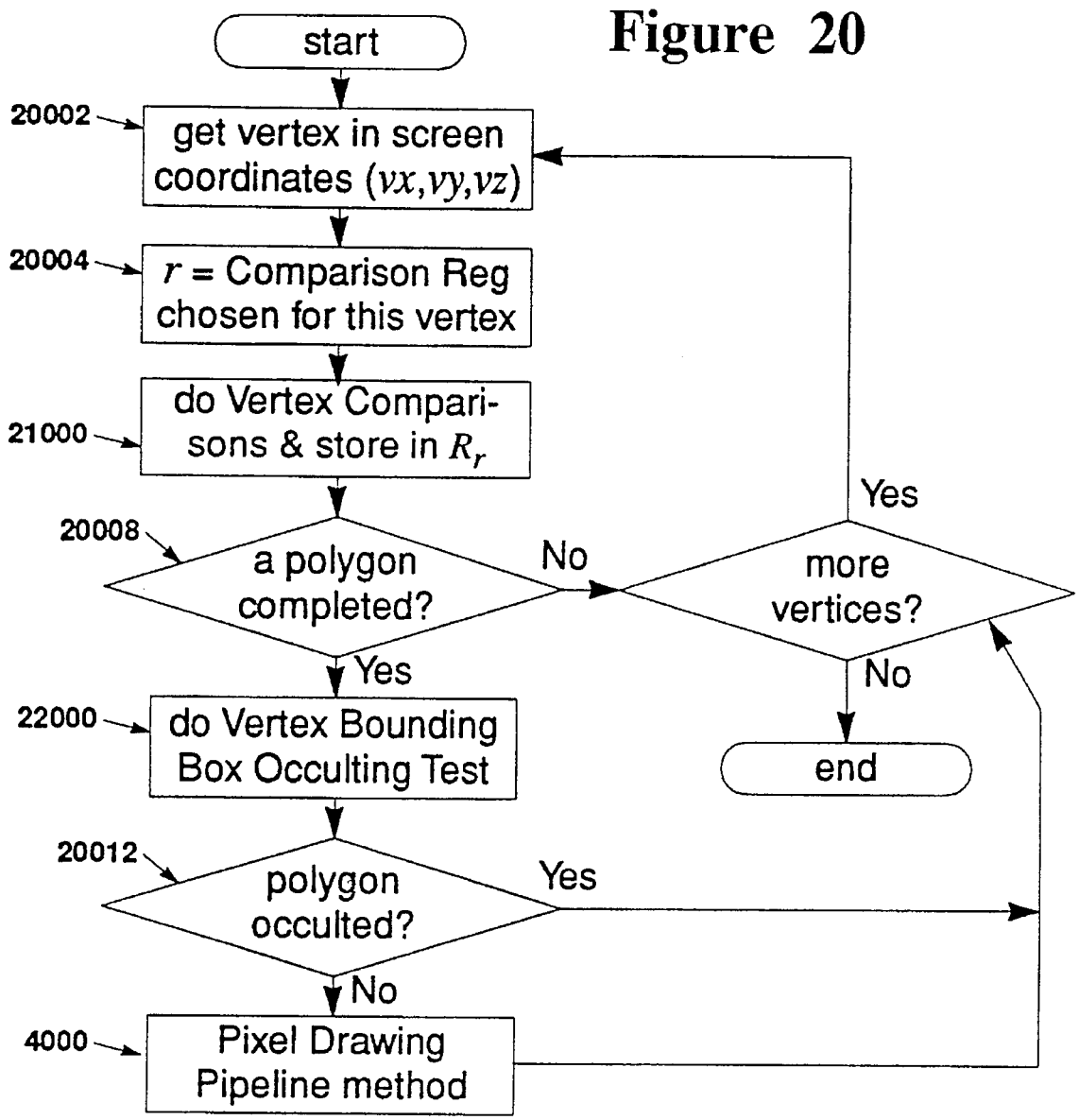
Figure 21:
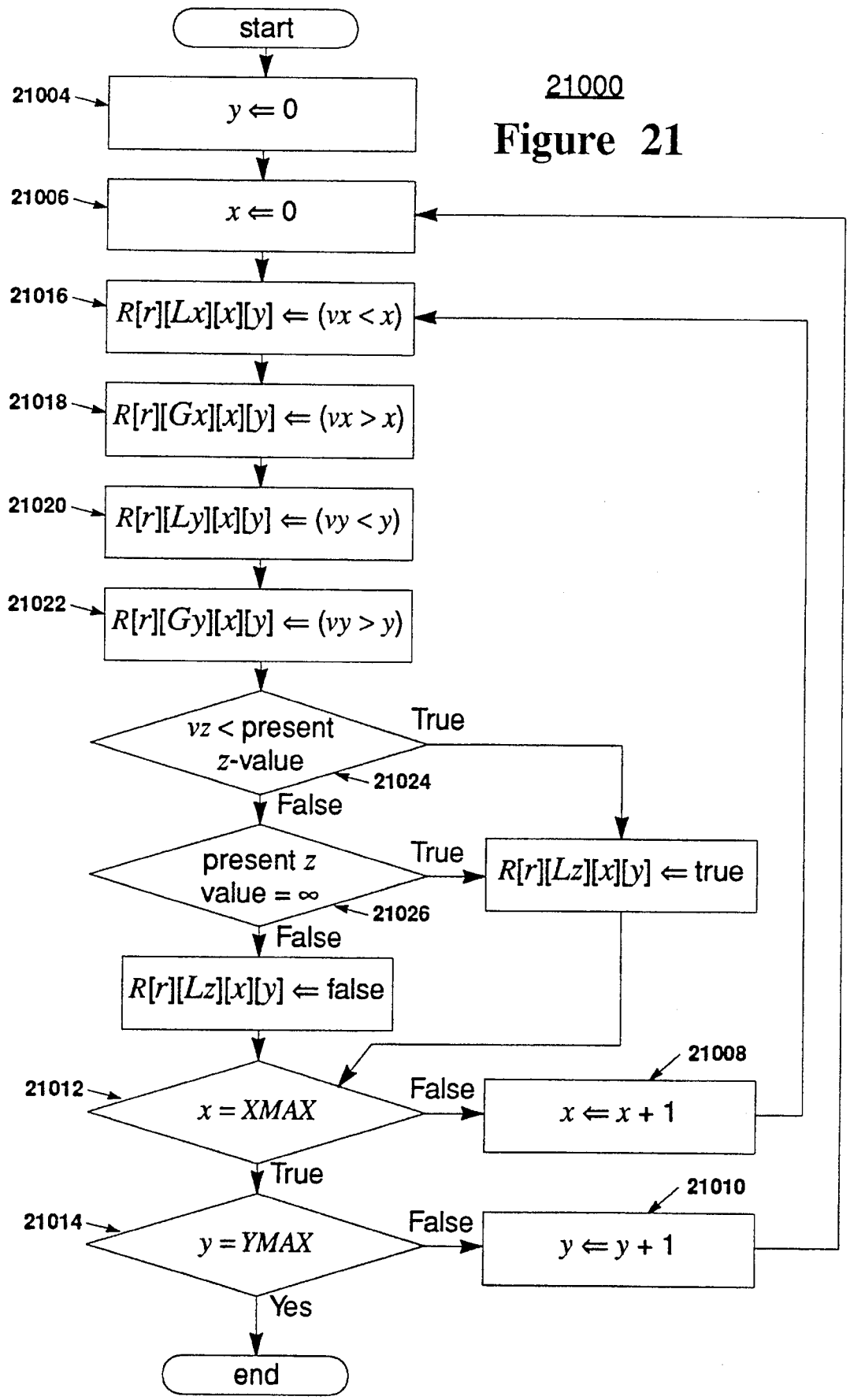
Figure 22:
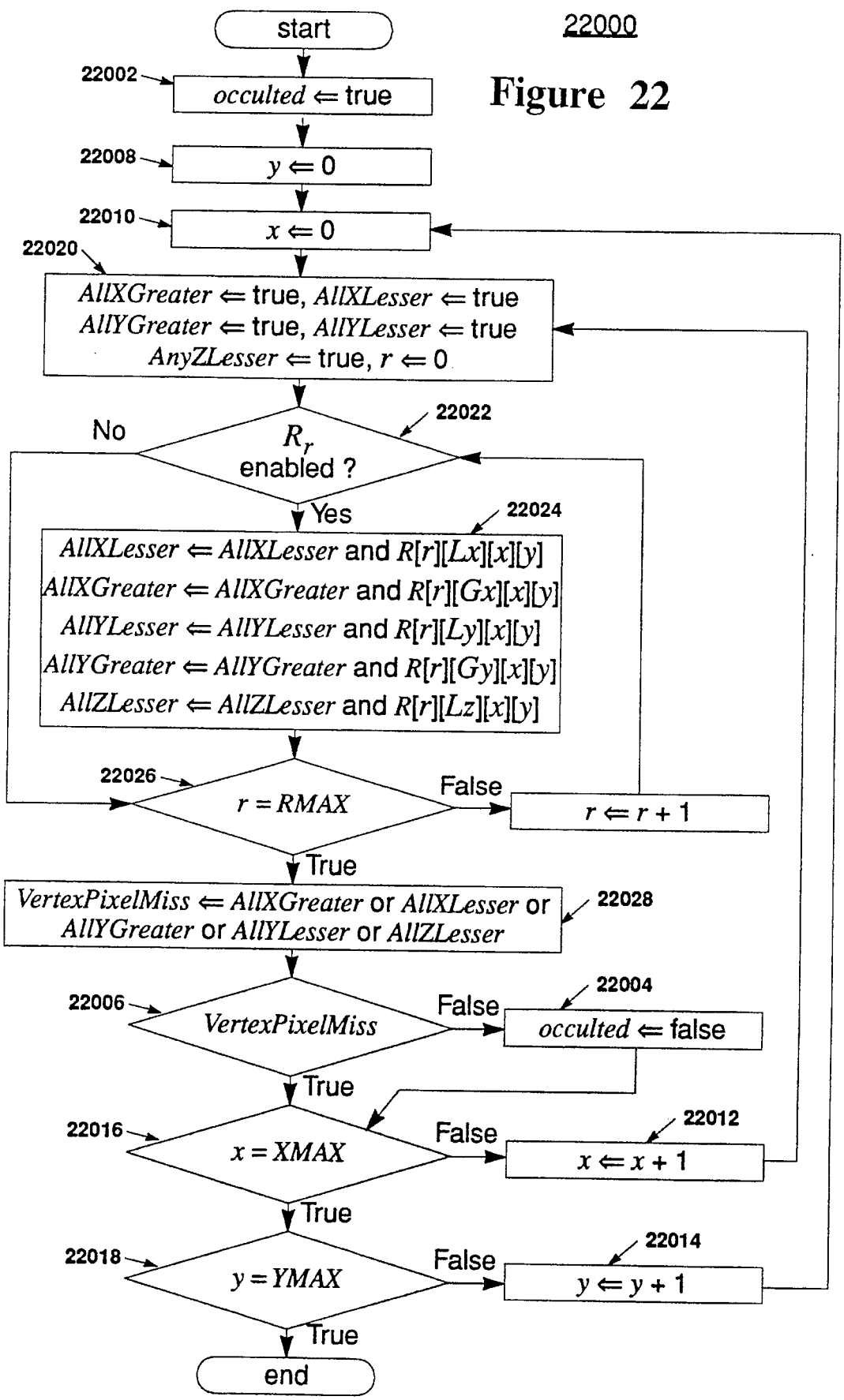
Figure 23:
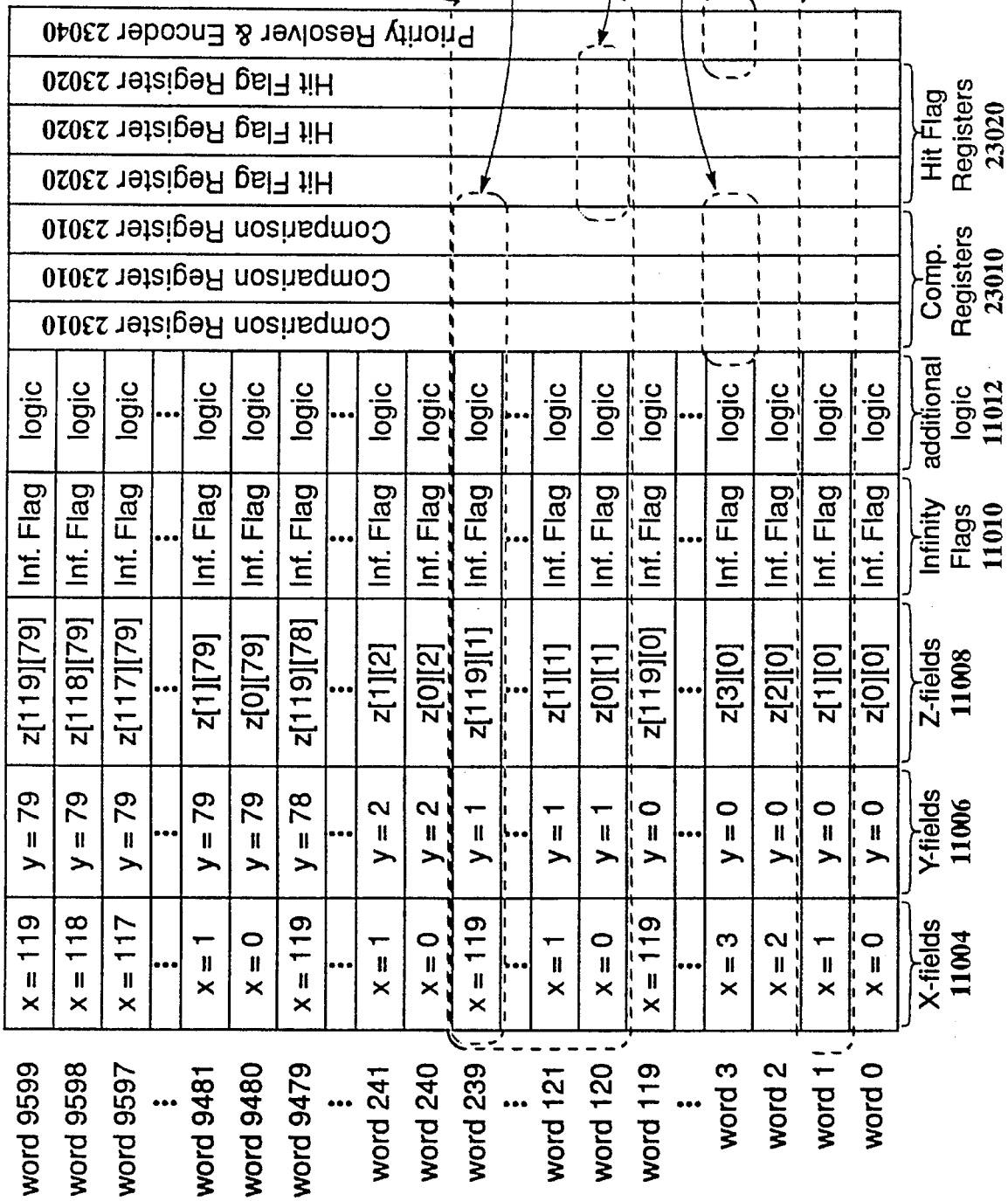
Figure 24:
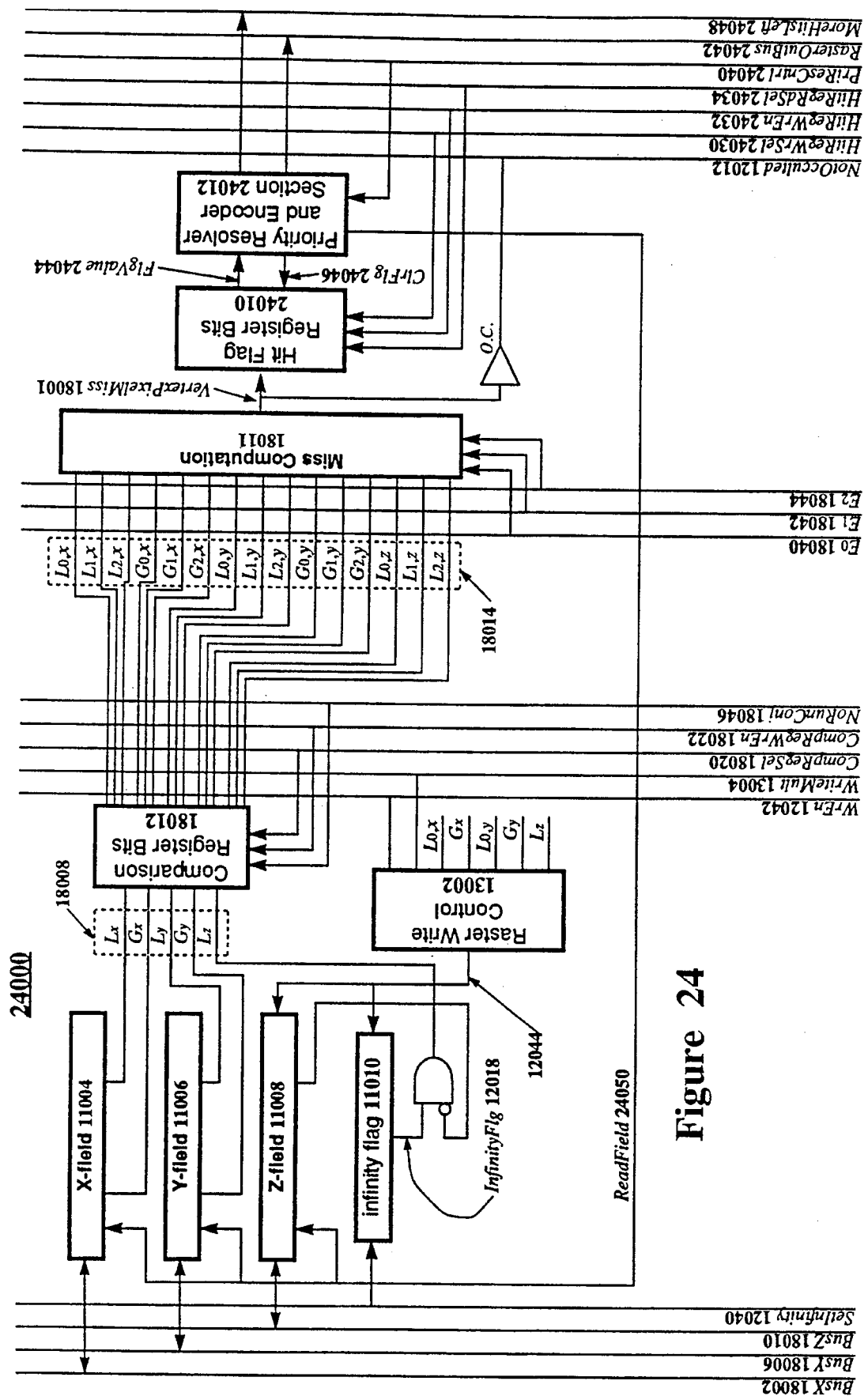
Figure 25:
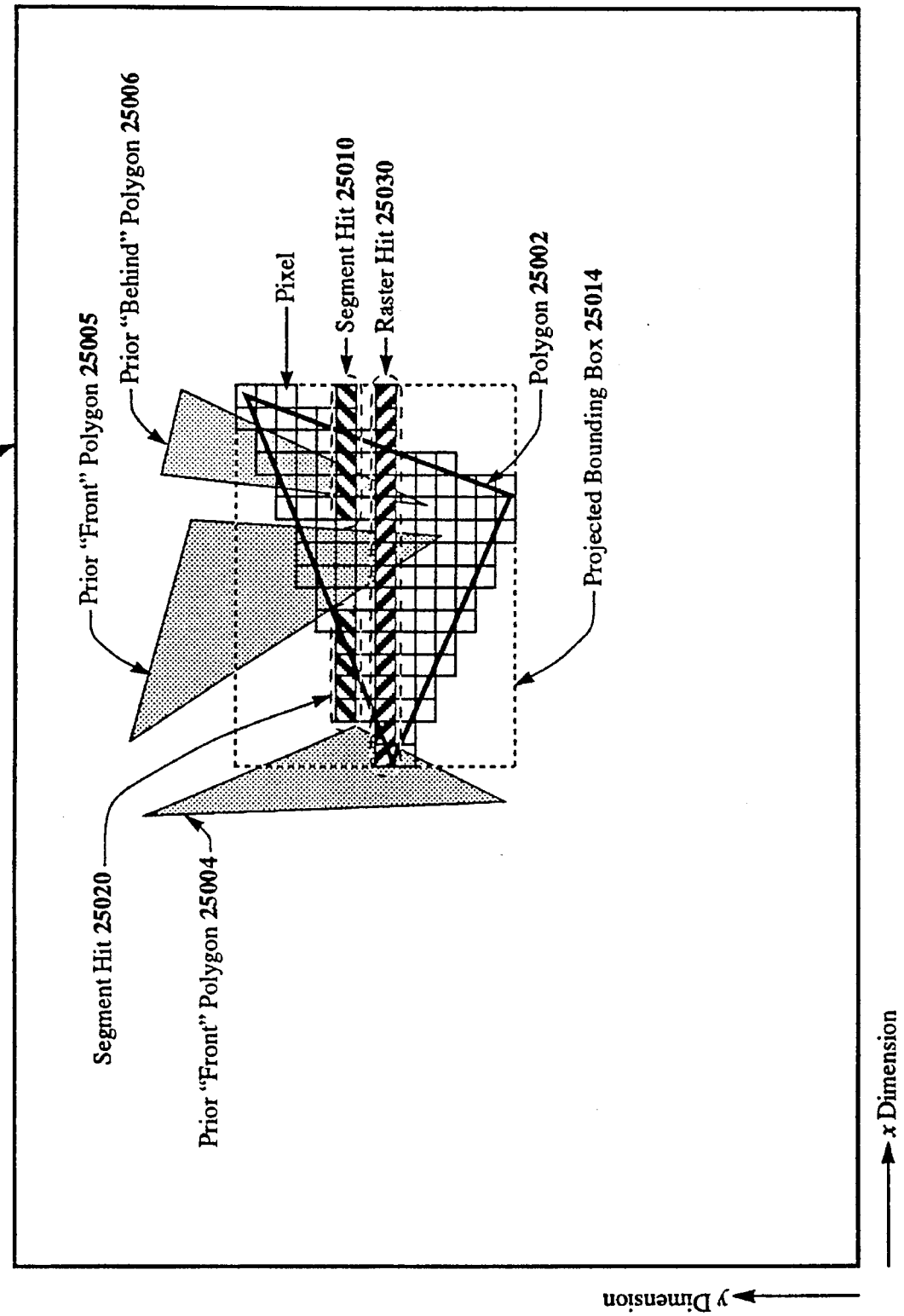
Figure 26:
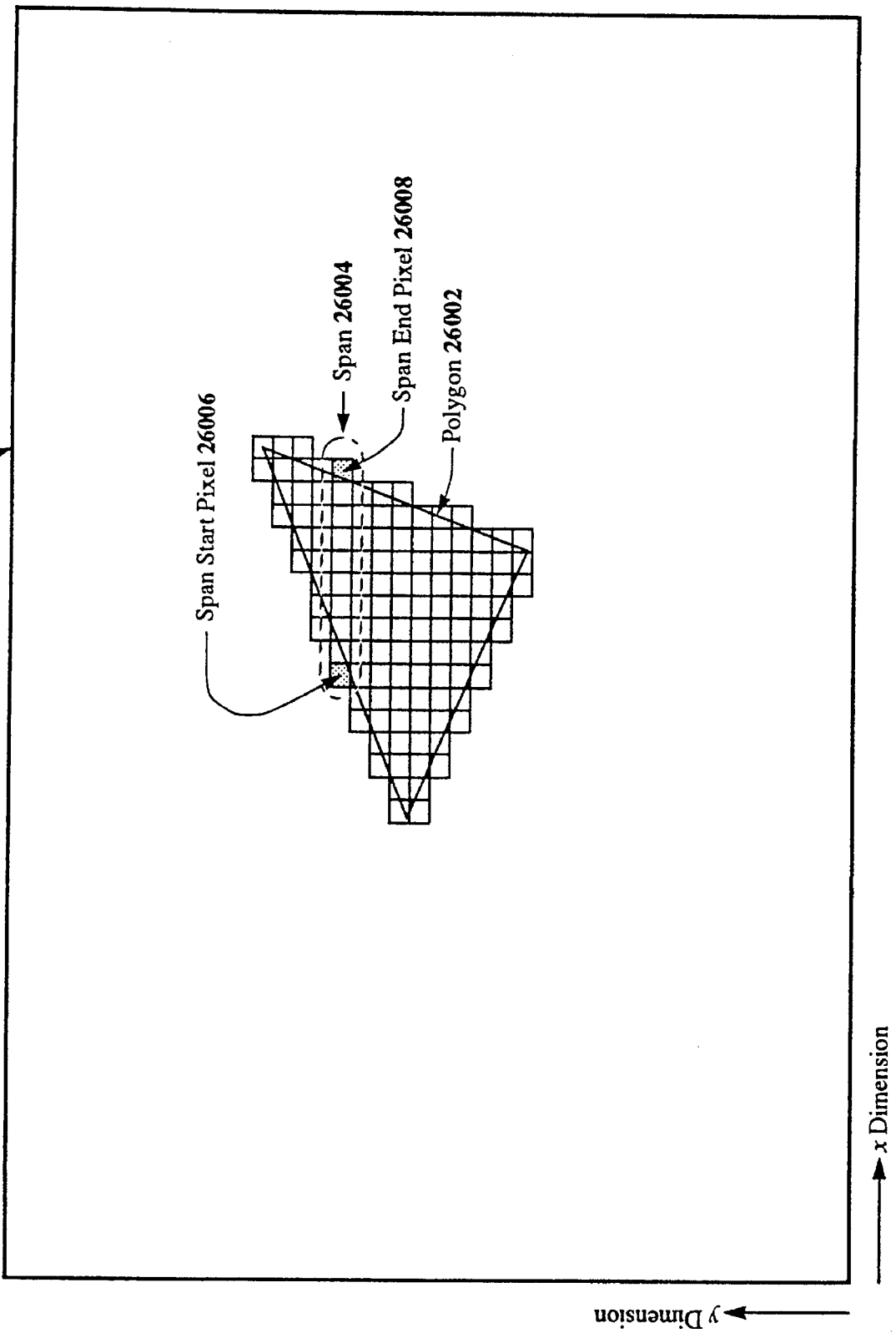
Figure 27:
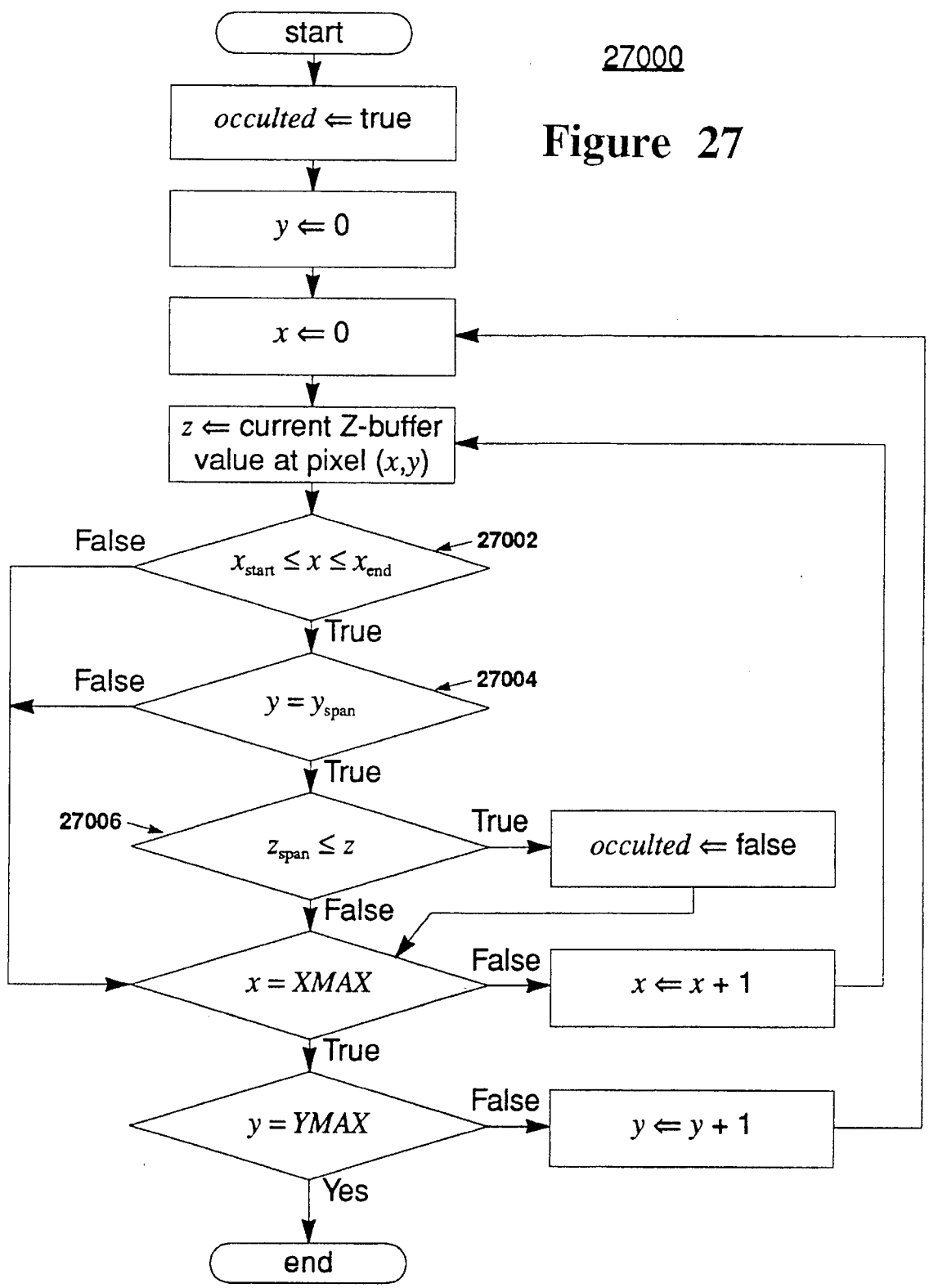
Figure 28:
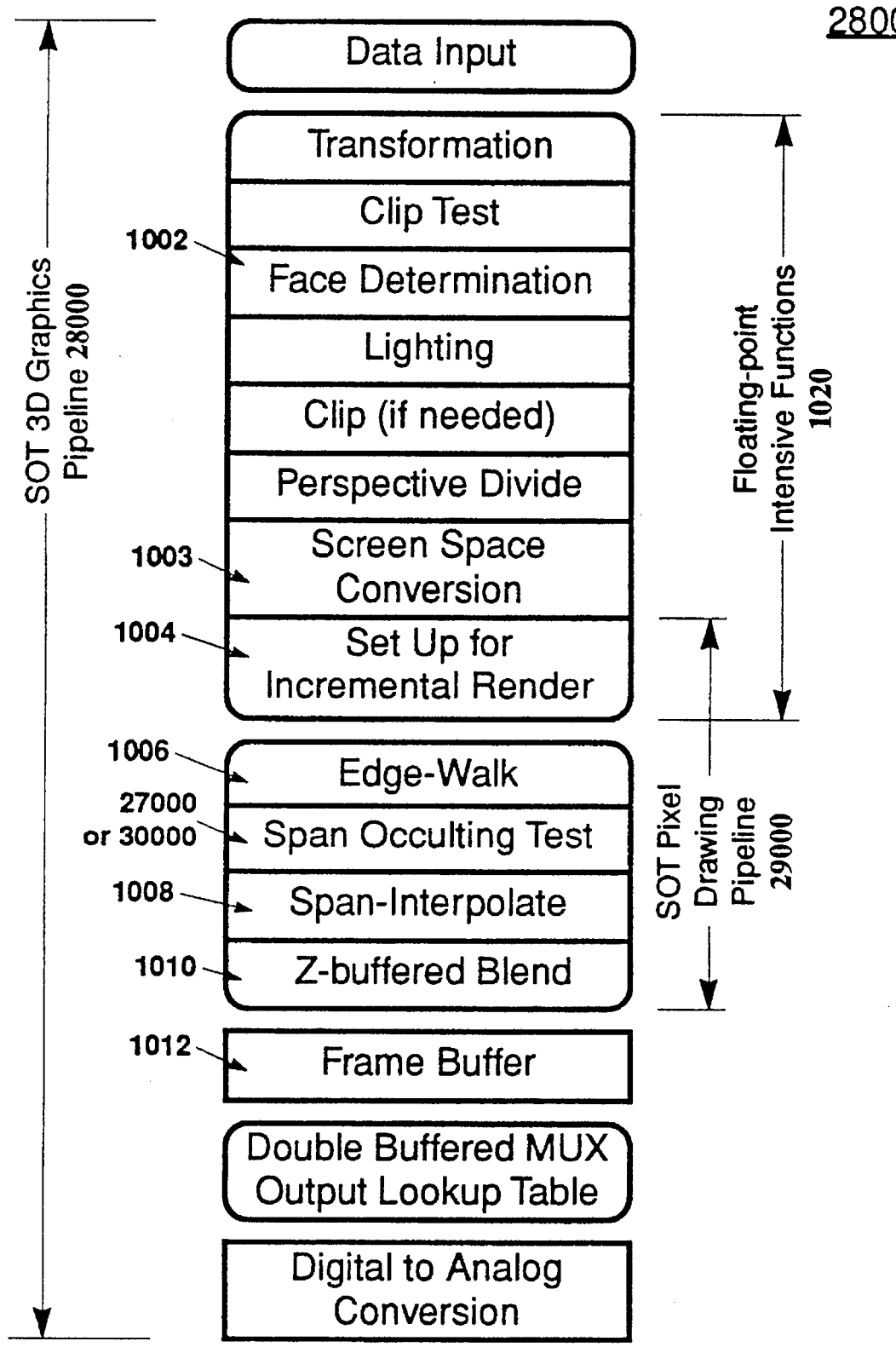
Figure 29:
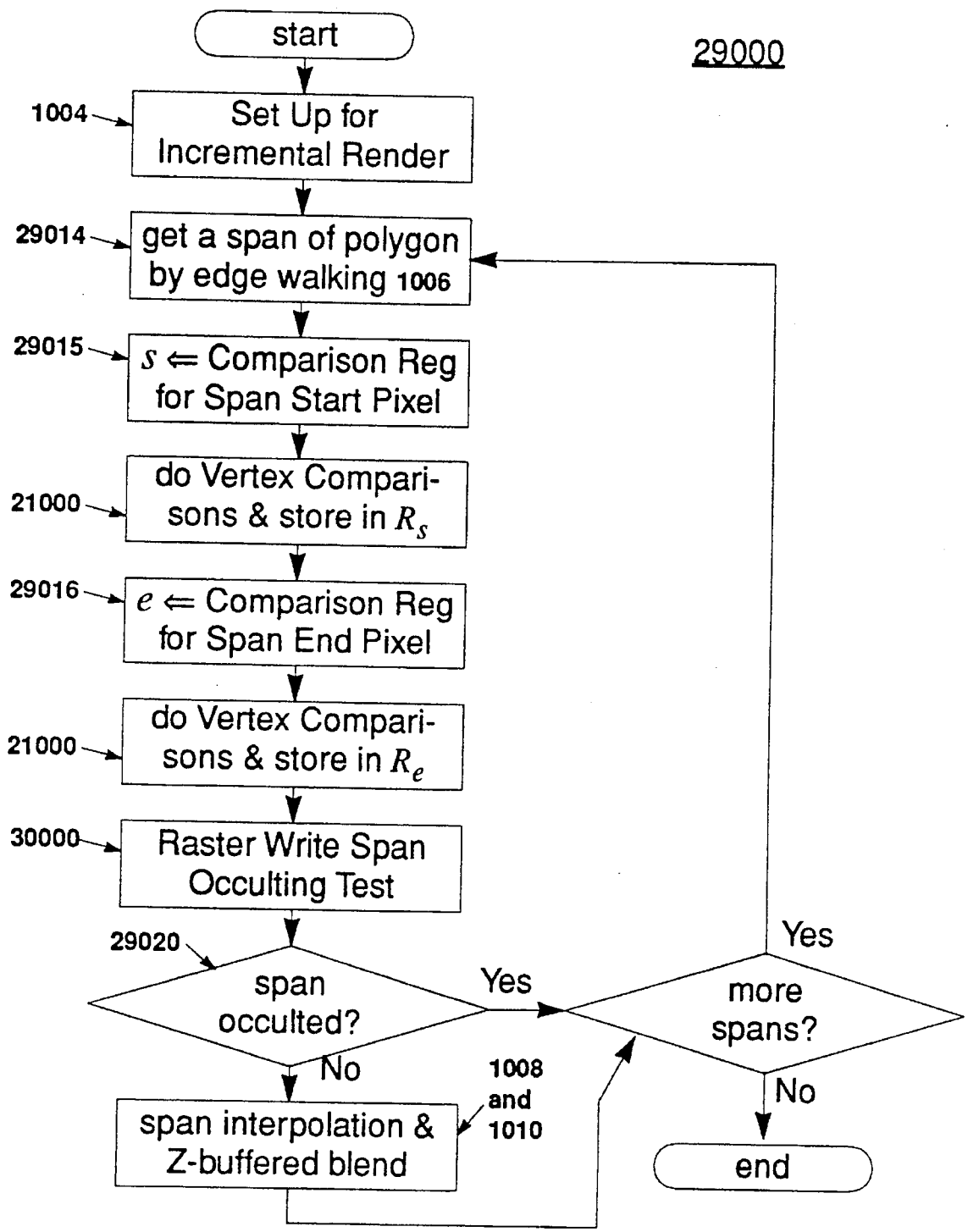
Figure 30:
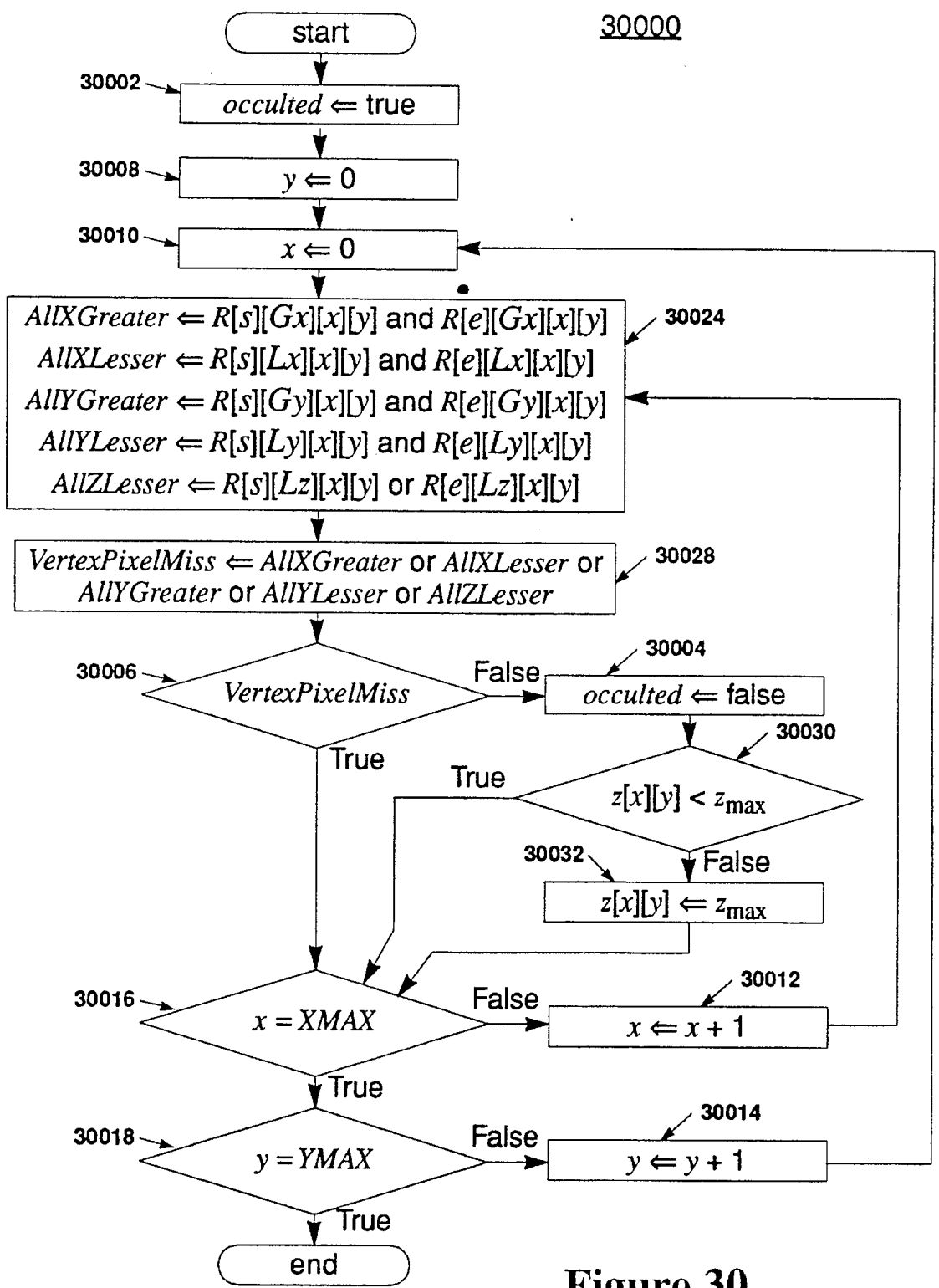
Figure 31:
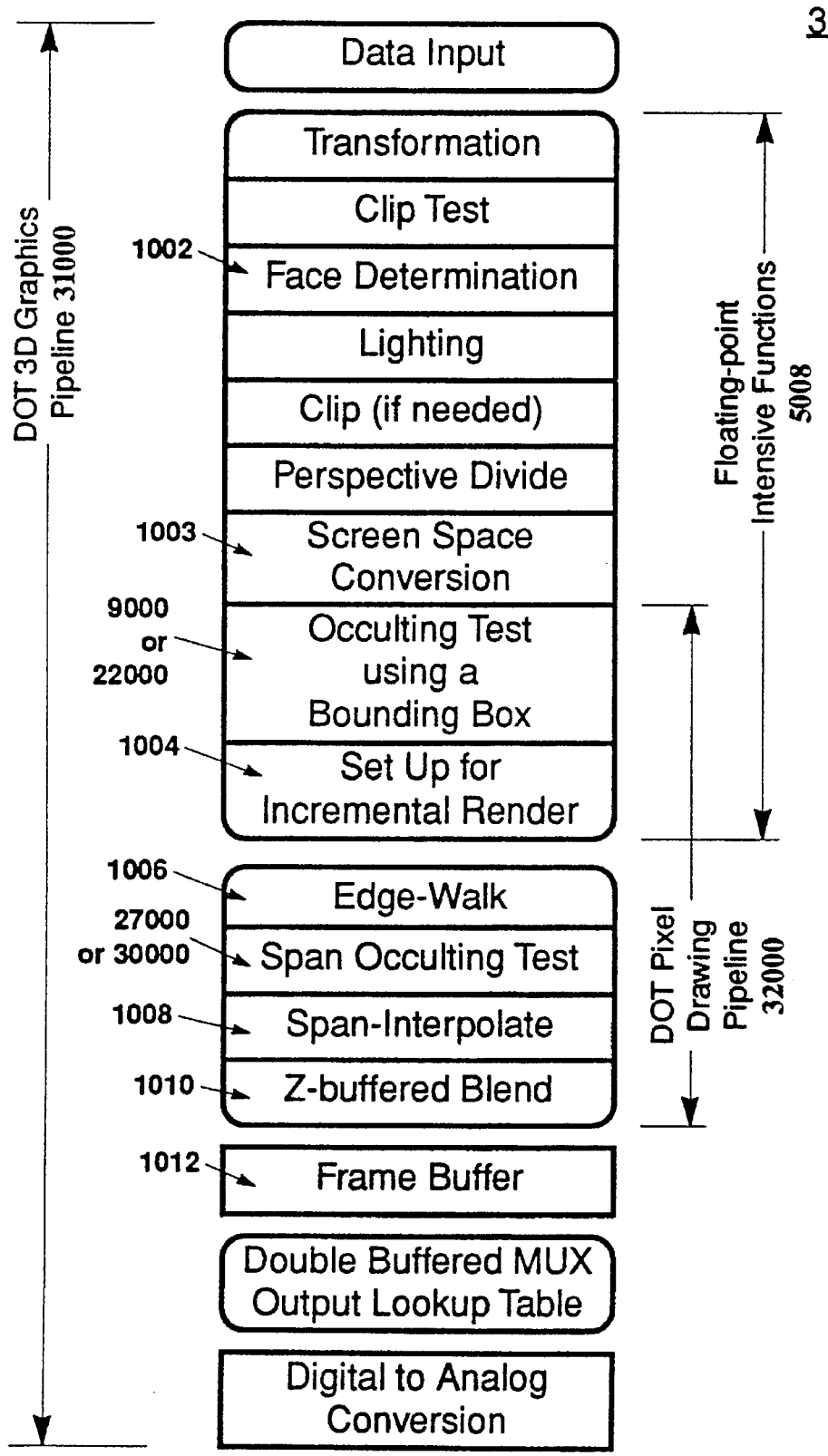
Figure 32:
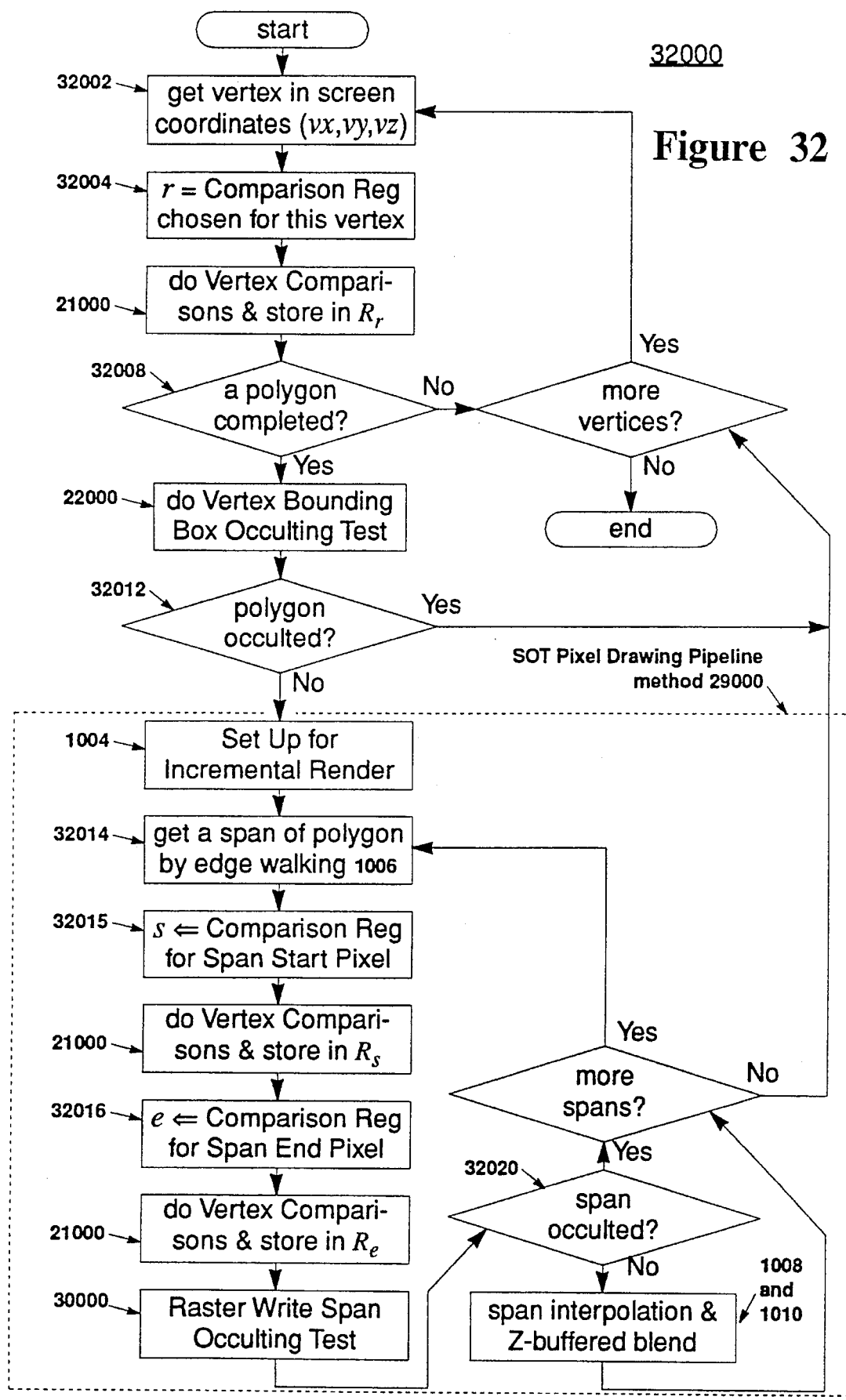
Figure 33:
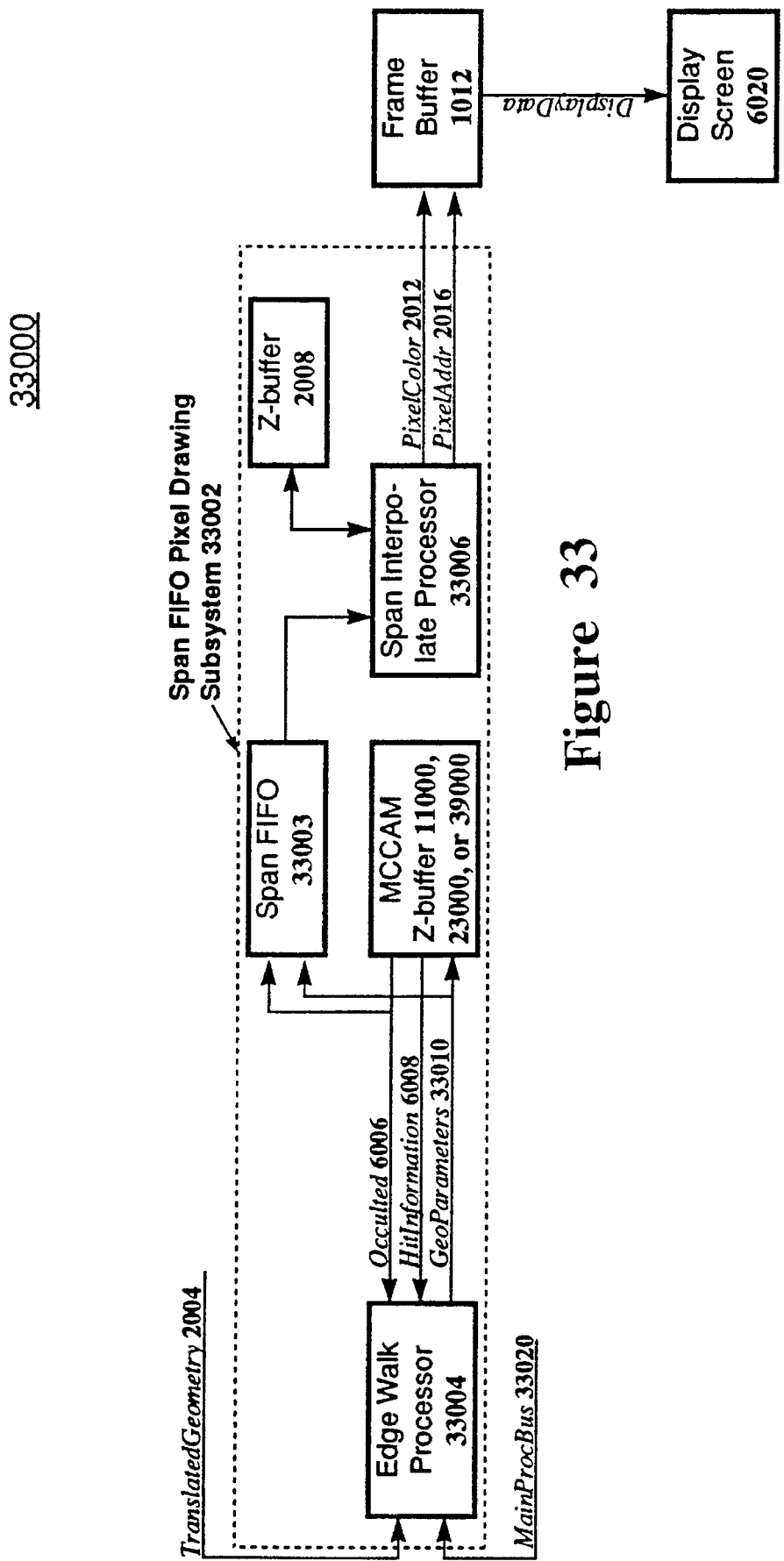
Figure 34:
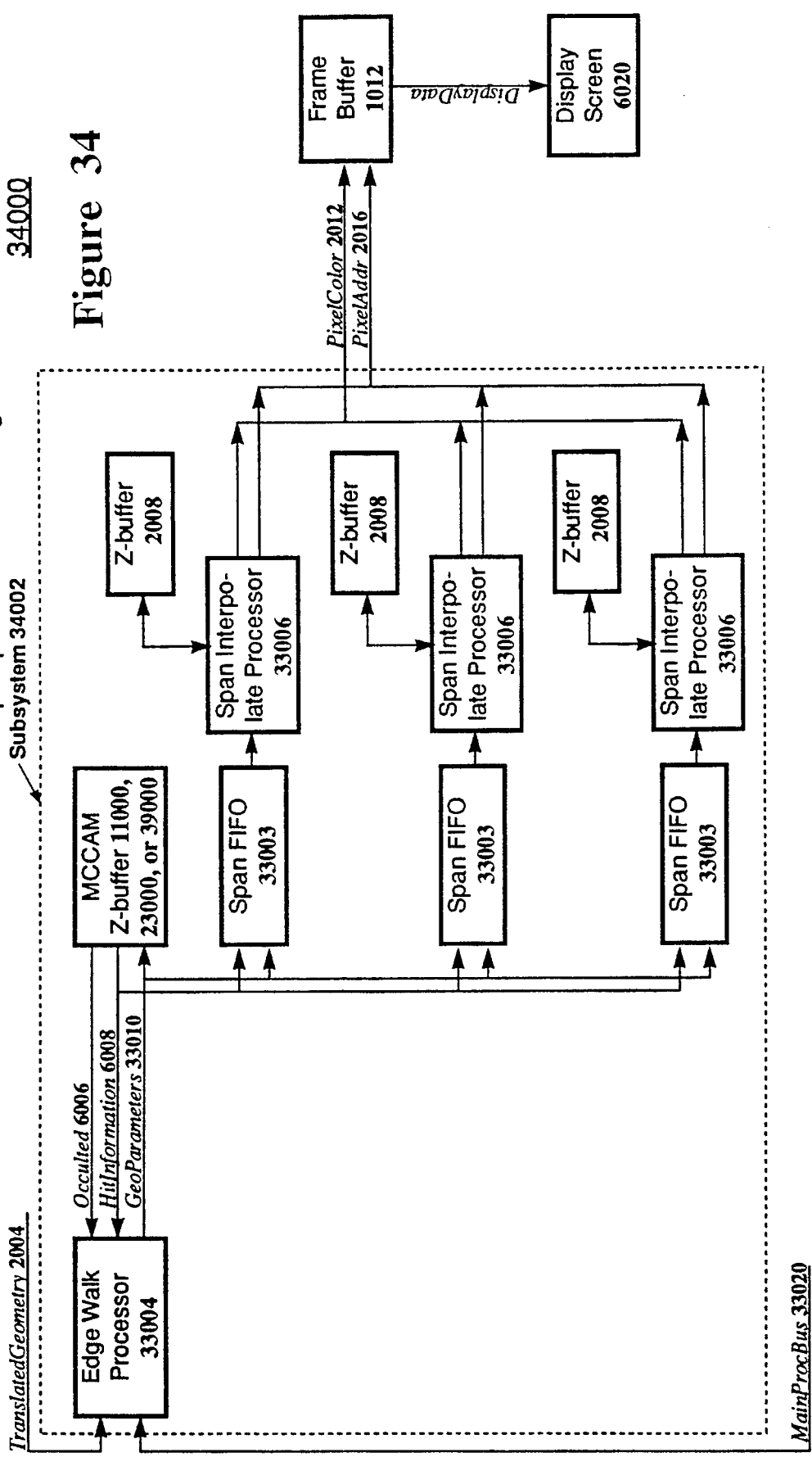
Figure 35:
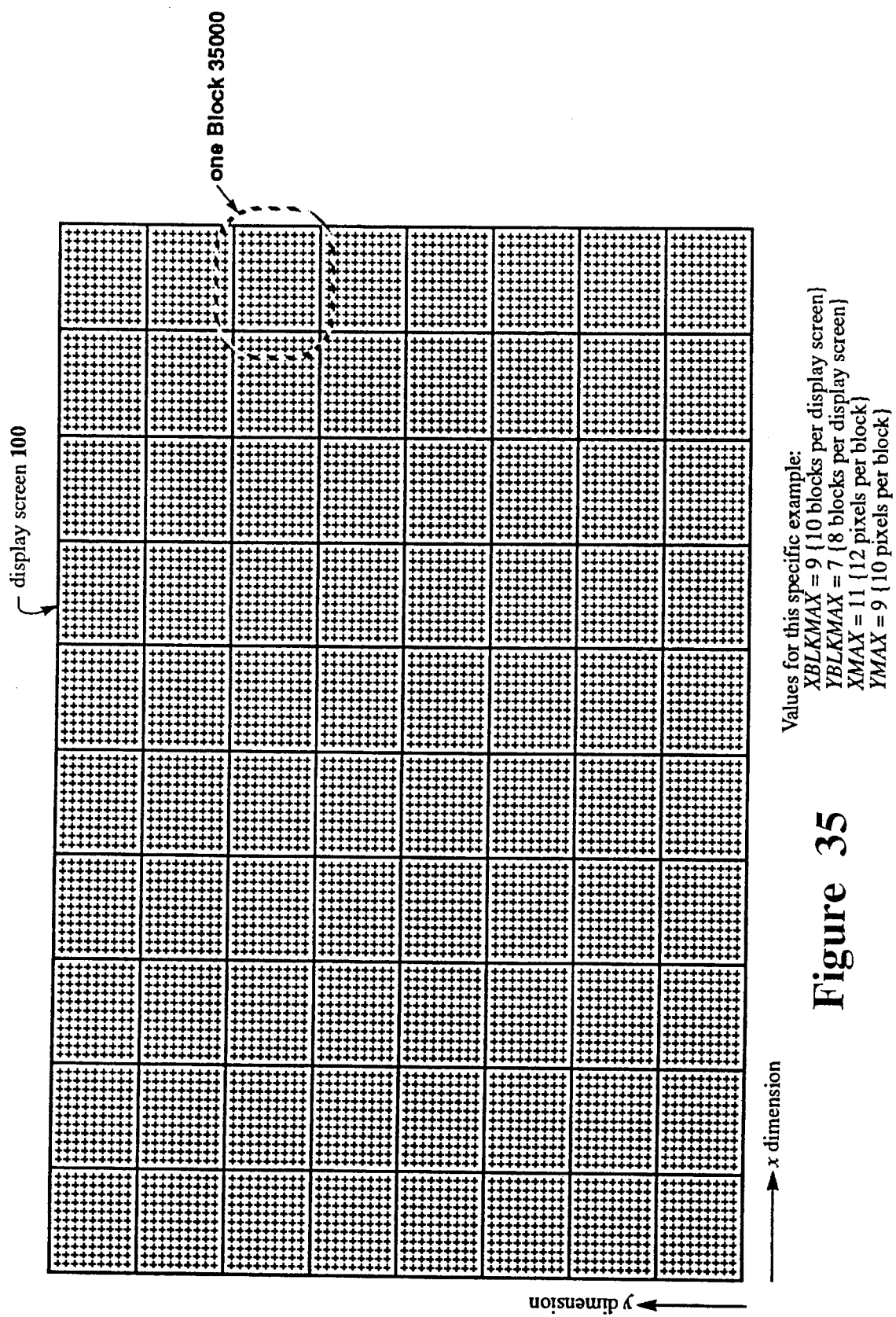
Figure 36:
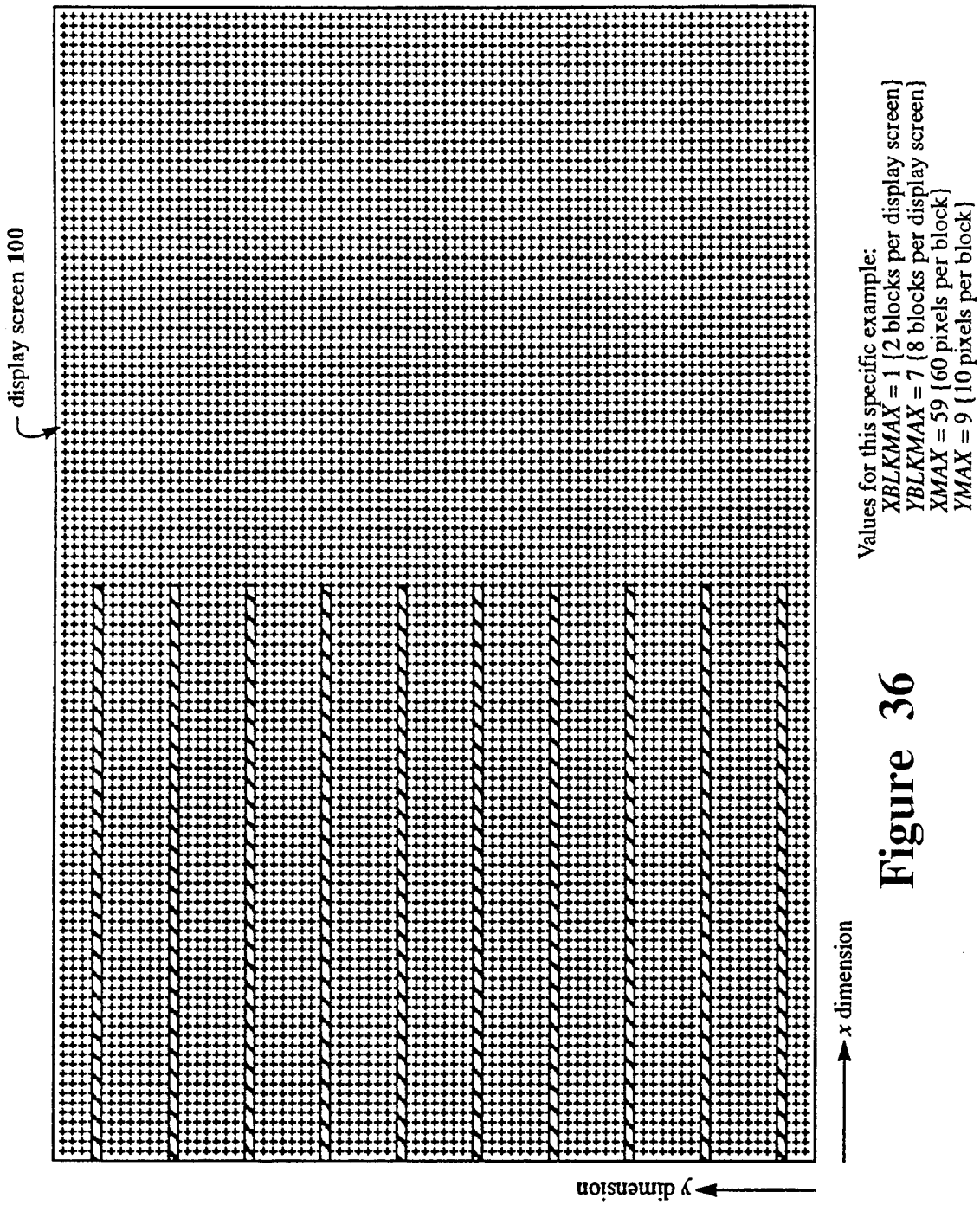
Figure 37:
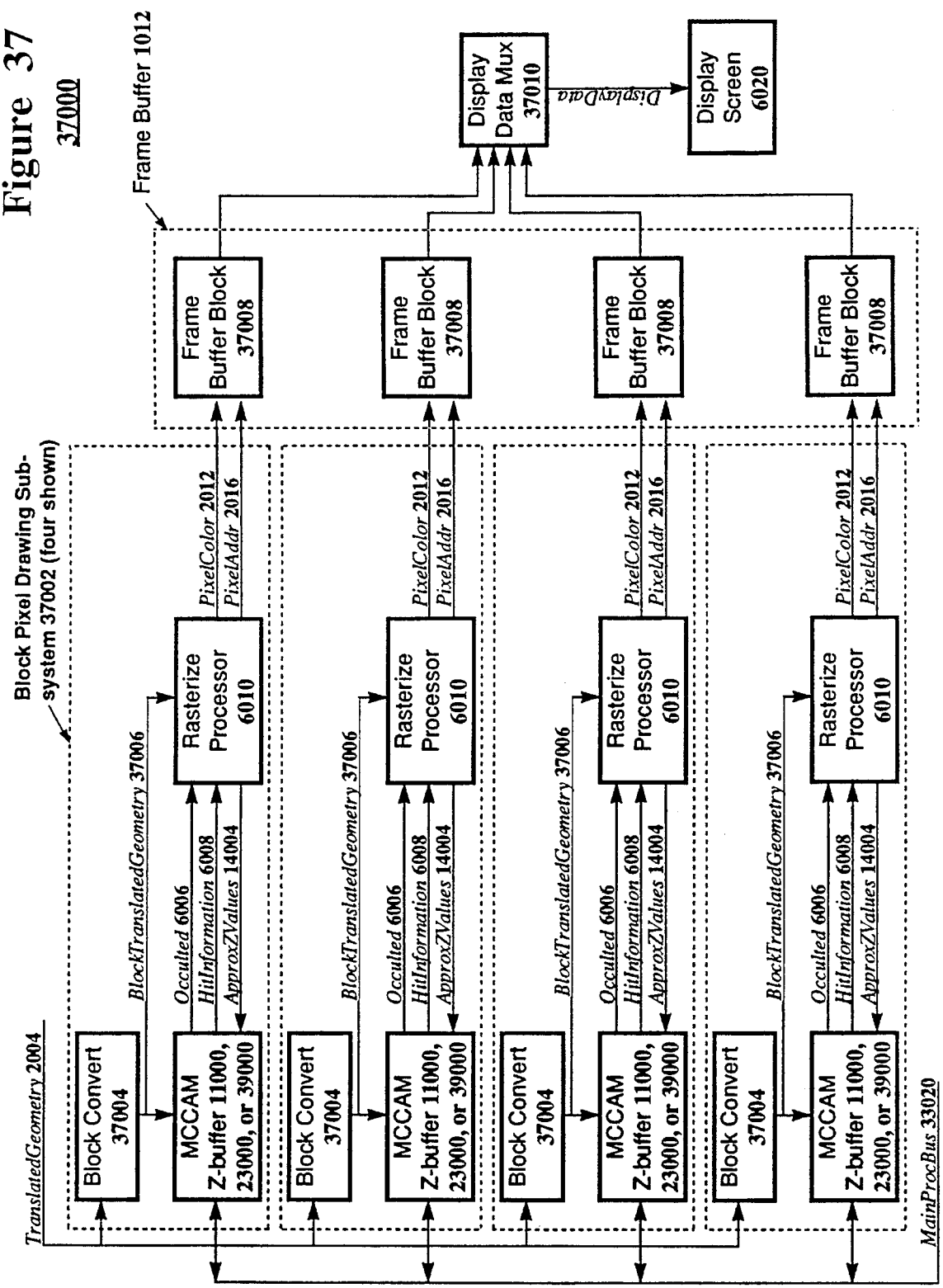
Figure 38:
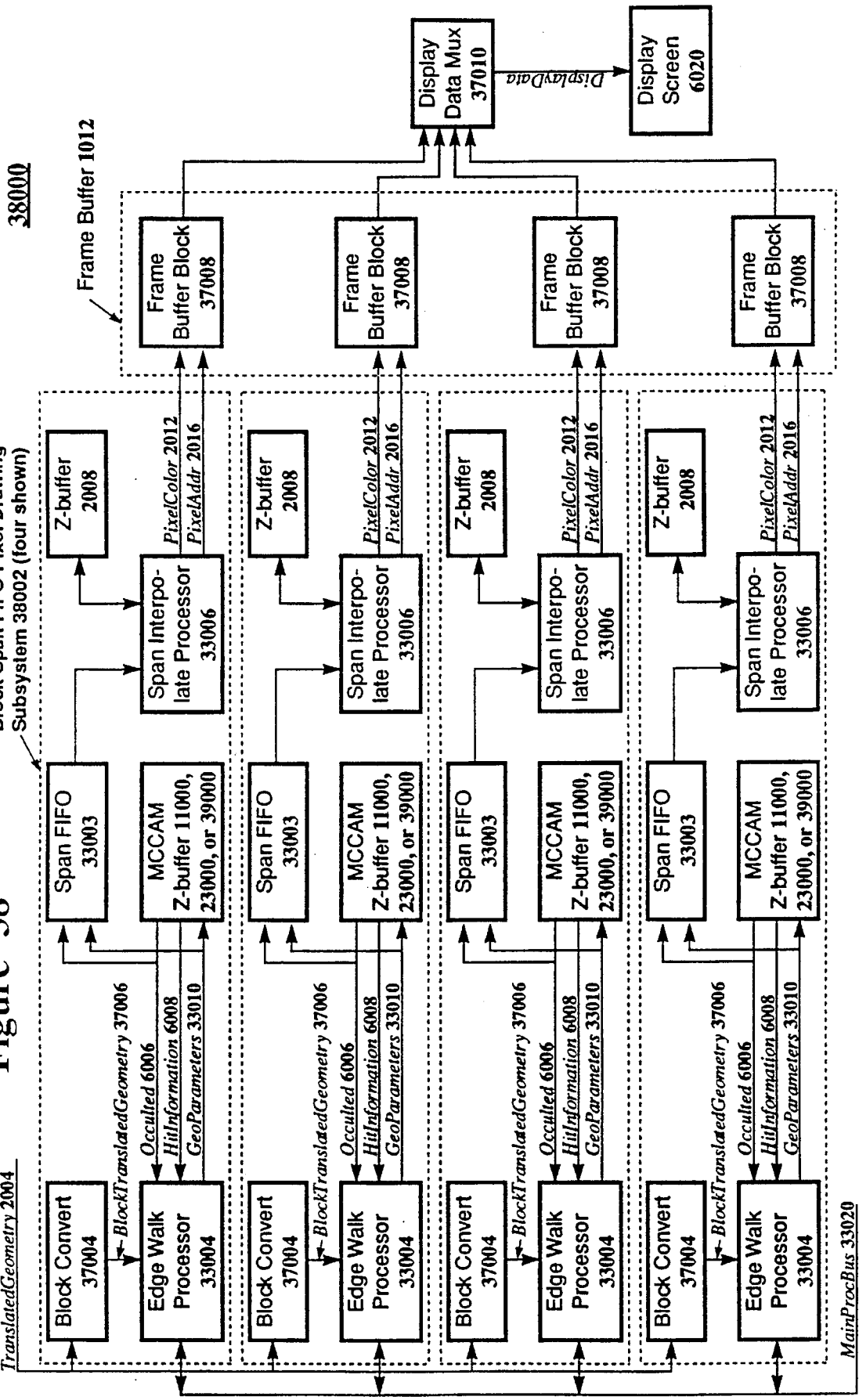
Figure 40:
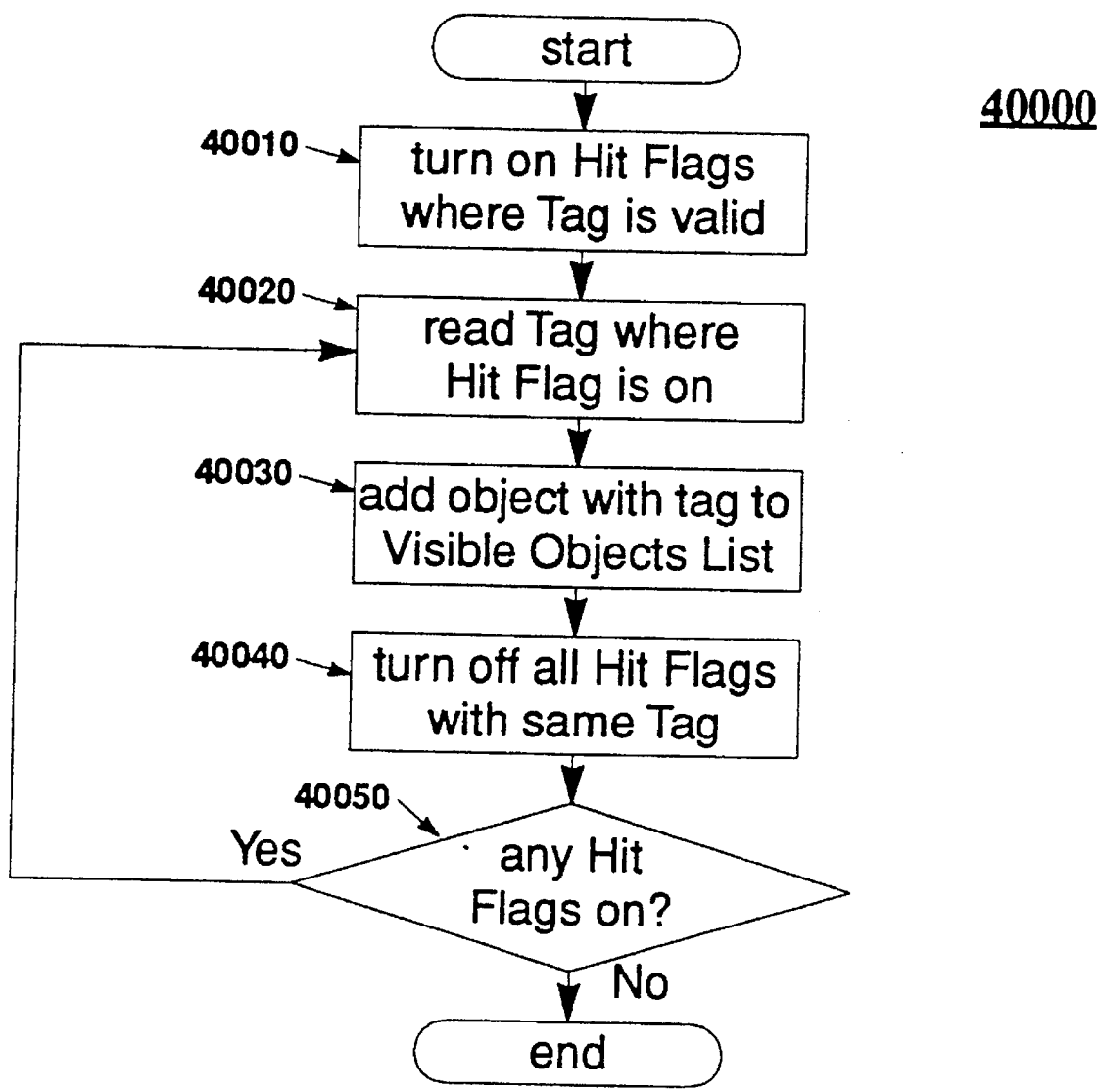
Figure 41:
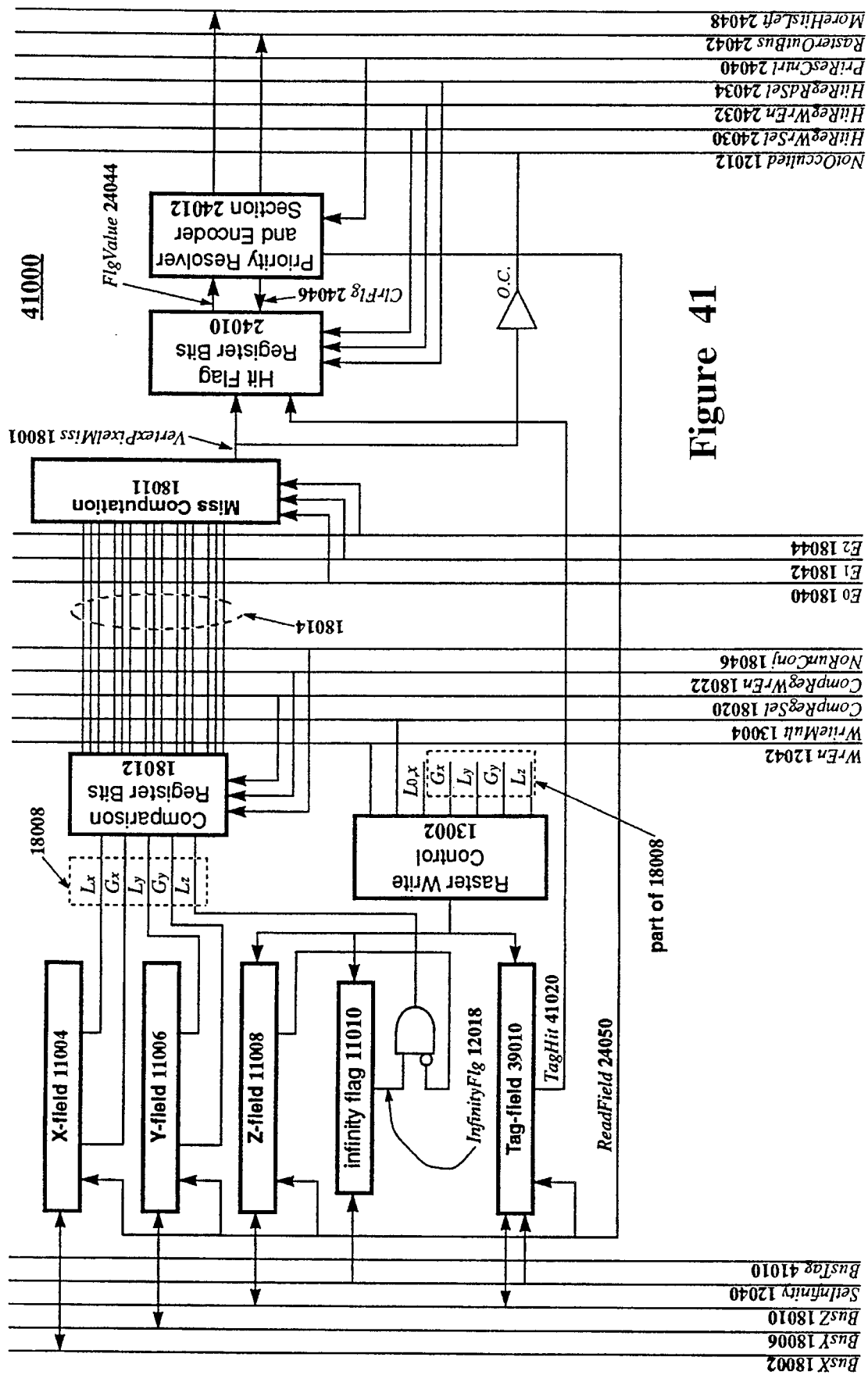
Figure 42:
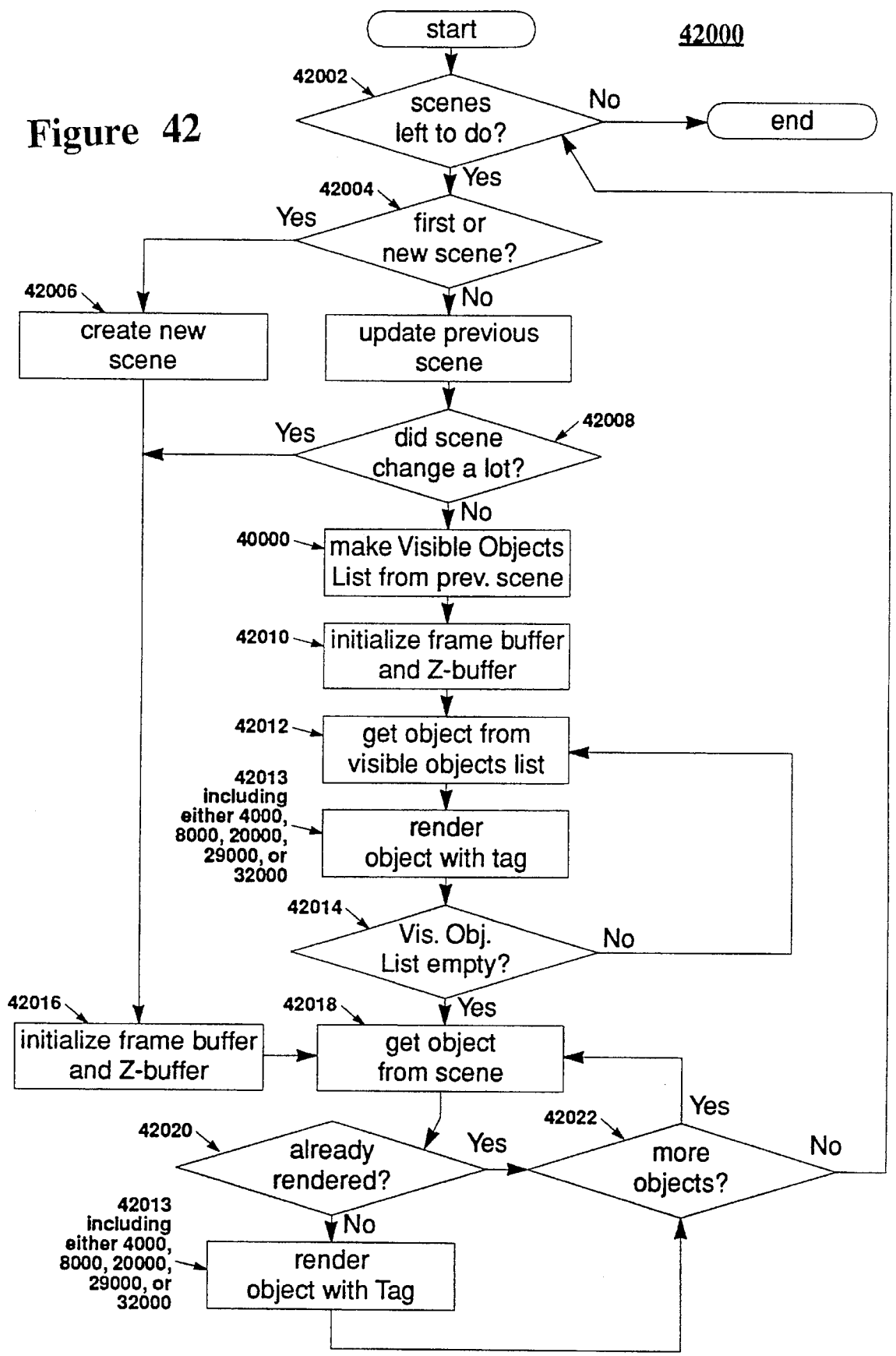
Figure 43:
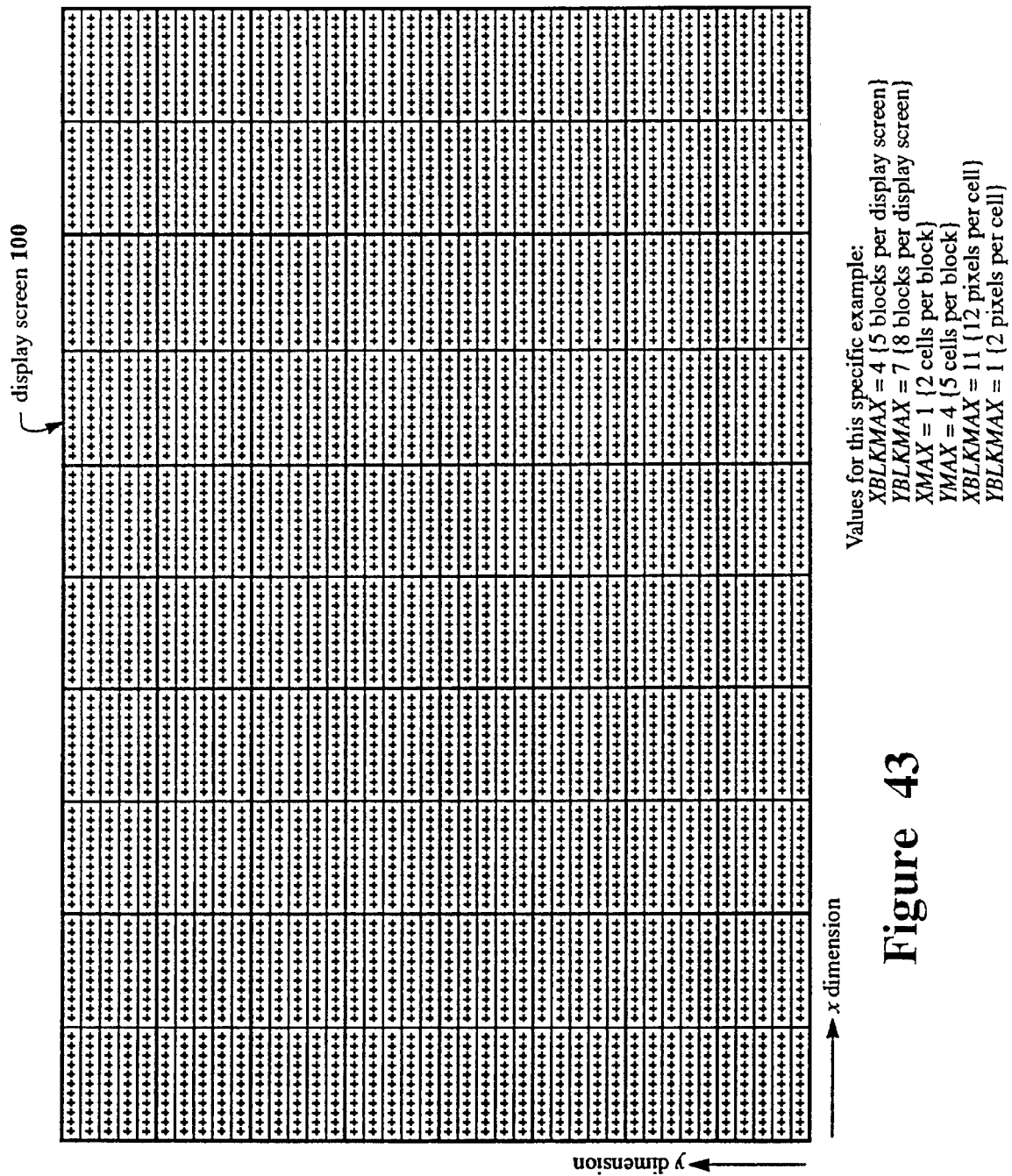
Figure 44:
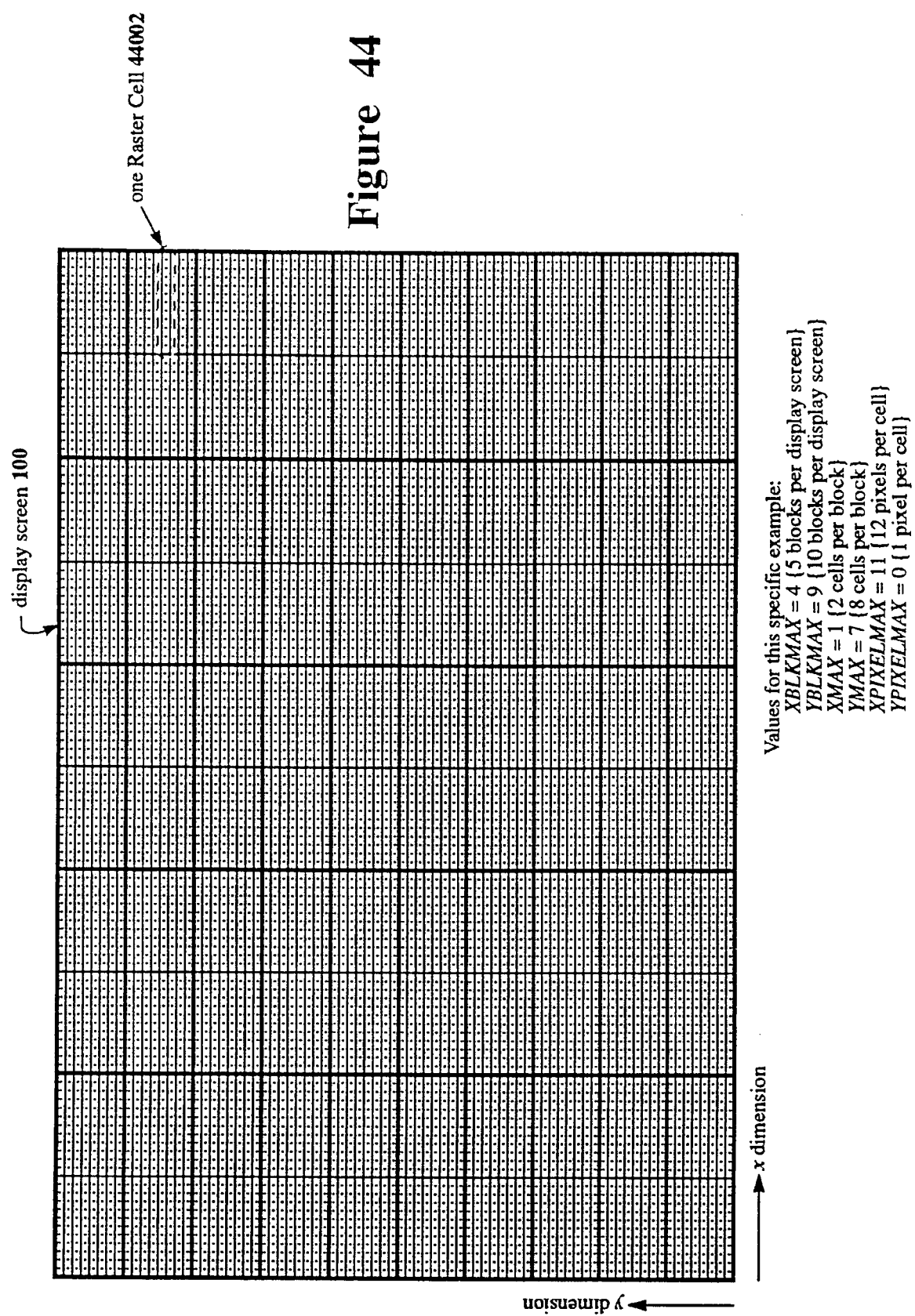
Figure 45:
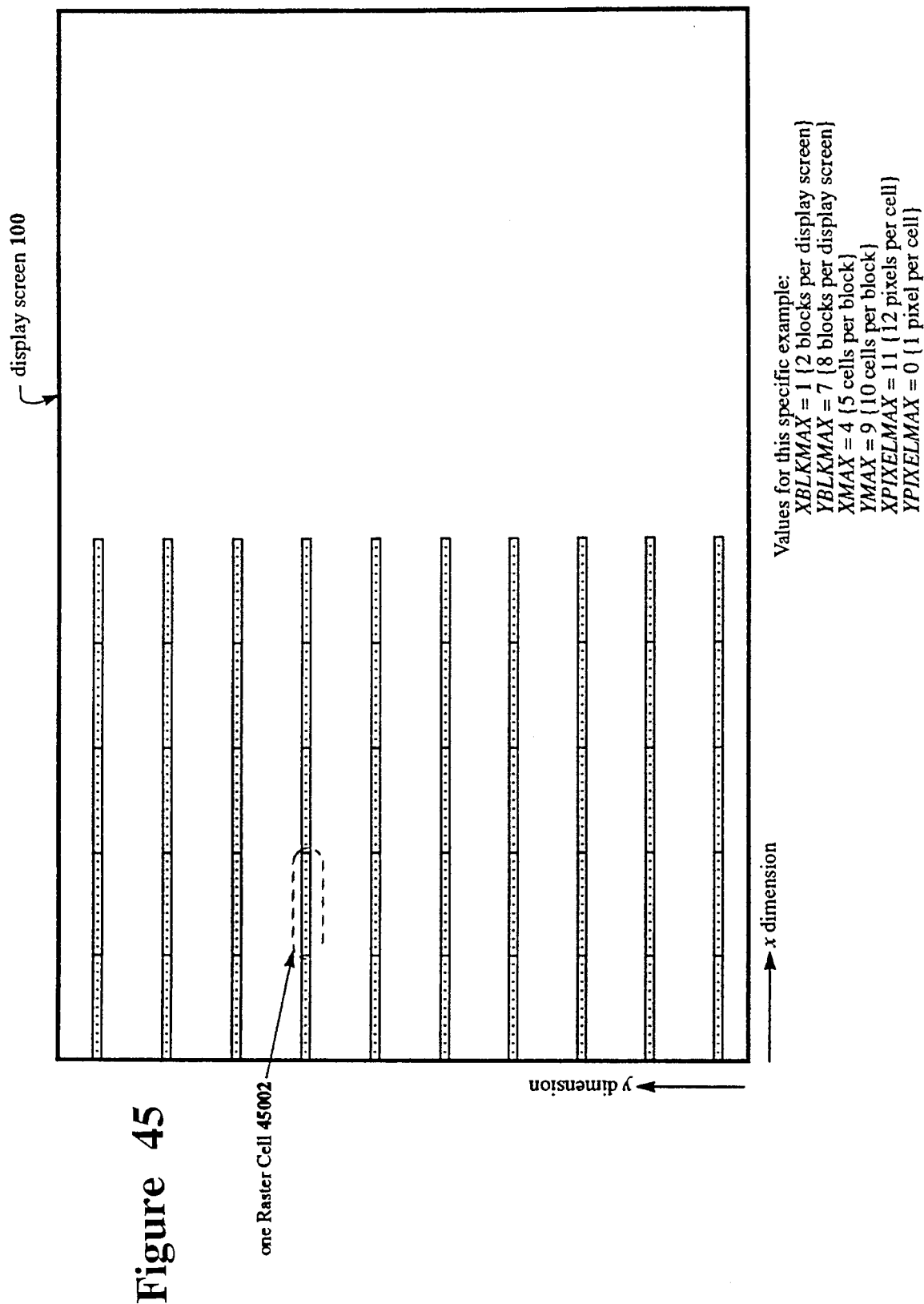
Figure 46:
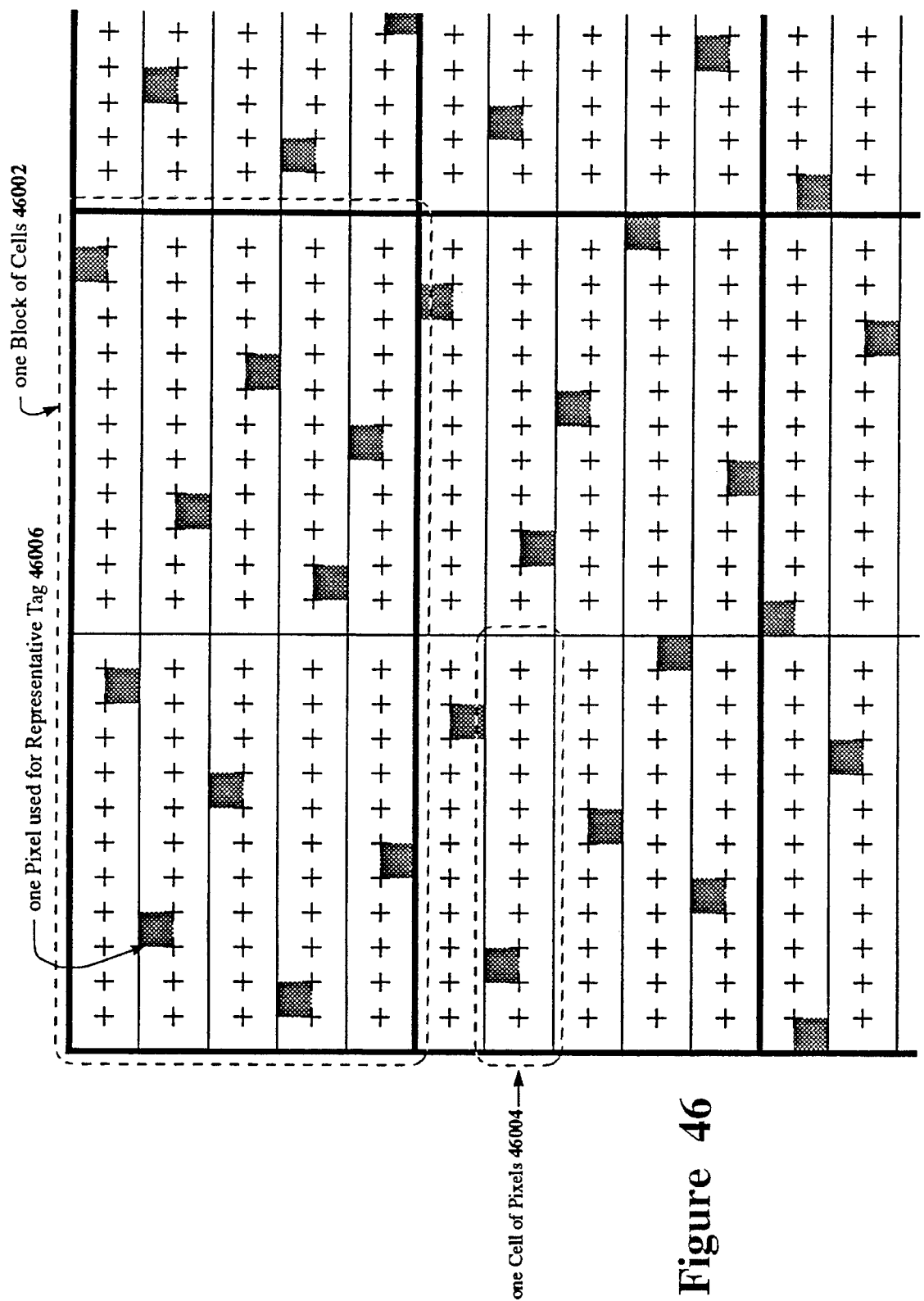
Figure 47:
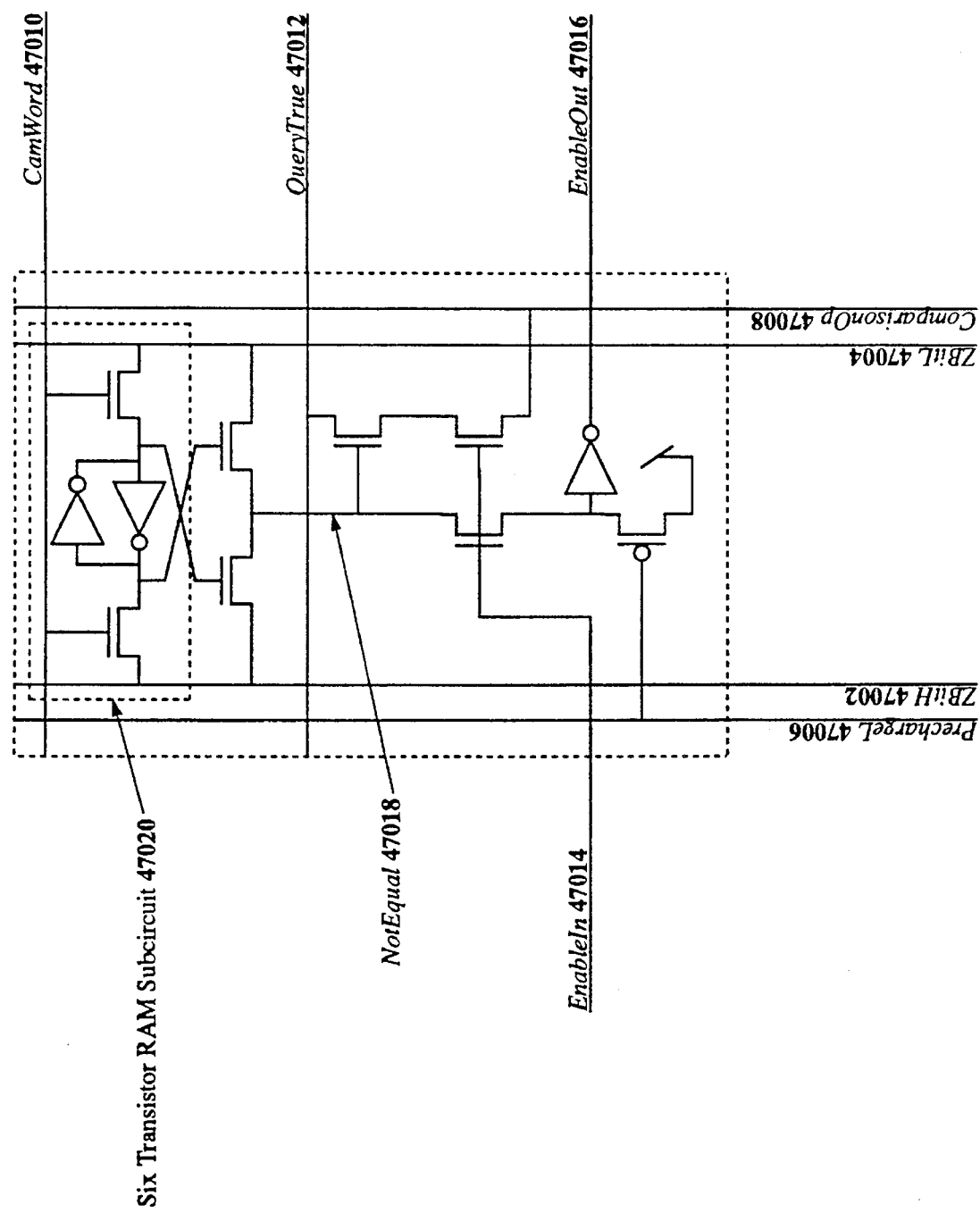
Figure 48:
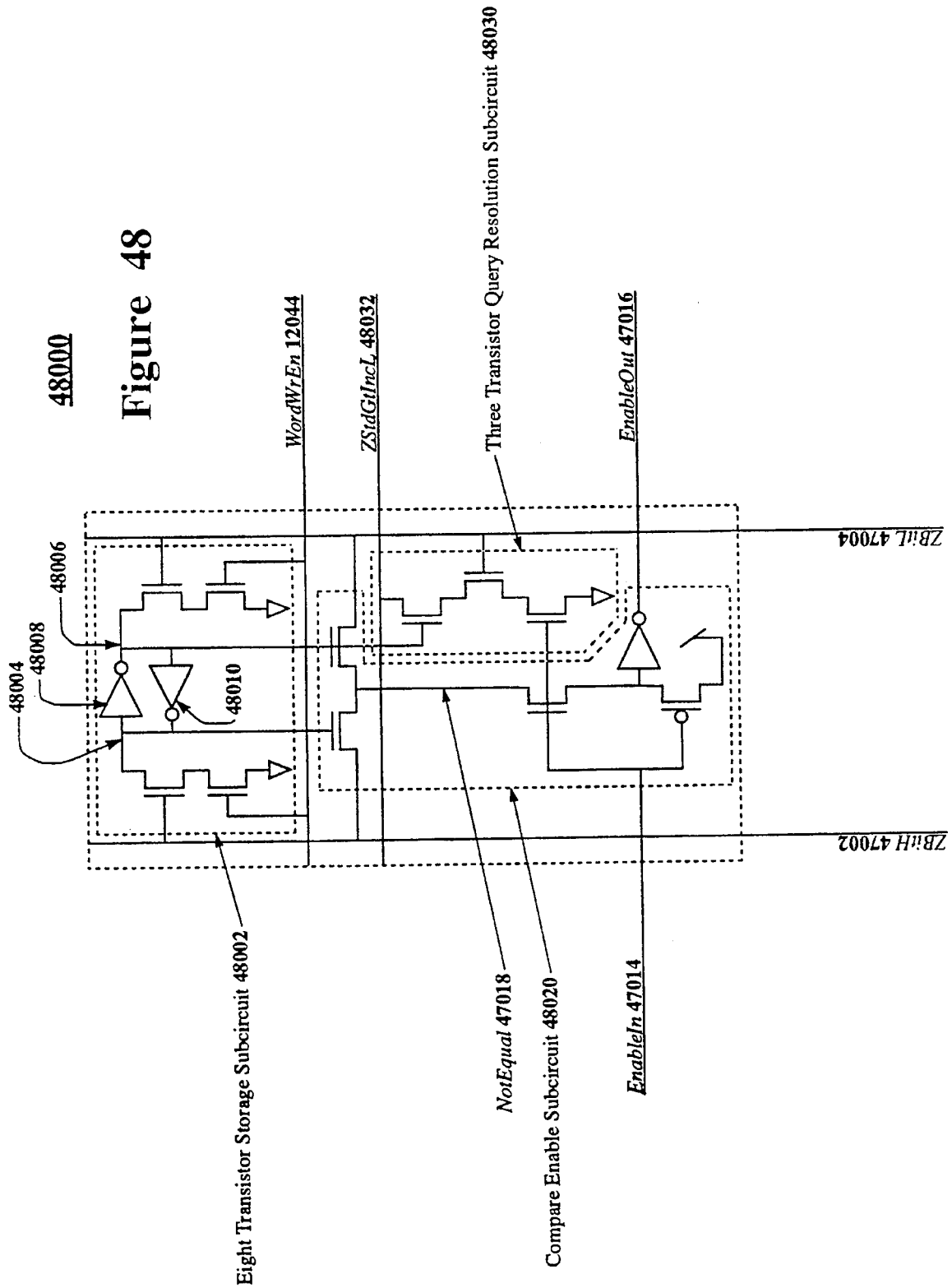
Figure 49:
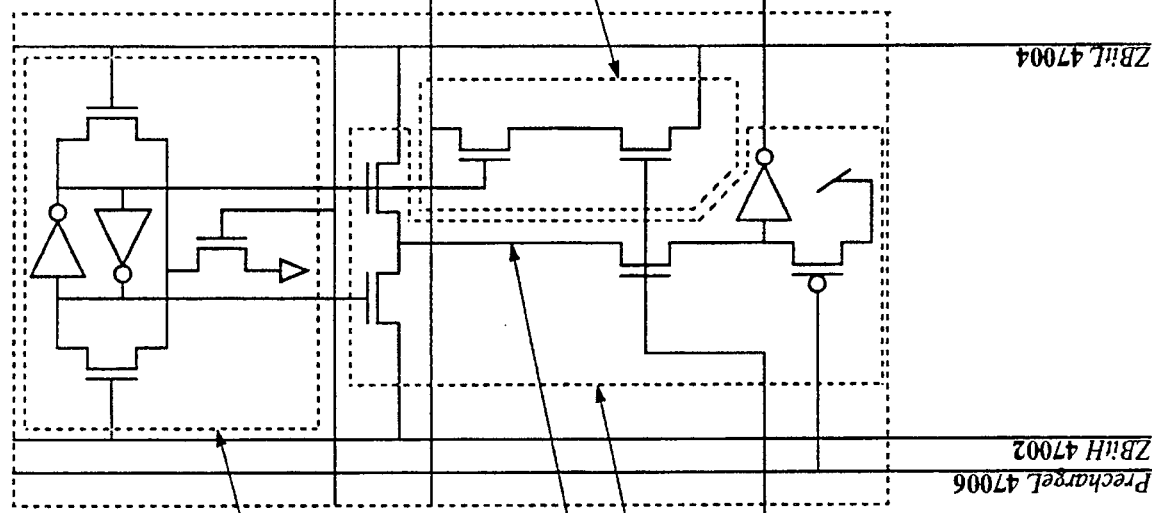
FIG. 49 shows MCCAM Bit Circuit C 49000, which can perform both Raster Write operations and read operations. This is done by the addition of two pass transistors 49002, 49004 which are enabled by ReadField 24050.
Figure 50:
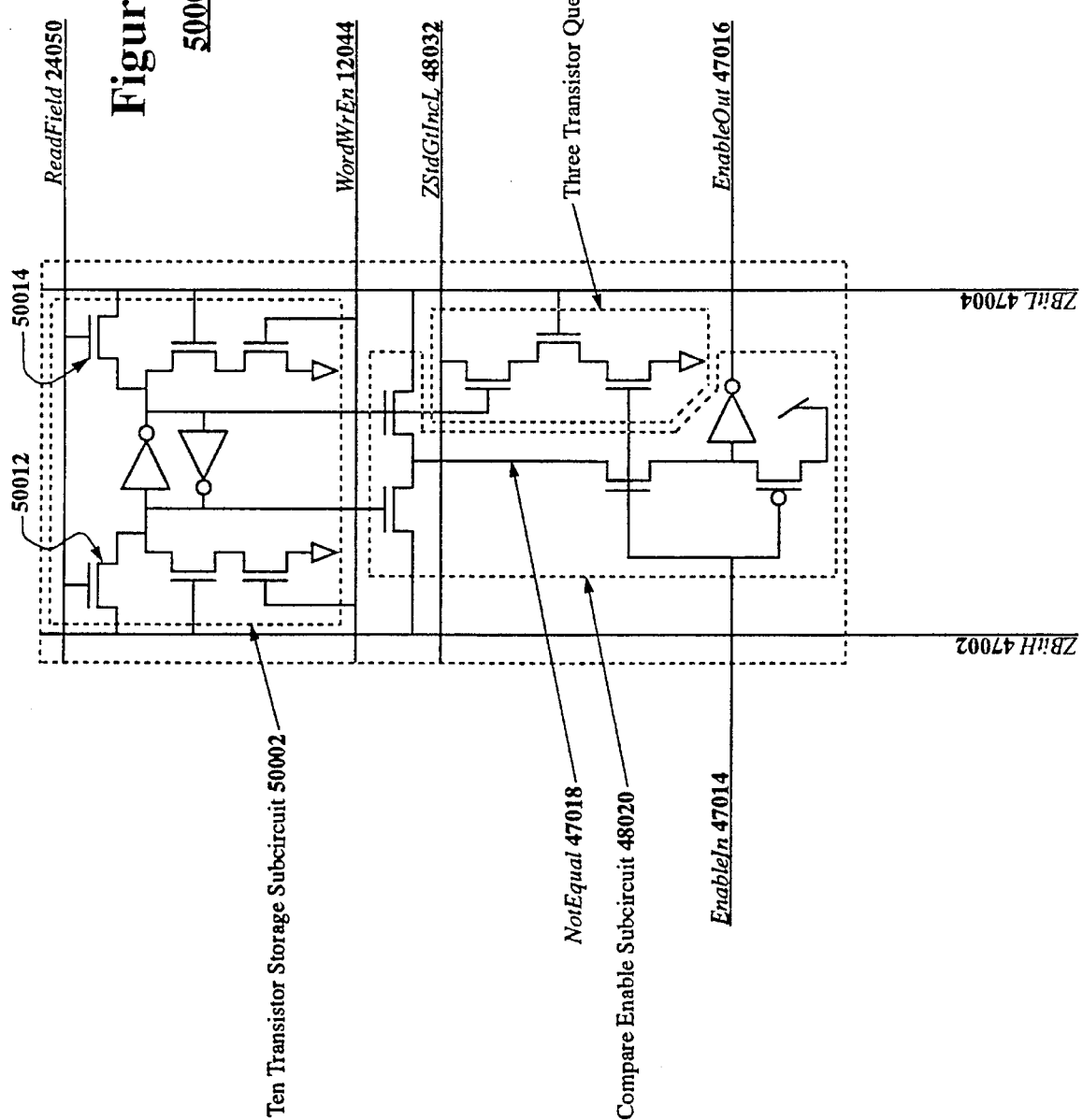
Figure 51:
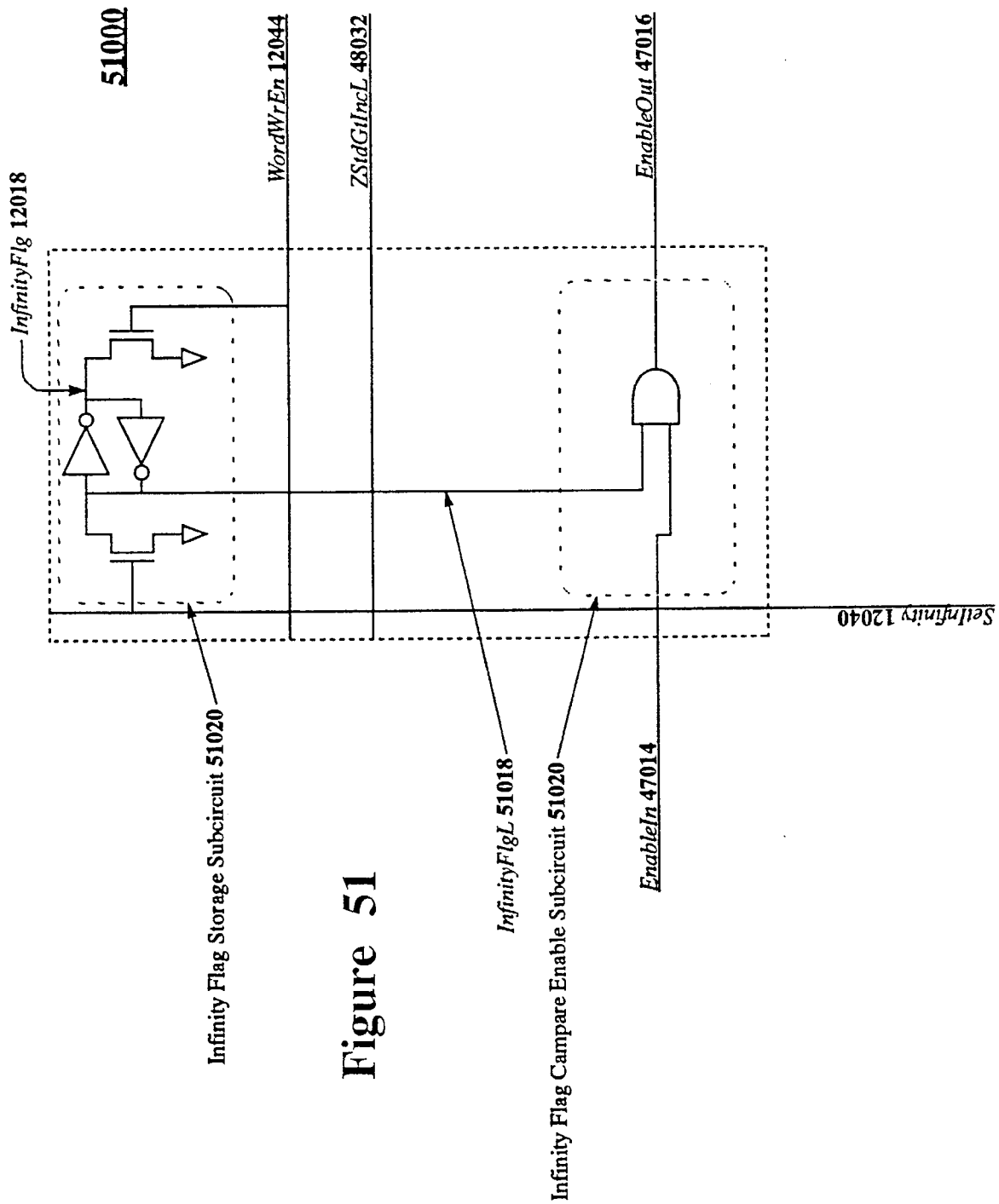
FIG. 51 shows the Infinity Flag Bit Circuit 51000, which stores the Infinity Flag 11010. The value InfinityFlg 12018 stored in the Infinity Flag Storage Subcircuit 51010 is set to "one" when SetInfinity 12040 is asserted, and cleared to "zero" when WordWrEn 12044 is asserted.
Figure 52:
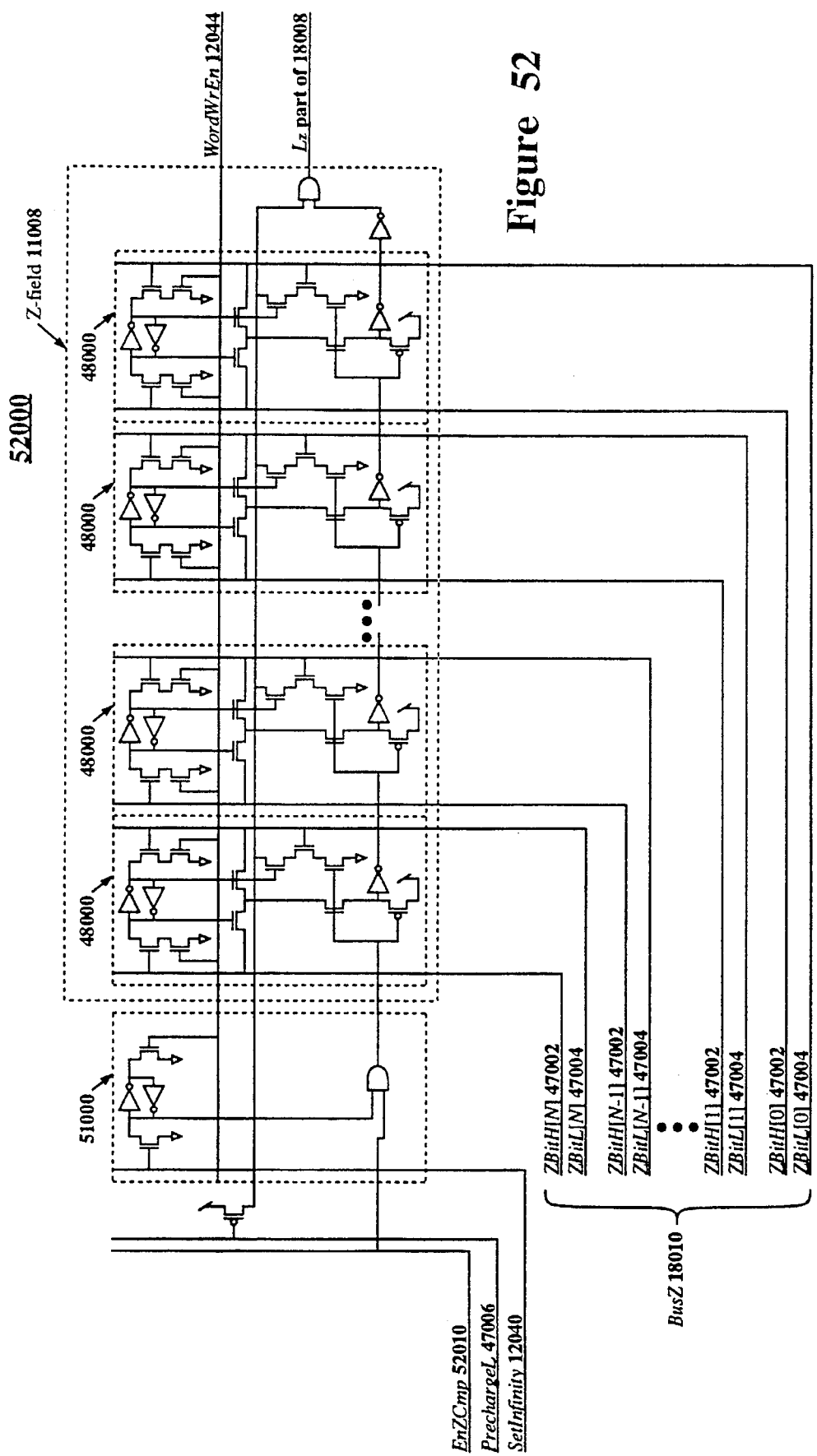

FIG. 52 shows a Z-field 11008 and associated Infinity Flag Bit Circuit 51000. Input data is placed on BusZ 18010, and if a comparison operation is to take place, the signal, EnZCmp 52010, is asserted after PrechargeL 47006 is pulsed low (thereby precharging ZStdGtIncL48032). The Infinity Flag Bit Circuit 51000 is designed to be placed in the domino logic chain before the most significant bit of storage of the Z-field 11008, as shown in FIG. 52. This position prevents enabling of the entire Z-field 11008 comparison when InfinityFlg 12018 is asserted. The assertion of InfinityFlg 12018 also causes ZStdGtIncL 48032 to be discharged, indicating the stored z-value is greater than the incoming value on BusZ 18010 (which must be true if the stored value is infinity). Since BusZ 18010 provides data to all Z-fields 11008, appropriate bus driver circuitry is needed.

A Z-field 11008 can be used to store and compare negative numbers provided the sign bit is inverted (1=positive and 0=negative), thereby making the representation of positive numbers greater than the representation of negative numbers. The Z-field 11008 can also store and compare floating-point numbers, as long as the exponent bits are in a more significant location than the mantissa bits. This is the case for IEEE standard floating point representation.

Since the values in all the X-fields 11004 and Y-fields 11006 are fixed during normal operational mode, modifiable bit storage is generally not needed. Hence, two types of bit circuits are needed: one for comparing to a "stored" value of "one"; and one for comparing to a "stored" value of "zero". Two circuits 53000 for each are shown in FIG. 53. FIG. 53A is a gate-level circuit for XYBitCircuit1 53002, which stores a logical "one" for comparison purposes. FIG. 53B is a gate-level circuit for XYBitCircuit0 53004, which stores a logical "zero" for comparison purposes. FIG. 53C is a CMOS transistor circuit for XYBitCircuit1 53002, which stores a logical "one" for comparison purposes. FIG. 53D is a CMOS transistor circuit for XYBitCircuit0 53004, which stores a logical "zero" for comparison purposes. These bit circuits 53002, 53004 are then cascaded together in various combinations so as to have one (x-value, y-value) pair for every pixel (or Cell, if used). The signals, XYEnableIn 53020, XYEnableOut 53022, and XYStdGtIncL 53024, are identical in operation to the signals EnableIn 47032, EnableOut 47032, and ZStdGtIncL 48032. The signals, XYBitH 53012 and XYBitL 53014, are the differential data input lines.

In contrast, the Duluk Patent provides writing of all fields within a word. This introduces a problem in assigning particular pixel locations to specific words. If writable X-fields 11004 and Y-fields 11006 are included, there must also be a mechanism for disabling the overwriting of the X-fields 11004 and Y-fields 11006, as they remain fixed during normal MCCAM Z-buffer 11000, 23000, or 39000 operations.

Figure 54:
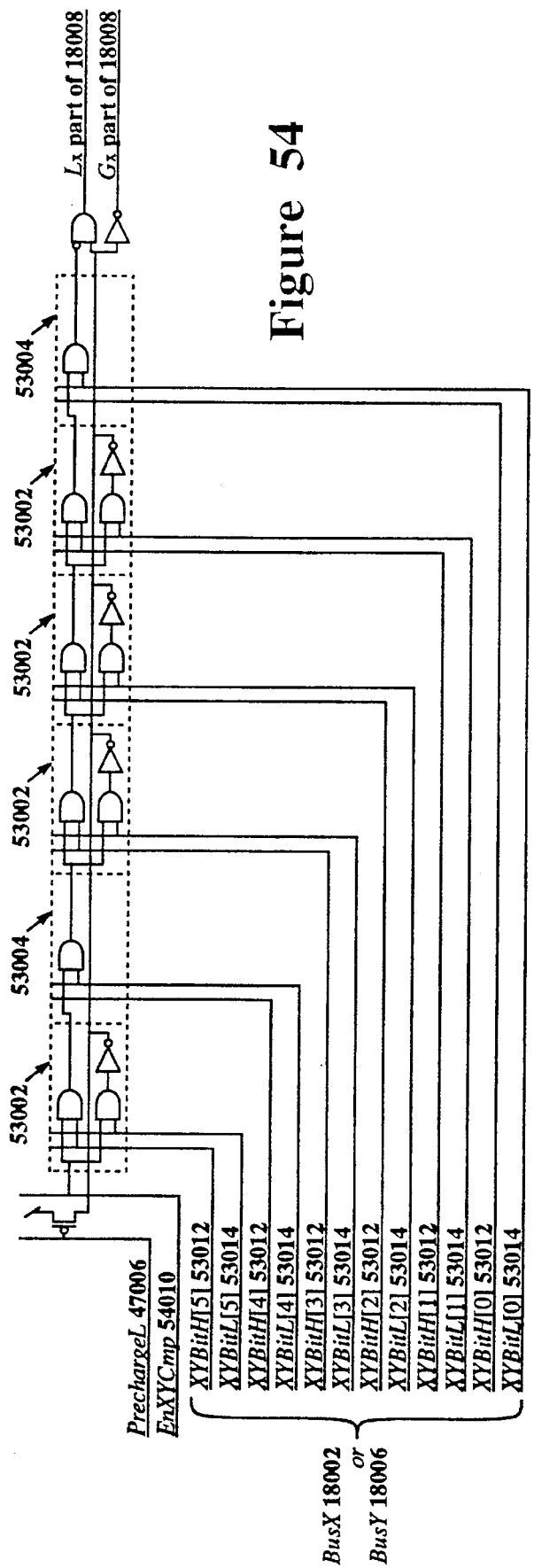

As an example, FIG. 54 shows a circuit 54000 for a six-bit X-field 11004 (or a Y-field 11006) which stores and compares to the value "101110", which is binary for 46. Here, four XYBitCircuit1 53002 bit circuits and two XYBitCircuit 053004 bit circuits are combined to make one particular X-field 11004.

Since MCCAM Words 12000, 13000, 18000, 24000, or 41000 within the same VLSI circuit are physically located adjacent to one another in row-by-row order, additional circuit economies can be achieved. MCCAM Words 12000, 13000, 18000, 24000, or 41000 which represent pixels (or Cells) with the same y-value are adjacent, and can therefore share the same Y-field 11006. Hence, the total number of Y-fields 11006 is equal to the number of row of pixels (or Cells). Similarly, the portion of Comparison Register Bits representing storing y-value comparisons can be shared.

Figure 55:
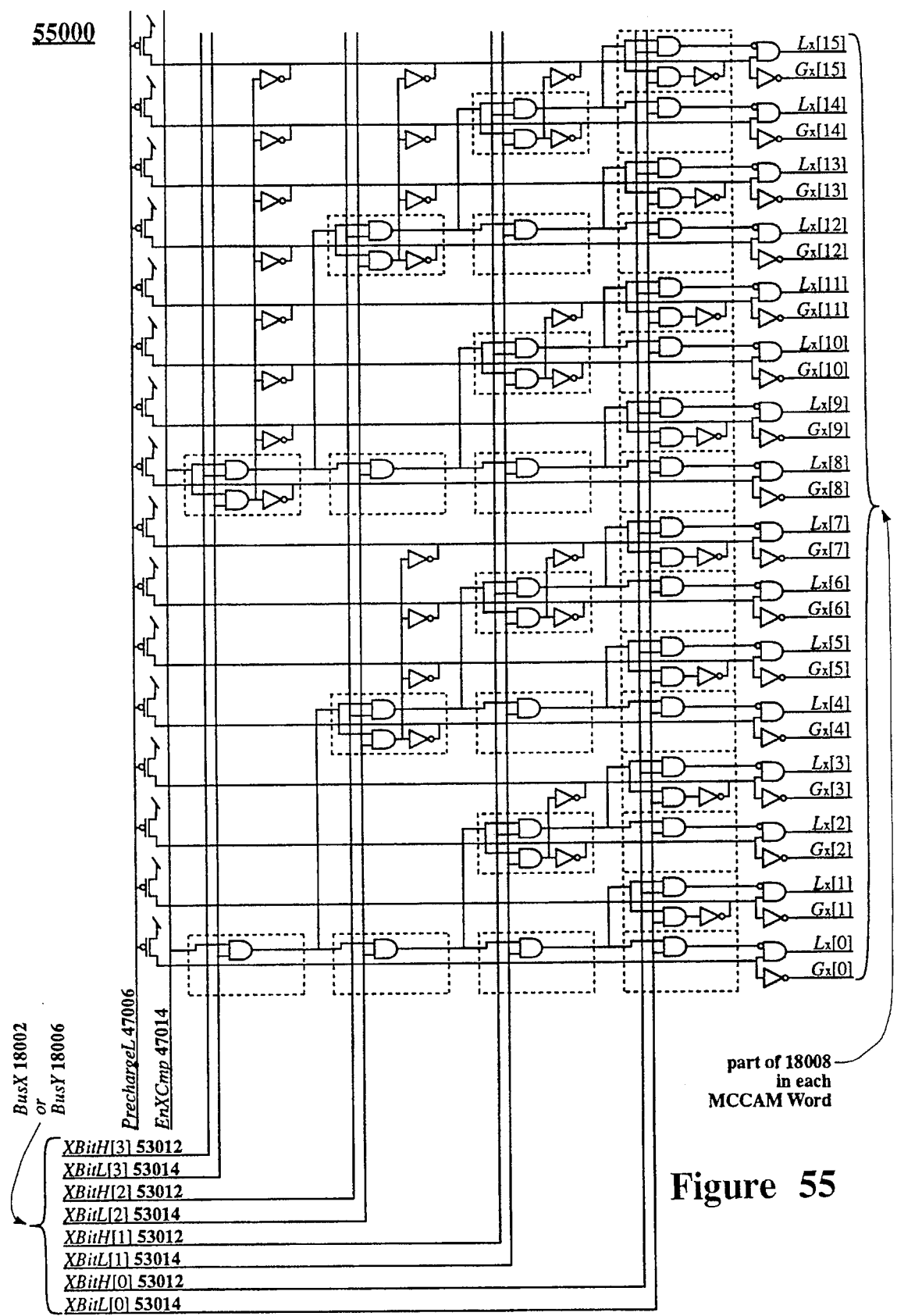

Another economy can be achieved by realizing X-fields 11004 with the identical leading bits can share the circuits for these leading bits. Since this can be done for every bit position, a tree structure can be used to perform the same function as a set of independent X-fields 11004. FIG. 55 is such a tree structure circuit 55000 for a set of sixteen X-fields 11004, which correspond to sixteen MCCAM Words 12000, 13000, 18000, 24000, or 41000.

Figure 56:
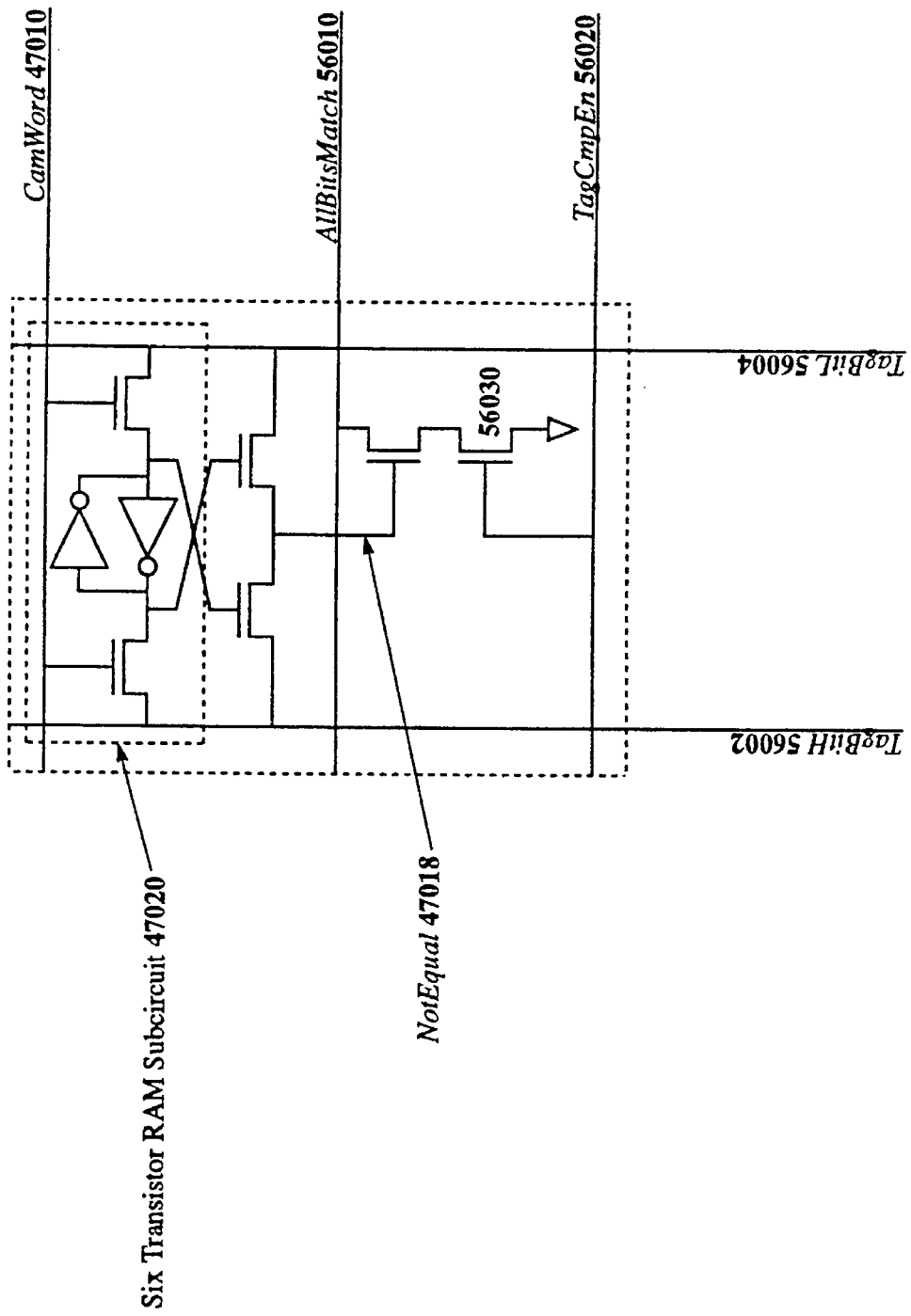

FIG. 56 shows a prior art CAM Bit Circuit 56000, which can perform a bit-for-bit equality comparison, but not arithmetic magnitude comparisons. Since magnitude comparisons are not performed on Tags, this bit circuit 56000 can store one Tag bit, but only if Raster Write operations are not allowed. A Tag bit is input or output on the differential bit lines, TagBitH 56002 and TagBitL 56004. Comparisons are done by first precharging AllBitsEqual 56010 to a high state, Driving TagBitH 56002 and TagBitL 56004 with the input data value, and then enabling the bit-for-bit comparison by asserting TagCmpEn 56020.

Figure 57:
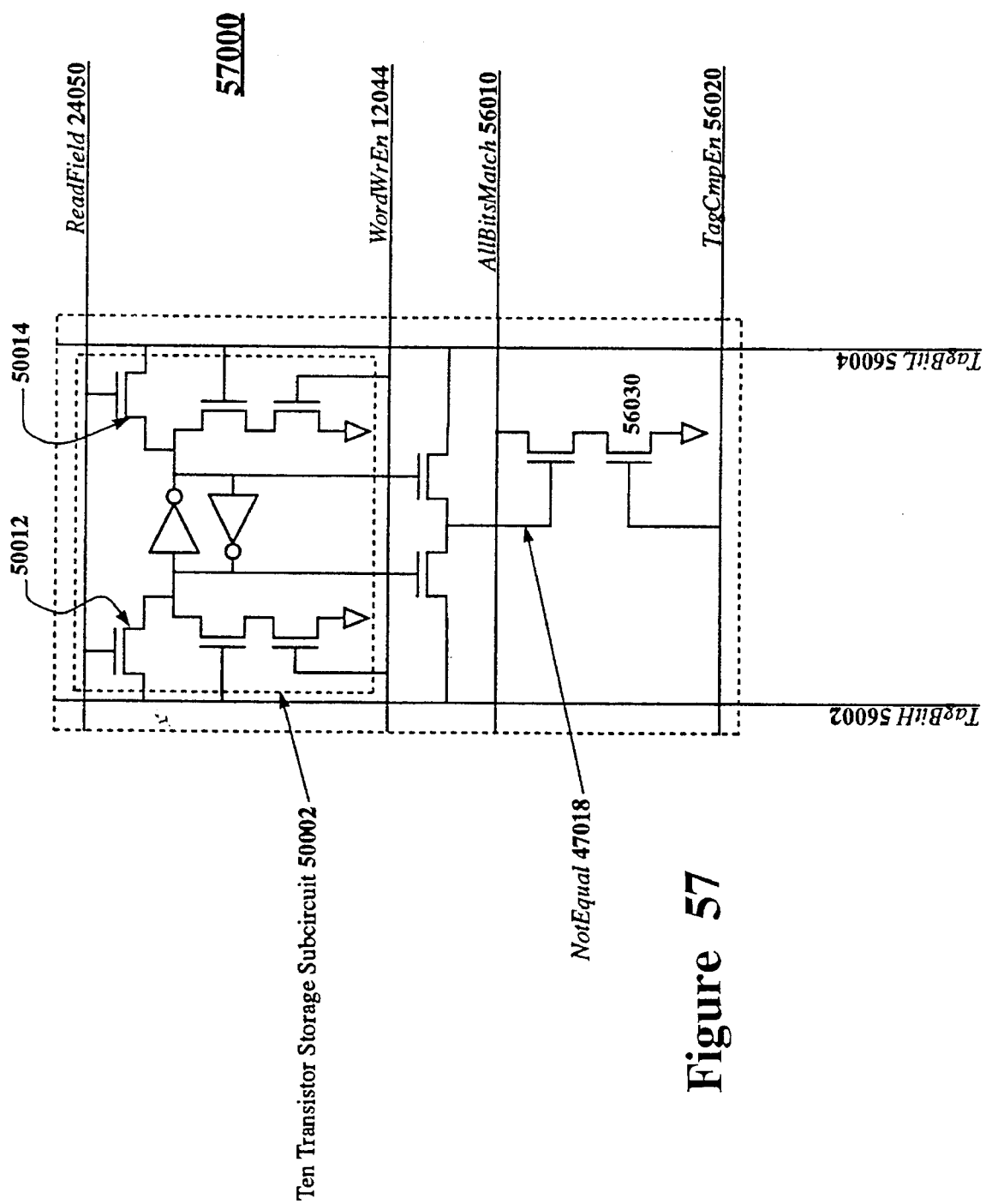

FIG. 57 shows the Tag Bit Circuit 57000, which can perform both Raster Write operations and read operations. Read operations are possible by the addition of two pass transistors 49002, 49004 which are enabled by ReadField 24050. Thus, this circuit 57000 performs read and write operations the same way MCCAM Bit Circuit C 49000 does.

Figure 58:
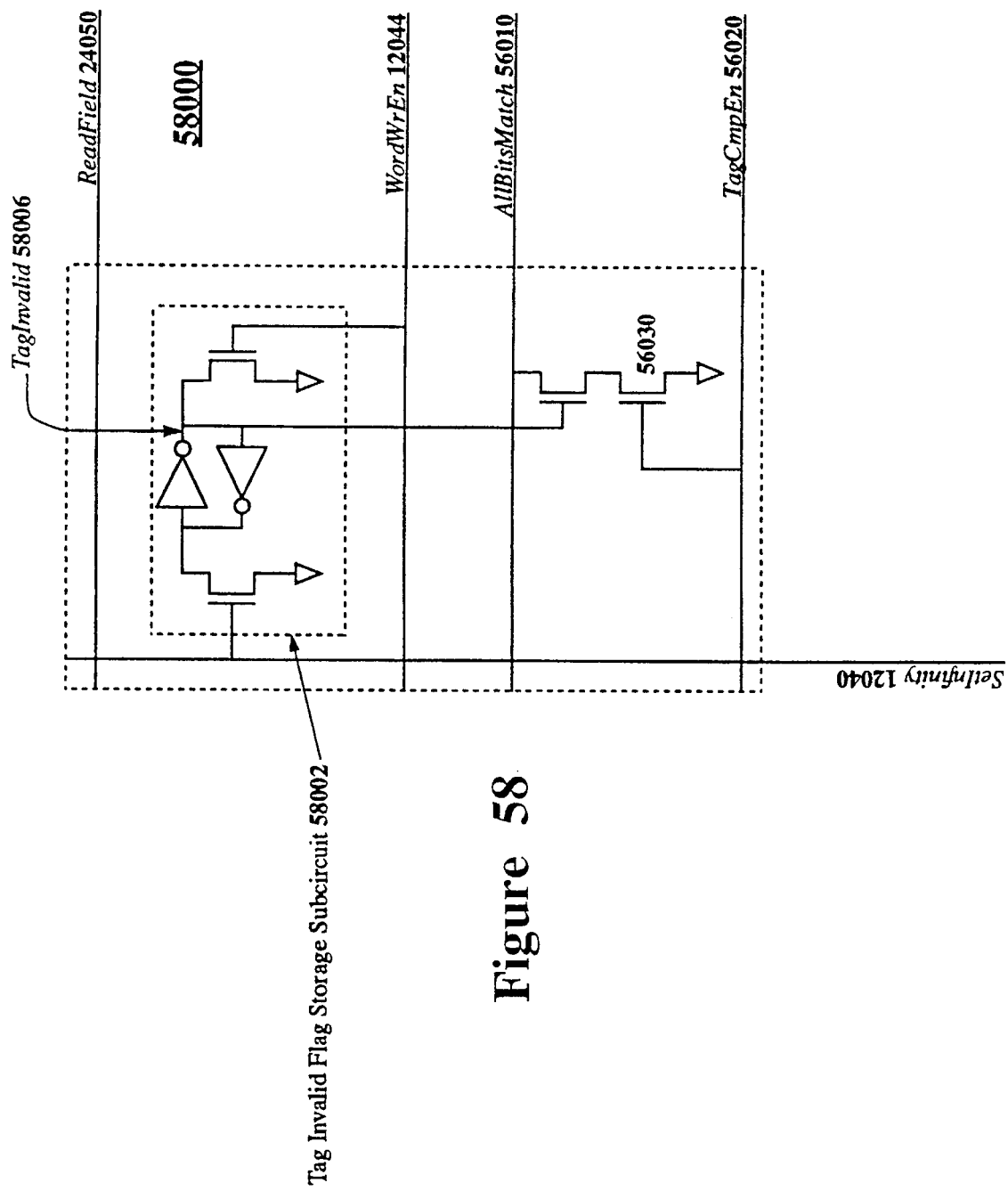

FIG. 58 shows a Tag Invalid Bit Circuit 58000, which is used within a Tag-field to indicate it is not storing a valid Tag. The value, TagInvalid 58006 is stored in the Tag Invalid Flag Storage Subcircuit 58002, and is set by SetInfinity 12040 and cleared when the Tag MCCAM Word 41000 is written, done by asserting WordWrEn 12044.

Figure 59:
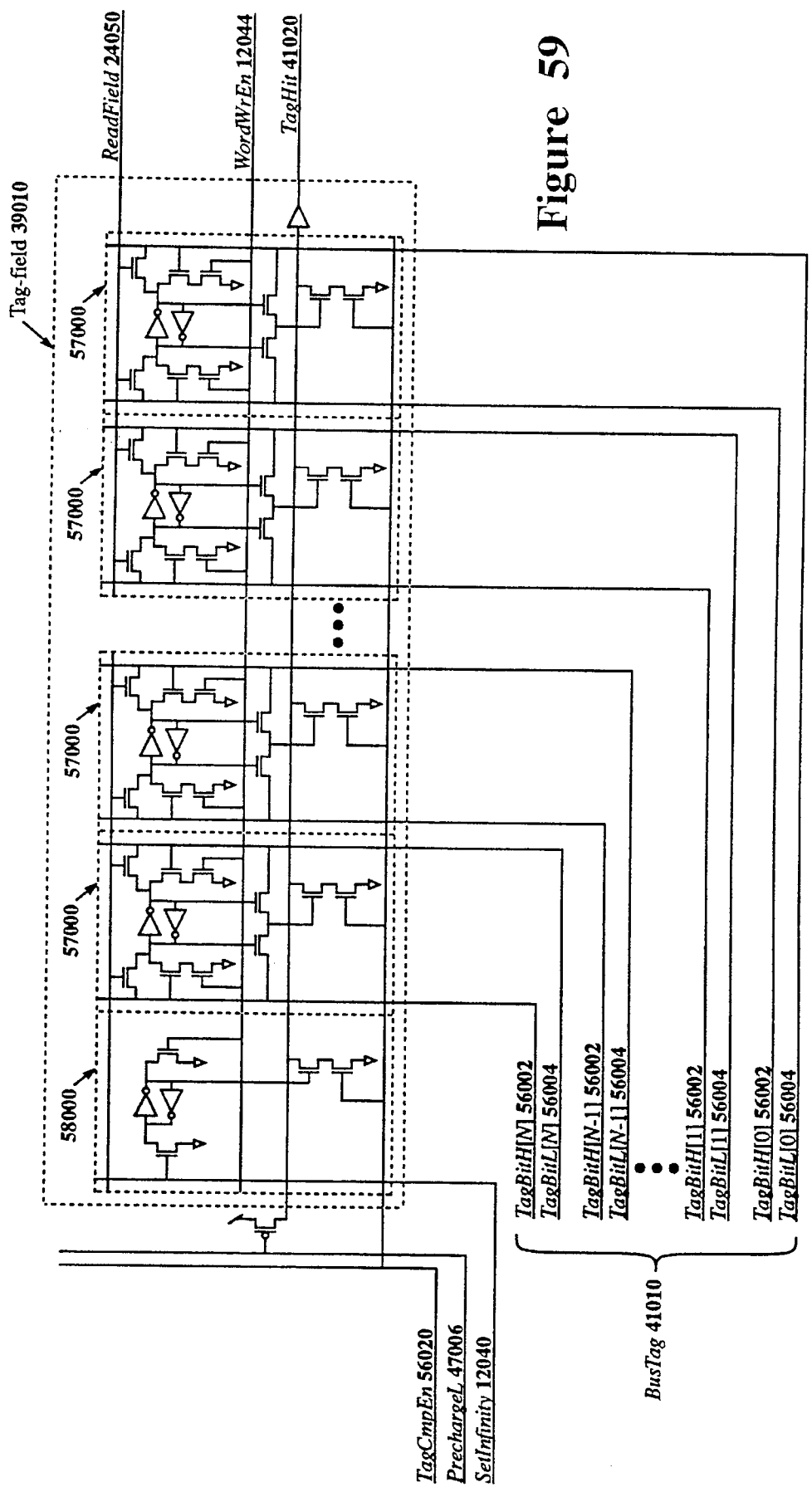

FIG. 59 shows a Tag-field 39010 composed of a Tag Invalid Bit Circuit 58000 and a multiplicity of the Tag B it Circuit 57000. When a Tag value is input for comparison on BusTag 41010, and some bit positions within the Tag value must not affect the comparison results (i.e., they are masked), then both TagBitH 56002 and TagBitL 56004 are driven low for those bit positions.

Tag-fields 39010 can be included in a separate VLSI circuit from the Z-fields 11008, but this would require duplication of circuitry, including the X-fields 11004 and Y-fields 11006.

Descriptions of the Method Pseudocode Appendices

Appendix 1: PriorArtZBuffer

This is pseudocode for the prior art Z-buffer method, slightly modified from that found in the Foley Reference.

Appendix 2: Global const, type, and var definitions

This pseudocode defines constants, data types, and global variables which are used in subsequent method pseudocode.

Appendix 3: BoundingBoxZBuffer

Method pseudocode "BoundingBoxZBuffer" compares the closest point (that is, minimum z-value) of a graphics primitive to all MCCAM Z-buffer 11000, 23000, or 39000 values within the projected bounding box of the graphics primitive by using the BBOT 9000. This comparison identifies graphics primitives which pass the BBOT 9000 and are thus occulted by previously rendered graphics primitives. Graphics primitives which fail the BBOT 9000 are rasterized pixel-by-pixel utilizing each pixel's z-value to determine if it's color value should overwrite the previous color value.

Appendix 4: BoundingBoxZBufferInfinity

Method pseudocode "BoundingBoxZBufferInfinity" adds an Infinity Flag 11010 to each pixel, which designates the z-value of the pixel to be infinitely distant from the viewing point. All Infinity Flags 11010 are set to true before a scene is rendered. This initializes the Z-buffer without writing the maximum z-value to every pixel's z-value.

Appendix 5: BoundingBoxZBufferRasterWrite

In method pseudocode "BoundingBoxZBufferRasterWrite", the Raster Write operation is used to store approximate z-values into the MCCAM Z-buffer 11000, 23000, or 39000. The span interpolation 1008, A5034 step uses a conventional Z-buffer 2008 to store exact z-values.

Appendix 6: RenderSceneRecursive

Method pseudocode "RenderSceneRecursive" renders a scene of hierarchically organized objects, where the depth of subobjects can be arbitrarily deep because of the recursive nature of the method pseudocode RenderObjectRecursive A6011. The Bounding Box Occulting Test is performed by method pseudocode "BoundingBoxZBufferTest" on entire objects and subobjects in addition to graphics primitives.

Appendix 7: BoundingBoxZBufferVertex

Method pseudocode "BoundingBoxZBufferVertex" operates on polygon meshes. For each pixel in the display screen 100, the method generates and temporarily stores Comparison Results 18008 for each vertex. If the most recent vertex completes a polygon, then, for each pixel, the temporarily stored Comparison Results 18008 are used by the VBBOT 22000 to determine if the bounding box of the polygon completed by the most recent vertex is occulted. If the bounding box is not occulted, approximate z-values are written into the MCCAM Z-buffer 11000, 23000, or 39000 using Raster Write operations. The polygon is then rendered pixel-by-pixel utilizing each pixel's exact z-value to determine if it's color value should overwrite the previous color value.

Appendix 8: BoundingBoxZBufferVertexPixelHits

Method pseudocode "BoundingBoxZBufferVertexPixelHits" uses the VBBOT 22000 to operate on polygon meshes and uses Hit Hags to mark pixels which might not be occulted. Hit Flags are then used to find these candidate pixels, which are then rendered by utilizing each pixel's z-value to determine if it's color value should overwrite the previous color value.

Appendix 9: BoundingBoxZBufferVertexSegmentHits

Method pseudocode "BoundingBoxZBufferVertexSegmentHits" uses the VBBOT 22000 to operate on polygon meshes and find Segment Hits. The method marks the Start Pixel Hit and End Pixel Hit of each Segment Hit along each raster line where a polygon may not be occulted. Pixels within each Segment Hit are rendered pixel-by-pixel utilizing each pixel's z-value to determine if it's color value should overwrite the previous color value.

Appendix 10: BoundingBoxZBufferVertexRasterHits

Method pseudocode "BoundingBoxZBufferVertexRasterHits" uses the VBBOT 22000 to operate on polygon meshes and find Raster Hits. The method marks y coordinate along each raster where a polygon may not be occulted. Approximate z-values are written into the MCCAM Z-buffer 11000, 23000, or 39000 using Raster Write operations. Raster Hits are then rendered pixel-by-pixel utilizing each pixel's exact z-value to determine if it's color value should overwrite the previous color value.

Appendix 11: BoundingBoxZWithDualOccultingTest

Method pseudocode "BoundingBoxZWithDualOccultingTest" operates on polygon meshes using the VBBOT 22000 to determine if each polygon is occulted. If a polygon fails the VBBOT 22000, each span within the polygon is processed using the Raster Write Span Occulting Test 30000. Spans which fail the RWSOT 30000 have their z-values in the Z-buffer 11000, 23000, or 39000 using Raster Write updated by a Raster Write operation.

Appendix 12: BoundingBoxZWithDualOccultingTestAndSpanFifo

Method pseudocode "BoundingBoxZWithDualOccultingTestAndSpanFifo" processes polygon meshes and spans in the same manner as the method in Appendix 11 except with the addition of the Span FIFO 33003. The Span FIFO 33003 allows the VBBOT 22000 and RWSOT 30000 to be located in a separate process from span interpolation 9000, A12050. This means the "while" statements A12006 and A12021 are both continuously looping at the same time. In fact, these to loops A12006 and A12021 maybe working an different objects in the scene.

Appendix 13: BoundingBoxZWithDualOccultingTestAndBlockSpanFifo

Method pseudocode "BoundingBoxZWithDualOccultingTestAndBlockSpanFifo" processes polygon meshes and spans in the same manner as the method in Appendix 12 except the display screen 100 is divided into Blocks.

Appendix 14: BlockVertexComparisons

Method pseudocode "BlockVertexComparisons" generates Comparison Results 18008 for a display screen 100 that is divided into Blocks.

Appendix 15: RenderSequenceWithTags

Method pseudocode "RenderSequenceWithTags" renders a sequence of scenes, each scene with multiple hierarchical objects. As objects are rendered, each object's Tag, or identification number, is stored in each pixel it effects. When subsequent scenes are to be rendered, if there is enough temporal coherency, the Tags of visible objects are read into a Visible Object List. The objects in this list are rendered first, resulting in a partially rendered scene where most of the visible surfaces have been rendered, and most of the yet-to-be-rendered objects are occulted. Before these yet-to-be-rendered objects are rendered, they are subjected to the VBBOT 22000 and RWSOT 30000, thereby eliminating most from the rest of the rendering work for these objects.

Appendix 16: BoundingBoxZBufferWithDualOccultingTestTags

Method pseudocode "BoundingBoxZBufferWithDualOccultingTestTags" uses the VBBOT 22000, RWSOT 30000, and Span FIFO 33003 as they are used in Appendix 11, except with the addition of Tags. As a polygon is rasterized, the polygon's Tag (or object's Tag) is stored in the MCCAM Z-buffer 11000, 23000, or 39000 where it is used to take advantage of temporal coherence in a sequence of scenes.

- 68 -

Appendix 1

Prior Art

```
A1000  procedure PriorArtZBuffer ( ); {prior art}
A1001  var x, y, pz : integer;
A1002  begin
A1003  |  FrameBufferInit ( ); {A1015}
A1004  |  ZBufferInit ( ); {A1022}
A1005  |  for each polygon do
A1006  |    for each pixel in polygon's projection with coordinates (x,y) do
A1007  |      begin
A1008  |      |  pz := polygon's z-value at pixel coords (x, y);
A1009  |      |  if pz <= ReadZ (x, y) then  {A1029}
A1010  |      |    begin {New point is not farther}
A1011  |      |    |  WritePixelBuffers (geometry, x, y, pz); {A1043}
A1012  |      |    end
A1013  |      end
A1014  end;

A1015  procedure FrameBufferInit ( );
A1016  var x, y : integer;
A1017  begin
A1018  |  for y := 0 to YMAX do
A1019  |    for x := 0 to XMAX do
A1020  |      WritePixel (x, y, BACKGROUND_VALUE); {A1037}
A1021  end;

A1022  procedure ZBufferInit ( );
A1023  var x, y : integer;
A1024  begin
A1025  |  for y := 0 to YMAX do
A1026  |    for x := 0 to XMAX do
A1027  |      WriteZ (x, y, ZMAX); {A1033}
A1028  end;

A1029  function ReadZ (x, y, pz: integer) : integer;
A1030  begin
A1031  |  ReadZ := ZBuffer[x][y];
A1032  end;

A1033  procedure WriteZ (x, y: integer);
A1034  begin
A1035  |  ZBuffer[x][y] := pz;
A1036  end;

A1037  procedure WritePixel (x, y: integer;  color : PixelColor;);
A1038  begin
A1039  |  FrameBuffer[x][y][red] := color[red];
A1040  |  FrameBuffer[x][y][blue] := color[blue];
A1041  |  FrameBuffer[x][y][green] := color[green];
A1042  end;

A1043  procedure WritePixelBuffers (geometry : geotype; x, y, pz : integer);
A1044  begin
A1045  |  WriteZ (x, y, pz); {A1033}
A1046  |  WritePixel (x, y, geometry's color at pixel coords (x, y) ); {A1037}
A1047  end;
```

A-59034 / JAS / MSR

- 69 -

Appendix 2

```
A2000   const
A2001     RMAX = maximum index of vertices needed for rendering current or future polygons;
A2002     XMAX = max x index of pixels in either the display screen or block, or cells in a block;
A2003     YMAX = max y index of pixels in either the display screen or block, or cells in a block;
A2004     XPIXELMAX = maximum x index of pixels within a cell;
A2005     YPIXELMAX = maximum y index of pixels within a cell;
A2006     XCELLMAX = maximum x index of cells within a block;
A2007     YCELLMAX = maximum y index of cells within a block;
A2008     XBLKMAX = maximum x index of blocks within the display screen;
A2009     YBLKMAX = maximum y index of blocks within the display screen;
A2010     XCELLSIZE = XMAX + 1 ; {pixels per cell in the x dimension}
A2011     YCELLSIZE = YMAX + 1 ; {pixels per cell in the y dimension}
A2012     XBLKSIZE = XMAX + 1 ; {pixels per block in the x dimension, assuming cells are not used}
A2013     YBLKSIZE = YMAX + 1 ; {pixels per block in the y dimension, assuming cells are not used}
A2014     XBLKCELLSIZE = XCELLMAX + 1 ; {cells per block in the x dimension}
A2015     YBLKCELLSIZE = YCELLMAX + 1 ; {cells per block in the y dimension}
A2016     XBLKPIXELSIZE = XBLKCELLSIZE * XCELLSIZE ; {x dimension pixels per block, assuming cells}
A2017     YBLKPIXELSIZE = YBLKCELLSIZE * YCELLSIZE ; {y dimension pixels per block, assuming cells}
A2018     XMAXTOTAL = total pixels in display screen; {total in the x dimension, regardless of organization}
A2019     YMAXTOTAL = total pixels in display screen ; {total in the y dimension, regardless of organization}
A2020   type
A2021     StartEndType = (START, END);
A2022     CoordinateType = (xcoord, ycoord, zcoord);
A2023     ObjectType = pointer to scene, object, or subobject;
A2024     CompareType = (Lx, Gx, Ly, Gy, Lz);
A2025     VertexArray = array [CoordinateType] of integer;
A2026     FrameBufferArray = array [StartEndType][0..XMAXTOTAL][0..YMAXTOTAL] of boolean;
A2027     ZBufferArray = array [0..XMAX][0..YMAX] of integer;
A2028     ComparisonRegisterArray = array [0..RMAX][CompareType][0..XMAX][0..YMAX] of boolean;
A2029     FlagArray = array [0..XMAX][0..YMAX] of boolean;
A2030     SegmentHitArray = array [StartEndType][0..XMAX][0..YMAX] of boolean;
A2031     RasterHitArray = array [0..YMAX] of boolean;
A2032     BlockZBufferArray = array [0..XBLKMAX][0..YBLKMAX][0..XMAX][0..YMAX] of integer;
A2033     BlockComparisonRegisterArray =
A2034           array [0..XBLKMAX][0..YBLKMAX][0..RMAX][CompareType][0..XMAX][0..YMAX] of boolean;
A2035     BlockFlagArray = array [0..XBLKMAX][0..YBLKMAX][0..XMAX][0..YMAX] of boolean;
A2036     BlockSegmentHitArray =
A2037           array [StartEndType][0..XBLKMAX][0..YBLKMAX][0..XMAX][0..YMAX] of boolean;
A2038   var
A2039     ZBuffer : ZBufferArray;
A2040     MccamZBuffer : ZBufferArray;
A2041     R : ComparisonRegisterArray;
A2042     MccamZInfinity : FlagArray;
A2043     PixelHit : FlagArray;
A2044     SegmentHit : SegmentHitArray;
A2045     RasterHit : RasterHitArray;
A2046     BlockMccamZBuffer : BlockZBufferArray;
A2047     BlockR : BlockComparisonRegisterArray;
A2048     BlockMccamZInfinity : BlockFlagArray;
```

A-59034 / JAS / MSR

Appendix 3

```
A3000  procedure BoundingBoxZBuffer ( );
A3001  var x, y, pz, xmin, xmax, ymin, ymax, zmin, zmax : integer; occulted : boolean;
A3002  begin
A3003  |  FrameBufferInit ( ); {A1015}
A3004  |  for each piece of geometry do
A3005  |    begin
A3006  |    |  MakeBoundingBox (geometry, xmin, xmax, ymin, ymax, zmin, zmax); {A3011}
A3007  |    |  occulted := BoundingBoxOccultingTest (xmin, xmax, ymin, ymax, zmin); {9000, A3020}
A3008  |    |  if occulted = false then RasterizeGeometry (geometry); {A3032}
A3009  |    end
A3010  end;

A3011  procedure MakeBoundingBox (geometry : geotype; var xmin, xmax, ymin, ymax, zmin, zmax : integer );
A3012  begin
A3013  |  xmin := MinOf (x coords of the geometry's vertices, extents, or bounds);
A3014  |  xmax := MaxOf (x coords of the geometry's vertices, extents, or bounds);
A3015  |  ymin := MinOf (y coords of the geometry's vertices, extents, or bounds);
A3016  |  ymax := MaxOf (y coords of the geometry's vertices, extents, or bounds);
A3017  |  zmin := MinOf (z coords of the geometry's vertices, extents, or bounds);
A3018  |  zmax := MaxOf (z coords of the geometry's vertices, extents, or bounds);
A3019  end;

A3020  function BoundingBoxOccultingTest (xmin, xmax, ymin, ymax, zmin : integer) : boolean; {9000}
A3021  var x, y : integer; occulted : boolean;
A3022  begin
A3023  |  occulted := true;
A3024  |  for y := 0 to YMAX do
A3025  |    for x := 0 to XMAX do
A3026  |      if x >= xmin and x <= xmax then
A3027  |        if y >= ymin and y <= ymax then
A3028  |          if zmin <= ReadMccamZ (x, y) then {A3044}
A3029  |            occulted := false;
A3030  |  BoundingBoxOccultingTest := occulted;
A3031  end;

A3032  procedure RasterizeGeometry (geometry : geotype);
A3033  begin
A3034  |  for each pixel in geometry's projection with coordinates (x,y) do
A3035  |    begin
A3036  |    |  pz := geometry's z-value at pixel coords (x, y);
A3037  |    |  if pz <= ReadMccamZ (x, y) then {A3044}
A3038  |    |    begin {New point is not farther}
A3039  |    |    |  WriteMccamZ (x, y, pz); {A3048}
A3040  |    |    |  WritePixel (x, y, geometry's color at pixel coords (x, y) ); {A1037}
A3041  |    |    end
A3042  |    end
A3043  end;

A3044  function ReadMccamZ ( x, y, pz: integer) : integer;
A3045  begin
A3046  |  ReadMccamZ := MccamZBuffer[x][y];
A3047  end;

A3048  procedure WriteMccamZ ( x, y: integer);
A3049  begin
A3050  |  MccamZBuffer[x][y] := pz;
A3051  end;
```

Appendix 4

```
A4000   procedure BoundingBoxZBufferInfinity ( );
A4001   var xmin, xmax, ymin, ymax, zmin, zmax : integer; occulted : boolean;
A4002   begin
A4003   |   FrameBufferInit ( ); {A1015}
A4004   |   MccamZBufferInit ( ); {A4012}
A4005   |   for each piece of geometry do
A4006   |     begin
A4007   |     |   MakeBoundingBox (geometry, xmin, xmax, ymin, ymax, zmin, zmax); {A3011}
A4008   |     |   occulted := BoundingBoxOccultingTestInfinity (xmin, xmax, ymin, ymax, zmin); {A4019}
A4009   |     |   if occulted = false then RasterizeGeometryInfinity (geometry); {A4032}
A4010   |     end
A4011   end;

A4012   procedure MccamZBufferInit ( );
A4013   var x, y : integer;
A4014   begin
A4015   |   for y := 0 to YMAX do
A4016   |     for x := 0 to XMAX do
A4017   |       MccamZInfinity[x][y] := true;
A4018   end;

A4019   function BoundingBoxOccultingTestInfinity (xmin, xmax, ymin, ymax, zmin : integer) : boolean;
A4020     {9000 plus Infinity Flag 11010}
A4021   var x, y : integer;
A4022   begin
A4023   |   occulted := true;
A4024   |   for y := 0 to YMAX do
A4025   |     for x := 0 to XMAX do
A4026   |       if x >= xmin and x <= xmax then
A4027   |         if y >= ymin and y <= ymax then
A4028   |           if zmin <= ReadMccamZ (x, y) or MccamZInfinity[x][y] then {A3044}
A4029   |             occulted := false;
A4030   |   BoundingBoxOccultingTestInfinity := occulted;
A4031   end;

A4032   procedure RasterizeGeometryInfinity (geometry : geotype);
A4033   var x, y, pz : integer;
A4034   begin
A4035   |   for each pixel in geometry's projection with coordinates (x,y) do
A4036   |     begin
A4037   |     |   pz := geometry's z-value at pixel coords (x, y);
A4038   |     |   if pz <= ReadMccamZ (x, y) or MccamZInfinity[x][y] then {A3044}
A4039   |     |     WriteMccamPixelBuffers (geometry, x, y, pz); {A4042}
A4040   |     end
A4041   end;

A4042   procedure WriteMccamPixelBuffers (geometry : geotype; x, y, pz : integer);
A4043   begin
A4044   |   WriteMccamZ (x, y, pz); {A3048}
A4045   |   MccamZInfinity[x][y] := false;
A4046   |   WritePixel (x, y, geometry's color at pixel coords (x, y) ); {A1037}
A4047   end;
```

Appendix 5

```
A5000   procedure BoundingBoxZBufferRasterWrite ( );
A5001   var xmin, xmax, ymin, ymax, zmin, zmax : integer; occulted : boolean;
A5002   begin
A5003   |  FrameBufferInit ( ); {A1015}
A5004   |  ZBufferInit ( ); {A1022}
A5005   |  MccamZBufferInit ( ); {A4012}
A5006   |  for each piece of geometry do
A5007   |    begin
A5008   |    |  MakeBoundingBox (geometry, xmin, xmax, ymin, ymax, zmin, zmax); {A3011}
A5009   |    |  occulted := BoundingBoxOccultingTestInfinity (xmin, xmax, ymin, ymax, zmin); {A4019}
A5010   |    |  if occulted = false then RasterizeGeometryWithRasterWrite (geometry); {A5013}
A5011   |    end
A5012   end;

A5013   procedure RasterizeGeometryWithRasterWrite (geometry : geotype);
A5014   var x, y, pz : integer;
A5015   begin
A5016   |  SetUpIncrRender (geometry); {1004}
A5017   |  while more spans in geometry are left do
A5018   |    begin
A5019   |    |  GetSpanByEdgeWalk (geometry, xstart, xend, yspan, zstart, zend); {1006}
A5020   |    |  spanzmax := MaxOf (z coords of the geometry's vertices, extents, or bounds within the span);
A5021   |    |  RasterWriteMccamZ (xstart, xend, yspan, spanzmax); {A5025}
A5022   |    |  SpanInterpolate (geometry, xstart, xend, yspan, zstart, zend); {1008, A5034}
A5023   |    end
A5024   end;

A5025   procedure RasterWriteMccamZ (xstart, xend, yspan, spanzmax : integer);
A5026   var x, y, pz : integer;
A5027   begin
A5028   |  for x := xstart to xend do
A5029   |    begin
A5030   |    |  pz := ReadMccamZ (x, yspan); {A3044}
A5031   |    |  if spanzmax < pz or MccamZInfinity[x][y] then WriteMccamZ (x, yspan, spanzmax); {A3048}
A5032   |    end
A5033   end;

A5034   procedure SpanInterpolate (geometry : geotype; xstart, xend, yspan, zstart, zend : integer); {1008}
A5035   var x, y, pz : integer;
A5036   begin
A5037   |  for x := xstart to xend do
A5038   |    begin
A5039   |    |  pz := geometry's z-value at pixel coords (x, yspan);
A5040   |    |  if pz <= ReadZ (x, y) or MccamZInfinity[x][y] then
A5041   |    |    WritePixelBuffers (geometry, x, y, pz);
A5042   |    end
A5043   end;
```

A-59034 / JAS / MSR

Appendix 6

```
A6000  procedure RenderScene (scene : ObjectType); {15000 with recursion added}
A6001  var object : ObjectType;
A6002  begin
A6003  |  FrameBufferInit ( ); {A1015}
A6004  |  MccamZBufferInit ( ); {A4012}
A6005  |  while there are more objects to render do
A6006  |    begin
A6007  |    |  GetTranslatedObject (scene, object); {get an object within scene}
A6008  |    |  RenderObjectRecursive (object); {A6011}
A6009  |    end
A6010  end;

A6011  procedure RenderObjectRecursive (object : ObjectType );
A6012  var
A6013    occulted : boolean;
A6014    subobject : ObjectType;
A6015    vrtx0, vrtx1 : VertexType;
A6016  begin
A6017  |  MakeBoundingBoxVertices (object, vrtx0, vrtx1); {A6035}
A6018  |  if bounding box has any portion within the viewvolume then
A6019  |    begin
A6020  |    |  VertexComparisons (0, vrtx0[xcoord], vrtx0[ycoord], vrtx0[zcoord]); {A6044}
A6021  |    |  VertexComparisons (1, vrtx1[xcoord], vrtx1[ycoord], vrtx1[zcoord]); {A6044}
A6022  |    |  occulted := VertexBoundingBoxOccultingTest ( ); {A7029}
A6023  |    |  if occulted = false then
A6024  |    |    if this level of object contains subobjects then
A6025  |    |      while there are more subobjects in the object do
A6026  |    |        begin
A6027  |    |        |  GetTranslatedObject (object, subobject); {get subobject within object}
A6028  |    |        |  RenderObjectRecursive (subobject); {A6011}
A6029  |    |        end
A6030  |    |    else do
A6031  |    |      if this level of the object contains renderable primitives then
A6032  |    |        BoundingBoxZBufferVertex (object); {A7000, or : A8000, A9000, A10000, A11000, A12000}
A6033  |    end
A6034  end;

A6035  procedure MakeBoundingBoxVertices (object : ObjectType; var vrtx0, vrtx1 : VertexType);
A6036  begin
A6037  |  vrtx0[xcoord] := MinOf (x coords of all object's vertices, extents, or bounds);
A6038  |  vrtx1[xcoord] := MaxOf (x coords of all object's vertices, extents, or bounds);
A6039  |  vrtx0[ycoord] := MinOf (y coords of all object's vertices, extents, or bounds);
A6040  |  vrtx1[ycoord] := MaxOf (y coords of all object's vertices, extents, or bounds);
A6041  |  vrtx0[zcoord] := MinOf (z coords of all object's vertices, extents, or bounds);
A6042  |  vrtx1[zcoord] := MaxOf (z coords of all object's vertices, extents, or bounds);
A6043  end;

A6044  procedure VertexComparisons (r, vx, vy, vz : integer); {21000}
A6045  var x, y : integer;
A6046  begin
A6047  |  for y := 0 to YMAX do
A6048  |    for x := 0 to XMAX do
A6049  |      begin
A6050  |      |  R[r][Gx][x][y] := vx > x;
A6051  |      |  R[r][Lx][x][y] := vx < x;
A6052  |      |  R[r][Gy][x][y] := vy > y;
A6053  |      |  R[r][Ly][x][y] := vy < y;
A6054  |      |  R[r][Lz][x][y] := vz < ReadMccamZ (x, y) or MccamZInfinity[x][y]; {A3044}
A6055  |      end
A6056  end;
```

Appendix 7

```
A7000   procedure BoundingBoxZBufferVertex (object : ObjectType); {20000 using Raster Write}
A7001   var
A7002     r, x, y, pz : integer;
A7003     occulted, backfacing : boolean;
A7004     vertex : VertexType;
A7005   begin
A7006   | while there are more vertices within object do
A7007   |   begin
A7008   |   |   GetTranslatedVertex (object, vertex, vx, vy, vz);
A7009   |   |   r := ComparisonRegisterUsageDecision (vertex, object); {A7022 or A8022}
A7010   |   |   VertexComparisons (r, vx, vy, vz); {A6044}
A7011   |   |   if vertex completes a polygon then
A7012   |   |     begin
A7013   |   |     |  backfacing := DoBackfaceCullingTest (vertices in present polygon);
A7014   |   |     |  if not backfacing then
A7015   |   |     |    begin
A7016   |   |     |    |  occulted := VertexBoundingBoxOccultingTest ( ); {A7029}
A7017   |   |     |    |  if occulted = false then RasterizePolygonWithRasterWrite (polygon); {A7055}
A7018   |   |     |    end
A7019   |   |     end
A7020   |   end
A7021   end;

A7022   function ComparisonRegisterUsageDecision (vertex : VertexType; object : ObjectType) : boolean;
A7023   var r : integer;
A7024   begin
A7025   |  r := 0;
A7026   |  repeat r := r + 1 until (the contents of R, not needed by this or future polygons in this mesh);
A7027   |  ComparisonRegisterUsageDecision := r;
A7028   end;

A7029   function VertexBoundingBoxOccultingTest ( ) : boolean; {22000}
A7030   var
A7031     r, x, y : integer;
A7032     ProjectionMiss, PixelMiss, AllXGreater, AllXLesser, AllYGreater, AllYLesser, AnyZLesser : boolean;
A7033     occulted : boolean;
A7034   begin
A7035   |  occulted := true;
A7036   |  for y := 0 to YMAX do {done with parallel apparatus}
A7037   |    for x := 0 to XMAX do {done with parallel apparatus}
A7038   |      begin
A7039   |      |  AllXGreater := AllXLesser := AllYGreater := AllYLesser := true;
A7040   |      |  AnyZLesser := false;
A7041   |      |  for r := 0 to RMAX do {done with parallel search apparatus}
A7042   |      |    if vertex r is part of the polygon then {if R, is enabled by E,}
A7043   |      |      begin
A7044   |      |      |  AllXGreater := AllXGreater and R[r][Gx][x][y];
A7045   |      |      |  AllXLesser  := AllXLesser  and R[r][Lx][x][y];
A7046   |      |      |  AllYGreater := AllYGreater and R[r][Gy][x][y];
A7047   |      |      |  AllYLesser  := AllYLesser  and R[r][Ly][x][y];
A7048   |      |      |  AnyZLesser  := AnyZLesser or R[r][Lz][x][y];
A7049   |      |      end
A7050   |      |  ProjectionMiss := AllXGreater or AllXLesser or AllYGreater or AllYLesser;
A7051   |      |  PixelMiss := ProjectionMiss or not AnyZLesser; {false if possiblily visible}
A7052   |      |  if not PixelMiss then occulted := false;
A7053   |      end
A7054   end;

A7055   procedure RasterizePolygonWithRasterWrite (polygon : geotype);
A7056   var x, y, pz : integer;
A7057   begin
A7058   |  SetUpIncrRender (polygon); {1004}
A7059   |  while more spans in polygon are left do
A7060   |    begin
A7061   |    |  GetSpanByEdgeWalk (polygon, xstart, xend, yspan, zstart, zend); {1006}
A7062   |    |  spanzmax := MaxOf (zstart, zend);
A7063   |    |  RasterWriteMccamZ (xstart, xend, yspan, spanzmax); {A5025}
A7064   |    |  SpanInterpolate (polygon, xstart, xend, yspan, zstart, zend); {1008, A5034}
A7065   |    end
A7066   end;
```

- 75 -

Appendix 8

```
A8000   procedure BoundingBoxZBufferVertexWithPixelHits (object : ObjectType ); {20000 using Pixel Hits}
A8001   var
A8002     r, x, y, pz : integer;
A8003     ProjectionMiss, occulted, backfacing : boolean;
A8004     vertex : VertexType;
A8005   begin
A8006   | while there are more vertices within object do
A8007   |   begin
A8008   |   |  GetTranslatedVertex (object, vertex, vx, vy, vz);
A8009   |   |  r := ComparisonRegisterUsageDecision (vertex, object); {A7022 or A8022}
A8010   |   |  VertexComparisons (r, vx, vy, vz); {A6044}
A8011   |   |  if vertex completes a polygon then
A8012   |   |    begin
A8013   |   |    |  backfacing := DoBackfaceCullingTest (vertices in present polygon);
A8014   |   |    |  if not backfacing then
A8015   |   |    |    begin
A8016   |   |    |    |  occulted := VertexBoundingBoxOccultingTestWithPixelHits ( ); {A8033}
A8017   |   |    |    |  if occulted = false then RasterizePixelHits (polygon); {A8064}
A8018   |   |    |    end
A8019   |   |    end
A8020   |   end
A8021   end;

A8022   function TmeshComparisonRegisterUsageDecision (vertex : VertexType; object : ObjectType) : boolean;
A8023   var r : integer;
A8024   begin
A8025   |  if Restart = true then
A8026   |    r := 0;
A8027   |  else if ReplaceOldest = true then
A8028   |    r := number of Comparison Register whose contents are the oldest;
A8029   |  else if ReplaceMiddle = true then
A8030   |    r := number of Comparison Register whose contents are the 2nd oldest;
A8031   |  TmeshComparisonRegisterUsageDecision := r;
A8032   end;

A8033   function VertexBoundingBoxOccultingTestWithPixelHits ( ) : boolean;
A8034   var
A8035     r, x, y : integer;
A8036     ProjectionMiss, PixelMiss, AllXGreater, AllXLesser, AllYGreater, AllYLesser, AnyZLesser : boolean;
A8037     occulted: boolean;
A8038   begin
A8039   |  occulted := true;
A8040   |  for y := 0 to YMAX do {done with parallel apparatus}
A8041   |    for x := 0 to XMAX do {done with parallel apparatus}
A8042   |      begin
A8043   |      |  AllXGreater := AllXLesser := AllYGreater := AllYLesser := true;
A8044   |      |  AnyZLesser := false;
A8045   |      |  for r := 0 to RMAX do {done with parallel search apparatus}
A8046   |      |    if vertex r is part of the polygon then {if R_r is enabled by E_r}
A8047   |      |      begin
A8048   |      |      |  AllXGreater := AllXGreater and R[r][Gx][x][y];
A8049   |      |      |  AllXLesser := AllXLesser and R[r][Lx][x][y];
A8050   |      |      |  AllYGreater := AllYGreater and R[r][Gy][x][y];
A8051   |      |      |  AllYLesser := AllYLesser and R[r][Ly][x][y];
A8052   |      |      |  AnyZLesser := AnyZLesser or R[r][Lz][x][y];
A8053   |      |      end
A8054   |      |  ProjectionMiss := AllXGreater or AllXLesser or AllYGreater or AllYLesser;
A8055   |      |  PixelMiss := ProjectionMiss or not AnyZLesser; {false if possiblily visible}
A8056   |      |  if not PixelMiss then
A8057   |      |    begin
A8058   |      |    |  occulted := false;
A8059   |      |    |  PixelHit[x][y] := true;
A8060   |      |    end
A8061   |      end
A8062   |  VertexBoundingBoxOccultingTestHits := occulted;
A8063   end;
```

A-59034 / JAS / MSR

Appendix 8 (continued)

```
A8064  procedure RasterizePixelHits (geometry : goetype );
A8065  var x, y, pz : integer;
A8066  begin
A8067  |  while ReadPixelHit (x, y) do  {A8075}
A8068  |    if the pixel at (x, y) is within the geometry's projection then
A8069  |    begin
A8070  |    |  pz := geometry's z-value at pixel coords (x, y);
A8071  |    |  if pz <= ReadMccamZ (x, y) or MccamZInfinity[x][y] then  {A3044}
A8072  |    |    WriteMccamPixelBuffers (geometry, x, y, pz);  {A4042}
A8073  |    end
A8074  end;
A8075  function ReadPixelHit (var x, y : integer) : boolean;
A8076  begin
A8077  |  y := -1;
A8078  |  repeat
A8079  |  |  y := y + 1;
A8080  |  |  x := -1;
A8081  |  |  repeat x := x + 1 until x = XMAX or PixelHit[x][y];
A8082  |  until y = YMAX or PixelHit[x][y];
A8083  |  if PixelHit[x][y] do
A8084  |    begin
A8085  |    |  PixelHit[x][y] := false;
A8086  |    |  ReadPixelHit := true;
A8087  |    end
A8088  |  else
A8089  |    ReadPixelHit := false;
A8090  end;
```

Appendix 9

```
A9000   procedure BoundingBoxZBufferVertexSegmentHits (object : ObjectType ); {20000 using Segment Hits}
A9001   var
A9002     r, x, y, pz : integer;
A9003     ProjectionMiss, occulted, backfacing : boolean;
A9004     vertex : VertexType;
A9005   begin
A9006   |  while there are more vertices within object do
A9007   |    begin
A9008   |    |  GetTranslatedVertex (object, vertex, vx, vy, vz);
A9009   |    |  r := ComparisonRegisterUsageDecision (vertex, object); {A7022 or A8022}
A9010   |    |  VertexComparisons (r, vx, vy, vz); {A6044}
A9011   |    |  if vertex completes a polygon then
A9012   |    |    begin
A9013   |    |    |  backfacing := DoBackfaceCullingTest (vertices in present polygon);
A9014   |    |    |  if not backfacing then
A9015   |    |    |    begin
A9016   |    |    |    |  occulted := VertexBoundingBoxOccultingTestWithSegmentHits ( ); {A9022}
A9017   |    |    |    |  if occulted = false then RasterizeSegmentHits (polygon); {A9062}
A9018   |    |    |    end
A9019   |    |    end
A9020   |    end
A9021   end;

A9022   function VertexBoundingBoxOccultingTestWithSegmentHits ( ) : boolean;
A9023   var
A9024     r, x, y : integer;
A9025     ProjectionMiss, PixelMiss, AllXGreater, AllXLesser, AllYGreater, AllYLesser, AnyZLesser : boolean;
A9026     occulted, pzhitprev, pzhit: boolean;
A9027   begin
A9028   |  occulted := true;
A9029   |  for y := 0 to YMAX do {done with parallel apparatus}
A9030   |    begin
A9031   |    |  pzhitprev := false;
A9032   |    |  for x := 0 to XMAX do {done with parallel apparatus}
A9033   |    |    begin
A9034   |    |    |  AllXGreater := AllXLesser := AllYGreater := AllYLesser := true;
A9035   |    |    |  AnyZLesser := false;
A9036   |    |    |  for r := 0 to RMAX do {done with parallel search apparatus}
A9037   |    |    |    if vertex r is part of the polygon then {if R_r is enabled by E_r}
A9038   |    |    |      begin
A9039   |    |    |      |  AllXGreater := AllXGreater and R[r][Gx][x][y];
A9040   |    |    |      |  AllXLesser := AllXLesser and R[r][Lx][x][y];
A9041   |    |    |      |  AllYGreater := AllYGreater and R[r][Gy][x][y];
A9042   |    |    |      |  AllYLesser := AllYLesser and R[r][Ly][x][y];
A9043   |    |    |      |  AnyZLesser := AnyZLesser or R[r][Lz][x][y];
A9044   |    |    |      end
A9045   |    |    |  ProjectionMiss := AllXGreater or AllXLesser or AllYGreater or AllYLesser;
A9046   |    |    |  PixelMiss := ProjectionMiss or not AnyZLesser; {false if possiblily visible}
A9047   |    |    |  if not PixelMiss then
A9048   |    |    |    begin
A9049   |    |    |    |  occulted := false;
A9050   |    |    |    |  pzhit := true;
A9051   |    |    |    end
A9052   |    |    |  else
A9053   |    |    |    pzhit := false;
A9054   |    |    |  if pzhit and not pzhitprev then {if 1st pixel in segment}
A9055   |    |    |    SegmentHit[START][x][y] := true;
A9056   |    |    |  if not pzhit and pzhitprev then {if previous is last pixel in segment}
A9057   |    |    |    SegmentHit[END][x - 1][y] := true;
A9058   |    |    |  pzhitprev := pzhit;
A9059   |    |    end
A9060   |    end
A9061   end;
```

Appendix 9 (continued)

```
A9062  procedure RasterizeSegmentHits (geometry : geotype );
A9063  var x, y, pz, xstart, xend : integer;
A9064  begin
A9065  |  while ReadSegmentHit (xstart, xend, y) do {A9074}
A9066  |     for x := xstart to xend do
A9067  |        if the pixel at (x, y) is within the geometry's projection then
A9068  |           begin
A9069  |           |  pz := geometry's z-value at pixel coords (x, y);
A9070  |           |  if pz <= ReadMccamZ (x, y) or MccamZInfinity[x][y] then {A3044}
A9071  |           |     WriteMccamPixelBuffers (geometry, x, y, pz); {A4042}
A9072  |           end
A9073  end;
A9074  function ReadSegmentHit (var xstart, xend, y : integer) : boolean;
A9075  begin
A9076  |  y := -1;
A9077  |  repeat
A9078  |  |  y := y + 1;
A9079  |  |  xstart := -1;
A9080  |  |  repeat xstart := xstart + 1 until xstart = XMAX or SegmentHit[START][xstart][y];
A9081  |  until y = YMAX or SegmentHit[START][xstart][y];
A9082  |  if SegmentHit[START][xstart][y] do
A9083  |     begin
A9084  |     |  SegmentHit[START][xstart][y] := false;
A9085  |     |  xend := xstart - 1;
A9086  |     |  repeat xend := xend + 1 until SegmentHit[END][xend][y];
A9087  |     |  SegmentHit[END][xend][y] := false;
A9088  |     |  ReadSegmentHit := true;
A9089  |     end
A9090  |  else
A9091  |     ReadSegmentHit := false;
A9092  end;
```

Appendix 10

```
A10000  procedure BoundingBoxZBufferVertexRasterHits (object : ObjectType);
A10001      {20000 using Raster Hits and Raster Write}
A10002  var
A10003      r, x, y, pz : integer;
A10004      ProjectionMiss, occulted, backfacing : boolean;
A10005      vertex : VertexType;
A10006  begin
A10007  |   while there are more vertices within object do
A10008  |      begin
A10009  |      |   GetTranslatedVertex (object, vertex, vx, vy, vz);
A10010  |      |   r := ComparisonRegisterUsageDecision (vertex, object); {A7022 or A8022}
A10011  |      |   VertexComparisons (r, vx, vy, vz); {A6044}
A10012  |      |   if vertex completes a polygon then
A10013  |      |      begin
A10014  |      |      |   backfacing := DoBackfaceCullingTest (vertices in present polygon);
A10015  |      |      |   if not backfacing then
A10016  |      |      |      begin
A10017  |      |      |      |   occulted := VertexBoundingBoxOccultingTestWithRasterHits ( ); {A10023}
A10018  |      |      |      |   if occulted = false then RasterizeRasterHitsWithRasterWrite (polygon); {A10058}
A10019  |      |      |      end
A10020  |      |      end
A10021  |      end
A10022  end;

A10023  function VertexBoundingBoxOccultingTestWithRasterHits ( ) : boolean;
A10024  var
A10025      r, x, y : integer;
A10026      ProjectionMiss, PixelMiss, AllXGreater, AllXLesser, AllYGreater, AllYLesser, AnyZLesser : boolean;
A10027      occulted, pzhitprev, pzhit: boolean;
A10028  begin
A10029  |   occulted := true;
A10030  |   for y := 0 to YMAX do {done with parallel apparatus}
A10031  |      begin
A10032  |      |   for x := 0 to XMAX do {done with parallel apparatus}
A10033  |      |      begin
A10034  |      |      |   AllXGreater := AllXLesser := AllYGreater := AllYLesser := true;
A10035  |      |      |   AnyZLesser := false;
A10036  |      |      |   for r := 0 to RMAX do {done with parallel search apparatus}
A10037  |      |      |      if vertex r is part of the polygon then {if $R_r$ is enabled by $E_r$}
A10038  |      |      |         begin
A10039  |      |      |         |   AllXGreater := AllXGreater and R[r][Gx][x][y];
A10040  |      |      |         |   AllXLesser := AllXLesser and R[r][Lx][x][y];
A10041  |      |      |         |   AllYGreater := AllYGreater and R[r][Gy][x][y];
A10042  |      |      |         |   AllYLesser := AllYLesser and R[r][Ly][x][y];
A10043  |      |      |         |   AnyZLesser := AnyZLesser or R[r][Lz][x][y];
A10044  |      |      |         end
A10045  |      |      |   ProjectionMiss := AllXGreater or AllXLesser or AllYGreater or AllYLesser;
A10046  |      |      |   PixelMiss := ProjectionMiss or not AnyZLesser; {false if possiblily visible}
A10047  |      |      |   if not PixelMiss then
A10048  |      |      |      begin
A10049  |      |      |      |   occulted := false;
A10050  |      |      |      |   RasterHit[y] := true;
A10051  |      |      |      end
A10052  |      |      |   else
A10053  |      |      |      |   RasterHit[y] := false;
A10054  |      |      end
A10055  |      end;
A10056  |   VertexBoundingBoxOccultingTestRasterHits := occulted;
A10057  end;

A10058  procedure RasterizeRasterHitsWithRasterWrite (polygon : geotype);
A10059  var xstart, xend, yspan, spanzmax, zstart, zend : integer;
A10060  begin
A10061  |   while ReadRasterHit (y) do {A10069}
A10062  |      begin
A10063  |      |   MakeSpanAtYValue (yspan, xstart, xend, zstart, zend); {1006}
A10064  |      |   spanzmax := MaxOf (zstart, zend);
A10065  |      |   RasterWriteMccamZ (xstart, xend, yspan, spanzmax); {A5025}
A10066  |      |   SpanInterpolate (polygon, xstart, xend, yspan, zstart, zend); {1008, A5034}
A10067  |      end
A10068  end;
```

A-59034 / JAS / MSR

Appendix 10 (continued)

```
A10069  function ReadRasterHit (var y : integer) : boolean;
A10070  begin
A10071  |  y := -1;
A10072  |  repeat
A10073  |  |  y := y + 1;
A10074  |  until y = YMAX or RasterHit[y];
A10075  |  if RasterHit[y] do
A10076  |    begin
A10077  |    |  RasterHit[y] := false;
A10078  |    |  ReadRasterHit := true;
A10079  |    end
A10080  |  else
A10081  |    ReadRasterHit := false;
A10082  end;
```

Appendix 11

```
A11000  procedure BoundingBoxZBufferWithDualOccultingTest (object : ObjectType); {32000}
A11001  var
A11002    r, vx, vy, vz : integer;
A11003    ProjectionMiss, occulted, backfacing : boolean;
A11004    vertex : VertexType;
A11005  begin
A11006  |  while there are more vertices within object do
A11007  |    begin
A11008  |    |  GetTranslatedVertex (object, vertex, vx, vy, vz);
A11009  |    |  r := ComparisonRegisterUsageDecision (vertex, object); {A7022 or A8022}
A11010  |    |  VertexComparisons (r, vx, vy, vz); {A6044}
A11011  |    |  if vertex completes a polygon then
A11012  |    |    begin
A11013  |    |    |  backfacing := DoBackfaceCullingTest (vertices in present polygon);
A11014  |    |    |  if not backfacing then
A11015  |    |    |    begin
A11016  |    |    |    |  occulted := VertexBoundingBoxOccultingTest ( ); {A7029}
A11017  |    |    |    |  if occulted = false then RasterizePolygonWithSpanOccultingTest (polygon); {A11022}
A11018  |    |    |    end
A11019  |    |    end
A11020  |    end
A11021  end;

A11022  procedure RasterizePolygonWithSpanOccultingTest (polygon : geotype); {29000}
A11023  var x, y, pz : integer;
A11024  begin
A11025  |  SetUpIncrRender (geometry); {1004}
A11026  |  while more spans in geometry are left do
A11027  |    begin
A11028  |    |  GetSpanByEdgeWalk (geometry, xstart, xend, yspan, zstart, zend); {1006}
A11029  |    |  spanzmin := MinOf (zstart, zend);
A11030  |    |  VertexComparisons (4, xstart, yspan, spanzmin); {A6044}
A11031  |    |  VertexComparisons (5, xend, yspan, spanzmin); {A6044}
A11032  |    |  occulted := SpanOccultingTest ( ); {A11041}
A11033  |    |  if occulted = false then
A11034  |    |    begin
A11035  |    |    |  spanzmax := MaxOf (zstart, zend);
A11036  |    |    |  RasterWriteMccamZ (xstart, xend, yspan, spanzmax); {A5025}
A11037  |    |    |  SpanInterpolate (geometry, xstart, xend, yspan, zstart, zend); {1008, A5034}
A11038  |    |    end
A11039  |    end
A11040  end;

A11041  function SpanOccultingTest ( ) : boolean; {27000}
A11042  var
A11043    r, x, y : integer;
A11044    ProjectionMiss, PixelMiss, AllXGreater, AllXLesser, AllYGreater, AllYLesser, AnyZLesser : boolean;
A11045    occulted : boolean;
A11046  begin
A11047  |  occulted := true;
A11048  |  for y := 0 to YMAX do {done with parallel apparatus}
A11049  |    for x := 0 to XMAX do {done with parallel apparatus}
A11050  |      begin
A11051  |      |  AllXGreater := AllXLesser := AllYGreater := AllYLesser := true;
A11052  |      |  AnyZLesser := false;
A11053  |      |  for r := 0 to RMAX do {done with parallel search apparatus}
A11054  |      |    if vertex r is part of the span then {if $R_r$ is enabled by $E_r$}
A11055  |      |      begin
A11056  |      |      |  AllXGreater := AllXGreater and R[r][Gx][x][y];
A11057  |      |      |  AllXLesser := AllXLesser and R[r][Lx][x][y];
A11058  |      |      |  AllYGreater := AllYGreater and R[r][Gy][x][y];
A11059  |      |      |  AllYLesser := AllYLesser and R[r][Ly][x][y];
A11060  |      |      |  AnyZLesser := AnyZLesser or R[r][Lz][x][y];
A11061  |      |      end
A11062  |      |  ProjectionMiss := AllXGreater or AllXLesser or AllYGreater or AllYLesser;
A11063  |      |  PixelMiss := ProjectionMiss or not AnyZLesser; {false if possiblily visible}
A11064  |      |  if not PixelMiss then occulted := false;
A11065  |      end
A11066  |  SpanOccultingTest := occulted;
A11067  end;
```

- 82 -

Appendix 12

```
A12000  procedure BoundingBoxZBufferWithDualOccultingTestAndSpanFifo (object : ObjectType);
A12001   {32000 with Span FIFO 33003}
A12002  var
A12003   r, vx, vy, vz : integer;
A12004   ProjectionMiss, occulted, backfacing : boolean;
A12005   vertex : VertexType;
A12006  begin
A12007  | while there are more vertices within object do {occurs in parallel with while at A12022}
A12008  |  begin
A12009  |  |  GetTranslatedVertex (object, vertex, vx, vy, vz);
A12010  |  |  r := ComparisonRegisterUsageDecision (vertex, object); {A7022 or A8022}
A12011  |  |  VertexComparisons (r, vx, vy, vz); {A6044}
A12012  |  |  if vertex completes a polygon then
A12013  |  |   begin
A12014  |  |   |  backfacing := DoBackfaceCullingTest (vertices in present polygon);
A12015  |  |   |  if not backfacing then
A12016  |  |   |   begin
A12017  |  |   |   |  occulted := VertexBoundingBoxOccultingTest ( ); {A7029}
A12018  |  |   |   |  if occulted = false then ProcessSpansAndWriteToSpanFifo (polygon); {A12024}
A12019  |  |   |   end
A12020  |  |   end
A12021  |  end
A12022  | while Span FIFO is not empty do ProcessSpan ( ); {A12043, occurs in parallel with while at A12007}
A12023  end;

A12024  procedure ProcessSpansAndWriteToSpanFifo (polygon : geotype);
A12025  var x, y, pz : integer;
A12026  begin
A12027  |  SetUpIncrRender (polygon); {1004}
A12028  |  while more spans in polygon are left do
A12029  |   begin
A12030  |   |  GetSpanByEdgeWalk (polygon, xstart, xend, yspan, zstart, zend); {1006}
A12031  |   |  spanzmin := MinOf (zstart, zend);
A12032  |   |  VertexComparisons (4, xstart, yspan, spanzmin); {A6044}
A12033  |   |  VertexComparisons (5, xend, yspan, spanzmin); {A6044}
A12034  |   |  occulted := SpanOccultingTest ( ); {A11041}
A12035  |   |  if occulted = false then
A12036  |   |   begin
A12037  |   |   |  spanzmax := MaxOf (zstart, zend);
A12038  |   |   |  RasterWriteMccamZ (xstart, xend, yspan, spanzmax); {A5025}
A12039  |   |   |  WriteSpanInfoIntoSpanFifo (polygon, xstart, xend, yspan, zstart, zend);
A12040  |   |   end
A12041  |   end
A12042  end;

A12043  procedure ProcessSpan ( );
A12044  var
A12045   r, x, y : integer;
A12046   ProjectionMiss, PixelMiss, AllXGreater, AllXLesser, AllYGreater, AllYLesser, AnyZLesser : boolean;
A12047   occulted : boolean;
A12048   polygon : geotype;
A12049  begin
A12050  |  ReadSpanInfoFromSpanFifo (polygon, xstart, xend, yspan, zstart, zend);
A12051  |  SpanInterpolate (polygon, xstart, xend, yspan, zstart, zend); {1008, A5034}
A12052  end;
```

Appendix 13

```
A13000   procedure BoundingBoxZBufferWithDualOccultingTestAndBlockSpanFifo (object : ObjectType);
A13001   {32000 with Blocks and Span FIFOs 33003}
A13002   var
A13003     r, vx, vy, vz : integer;
A13004     ProjectionMiss, occulted, backfacing : boolean;
A13005     vertex : VertexType;
A13006   begin
A13007   |  while there are more vertices within object do {done in parallel with while at A13028}
A13008   |    begin
A13009   |    |  GetTranslatedVertex (object, vertex, vx, vy, vz);
A13010   |    |  for by := 0 to YBLKMAX do {done with parallel apparatus}
A13011   |    |    for bx := 0 to XBLKMAX do {done with parallel apparatus}
A13012   |    |      begin
A13013   |    |      |  r := ComparisonRegisterUsageDecision (vertex, object); {A7022 or A8022}
A13014   |    |      |  ConvertToCoordWithinBlock (bx, by, vx, vy, vbx, vby); {A13036}
A13015   |    |      |  BlockVertexComparisons (bx, by, r, vbx, vby, vz); {A14000}
A13016   |    |      |  if vertex completes a polygon then
A13017   |    |      |    begin
A13018   |    |      |    |  backfacing := DoBackfaceCullingTest (vertices in present polygon);
A13019   |    |      |    |  if not backfacing then
A13020   |    |      |    |    begin
A13021   |    |      |    |    |  occulted := VertexBoundingBoxOccultingTestBlock (bx, by); {A13041}
A13022   |    |      |    |    |  if occulted = false then
A13023   |    |      |    |    |    ProcessSpansAndWriteToBlockSpanFifo (bx, by, polygon); {A13068}
A13024   |    |      |    |    end
A13025   |    |      |    end
A13026   |    |      end
A13027   |    end
A13028   |  while any Span FIFO is not empty do {done in parallel with while at A13007}
A13029   |    begin
A13030   |    |  GetTranslatedVertex (object, vertex, vx, vy, vz);
A13031   |    |  for by := 0 to YBLKMAX do {done with parallel apparatus}
A13032   |    |    for bx := 0 to XBLKMAX do {done with parallel apparatus}
A13033   |    |      while Span FIFO in block (bx, by) is not empty do ProcessBlockSpan (bx, by); {A13087}
A13034   |    end
A13035   end;

A13036   procedure ConvertToCoordWithinBlock (bx, by, vx, vy : integer; var vbx, vby : integer );
A13037   begin
A13038   |  vbx := vx - XBLKSIZE * IntegerPartOf (vx / XBLKSIZE);
A13039   |  vby := vy - YBLKSIZE * IntegerPartOf (vy / YBLKSIZE);
A13040   end;

A13041   function VertexBoundingBoxOccultingTestBlock (bx, by : integer) : boolean;
A13042   var
A13043     r, x, y: integer;
A13044     ProjectionMiss, PixelMiss, AllXGreater, AllXLesser, AllYGreater, AllYLesser, AnyZLesser : boolean;
A13045     occulted : boolean;
A13046   begin
A13047   |  occulted := true;
A13048   |  for y := 0 to YMAX do {pixel index within block (bx, by), done with parallel apparatus}
A13049   |    for x := 0 to XMAX do {pixel index within block (bx, by), done with parallel apparatus}
A13050   |      begin
A13051   |      |  AllXGreater := AllXLesser := AllYGreater := AllYLesser := true;
A13052   |      |  AnyZLesser := false;
A13053   |      |  for r := 0 to RMAX do {done with parallel apparatus}
A13054   |      |    if vertex v is part of the spatial primitive then
A13055   |      |      begin
A13056   |      |      |  AllXGreater := AllXGreater and BlockR[r][Gx][bx][by][x][y];
A13057   |      |      |  AllXLesser := AllXLesser and BlockR[r][Lx][bx][by][x][y];
A13058   |      |      |  AllYGreater := AllYGreater and BlockR[r][Gy][bx][by][x][y];
A13059   |      |      |  AllYLesser := AllYLesser and BlockR[r][Ly][bx][by][x][y];
A13060   |      |      |  AnyZLesser := AnyZLesser or BlockR[r][Lz][bx][by][x][y];
A13061   |      |      end
A13062   |      |  ProjectionMiss := AllXGreater or AllXLesser or AllYGreater or AllYLesser;
A13063   |      |  PixelMiss := ProjectionMiss or not AnyZLesser;
A13064   |      |  if not PixelMiss then occulted := false;
A13065   |      end
A13066   |  VertexBoundingBoxOccultingTestBlock := occulted;
A13067   end;
```

A-59034 / JAS / MSR

- 84 -

Appendix 13 (continued)

```
A13068  procedure ProcessSpansAndWriteToBlockSpanFifo (bx, by : integer; polygon : geotype);
A13069  var x, y, pz : integer;
A13070  begin
A13071  |   SetUpIncrRenderInBlock (bx, by, polygon); {1004 as if entire display screen is just one block}
A13072  |   while more spans in geometry are left do
A13073  |     begin
A13074  |     |   GetSpanByEdgeWalkInBlock (bx, by, polygon, bxstart, bxend, byspan, bzstart, bzend); {1006}
A13075  |     |   spanzmin := MinOf (bzstart, bzend);
A13076  |     |   BlockVertexComparisons (bx, by, 4, bxstart, byspan, bspanzmin); {A14000}
A13077  |     |   BlockVertexComparisons (bx, by, 5, bxend, byspan, bspanzmin); {A14000}
A13078  |     |   occulted := SpanOccultingTestBlock (bx, by); {A13097}
A13079  |     |   if occulted = false then
A13080  |     |     begin
A13081  |     |     |   spanbzmax := MaxOf (bzstart, bzend);
A13082  |     |     |   RasterWriteMccamZBlock (bx, by, bxstart, bxend, byspan, bspanzmax); {A13124}
A13083  |     |     |   WriteSpanInfoIntoBlockSpanFifo (bx, by, polygon, bxstart, bxend, byspan, bzstart, bzend);
A13084  |     |     end
A13085  |     end
A13086  end;

A13087  procedure ProcessBlockSpan (bx, by : integer);
A13088  var
A13089      r, x, y : integer;
A13090      ProjectionMiss, PixelMiss, AllXGreater, AllXLesser, AllYGreater, AllYLesser, AnyZLesser : boolean;
A13091      occulted : boolean;
A13092      polygon : geotype;
A13093  begin
A13094  |   ReadSpanInfoFromBlockSpanFifo (bx, by, polygon, bxstart, bxend, byspan, bzstart, bzend);
A13095  |   SpanInterpolateBlock (bx, by, polygon, bxstart, bxend, byspan, bzstart, bzend); {1008, A13134}
A13096  end;

A13097  function SpanOccultingTestBlock (bx, by) : boolean;
A13098  var
A13099      r, x, y : integer;
A13100      ProjectionMiss, PixelMiss, AllXGreater, AllXLesser, AllYGreater, AllYLesser, AnyZLesser : boolean;
A13101      occulted : boolean;
A13102  begin
A13103  |   occulted := true;
A13104  |   for y := 0 to YMAX do {pixel index within block (bx, by), done with parallel apparatus}
A13105  |     for x := 0 to XMAX do {pixel index within block (bx, by), done with parallel apparatus}
A13106  |       begin
A13107  |       |   AllXGreater := AllXLesser := AllYGreater := AllYLesser := true;
A13108  |       |   AnyZLesser := false;
A13109  |       |   for r := 0 to RMAX do {done with parallel search apparatus}
A13110  |       |     if vertex r is part of the span then {if $R_r$ is enabled by $E_r$}
A13111  |       |       begin
A13112  |       |       |   AllXGreater := AllXGreater and BlockR[r][Gx][bx][by][x][y];
A13113  |       |       |   AllXLesser := AllXLesser and BlockR[r][Lx][bx][by][x][y];
A13114  |       |       |   AllYGreater := AllYGreater and BlockR[r][Gy][bx][by][x][y];
A13115  |       |       |   AllYLesser := AllYLesser and BlockR[r][Ly][bx][by][x][y];
A13116  |       |       |   AnyZLesser := AnyZLesser or BlockR[r][Lz][bx][by][x][y];
A13117  |       |       end
A13118  |       |   ProjectionMiss := AllXGreater or AllXLesser or AllYGreater or AllYLesser;
A13119  |       |   PixelMiss := ProjectionMiss or not AnyZLesser; {false if possiblily visible}
A13120  |       |   if not PixelMiss then occulted := false;
A13121  |       end
A13122  |   SpanOccultingTest := occulted;
A13123  end;

A13124  procedure RasterWriteMccamZBlock (bx, by, xstart, xend, yspan, spanzmax : integer);
A13125  var x, y, pz : integer;
A13126  begin
A13127  |   for x := xstart to xend do
A13128  |     begin
A13129  |     |   pz := ReadBlockMccamZ (bx, by, x, yspan); {A13144}
A13130  |     |   if spanzmax < pz or MccamZInfinityBlock[bx][by][x][y] then
A13131  |     |     WriteBlockMccamZ (bx, by, x, yspan, spanzmax); {A13148}
A13132  |     end
A13133  end;
```

A-59034 / JAS / MSR

Appendix 13 (continued)

```
A13134  procedure SpanInterpolateBlock (geometry : geotype; bx, by, xstart, xend, yspan, zstart, zend : integer);
A13135  var x, y, pz : integer;
A13136  begin
A13137  |  for x := xstart to xend do
A13138  |    begin
A13139  |    |  pz := geometry's z-value at pixel coords (bx, by, x, yspan);
A13140  |    |  if pz <= ReadZBlock (bx, by, x, y) or MccamZInfinity[bx][by][x][y] then {A13152}
A13141  |    |     WritePixelBuffersBlock (geometry, x, y, pz); {A13156}
A13142  |    end
A13143  end;

A13144  function ReadBlockMccamZ ( x, y, pz: integer) : integer;
A13145  begin
A13146  |  ReadBlockMccamZ := BlockMccamZBuffer[bx][by][x][y];
A13147  end;

A13148  procedure WriteBlockMccamZ (bx, by, x, y: integer);
A13149  begin
A13150  |  BlockMccamZBuffer[bx][by][x][y] := pz;
A13151  end;

A13152  function ReadZBlock (bx, by, x, y, pz: integer) : integer;
A13153  begin
A13154  |  ReadZBlock := BlockZBuffer[bx][by][x][y];
A13155  end;

A13156  procedure WritePixelBuffersBlock (polygon : polygon; bx, by, x, y, pz : integer);
A13157  begin
A13158  |  BlockZBuffer[bx][by][x][y] := pz;
A13159  |  WriteBlockPixel (bx, by, x, y, polygon's color at pixel coords (x, y) ); {A13161}
A13160  end;

A13161  procedure WriteBlockPixel (bx, by, x, y: integer;  color : PixelColor;);
A13162  begin
A13163  |  FrameBuffer[XBLKSIZE * bx + x][YBLKSIZE * by + y][red] := color[red];
A13164  |  FrameBuffer[XBLKSIZE * bx + x][YBLKSIZE * by + y][blue] := color[blue];
A13165  |  FrameBuffer[XBLKSIZE * bx + x][YBLKSIZE * by + y][green] := color[green];
A13166  end;
```

Appendix 14

```
A14000  procedure BlockVertexComparisons (bx, by, v, vbx, vby, vz : integer); {21000 with Blocks}
A14001  var
A14002    x, y : integer;
A14003  begin
A14004  | if vbx < 0 then
A14005  |   for y := 0 to YMAX do {done with parallel apparatus}
A14006  |     for x := 0 to XMAX do {done with parallel apparatus}
A14007  |       begin
A14008  |       | BlockR[r][Gx][bx][by][x][y] := false;
A14009  |       | BlockR[r][Lx][bx][by][x][y] := true;
A14010  |       end
A14011  | else if vbx > XMAX then
A14012  |   for y := 0 to YMAX do {done with parallel apparatus}
A14013  |     for x := 0 to XMAX do {done with parallel apparatus}
A14014  |       begin
A14015  |       | BlockR[r][Gx][bx][by][x][y] := true;
A14016  |       | BlockR[r][Lx][bx][by][x][y] := false;
A14017  |       end
A14018  | else
A14019  |   for y := 0 to YMAX do {done with parallel apparatus}
A14020  |     for x := 0 to XMAX do {done with parallel apparatus}
A14021  |       begin
A14022  |       | BlockR[r][Gx][bx][by][x][y] := vbx > x;
A14023  |       | BlockR[r][Lx][bx][by][x][y] := vbx < x;
A14024  |       end
A14025  | if vby < 0 then
A14026  |   for y := 0 to YMAX do {done with parallel apparatus}
A14027  |     for x := 0 to XMAX do {done with parallel apparatus}
A14028  |       begin
A14029  |       | BlockR[r][Gy][bx][by][x][y] := false;
A14030  |       | BlockR[r][Ly][bx][by][x][y] := true;
A14031  |       end
A14032  | else if vby > YMAX then
A14033  |   for y := 0 to YMAX do {done with parallel apparatus}
A14034  |     for x := 0 to XMAX do {done with parallel apparatus}
A14035  |       begin
A14036  |       | BlockR[r][Gy][bx][by][x][y] := true;
A14037  |       | BlockR[r][Ly][bx][by][x][y] := false;
A14038  |       end
A14039  | else
A14040  |   for y := 0 to YMAX do {done with parallel apparatus}
A14041  |     for x := 0 to XMAX do {done with parallel apparatus}
A14042  |       begin
A14043  |       | BlockR[r][Gy][bx][by][x][y] := vby > y;
A14044  |       | BlockR[r][Ly][bx][by][x][y] := vby < y;
A14045  |       end
A14046  | for y := 0 to YMAX do {done with parallel apparatus}
A14047  |   for x := 0 to XMAX do {done with parallel apparatus}
A14048  |     BlockR[r][Lz][bx][by][x][y] := vz < BlockMccamZBuffer[bx][by][x][y] or
A14049  |                                    BlockMccamZInfinity[bx][by][x][y];
A14050  end;
```

- 87 -

Appendix 15

```
A15000   procedure RenderSequenceWithTags ( ); {42000}
A15001   var
A15002     x, y, pz : integer;
A15003     occulted : boolean;
A15004     scene : ObjectType; {the entire scene is made up of objects}
A15005   begin
A15006   | while there are more scenes in the sequence do
A15007   |   if this is the first scene or a totally new scene do
A15008   |     begin
A15009   |     |  GenerateScene (scene);
A15010   |     |  RenderSceneWithTags (false, scene); {A15021}
A15011   |     end
A15012   |   else
A15013   |     begin
A15014   |     |  UpdateScene (scene);
A15015   |     |  if this is a significantly different version of the same scene do
A15016   |     |    RenderSceneWithTags (false, scene); {A15021}
A15017   |     |  else do
A15018   |     |    RenderSceneWithTags (true, scene); {A15021}
A15019   |     end
A15020   end;

A15021   procedure RenderSceneWithTags (temporalcorrelation : boolean; scene : ObjectType;);
A15022   var
A15023     xobjectnumber : integer;
A15024     object, subobject : ObjectType;
A15025     visibleobjects : ObjectType;
A15026   begin
A15027   | if temporalcorrelation then ReadVisibleObjects (visibleobjects); {A15044}
A15028   | FrameBufferInit ( ); {A1015}
A15029   | ZBufferInit ( ); {A1022}
A15030   | MccamZBufferWithTagsInit ( ); {A15054}
A15031   | if temporalcorrelation then {render the objects that were visible in previous scene}
A15032   |   while there are more objects in the visibleobjects list do
A15033   |     begin
A15034   |     |  GetTranslatedObjectWithTag (visibleobjects, object, objectnumber);
A15035   |     |  RenderObjectWithTagRecursive (object, objectnumber); {A15098}
A15036   |     end
A15037   | while there are more objects in the scene to be rendered do
A15038   |   begin
A15039   |   |  GetTranslatedObjectWithTag (scene, object, objectnumber);
A15040   |   |  if this object has not been rendered then
A15041   |   |    RenderObjectWithTagRecursive (object, objectnumber); {A15098}
A15042   |   end
A15043   end;

A15044   procedure ReadVisibleObjects (var visibleobjects : ObjectType;); {40000}
A15045   var objectnumber : tag;
A15046   begin
A15047   | SetTagHits ( ); {A15064}
A15048   | while ReadTagHit (objectnumber) then {A15071}
A15049   |   begin
A15050   |   |  PutObject (visibleobjects, objectnumber);
A15051   |   |  ClearAllHitsWithTag (objectnumber); {A15090}
A15052   |   end
A15053   end;

A15054   procedure MccamZBufferWithTagsInit ( );
A15055   var x, y : integer;
A15056   begin
A15057   | for y := 0 to YMAX do
A15058   |   for x := 0 to XMAX do
A15059   |     begin
A15060   |     |  MccamZInfinity[x][y] := true;
A15061   |     |  TagInvalid[x][y] := true;
A15062   |     end
A15063   end;
```

Appendix 15 (continued)

```
A15064  procedure SetTagHits ( );
A15065  var x, y : integer;
A15066  begin
A15067  |  for y := 0 to YMAX do
A15068  |    for x := 0 to XMAX do
A15069  |      TagHit [x][y] := not TagInvalid[x][y];
A15070  end;

A15071  function ReadTagHit (var objectnumber : tag) : boolean;
A15072  var x, y : integer;
A15073  begin
A15074  |  y := -1;
A15075  |  repeat
A15076  |  |  y := y + 1;
A15077  |  |  x := -1;
A15078  |  |  repeat
A15079  |  |  |  x := x + 1;
A15080  |  |  until TagHit[x][y] or x = XMAX;
A15081  |  until TagHit[x][y] or y = YMAX;
A15082  |  if TagHit[x][y] then
A15083  |    begin
A15084  |    |  tag := ZTag[x][y];
A15085  |    |  ReadTagHit := true;
A15086  |    end
A15087  |  else
A15088  |    ReadTagHit := false;
A15089  end;

A15090  procedure ClearAllHitsWithTag (objectnumber : tag);
A15091  var bx, by, x, y : integer;
A15092  begin
A15093  |  for y := 0 to YMAX do
A15094  |    for x := 0 to XMAX do
A15095  |      if ZTag[x][y] = objectnumber then
A15096  |        TagHit[x][y] := false;
A15097  end;

A15098  procedure RenderObjectWithTagRecursive (object : ObjectType; objectnumber : tag);
A15099  var
A15100    x, y, pz, xmin, xmax, ymin, ymax, zmin, zmax : integer;
A15101    occulted : boolean;
A15102    subobject : ObjectType;
A15103    vrtx0, vrtx1 : VertexType;
A15104    subobjectnumber : tag;
A15105  begin
A15106  |  MakeBoundingBoxVertices (object, vrtx0, vrtx1);  {A6035}
A15107  |  if bounding box has any portion within the viewvolume then
A15108  |    begin
A15109  |    |  VertexComparisons (0, vrtx0[xcoord], vrtx0[ycoord], vrtx0[zcoord]);  {A6044}
A15110  |    |  VertexComparisons (1, vrtx1[xcoord], vrtx1[ycoord], vrtx1[zcoord]);  {A6044}
A15111  |    |  occulted := VertexBoundingBoxOccultingTest ( );  {A7029}
A15112  |    |  if occulted = false then
A15113  |    |    if this object contains subobjects then
A15114  |    |      for each subobject in object do
A15115  |    |        GetObject (object, subobject, subobjectnumber);
A15116  |    |        RenderObjectWithTagRecursive (subobject, subobjectnumber);  {A15098}
A15117  |    |    else do
A15118  |    |      if this object contains renderable primitives then
A15119  |    |        BoundingBoxZBufferWithDualOccultingTestTags (object, objectnumber);  {A16000}
A15120  |    end
A15121  end;
```

Appendix 16

```
A16000  procedure BoundingBoxZBufferWithDualOccultingTestTags (object : ObjectType; objectnumber : tag);
A16001   {32000 with Tags}
A16002  var
A16003    r, vx, vy, vz : integer;
A16004    ProjectionMiss, occulted, backfacing : boolean;
A16005    vertex : VertexType;
A16006  begin
A16007  |  while there are more vertices within object do {occurs in parallel with while at A16023}
A16008  |    begin
A16009  |    |  GetTranslatedVertex (object, vertex, vx, vy, vz);
A16010  |    |  r := ComparisonRegisterUsageDecision (vertex, object); {A7022 or A8022}
A16011  |    |  VertexComparisons (r, vx, vy, vz); {A6044}
A16012  |    |  if vertex completes a polygon then
A16013  |    |    begin
A16014  |    |    |  backfacing := DoBackfaceCullingTest (vertices in present polygon);
A16015  |    |    |  if not backfacing then
A16016  |    |    |    begin
A16017  |    |    |    |  occulted := VertexBoundingBoxOccultingTest ( ); {A7029}
A16018  |    |    |    |  if occulted = false then
A16019  |    |    |    |    ProcessSpansWithTagsAndWriteToSpanFifo (polygon; objectnumber); {A16025}
A16020  |    |    |    end
A16021  |    |    end
A16022  |    end
A16023  |  while Span FIFO is not empty do ProcessSpan ( ); {A12043, occurs in parallel with while at A16007}
A16024  end;

A16025  procedure ProcessSpansWithTagsAndWriteToSpanFifo (polygon : geotype; objectnumber : tag);
A16026  var x, y, pz : integer;
A16027  begin
A16028  |  SetUpIncrRender (polygon); {1004}
A16029  |  while more spans in polygon are left do
A16030  |    begin
A16031  |    |  GetSpanByEdgeWalk (polygon, xstart, xend, yspan, zstart, zend); {1006}
A16032  |    |  spanzmin := MinOf (zstart, zend);
A16033  |    |  VertexComparisons (4, xstart, yspan, spanzmin); {A6044}
A16034  |    |  VertexComparisons (5, xend, yspan, spanzmin); {A6044}
A16035  |    |  occulted := SpanOccultingTest ( ); {A11041}
A16036  |    |  if occulted = false then
A16037  |    |    begin
A16038  |    |    |  spanzmax := MaxOf (zstart, zend);
A16039  |    |    |  RasterWriteMccamZWithTag (xstart, xend, yspan, spanzmax; objectnumber); {A16044}
A16040  |    |    |  WriteSpanInfoIntoSpanFifo (polygon, xstart, xend, yspan, zstart, zend);
A16041  |    |    end
A16042  |    end
A16043  end;

A16044  procedure RasterWriteMccamZWithTag (xstart, xend, yspan, spanzmax : integer; objectnumber : tag);
A16045  var x, y, pz : integer;
A16046  begin
A16047  |  for x := xstart to xend do
A16048  |    begin
A16049  |    |  pz := ReadMccamZ (x, yspan); {A3044}
A16050  |    |  if spanzmax < pz or MccamZInfinity[x][y] then
A16051  |    |    begin
A16052  |    |    |  WriteMccamZ (x, yspan, spanzmax); {A3048}
A16053  |    |    |  ZTag[x][yspan] = objectnumber;
A16054  |    |    end
A16055  |    end
A16056  end;
```

I claim as follows:

1. A method of writing graphics images from a set of geometry data stored in a data memory to rasterized pixel data stored in a frame buffer for presentation on a display screen, said method comprising the steps of:

storing a number for use as a z-coordinate value with each image pixel location represented by said frame buffer in a magnitude comparison content addressable memory buffer;

selecting a geometry data item having at least one z-coordinate value from said set of geometry data stored in said data memory;

generating a bounding box around said selected geometry data;

determining a minimum z-coordinate value of said selected geometry data;

simultaneously performing for each of a plurality of pixels, prior to generation of pixel raster data from said selected geometry data, an arithmetic magnitude comparison between said minimum z-coordinate value and previously stored z-coordinate values associated with each of said plurality of pixels of previously selected geometry data currently stored on a pixel-by-pixel basis in said magnitude comparison content addressable memory buffer; and discarding on a pixel-by-pixel basis, prior to generation of pixel raster data from said selected geometry data, a portion of said selected geometry data for which said minimum z-coordinate value is greater than said previously stored z-coordinate values within said bounding box so that said discarded portion of said selected geometry data is not written to said frame buffer.

2. The method of claim 1, wherein said bounding box generated in said generating step is a minimum sized rectangle in a viewing plane defined by said display screen which covers the area covered by said selected geometry data.

3. The method of claim 1, further comprising the step of:

replacing said previously stored z-coordinate values in said magnitude comparison content addressable memory buffer with the z-coordinate values of said selected geometry data when said minimum z-coordinate value is less than said previously stored z-coordinate values.

4. The method in claim 1, wherein said step of simultaneously performing said plurality of arithmetic magnitude comparisons between said minimum z-coordinate value and said previously stored z-coordinate values of previously selected geometry data comprises simultaneously performing said arithmetic magnitude comparisons between said minimum z-coordinate value and all of said previously stored z-coordinate values.

5. The method of claim 1, wherein said arithmetic magnitude comparison operations are selected from the group consisting of a greater-than arithmetic operation, a greater-than-or-equal-to arithmetic operation, a less-than arithmetic operation, and a less-than-or-equal-to arithmetic operation.

6. The method of claim 1, further comprising the steps of:

storing a plurality of words, each of said words comprising a plurality of data fields, each of said data fields being divided into a plurality of data bits;

providing an input comprising a plurality of input fields matching some of said data fields, and dividing each said input into input bits so as to have a one-to-one bit correspondence to the said data bits in said data fields in said words;

simultaneously comparing said plurality of input fields to all said words such that each said data field is compared to its corresponding said input, and for simultaneously generating a query result for each said word which is true when all said data fields within said word which are compared to one of said inputs compare favorably to each corresponding said input;

flag memory means for storing a flag bit equal to said query result for each of said words;

writing data to multiple words of said magnitude comparison content addressable memory simultaneously; and performing multiple simultaneous queues of words of said magnitude comparison content addressable memory.

7. The method in claim 1, wherein each said number stored in said magnitude comparison content addressable memory buffer for use as a z-coordinate value is a number indicating that said z-coordinate value is at an infinite distance from the viewing eyepoint.

8. The method of claim 1, wherein said magnitude comparison test comprises applying a comparison test to all pixels previously stored in the MCCAM z-buffer and generating said first boolean value for each pixel when the following formula is satisfied as false:

$$\text{Pixel}(x,y)=0 \text{ if } [(x<x_{min}) \vee (x>x_{max}) \vee (y<y_{min}) \vee (y>y_{max}) \vee (z<z_{min})].$$

9. The method of claim 8, wherein said boolean value is generated from separate comparison result generating steps for each of the inequalities $x<x_{min}$, $x>x_{max}$, $y<Y_{min}$, $y>y_{max}$, and $z<z_{min}$.

10. The method of claim 9, wherein said occulting test uses a comparison apparatus of said MCCAM z-buffer to determine if said bounding box is occulted by previously rasterized geometry; and wherein said comparison apparatus comprises:

means for performing the arithmetic less-than operation between said x and said $x_{min}$ to generate an $x_{min}$ comparison result;

means for performing the arithmetic greater-than operation between said x and said $x_{max}$ to generate an $x_{max}$ comparison result;

means for performing the arithmetic less-than operation between said y and said $y_{min}$ to generate an $y_{min}$ comparison result;

means for performing the arithmetic greater-than operation between said y and said $y_{max}$ to generate an $y_{max}$ comparison result;

means for performing the arithmetic less-than operation between said z and said $z_{min}$ to generate an $z_{min}$ comparison result; and logic means receiving said comparison results and generating an occultation result based on said comparison results and predetermined rules.

11. The method of claim 10, wherein each said arithmetic less-than operation between said z and said $z_{min}$ comparison is performed simultaneously including comparisons for pixels outside said projected bounding box; whereby the value of occulted is determined in an amount of time independent of both the number of pixels or the size of the projected bounding box.

12. The method of claim 11, wherein said bounding box occulting test further comprises the steps of:

terminating said occulting test at any time occulted is set to false; and testing only pixels within a projected bounding box for which $xmin \leq x \leq xmax$ and $ymin \leq y \leq ymax$.

13. The method in claim 10, wherein said MCCAM z-buffer comprises means for writing said z-fields while maintaining said x-fields and said y-fields fixed.

14. The method in claim 10, wherein said MCCAM further comprises means for performing a raster-write operation to simultaneously write a fixed z-value to multiple words of said MCCAM, and wherein said multiple words comprise words adjacent along a display raster line.

15. The method in claim 1, further comprising the step of temporally correlating a sequence of image scenes through the use of tag pointers to source geometry stored in a tag field within said MCCAM z-buffer.

16. The system of claim 1, wherein said display screen pixels are divided into a plurality of sub-image blocks; and wherein said system comprises a plurality of magnitude comparison content addressable memory z-buffers arranged in parallel, each said magnitude comparison content addressable memory z-buffers processing data for one of said sub-image blocks; said parallel arrangement of magnitude comparison content addressable memory z-buffers operating to increase the overall input/output capability said system over that provided by a single magnitude comparison content addressable memory z-buffer.

17. A graphics rendering system comprising:

a magnitude comparison content addressable memory for (i) receiving coordinate values including numerical z-coordinate values of corresponding geometry data, and (ii) for performing simultaneous arithmetic magnitude comparisons between a plurality of said received coordinate values with previously stored coordinate values in said magnitude comparison content addressable memory, and (iii) for generating an occulting signal representing results from said plurality of arithmetic magnitude comparisons of said received coordinate values with said stored coordinate values, and (iv) for updating said stored coordinate values in response to a result of said arithmetic magnitude comparisons;

a processor coupled to said magnitude comparison content addressable memory for processing said geometry data responsive to said generated occulting signal from said magnitude comparison content addressable memory; and a frame buffer coupled to said processor for storing said processed geometry data from said processor.

18. The graphics rendering system recited in claim 17 further comprising:

a z-buffer for storing actual z-coordinate values corresponding to said coordinate values of said geometry data from said processor; and wherein said z-coordinate values stored in said magnitude comparison content addressable memory are approximate z-coordinate values of said geometry data, said approximate z-coordinate values being greater-than-or-equal-to said actual z-coordinate value so that when a new geometry data is compared to said stored approximated z-coordinate value then said new geometry data is never declared occulted based on said approximated Z-coordinate value if it would not be declared occulted based on said actual z-coordinate value.

19. The graphics rendering system of claim 17, wherein said magnitude comparison content addressable memory (MCCAM) further comprises:

means for storing a plurality of words, each of said words comprising a plurality of data fields, each of said data fields being divided into a plurality of data bits;

means for providing an input to said MCCAM, said input comprising a plurality of input fields matching some of said data fields, each said input being divided into input bits so as to have a one-to-one bit correspondence to said data bits in said data fields;

query means for simultaneously comparing said plurality of input fields to all of said words so that each said data field is compared to its corresponding input field, and for simultaneously generating a query result for each said word which result is true only when all said data fields within said word compare favorably to each corresponding said input; said query means including arithmetic magnitude comparator means associated with each said word storing a pixel z-value for comparing said stored pixel z-value with a reference value; and flag memory means for storing a flag bit equal to said query result for each of said words.

20. The system of claim 19, wherein:

said magnitude comparison content addressable memory further comprises means for writing data to multiple words of said magnitude comparison content addressable memory simultaneously; and means for performing multiple simultaneous queries of words of said magnitude comparison content addressable memory;

whereby the number of clock cycles needed to process geometry data is reduced.

21. The graphics rendering system in claim 17, wherein said magnitude comparison content addressable memory for performing simultaneous arithmetic magnitude comparisons between a plurality of said received coordinate values with previously stored coordinate values in said magnitude comparison content addressable memory comprises:

means for performing simultaneous arithmetic magnitude comparisons between all of said received coordinate values with said previously stored coordinate values in said magnitude comparison content addressable memory; and wherein said arithmetic magnitude comparisons operations are selected from the group consisting of a greater-than arithmetic operation, a greater-than-or-equal-to arithmetic operation, a less-than arithmetic operation, and a less-than-or-equal-to arithmetic operation.

22. A method of converting imagery in the form of a set of geometry data stored in a data memory to rasterized pixel data stored in a frame buffer for presentation on a display screen, said method comprising the steps of:

storing a number for use as a z-coordinate value with each image pixel represented by said frame buffer in a storage location within a magnitude comparison content addressable memory buffer;

selecting a geometry data item having at least one z-coordinate value from said set of geometry data;

generating an approximating boundary characterization of said selected geometry data based on coordinate parameters of said selected geometry data;

determining a minimum z-coordinate value of said selected geometry data;

simultaneously performing for each of pixel in said image an arithmetic magnitude comparison test between said geometry object minimum z-coordinate value and said stored z-coordinate values of said image pixels; and discarding on a pixel-by-pixel basis, any portion of said selected geometry data for which said minimum z-coordinate value is greater than said previously stored z-coordinate values within said boundary characterization prior to rasterization of said selected geometry data.

23. The method of claim 22, wherein said comparison test is performed for every pixel in the display screen, and further comprising the steps of:

setting, for each pixel prior to performing said comparison test, an occulted parameter to true to indicate that the geometrical location associated with said pixel is occulted;

determining the current z-coordinate value for said pixel;

determining whether said pixel is within said projected bounding box, and if said pixel is within said projected bounding box, then comparing said z-coordinate value to $z_{min}$;

if $z_{min}$ is not greater that said z-coordinate value of said evaluating pixel, then setting said occulted parameter to false for said pixel indicating that said new geometry may not be occulted and required additional processing to determine whether said geometry is occulted or not; and wherein every pixel is evaluated for occultation simultaneously in a predetermined number of clock cycles independent of the number of pixels and independent of the size of the projected bounding box.

24. The method of claim 23, wherein said predetermined number of clock cycles is one clock cycle.

25. The method of claim 24, wherein said method further comprises the steps of:

terminating said bounding box occulting test whenever a pixel is determined not to be occulted and said occulted value is set to false; and testing only pixels within said projected bounding box rather than all of said pixels within said display screen.

26. The method of claim 24, wherein said comparison tests are performed for all pixels in said display screen simultaneously and in parallel to search and determine if any piece of geometry is occulted, so that an entire object is tested to determine if it is occulted before said object is rasterized into pixels so that if it is determined that said entire object is occulted then all of the computations for converting the object geometry to pixels are avoided.

27. The method of claim 23, wherein said occulting test further comprises the steps of:

storing geometrical parameters for each pixel in a word in a data structure, said word including an x-field for storing and comparing the pixel x-value, a y-field for storing and comparing the pixel y-value, a z-field for storing and comparing the pixel z-value, and a logic field for storing and generating result signals including a pixel miss signal.

28. The method of claim 27, wherein said word further includes an infinity flag field for indicating that the z-value of the associated pixel is infinity, thus causing the pixel to be further away from the viewing point than any geometry could be located;

whereby said infinity field for all pixels may be set in parallel and thereby eliminate any need to separately write each z-value with a large value;

said infinity flag being cleared whenever a new z-value is written to the associated pixel; and wherein said magnitude comparison test comprises applying a comparison test to all pixels previously stored in said magnitude comparison content addressable memory (MCCAM) z-buffer and generating said first boolean value for each pixel when the following formula is satisfied as false:

$$\text{Pixel}(x,y)=0 \text{ if } [(x<x_{min}) \vee (x>x_{max}) \vee (y<y_{min}) \vee (y>y_{max}) \vee \{(z<z_{min}) \vee \text{NOT}(\text{Infinity\_Flag})\}].$$

29. The method of claim 28, further comprising the steps of:

tagging pixels generating a first boolean value indicating said pixel is not occuoted for a subsequent processor to use in rendering temporally related scenes.

30. The method of claim 29, further comprising the steps of:

grouping said tagged pixels together into segments along a display raster line.

* * * * *